United States Patent [19]

Leising et al.

[11] Patent Number: 4,938,102
[45] Date of Patent: Jul. 3, 1990

[54] METHOD OF ADAPTIVELY SCHEDULING A SHIFT FOR AN ELECTRONIC AUTOMATIC TRANSMISSION SYSTEM

[75] Inventors: Maurice B. Leising, Clawson; Howard L. Benford, Bloomfield Hills, both of Mich.

[73] Assignee: Chrysler Motors Corporation, Highland Park, Mich.

[21] Appl. No.: 326,492

[22] Filed: Mar. 17, 1989

Related U.S. Application Data

[63] Continuation of Ser. No. 188,599, Apr. 23, 1988, abandoned.

[51] Int. Cl.⁵ .............................................. B60K 41/18
[52] U.S. Cl. ............................................................ 74/866
[58] Field of Search ................. 74/866, 752 A, 752 C, 74/752 D

[56] References Cited

U.S. PATENT DOCUMENTS

| | | | |
|---|---|---|---|
| 3,927,579 | 12/1975 | Golan | 74/752 C |
| 3,942,393 | 3/1976 | Forster et al. | 74/866 |
| 4,044,634 | 8/1977 | Florus et al. | 74/866 |
| 4,073,204 | 2/1978 | Dick | 74/866 |
| 4,198,882 | 4/1980 | Kienoke et al. | 74/866 |
| 4,258,591 | 3/1981 | Eckert et al. | 74/866 |
| 4,468,989 | 9/1984 | Rosen | 74/869 |
| 4,503,734 | 3/1985 | Acker | 74/866 |
| 4,527,678 | 7/1985 | Pierce et al. | 74/866 |
| 4,551,802 | 11/1985 | Smyth | 74/866 X |
| 4,599,917 | 7/1986 | Léorat et al. | 74/866 |
| 4,608,873 | 9/1986 | Redzinsky | 74/866 |
| 4,638,690 | 1/1987 | Hattori et al. | 74/866 |
| 4,649,775 | 3/1987 | Ootani | 74/866 |
| 4,667,540 | 5/1987 | Yagi | 74/866 |
| 4,707,789 | 11/1987 | Downs et al. | 304/424.1 |
| 4,724,723 | 2/1988 | Lockhart et al. | 74/854 |
| 4,727,472 | 2/1988 | Deutsch et al. | 74/866 X |
| 4,736,813 | 4/1988 | Hayama et al. | 74/866 X |
| 4,744,031 | 5/1988 | Takeda et al. | 74/866 X |
| 4,789,937 | 12/1988 | Yasue et al. | 74/866 X |
| 4,817,471 | 4/1989 | Tury | 74/866 |

Primary Examiner—Dirk Wright
Attorney, Agent, or Firm—Mark P. Calcaterra

[57] ABSTRACT

A method of adaptively scheduling a shift or inhibiting a shift until engine speed is at least equal to or greater than the output speed of the target gear which will prevent any negative torque, and will eliminate any "clunk" in the drivetrain in an automatic transmission system.

4 Claims, 97 Drawing Sheets

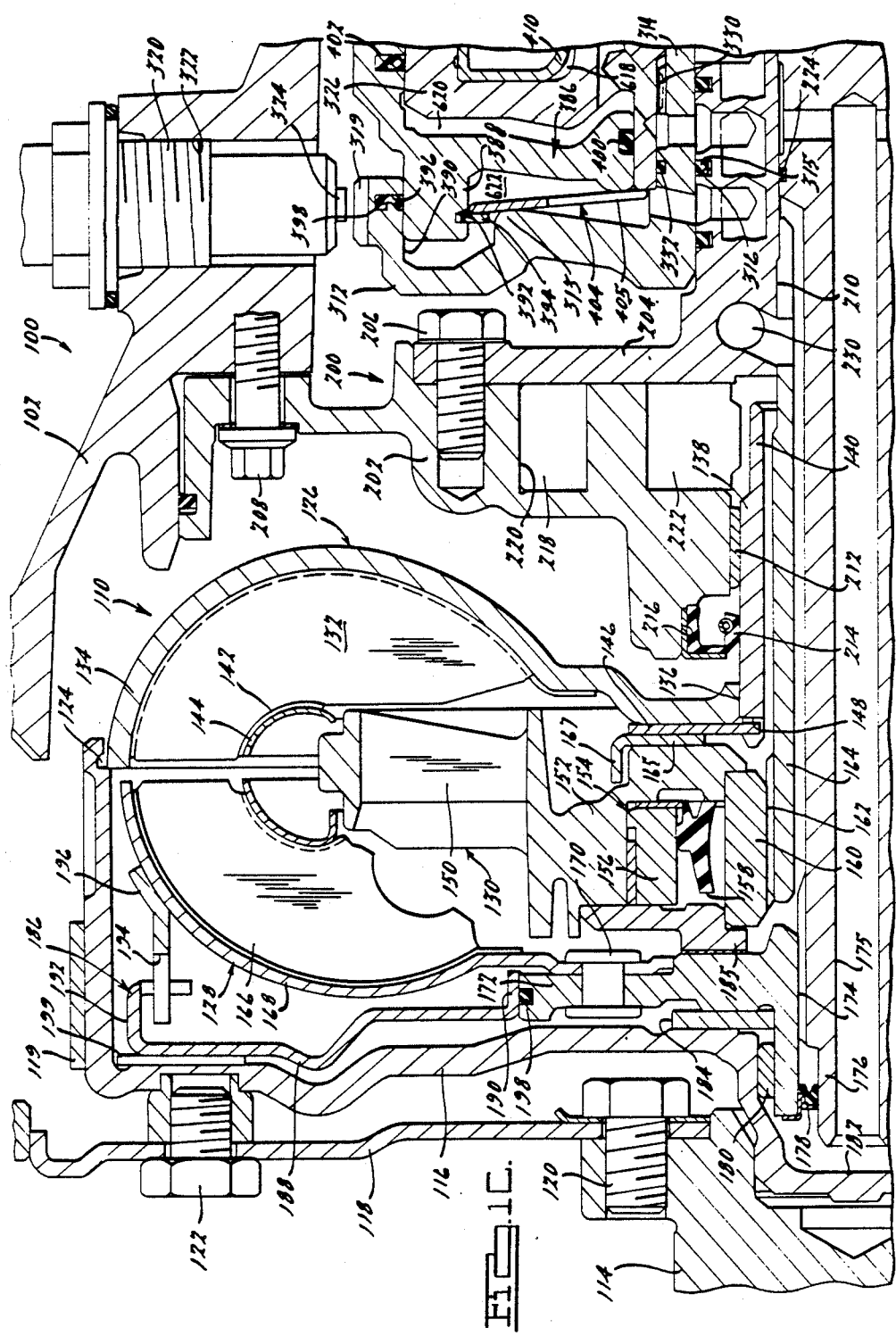

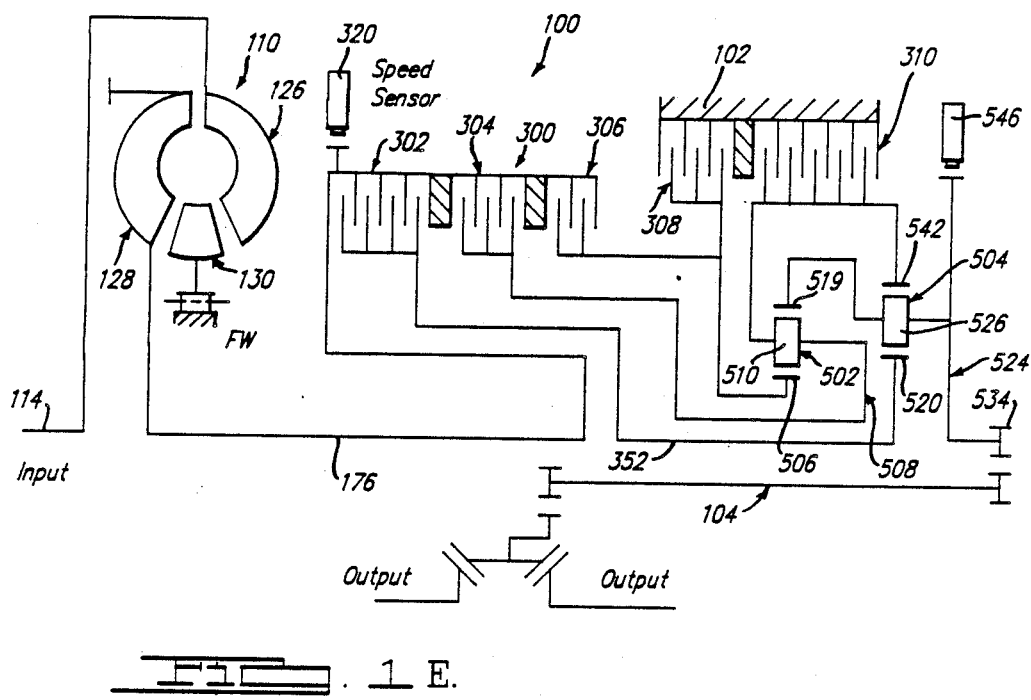
FIG. 1E.
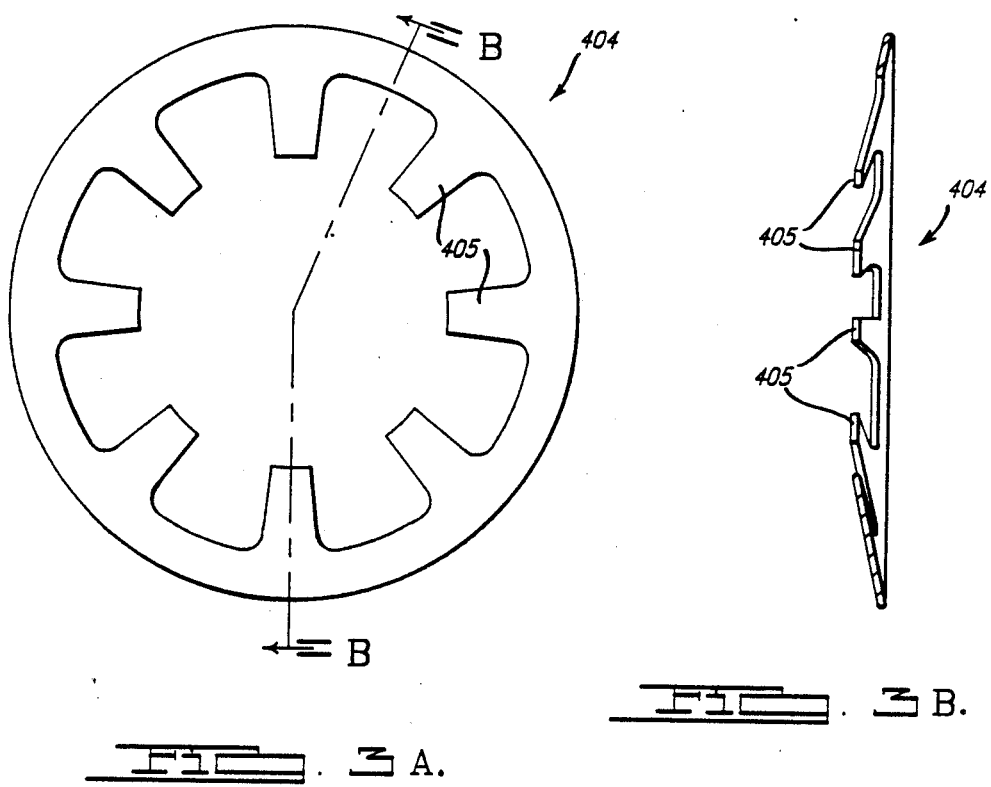
FIG. 3A.
FIG. 3B.

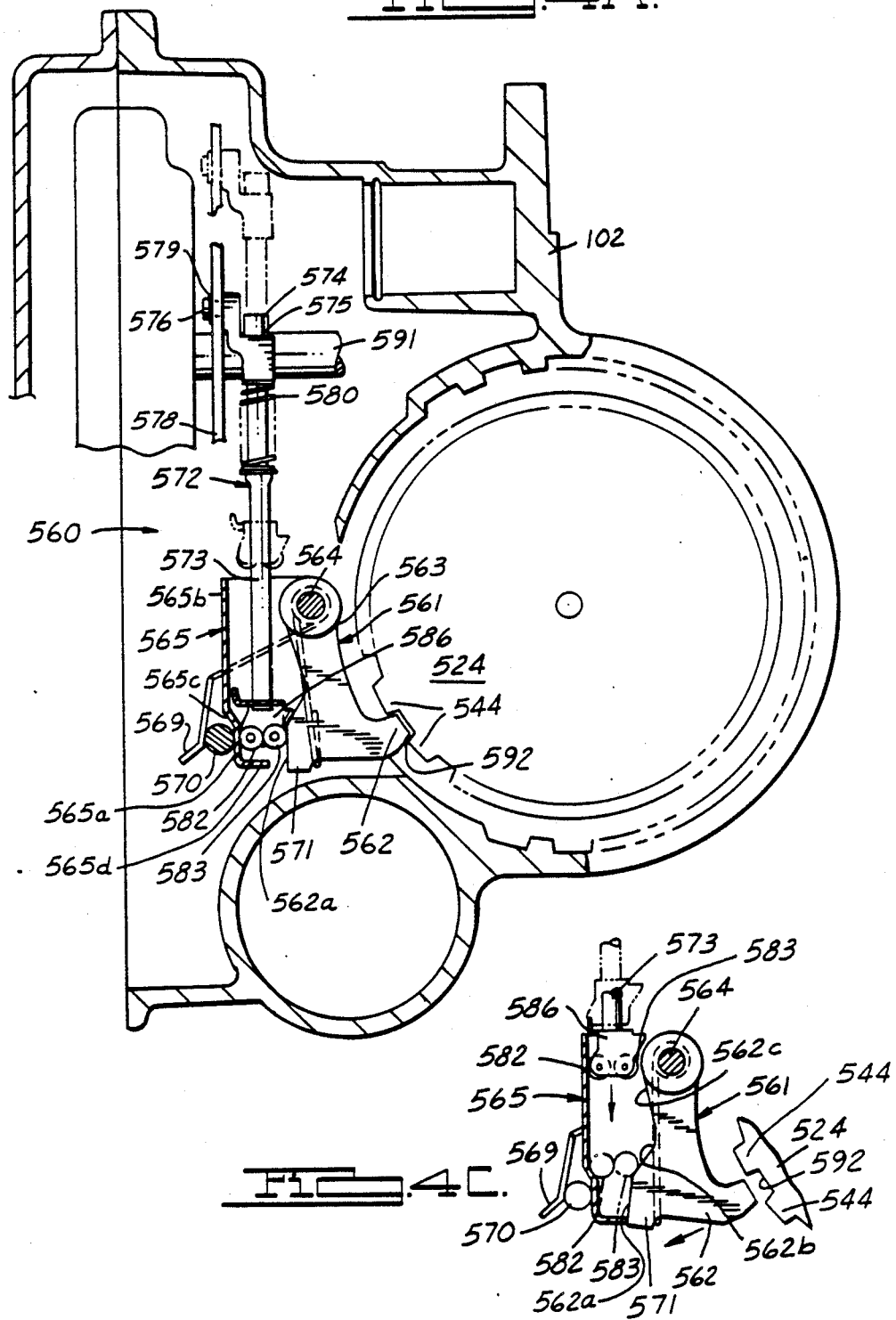

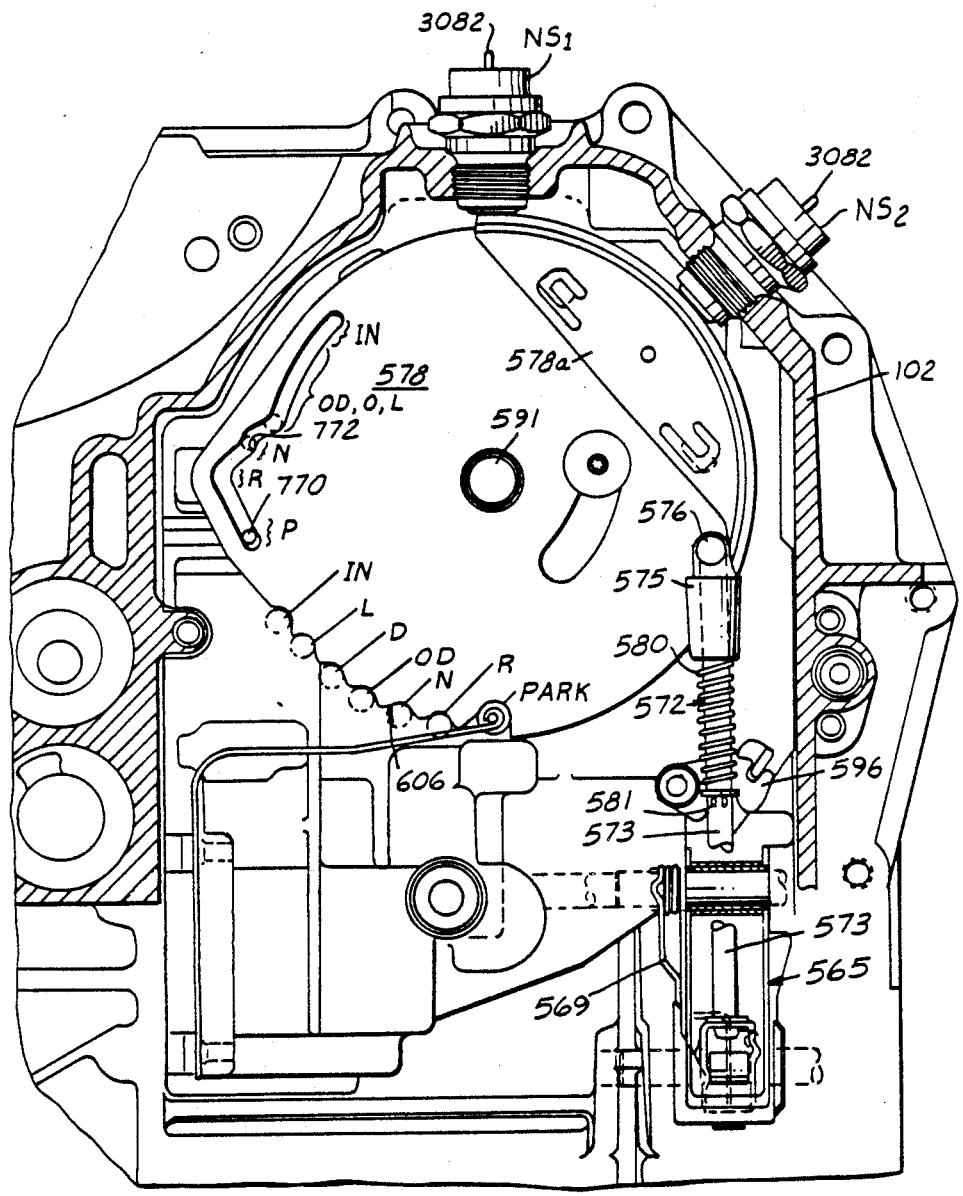

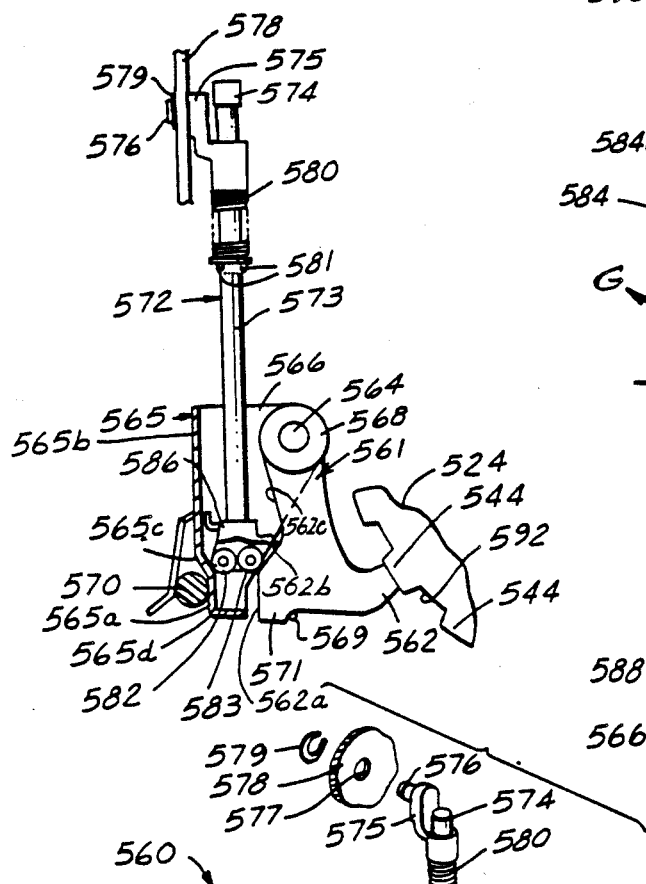
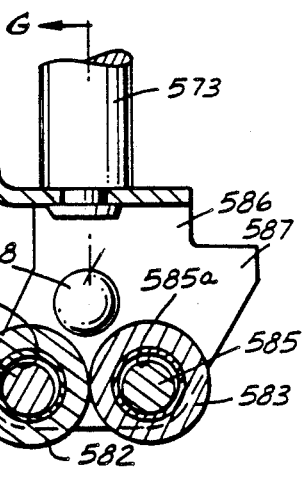
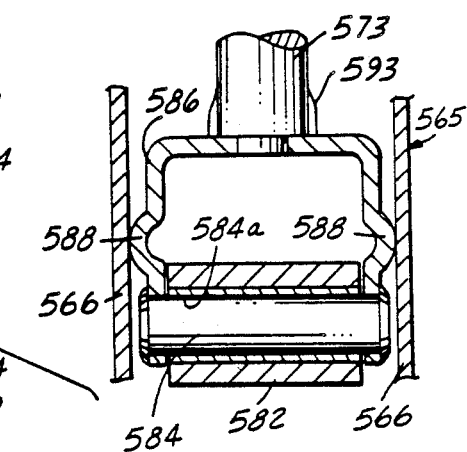
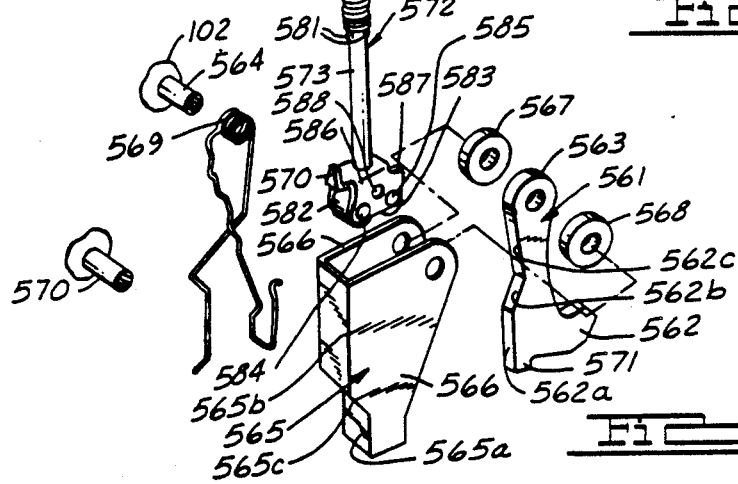

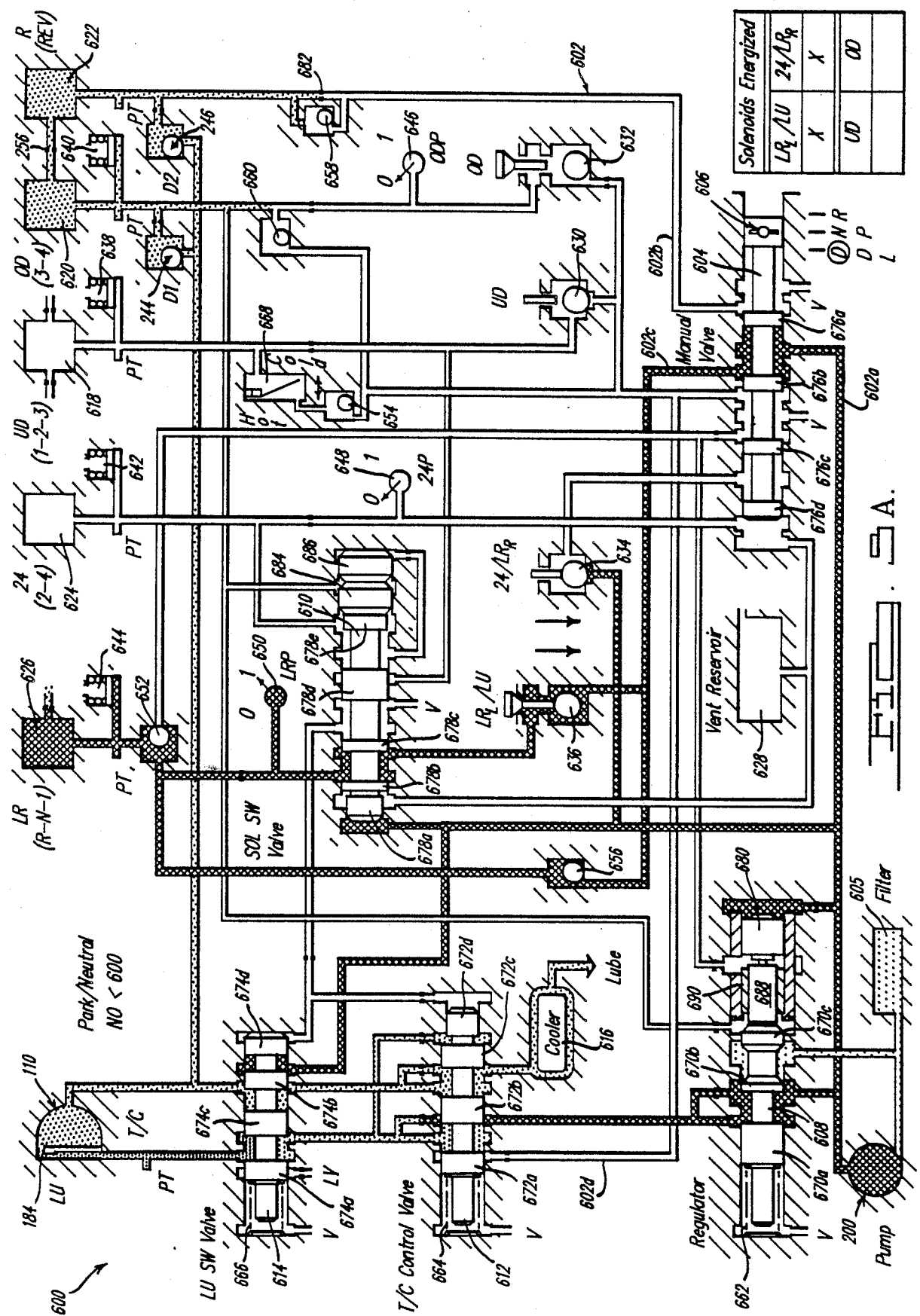

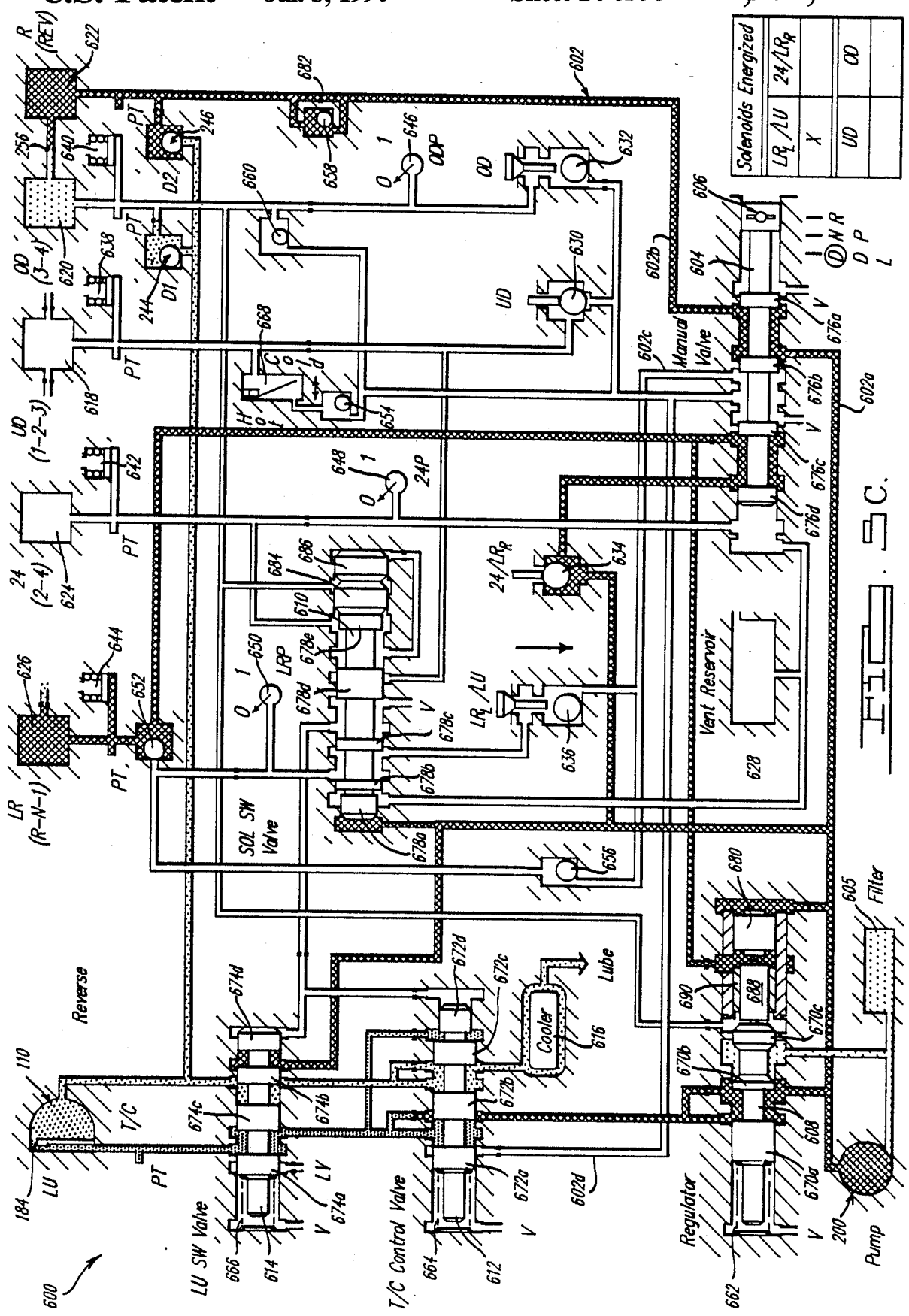

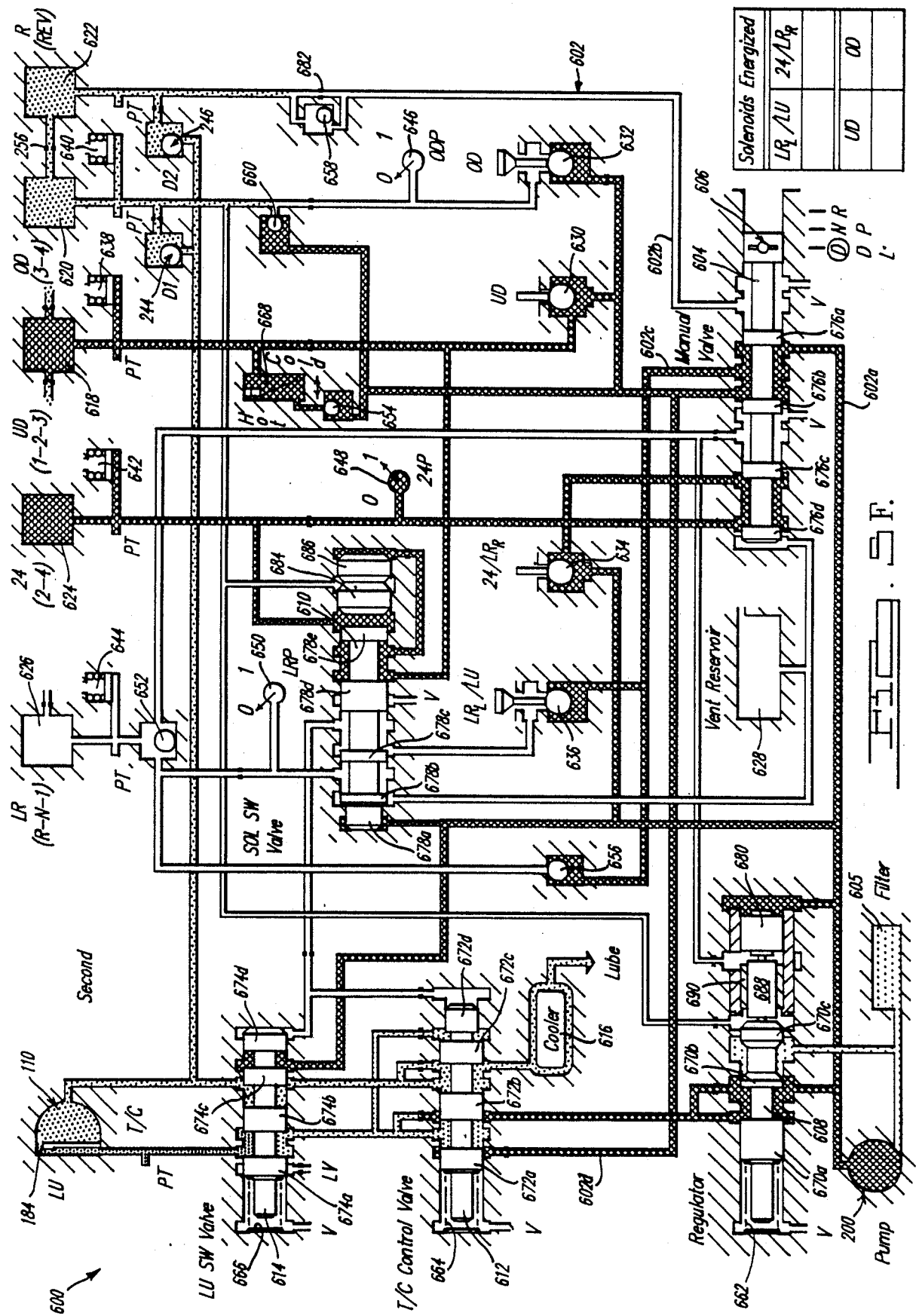

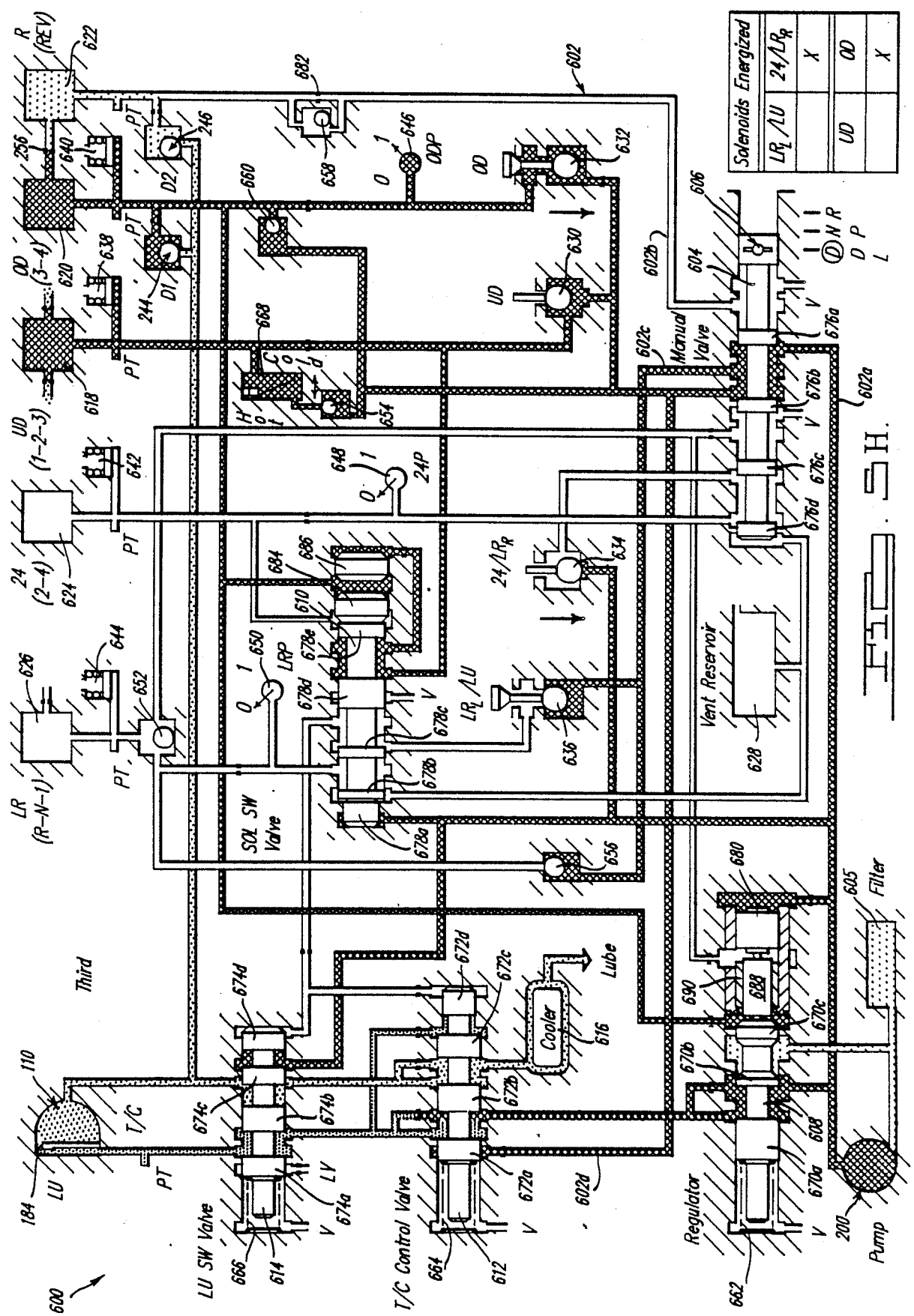

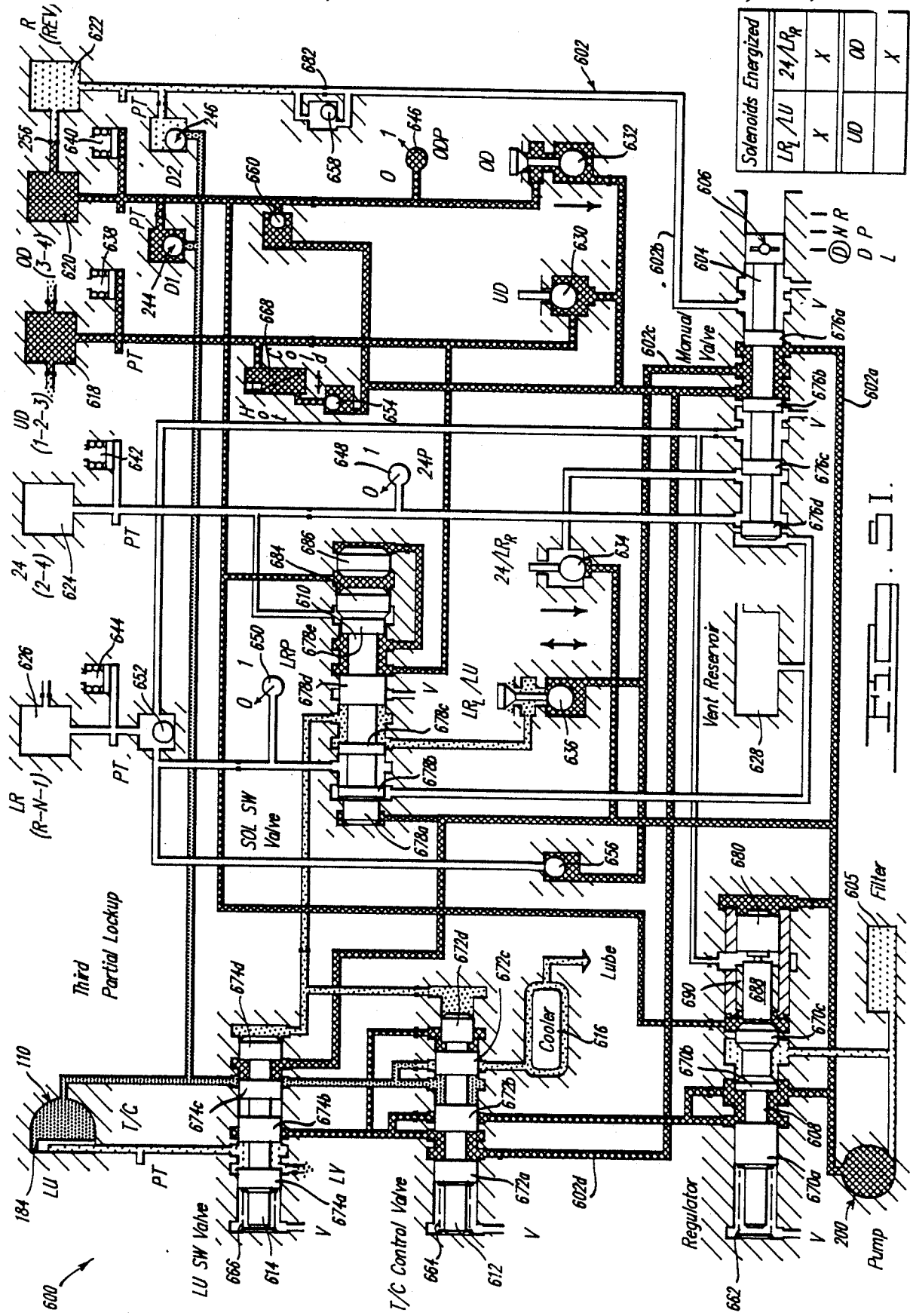

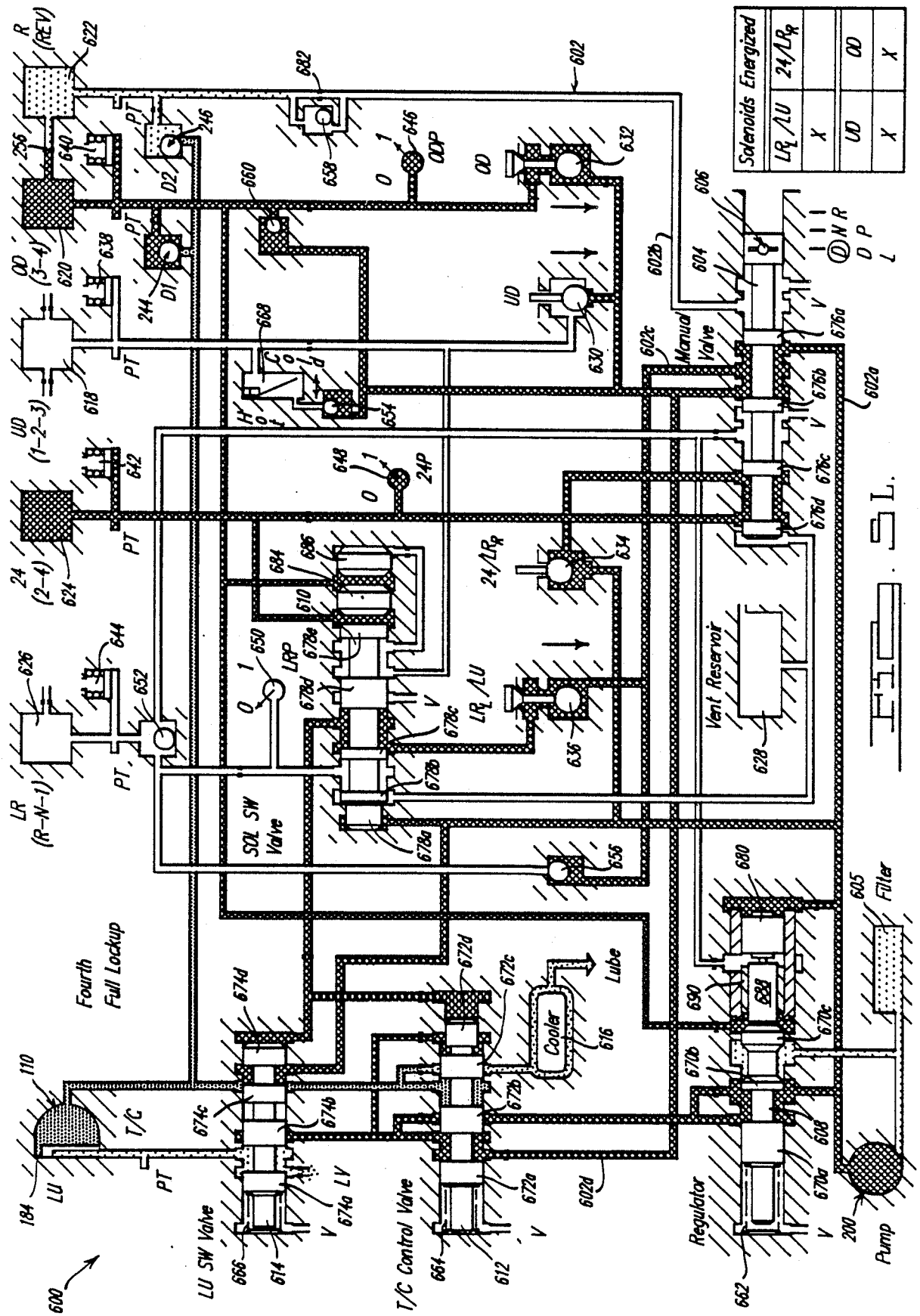

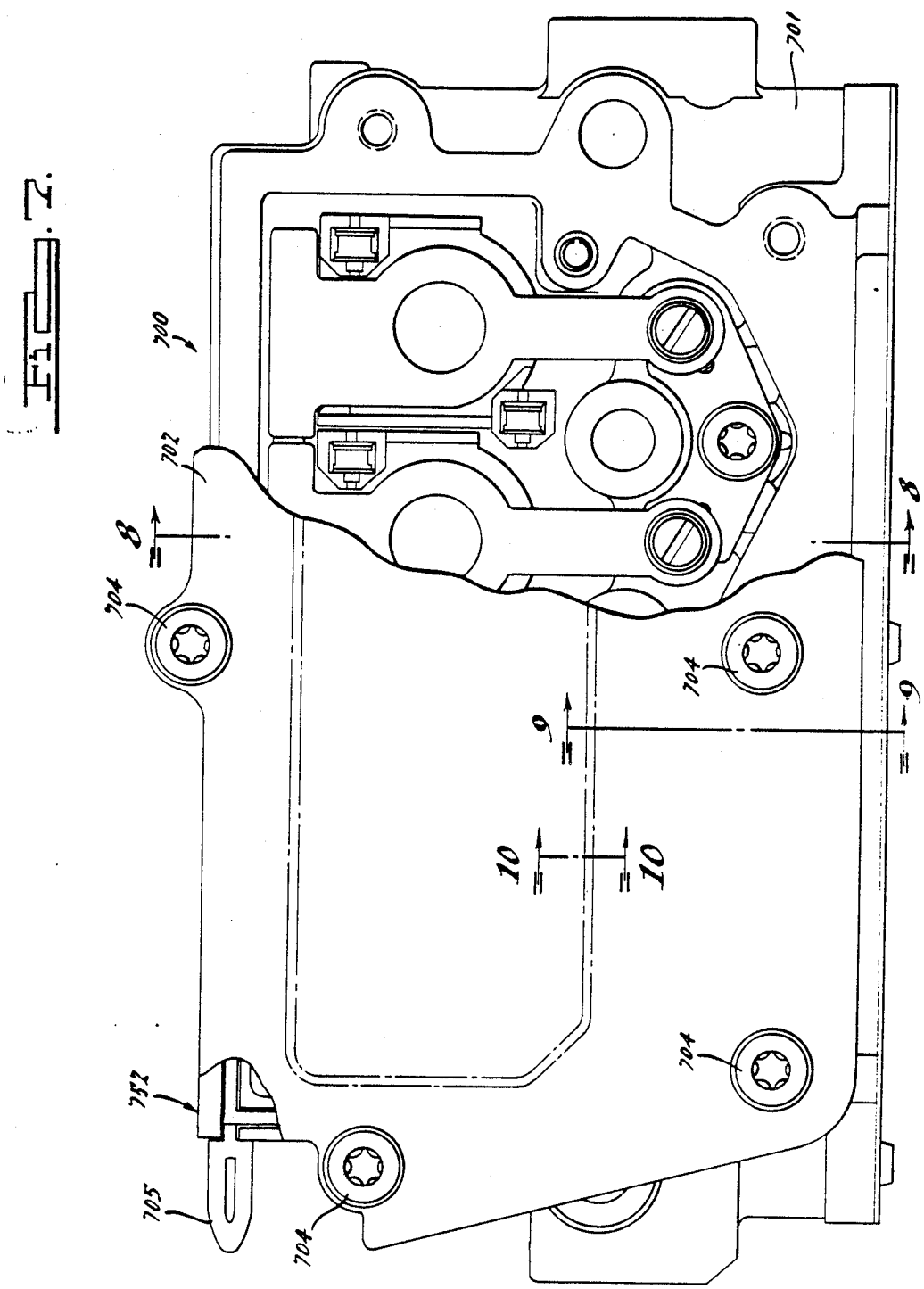

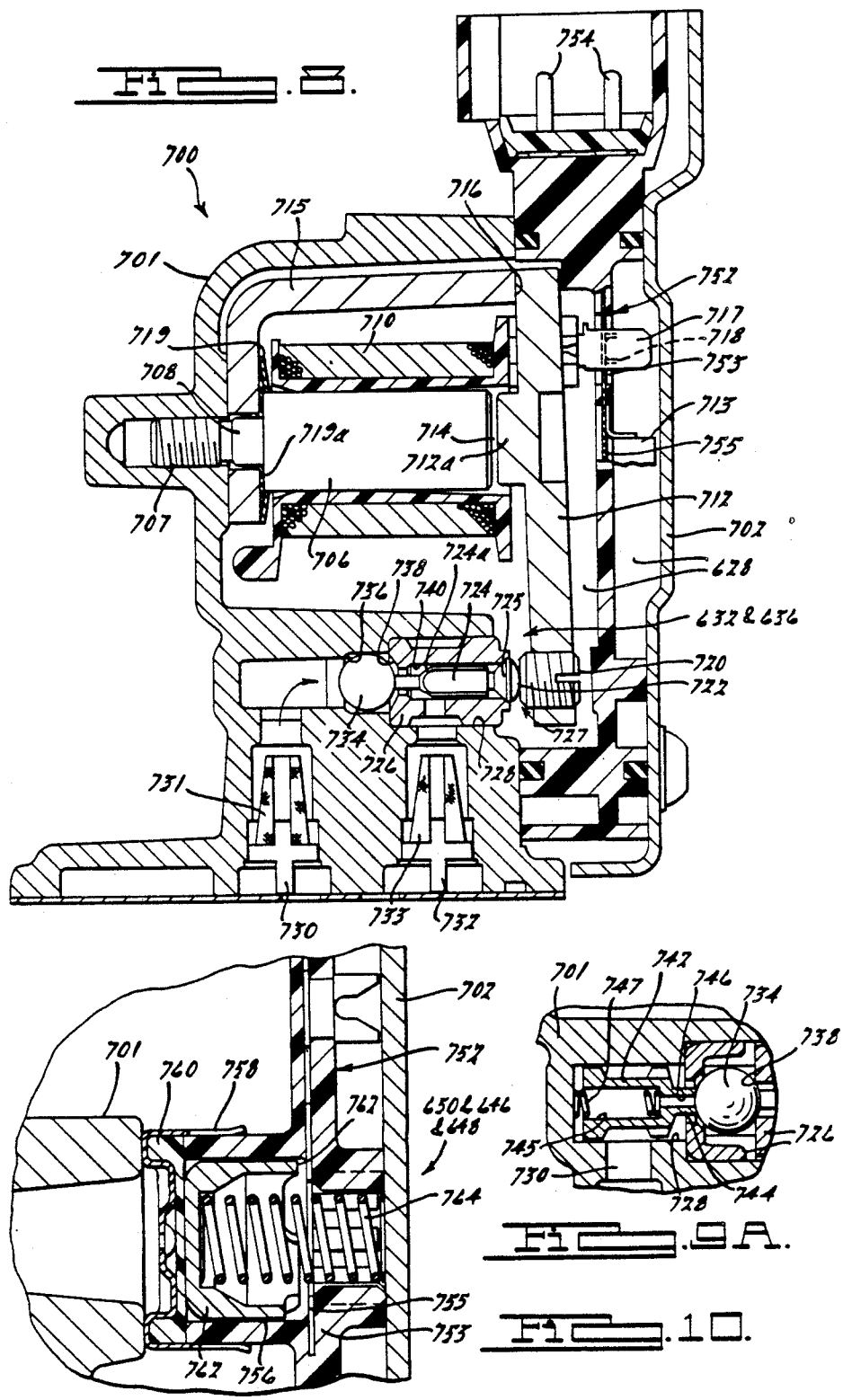

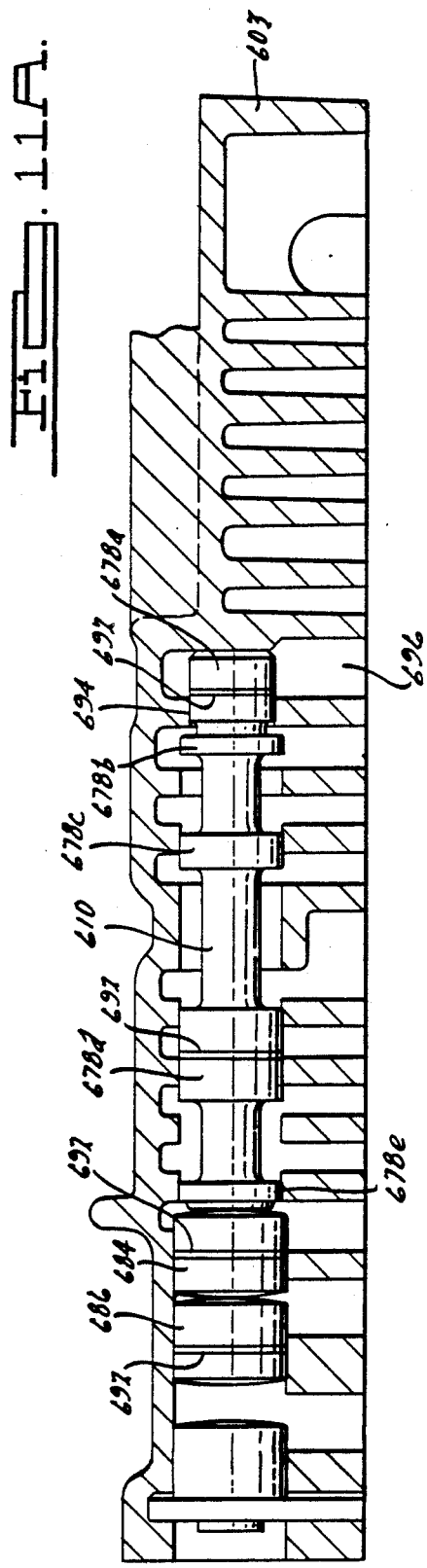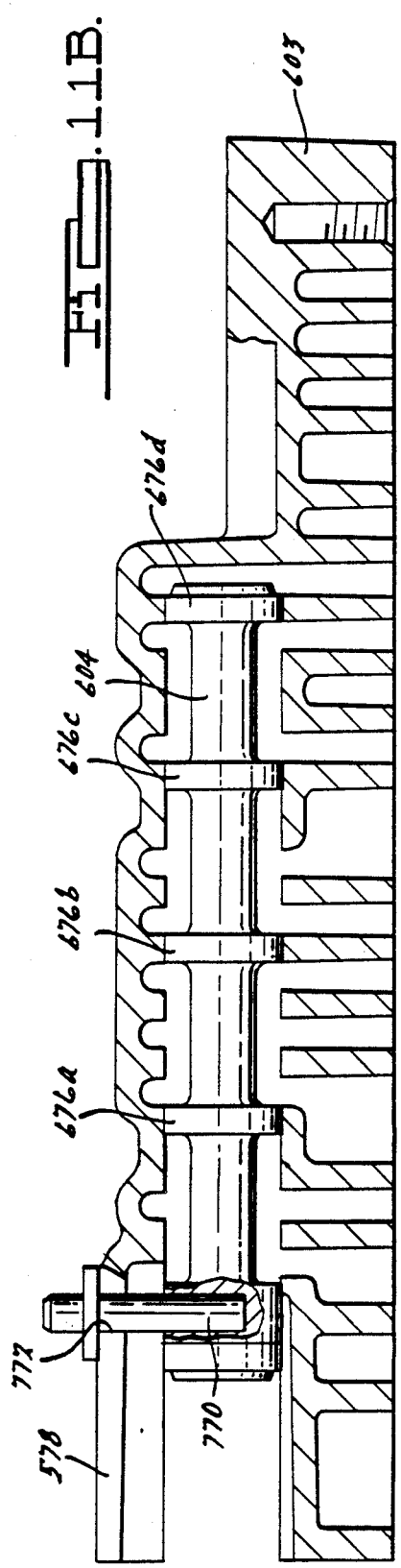

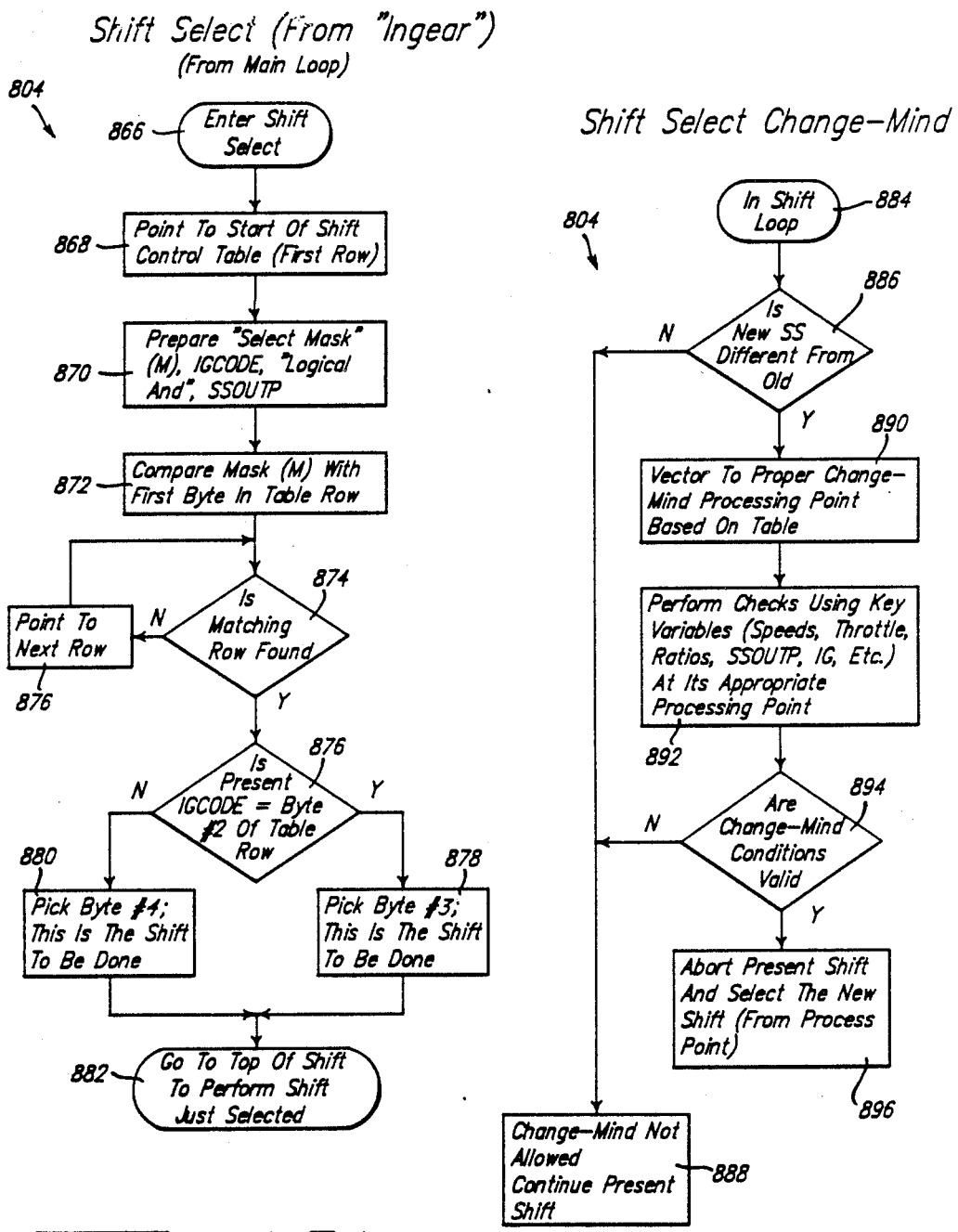

Downshift Logic

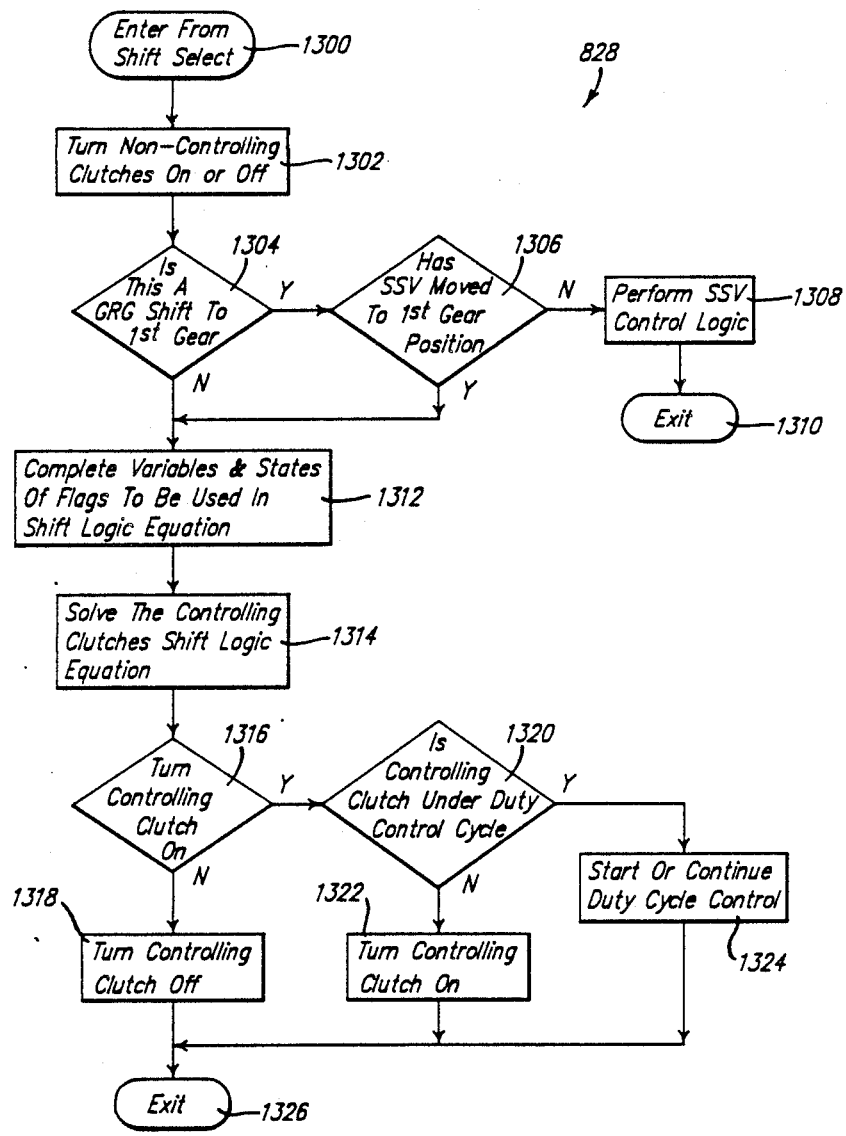
Garage Shift Logic

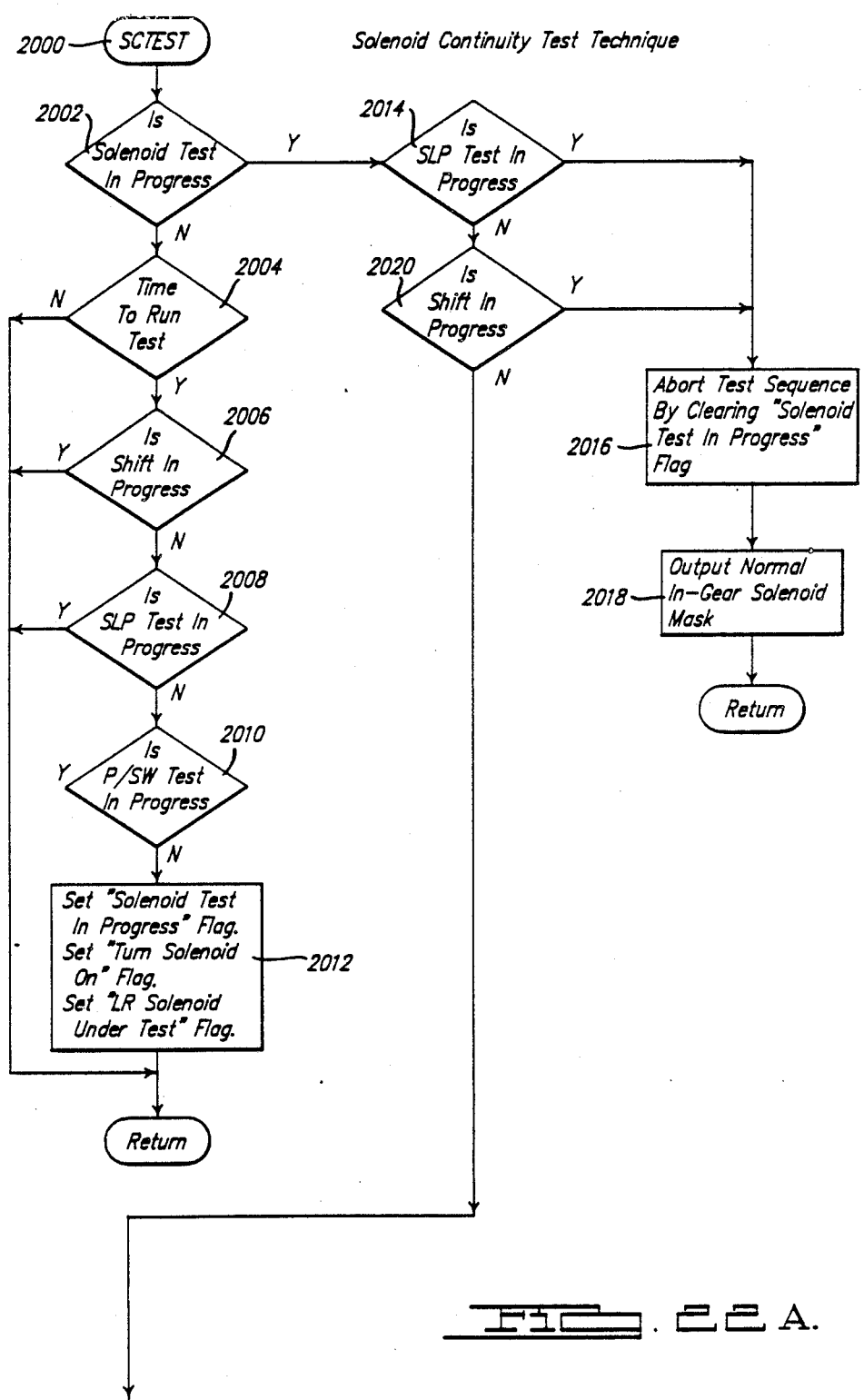

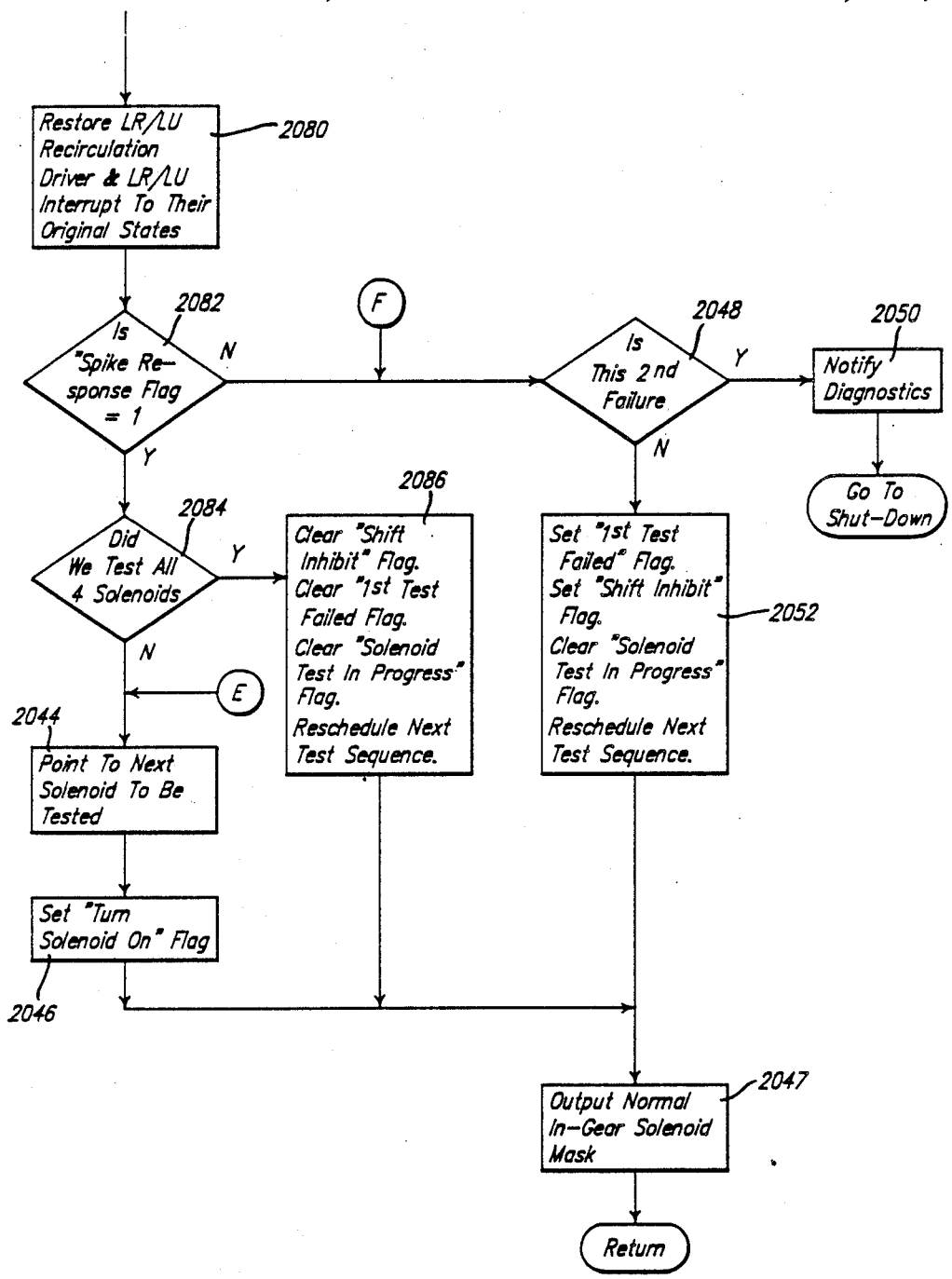

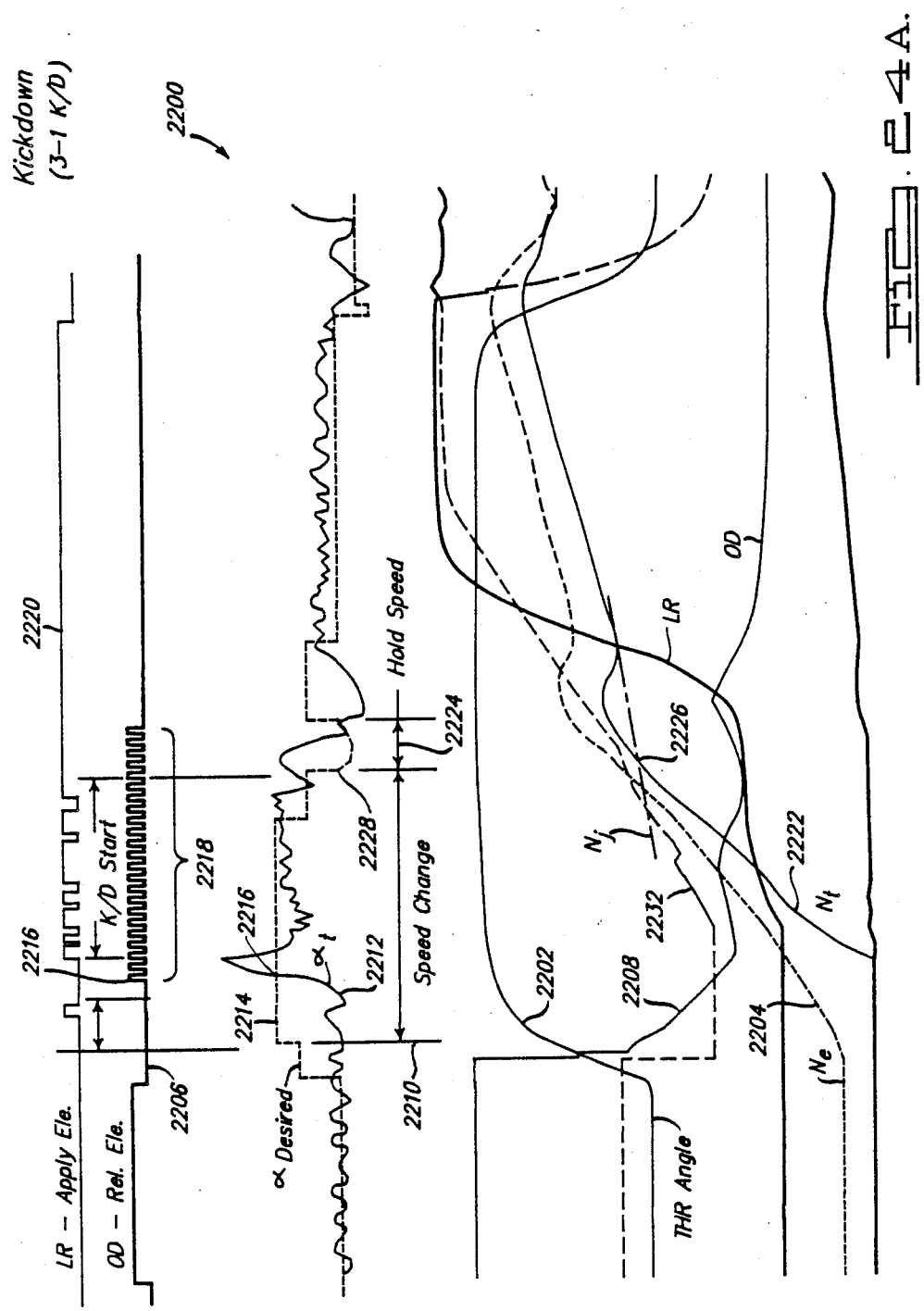

$$T_T = (69N_e - 57N_t) N_E (10^{-6}) \qquad N_t < .85N_e$$
$$135(N_e - N_t) N_E (10^{-6}) \qquad N_t \geq .85N_e$$

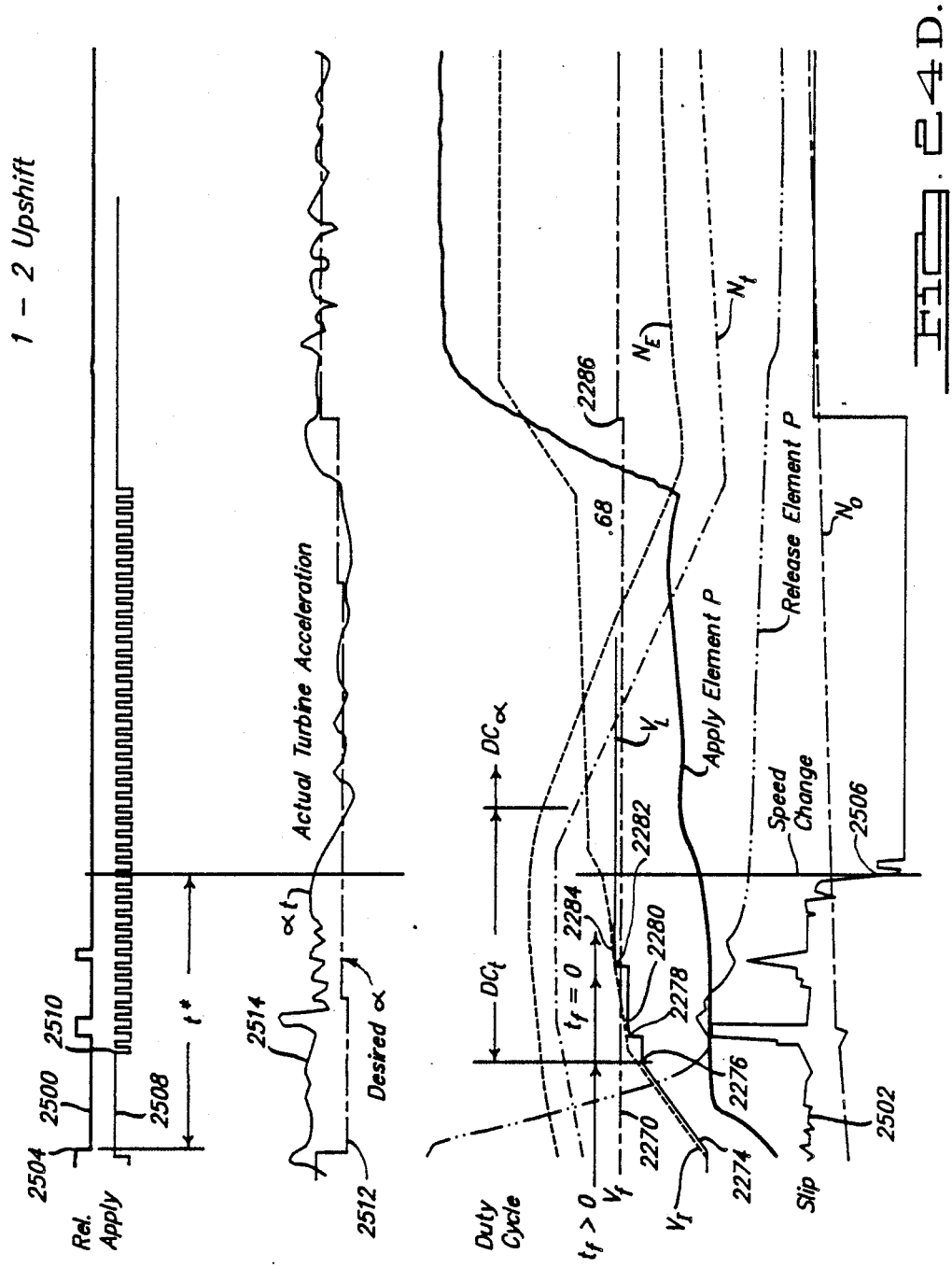

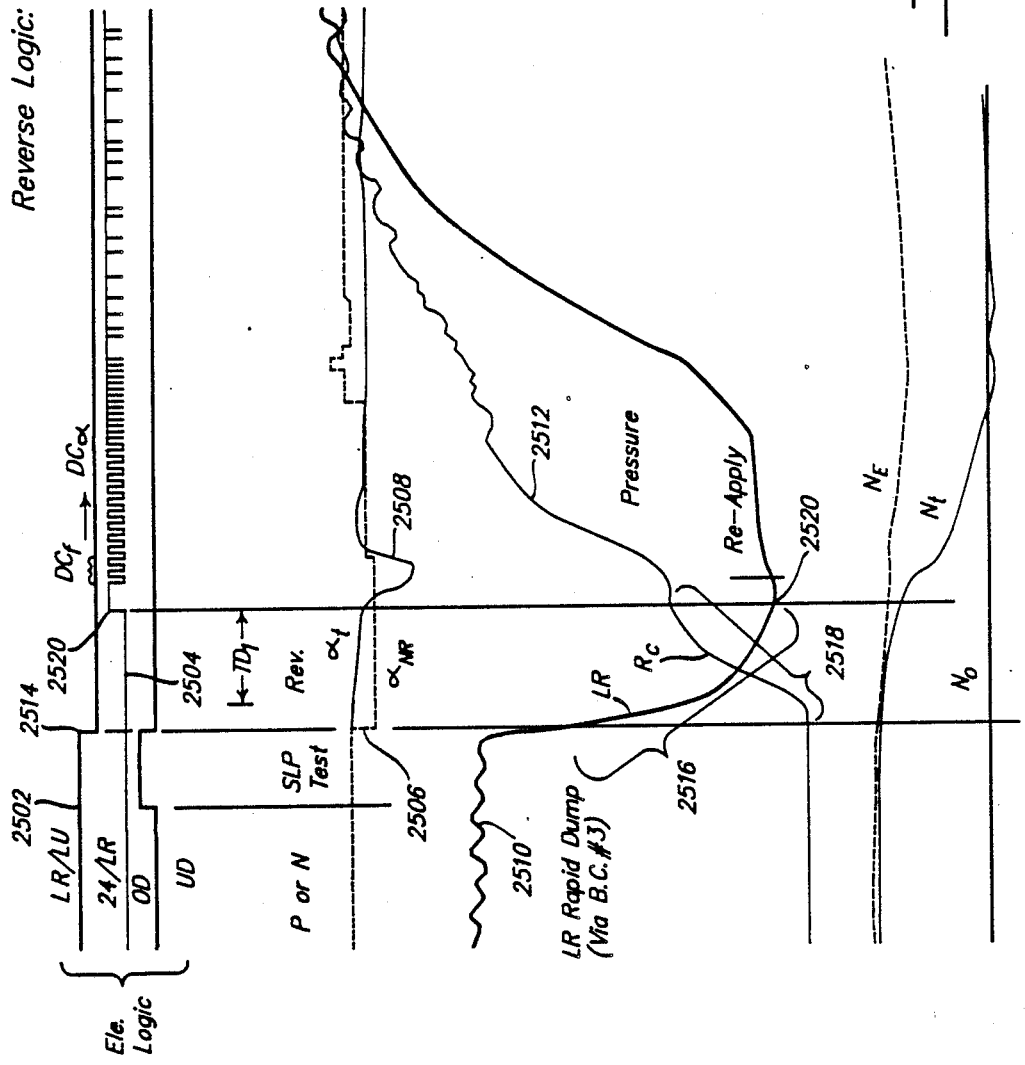

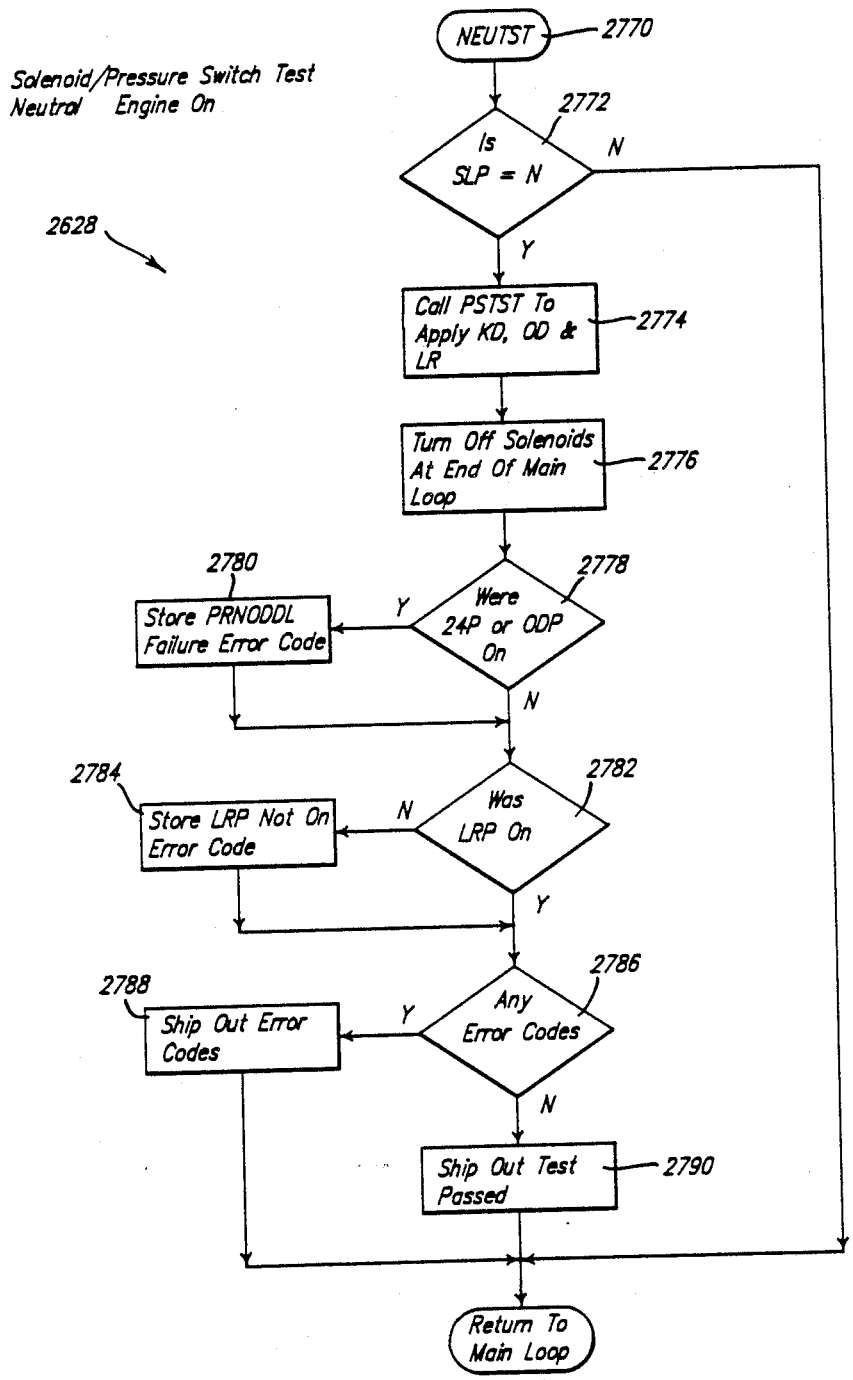

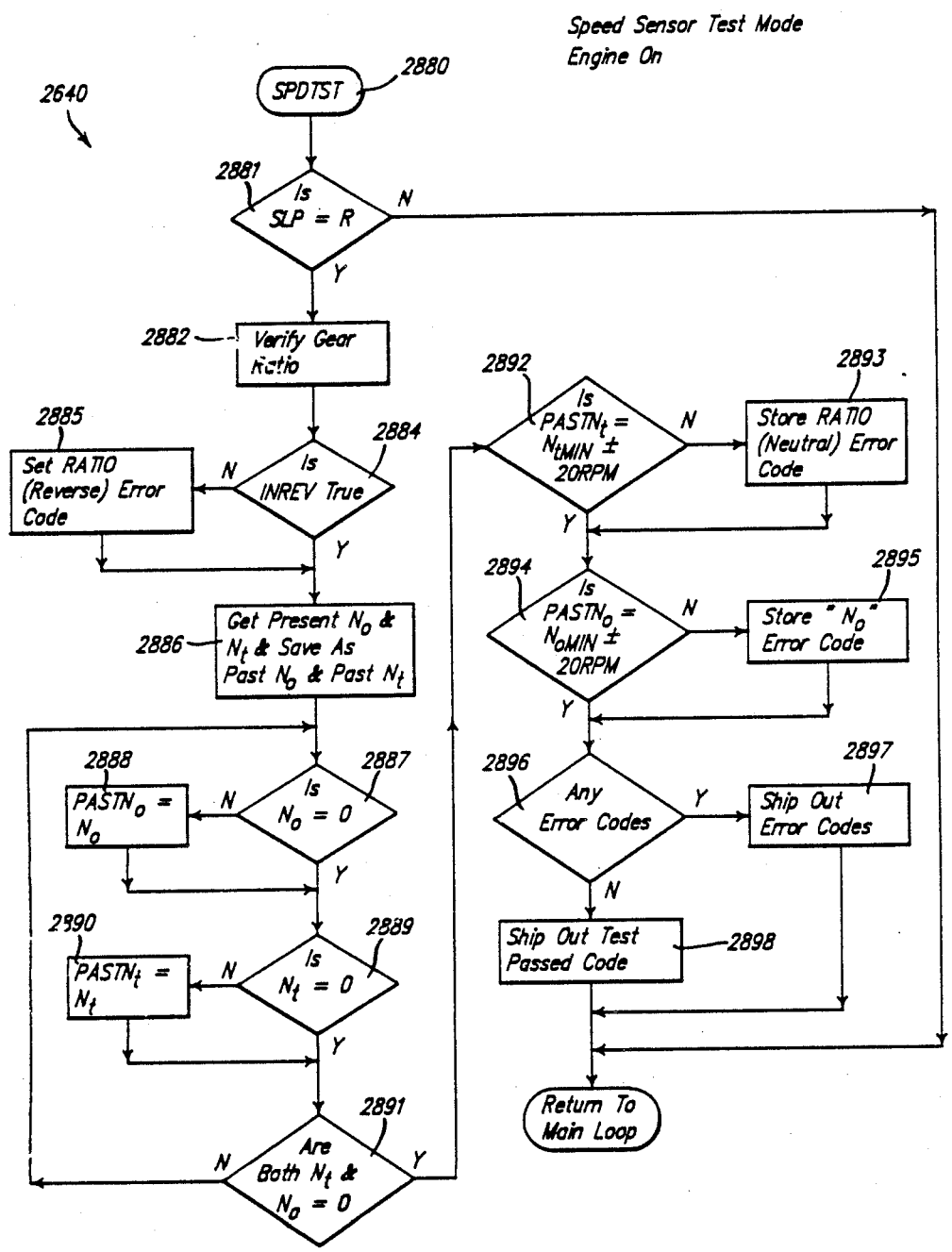

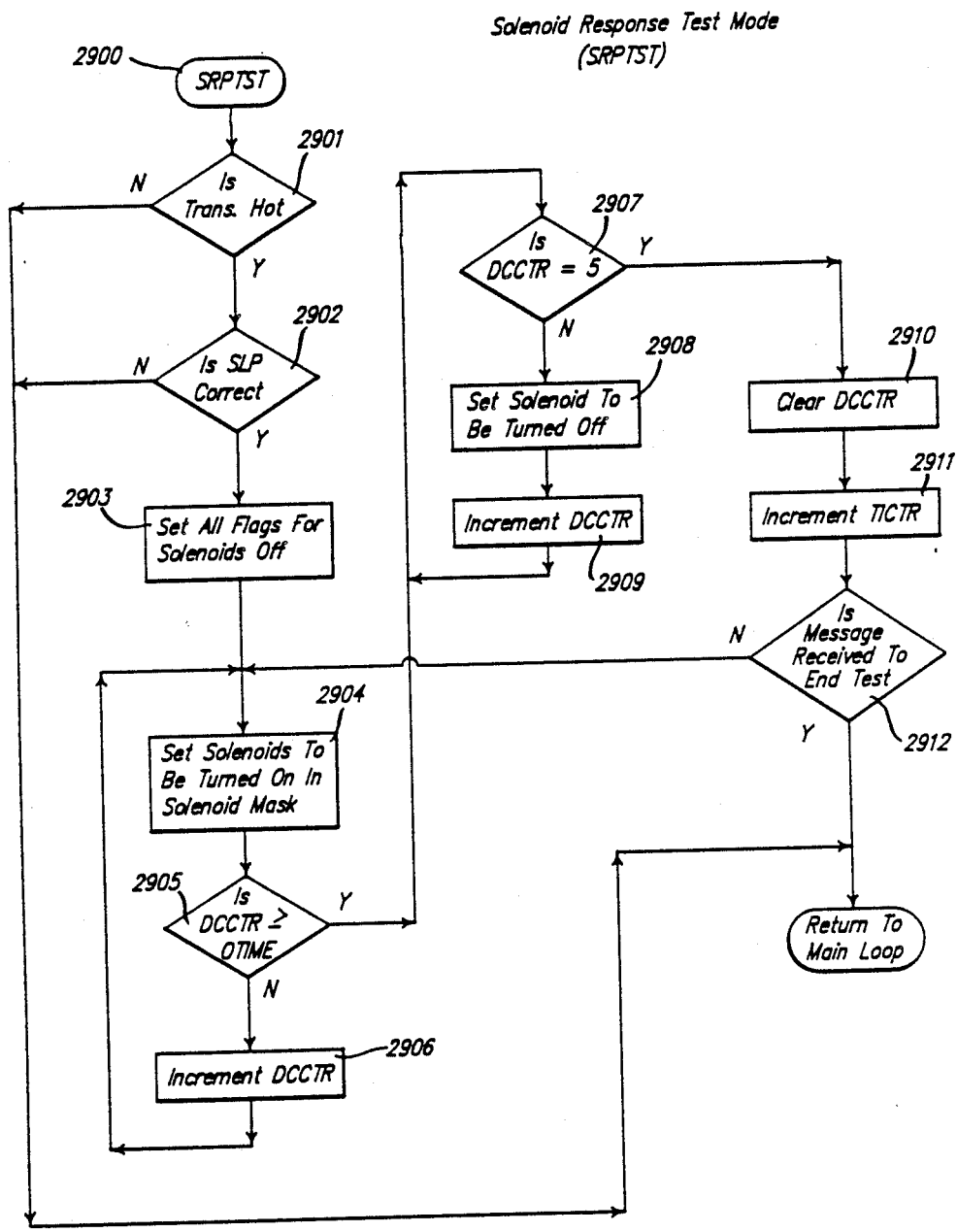

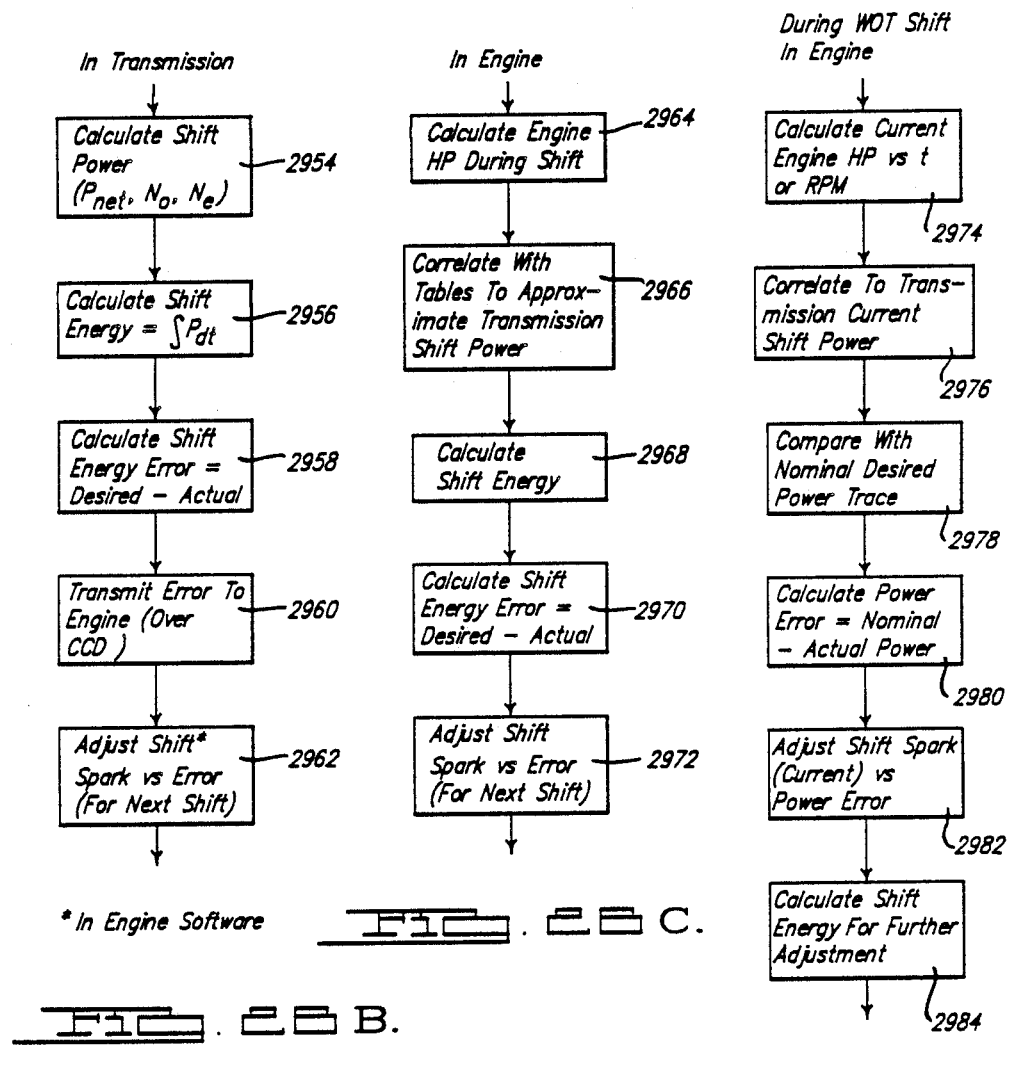

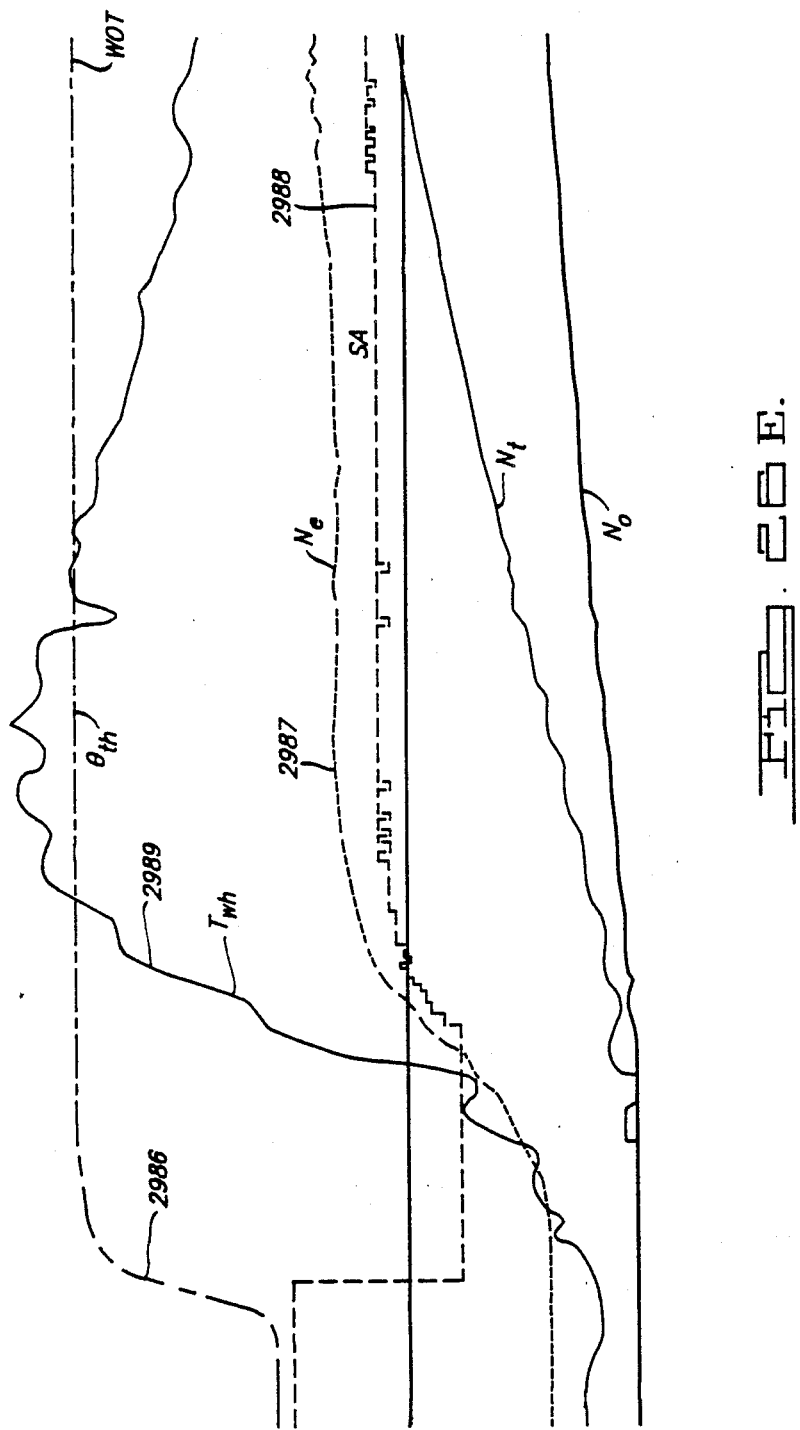

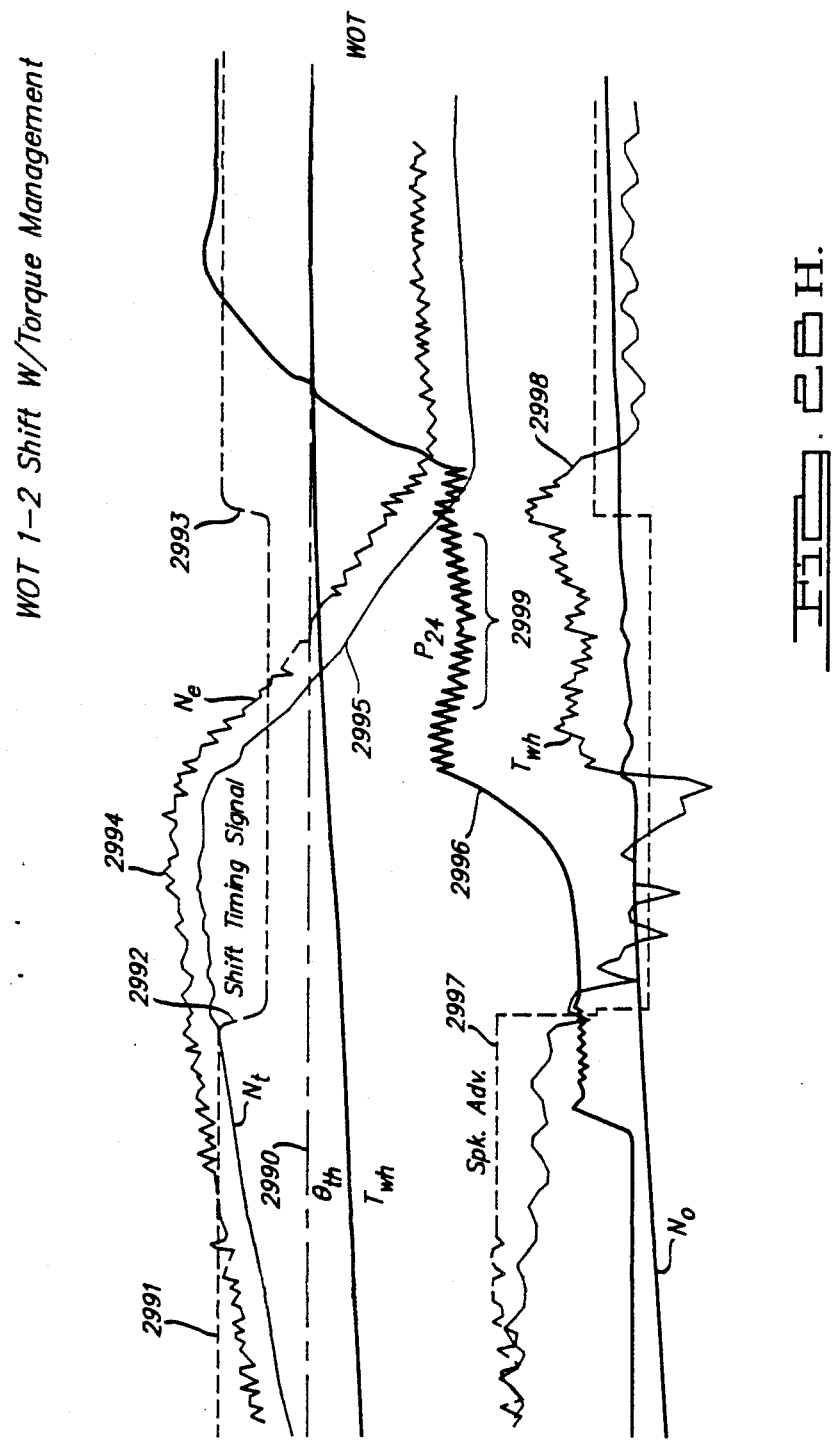

METHOD OF ADAPTIVELY SCHEDULING A SHIFT FOR AN ELECTRONIC AUTOMATIC TRANSMISSION SYSTEM

Continuation of U.S. Ser. No. 07/188,599 filed Apr. 29, 1988, abandoned.

BACKGROUND OF THE INVENTION

1. Field of the Invention

The present invention relates to an automatic transmission primarily intended for motor vehicle use, and more particularly, to a method of adaptively scheduling a shift until a predetermined time for a transmission that is controlled electronically and hydraulically.

2. Description of Related Art

Generally speaking, land vehicles require three basic components. These components comprise a power plant (such as an internal combustion engine) a power train and wheels. The internal combustion engine produces force by the conversion of the chemical energy in a liquid fuel into the mechanical energy of motion (kinetic energy). The function of the power train is to transmit this resultant force to the wheels to provide movement of the vehicle.

The power train's main component is typically referred to as the "transmission". Engine torque and speed are converted in the transmission in accordance with the tractive-power demand of the vehicle. The vehicle's transmission is also capable of controlling the direction of rotation being applied to the wheels, so that the vehicle may be driven both forward and backward.

A conventional transmission includes a hydrodynamic torque converter to transfer engine torque from the engine crankshaft to a rotatable input member of the transmission through fluid-flow forces. The transmission also includes frictional units which couple the rotating input member to one or more members of a planetary gearset. Other frictional units, typically referred to as brakes, hold members of the planetary gearset stationary during flow of power. These frictional units are usually brake clutch assemblies or band brakes. The drive clutch assemblies can couple the rotating input member of the transmission to the desired elements of the planetary gearsets, while the brakes hold elements of these gearsets stationary. Such transmission systems also typically provide for one or more planetary gearsets in order to provide various ratios of torque and to ensure that the available torque and the respective tractive power demand are matched to each other.

Transmissions are generally referred to as manually actuated or automatic transmissions. Manual transmissions generally include mechanical mechanisms for coupling rotating gears to produce different ratio outputs to the drive wheels.

Automatic transmissions are designed to take automatic control of the frictional units, gear ratio selection and gear shifting. A thorough description of general automatic transmission design principals may be found in "Fundamentals of Automatic Transmissions and Transaxles," Chrysler Corporation Training Manual No. TM-508A. Additional descriptions of automatic transmissions may be found in U.S. Pat. No. 3,631,744, entitled "Hydromatic Transmission," issued Jan. 4, 1972 to Blomquist, et al., and U.S. Pat. No. 4,289,048, entitled "Lock-up System for Torque Converter," issued on Sept. 15, 1981 to Mikel, et al. Each of these patents is hereby incorporated by reference.

In general, the major components featured in such an automatic transmission are: a torque converter as above-mentioned; fluid pressure-operated multi-plate drive or brake clutches and/or brake bands which are connected to the individual elements of the planetary gearsets in order to perform gear shifts without interrupting the tractive power; one-way clutches in conjunction with the frictional units for optimization of power shifts; and transmission controls such as valves for applying and releasing elements to shift the gears (instant of shifting), for enabling power shifting, and for choosing the proper gear (shift point control), dependent on shift-program selection by the driver (selector lever), accelerator position, the engine condition and vehicle speed.

The control system of the automatic transmission is typically hydraulically operated through the use of several valves to direct and regulate the supply of pressure. This hydraulic pressure control will cause either the actuation or deactuation of the respective frictional units for effecting gear changes in the transmission. The valves used in the hydraulic control circuit typically comprise spring-biased spool valves, spring-biased accumulators and ball check valves. Since many of these valves rely upon springs to provide a predetermined amount of force, it will be appreciated that each transmission design represents a finely tuned arrangement of interdependent valve components. While this type of transmission control system has worked well over the years, it does have its limitations. For example, such hydraulically controlled transmissions are generally limited to one or a very small number of engines and vehicle designs. Therefore, considerable cost is incurred by an automobile manufacturer to design, test, build, inventory and repair several different transmission units in order to provide an acceptable broad model line for consumers.

Additionally, it should be appreciated that such hydraulically controlled transmission systems cannot readily adjust themselves in the field to compensate for varying conditions such as normal wear on the components, temperature swings and changes in engine performance over time. While each transmission is designed to operate most efficiently within certain specific tolerances, typical hydraulic control systems are incapable of taking self-corrective action on their own to maintain operation of the transmission at peak efficiency.

However, in recent years, a more advanced form of transmission control system has been proposed, which would offer the possibility of enabling the transmission to adapt itself to changing conditions. In this regard, U.S. Pat. No. 3,956,947, issued on May 18, 1976 to Leising, et al., which is hereby incorporated by reference, sets forth a fundamental development in this field. Specifically, this patent discloses an automatic transmission design which features an "adaptive" control system that includes electrically operated solenoid-actuated valves for controlling certain fluid pressures. In accordance with this electric/hydraulic control system, the automatic transmission would be "responsive" to an acceleration factor for controlling the output torque of the transmission during a shift from one ratio of rotation (between the input and output shafts of the transmission) to another. Specifically, the operation of the solenoid-actuated valves would cause a rotational speed versus time curve of a sensed rotational component of the transmission to substantially follow along a predetermined path during shifting.

3. Objects of the Present Invention

It is one of the principal objects of the present invention to provide a significantly advanced electronically controlled transmission which is fully adaptive. By fully adaptive, it is meant that substantially all shifts are made using closed-loop control (i.e., control based on feedback). In particular, the control is closed loop on speed, speed ratio, or slip speed of either $N_t$ (turbine) of the torque converter and $N_e$ (engine) or a combination of $N_t$ and $N_o$ (output) which will provide the speed ratio or slip speed. This transmission control is also capable of "learning" from past experience and making appropriate adjustments on that basis.

Another object of the present invention is to provide an automatic transmission in which the shift quality is maintained approximately uniform regardless of the engine size, within engine performance variations or component condition (i.e. the transmission control system will adapt to changes in engine performance or in the condition of the various frictional units of the transmission).

It is a more specific object of the present invention to provide a method of scheduling or inhibiting a shift until a predetermined time period to prevent a positive to negative torque condition, resulting in a "clunk" of the drivetrain.

It is a further object of the present invention to achieve exceptionally smooth, yet quick kickdown shifts (i.e., second to first gear), and in so doing, make any powertrain feel more responsive without increasing harshness. Being adaptive, these controls will be capable of compensating for changes in engine or friction element torque, and provide consistent shift quality over the life of the transmission.

This application is one of several applications filed on the same date, all commonly assigned and having similar Specification and Drawings, these applications being identified below.

| U.S. Ser No. | Title |
|---|---|
| 187,772 | AN ELECTRONICALLY-CONTROLLED, ADAPTIVE AUTOMATIC TRANSMISSION SYSTEM |
| 187,751 | AUTOMATIC FOUR-SPEED TRANSMISSION |
| 189,493 | PUSH/PULL CLUTCH APPLY PISTON OF AN AUTOMATIC TRANSMISSION |
| 187,781 | SHARED REACTION PLATES BETWEEN CLUTCH ASSEMBLIES IN AN AUTOMATIC TRANSMISSION |
| 189,492 | CLUTCH REACTION AND PRESSURE PLATES IN AN AUTOMATIC TRANSMISSION |
| 188,602 | BLEEDER BALL CHECK VALVES IN AN AUTOMATIC TRANSMISSION |
| 188,610 | PRESSURE BALANCED PISTONS IN AN AUTOMATIC TRANSMISSION |
| 189,494 | DOUBLE-ACTING SPRING IN AN AUTOMATIC TRANSMISSION |
| 188,613 | PARK LOCKING MECHANISM FOR AN AUTOMATIC TRANSMISSION |
| 187,770 | SOLENOID-ACTUATED VALVE ARRANGEMENT OF AN AUTOMATIC TRANSMISSION SYSTEM |
| 187,796 | RECIPROCATING VALVES IN A FLUID SYSTEM OF AN AUTOMATIC TRANSMISSION |
| 187,705 | VENT RESERVOIR IN A FLUID SYSTEM OF AN AUTOMATIC TRANSMISSION |
| 188,592 | FLUID ACTUATED SWITCH VALVE IN AN AUTOMATIC TRANSMISSION |
| 188,598 | DIRECT-ACTING, NON-CLOSE CLEARANCE SOLENOID-ACTUATED VALVES |
| 188,618 | NOISE CONTROL DEVICE FOR A SOLENOID-ACTUATED VALVE |
| 188,605 | FLUID ACTUATED PRESSURE SWITCH FOR AN AUTOMATIC TRANSMISSION |
| 187,210 | METHOD OF APPLYING REVERSE GEAR OF AN AUTOMATIC TRANSMISSION |
| 187,672 | TORQUE CONVERTER CONTROL VALVE IN A FLUID SYSTEM OF AN AUTOMATIC TRANSMISSION |
| 187,120 | CAM-CONTROLLED MANUAL VALVE IN AN AUTOMATIC TRANSMISSION |
| 187,181 | FLUID SWITCHING MANUALLY BETWEEN VALVES IN AN AUTOMATIC TRANSMISSION |
| 187,704 | METHOD OF OPERATING AN ELECTRONIC AUTOMATIC TRANSMISSION SYSTEM |
| 188,020 | METHOD OF SHIFT SELECTION IN AN ELECTRONIC AUTOMATIC TRANSMISSION SYSTEM |
| 187,991 | METHOD OF UNIVERSALLY ORGANIZING SHIFTS FOR AN ELECTRONIC AUTOMATIC TRANSMISSION SYSTEM, NOW ALLOWED |
| 188,603 | METHOD OF DETERMINING AND CONTROLLING THE LOCK-UP OF A TORQUE CONVERTER IN AN ELECTRONIC AUTOMATIC TRANSMISSION SYSTEM |
| 188,617 | METHOD OF ADAPTIVELY IDLING AN ELECTRONIC AUTOMATIC TRANSMISSION SYSTEM |
| 189,553 | METHOD OF DETERMINING THE DRIVER SELECTED OPERATING MODE OF AN AUTOMATIC TRANSMISSION SYSTEM |
| 188,615 | METHOD OF DETERMINING THE SHIFT LEVER POSITION OF AN ELCTRONIC AUTOMATIC TRANSMISSION SYSTEM |
| 188,594 | METHOD OF DETERMINING THE ACCELERATION OF A TURBINE IN AN AUTOMATIC TRANSMISSION |
| 187,771 | METHOD OF DETERMINING THE FLUID TEMPERATURE OF AN ELECTRONIC AUTOMATIC TRANSMISSION SYSTEM |
| 188,607 | METHOD OF DETERMINING THE CONTINUITY OF SOLENOIDS IN AN ELECTRONIC AUTOMATIC TRANSMISSION SYSTEM |
| 189,579 | METHOD OF DETERMINING THE THROTTLE ANGLE POSITION FOR AN ELECTRONIC AUTOMATIC TRANSMISSION SYSTEM |
| 188,604 | METHOD OF CONTROLLING THE SPEED CHANGE OF A KICKDOWN SHIFT FOR AN ELECTRONIC AUTOMATIC TRANSMISSION SYSTEM |
| 188,591 | METHOD OF CONTROLLING THE APPLY ELEMENT DURING A KICKDOWN SHIFT FOR ELECTRONIC AUTOMATIC TRANSMISSION SYSTEM |
| 188,608 | METHOD OF CALCULATING TORQUE FOR AN ELECTRONIC AUTOMATIC TRANSMISSION SYSTEM |
| 187,150 | METHOD OF LEARNING FOR ADAPTIVELY CONTROLLING AN ELECTRONIC AUTOMATIC TRANSMISSION SYSTEM |
| 188,595 | METHOD OF ACCUMULATOR CONTROL FOR A FRICTION ELEMENT IN AN ELECTRONIC AUTOMATIC TRANSMISSION SYSTEM |
| 188,601 | METHOD OF SHIFT CONTROL DURING A COASTDOWN SHIFT FOR AN ELECTRONIC AUTOMATIC TRANSMISSION SYSTEM |
| 188,620 | METHOD OF TORQUE PHASE SHIFT CONTROL FOR AN ELECTRONIC AUTOMATIC TRANSMISSION |
| 188,596 | METHOD OF DIAGNOSTIC PROTECTION FOR AN ELECTRONIC AUTOMATIC TRANSMISSION SYSTEM |
| 188,597 | METHOD OF STALL TORQUE MANAGEMENT FOR AN ELECTRONIC AUTOMATIC TRANSMISSION SYSTEM |
| 188,606 | METHOD OF SHIFT TORQUE MANAGEMENT FOR AN ELECTRONIC AUTOMATIC TRANSMISSION SYSTEM |
| 188,616 | ELECTRONIC CONTROLLER FOR AN AUTOMATIC TRANSMISSION |

-continued

| U.S. Ser No. | Title |
|---|---|
| 188,600 | DUAL REGULTOR FOR REDUCING SYSTEM CURRENT DURING AT LEAST ONE MODE OF OPERATION |
| 188,619 | UTILIZATION OF A RESET OUTPUT OF A REGULATOR AS A SYSTEM LOW-VOLTAGE INHIBIT |
| 188,593 | THE USE OF DIODES IN AN INPUT CIRCUIT TO TAKE ADVANTAGE OF AN ACTIVE PULL-DOWN NETWORK PROVIDED IN A DUAL REGULATOR |
| 188,609 | SHUTDOWN RELAY DRIVER CIRCUIT |
| 188,614 | CIRCUIT FOR DETERMINING THE CRANK POSITION OF AN IGNITION SWITCH BY SENSING THE VOLTAGE ACROSS THE STARTER RELAY CONTROL AND HOLDING AN ELECTRONIC DEVICE IN A RESET CONDITION IN RESPONSE THERETO |
| 188,612 | THROTTLE POSITION SENSOR DATA SHARED BETWEEN CONTROLLER WITH DISSIMILAR GROUNDS |
| 188,611 | NEUTRAL START SWITCH TO SENSE SHIFT LEVER POSITION |
| 188,981 | OPEN LOOP CONTROL OF SOLENOID COIL DRIVER |

SUMMARY OF THE INVENTION

To achieve the foregoing objects, the present invention provides a comprehensive four-speed automatic transmission system. While this transmission system particularly features a fully adaptive electronic control system, numerous other important advances are incorporated into this unique transmission system, as will be described below in detail.

The transmission control system includes a microcomputer-based controller which receives input signals indicative of engine speed, turbine speed, output speed (vehicle speed), throttle angle position, brake application, predetermined hydraulic pressure, the driver selected gear or operating condition (PRNODDL), engine coolant temperature, and/or ambient temperature. This controller generates command or control signals for causing the actuation of a plurality of solenoid-actuated valves which regulate the application and release of pressure to and from the frictional units of the transmission system. Accordingly, the controller will execute predetermined shift schedules stored in the memory of the controller through appropriate command signals to the solenoid-actuated valves and the feedback which is provided by various input signals.

Another primary feature of the present invention is to provide an adaptive system based on closed-loop control. In other words, the adaptive control system performs its functions based on real-time feedback sensor information, i.e., the system takes an action which affects the output, reads the effect, and adjusts the action continuously in real-time. This is particularly advantageous because the control actuations can be corrected as opposed to an open loop control in which signals to various elements are processed in accordance with a predetermined program.

Another feature of the transmission control system includes a method for adaptive scheduling or inhibiting a shift until engine speed $N_e$ is at least equal to or greater than the output speed $N_o$ of the target gear to prevent any negative torque, eliminating any "clunk" in the drivetrain.

BRIEF DESCRIPTION OF THE DRAWINGS

Other objects, features and advantages of the present invention will become more fully apparent from the following detailed description of the preferred embodiment, the appended claims and in the accompanying drawings in which:

FIGS. 1A-E illustrate one physical embodiment of the transmission according to the present invention; FIG. 1A is a perspective view, partially broken away of the transmission; FIG. 1B is a sectional elevational view of one embodiment of a transmission constructed according to the present invention; FIG. 1C is a partial sectional elevational view of one half of the transmission of FIG. 1B; FIG. 1D is a partial sectional elevational view of the other half of the transmission of FIG. 1B; and FIG. 1E is a schematic diagram of the transmission of FIGS. 1A and 1B;

FIG. 2A is a front elevational view of the reaction shaft support and bleeder ball check valve assembly; and FIG. 2B is a sectional view of FIG. 2A;

FIG. 3A is an elevational view of the structure of the double acting spring; FIG. 3B is a sectional view taken along lines B—B of FIG. 3A; FIG. 3C is a partial sectional elevational view of the spring in its non-applied position; FIG. 3D is a partial sectional elevational view of the spring while the overdrive clutch is being applied; and FIG. 3E is a partial sectional elevational view of the spring while the reverse clutch is being applied;

FIGS. 4A-J illustrate the park locking mechanism according to the present invention; FIG. 4A is an elevational view, partly in section with parts broken away, of the underside of an automatic transmission housing showing the manual lever rotated to its park lock position; FIG. 4B is a sectional view taken substantially along line B—B of FIG. 4A; FIG. 4C is a fragmentary view of the park lock mechanism of FIG. 4B showing the mechanism in its unlocked mode; FIG. 4D is a fragmentary view of the park lock mechanism of FIG. 4B showing the mechanism in its locked mode with the pawl out of registry with a space between adjacent teeth of the parking gear; FIG. 4E is an exploded perspective view of the park lock mechanism; FIG. 4F is an enlarged fragmentary sectional view of the park lock cam rollers; FIG. 4G is a sectional view taken substantially along line G—G of FIG. 4F; FIG. 4H is a fragmentary elevational view of the upper surface of the manual lever rotated to its installation position; FIG. 4I is an end elevational fragmentary view of the manual lever as viewed in the direction of the arrow of FIG. 3H; and FIG. 4J is a fragmentary perspective view illustrating, in a schematic manner, the interlocking relationship between the park lock carrier and the transmission case;

FIGS. 5A-L are schematic diagrams of the hydraulic circuits employed in the transmission according to the present invention in various gear positions;

FIG. 6 is a partial exploded view of the valve body and other valves contained therein of FIGS. 5A-L according to the present invention;

FIG. 8 is a cross-sectional view of the normally vented solenoid-actuated valve 632 taken along line 8—8 of FIG. 7;

FIG. 9 is a cross-sectional view of the normally applied solenoid-actuated valve 630 taken along line 9—9 of FIG. 7;

FIG. 9A is a partial sectional view of the valve of FIG. 9 with a noise reducing device;

FIG. 10 is a cross-sectional view of a pressure switch of FIGS. 5A-L taken along line 10—10 of FIG. 7;

FIG. 11A is a sectional view of the solenoid switch valve of FIGS. 5A-L taken along line A—A of FIG. 5; and FIG. 11B is a sectional view of the manual valve of FIGS. 5A-L taken along line B—B of FIG. 5;

FIGS. 13A-13C are flow charts of the shift select methodology of FIG. 12 according to the present invention;

FIG. 14A is a flow chart of the shift schedule methodology of FIG. 12; and FIGS. 14B-14D are shift schedule graphs;

FIG. 15A is a flow chart of the PSLOPE methodology of FIG. 14; and FIG. 15B is a graph of the method used in FIG. 15A;

FIGS. 16A-D are flow charts of the shift methodology of FIG. 12 according to the present invention; FIG. 16A is a flow chart of the upshift methodology; FIGS. 16B and 16C are flow charts of the downshift methodology; and FIG. 16D is a flow chart of the garage shift methodology;

FIG. 18A is a flow chart of the adaptive idle methodology; FIG. 18B is a graph of the cycle time of one solenoid-actuated valve; and FIG. 18C is a graph of speed versus time for the turbine of the torque converter;

FIGS. 21A and 21C are flow charts of the pressure switch test and transmission temperature methodology; FIG. 21D is a graph of a predicted transmission temperature methodology;

FIGS. 22A-E illustrate the solenoid continuity test methodology according to the present invention; FIGS. 22A-D are flow charts of the solenoid continuity test methodology; and FIG. 22E is a graph of solenoid driver logic;

FIGS. 23A and 23B are flow charts of the throttle angle computation methodology; and FIG. 23C is a plot of variables used for the throttle angle computation methodology;

FIGS. 24A-L illustrate the shift methodology according to the present invention; FIG. 24A is a shift graph tape for a third to first gear kickdown shift; FIG. 24B is a graph of torque converter characteristics for the turbine torque methodology; FIG. 24C is a partial shift tape graph of the learn methodology for kickdown shifts; FIG. 24D is a shift tape graph for a first to second gear upshift; FIG. 24E is a flow chart of the learn methodology; FIG. 24F is a graph for the adaptive scheduling methodology for a fourth to third gear coastdown shift; FIG. 24G is a phase plane graph for a second to first gear coastdown shift; FIG. 24H is a partial shift tape graph for a second to first gear coastdown shift; FIG. 24I is a flow chart of the release element logic for a kickdown or coastdown shift; FIG. 24J is a flow chart of the apply element logic for a kickdown or coastdown shift; FIG. 24K is a graph of pressure versus time for an element; and FIG. 24L is a shift tape graph for a neutral to reverse gear garage shift;

FIGS. 25A-K are flow charts of the on-board diagnostics according to the present invention;

FIGS. 26A-H illustrate the engine torque management methodology according to the present invention; FIGS. 26A-D are flow charts of the engine torque management methodology; and FIGS. 26E-H are shift tape graphs with and without engine torque management;

FIG. 28A illustrates a communication circuit which provides a serial communication link between the transmission controller and the engine controller; FIG. 28B illustrates the microprocessor and peripheral interface circuits; FIG. 28C illustrates the read only memory and watchdog/reset circuits; FIG. 28D illustrates the speed and throttle input circuits; FIG. 28E illustrates the ignition switch input circuits; FIG. 28F illustrates the regulator and relay driver circuits; FIG. 28G illustrates the solenoid driver circuits; FIG. 28H illustrates the pressure switch input and test mode circuits; and FIG. 28I illustrates two additional communication circuits for the transmission controller;

DESCRIPTION OF THE PREFERRED EMBODIMENT

Figure 1A:
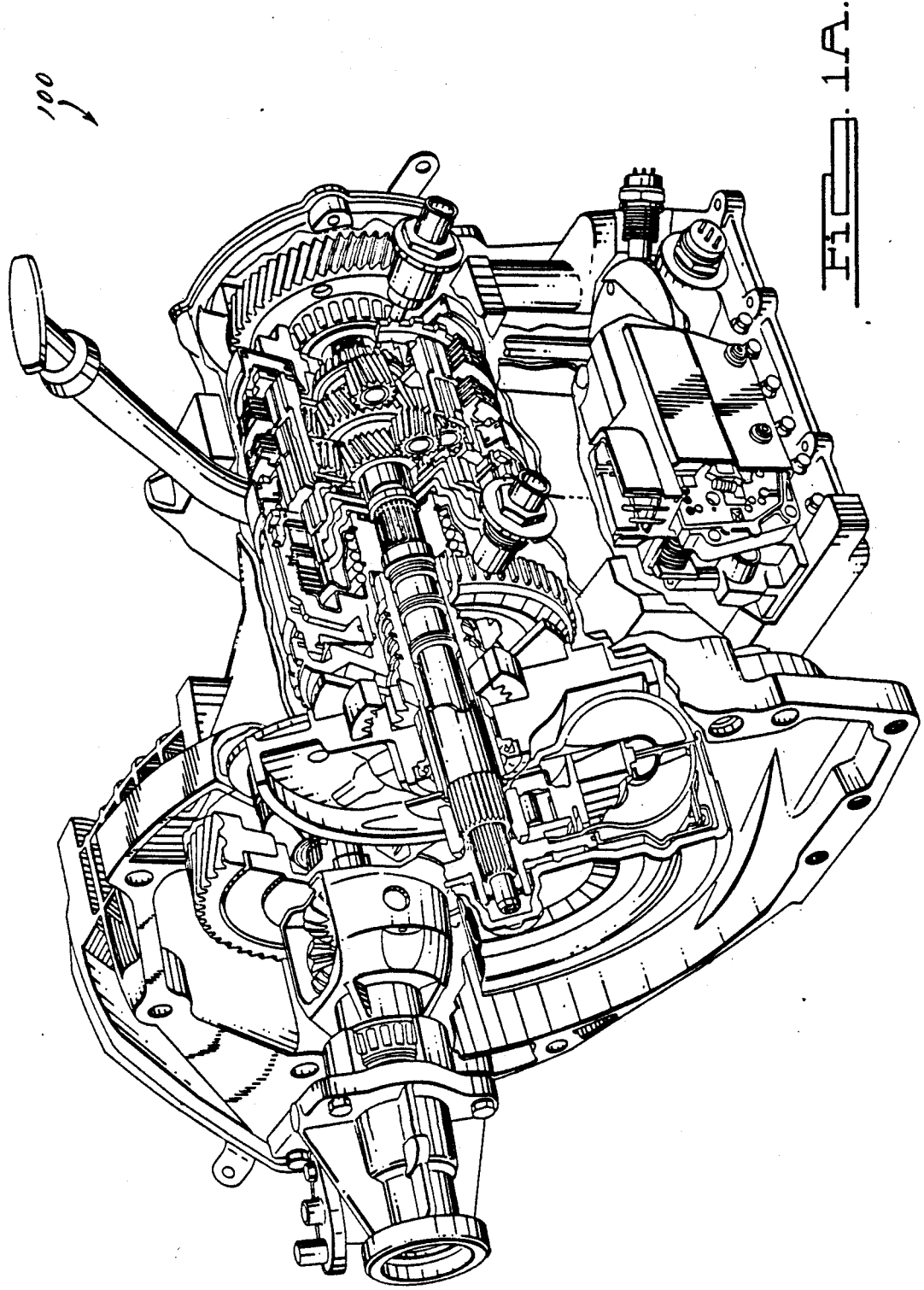
Figure 1B:
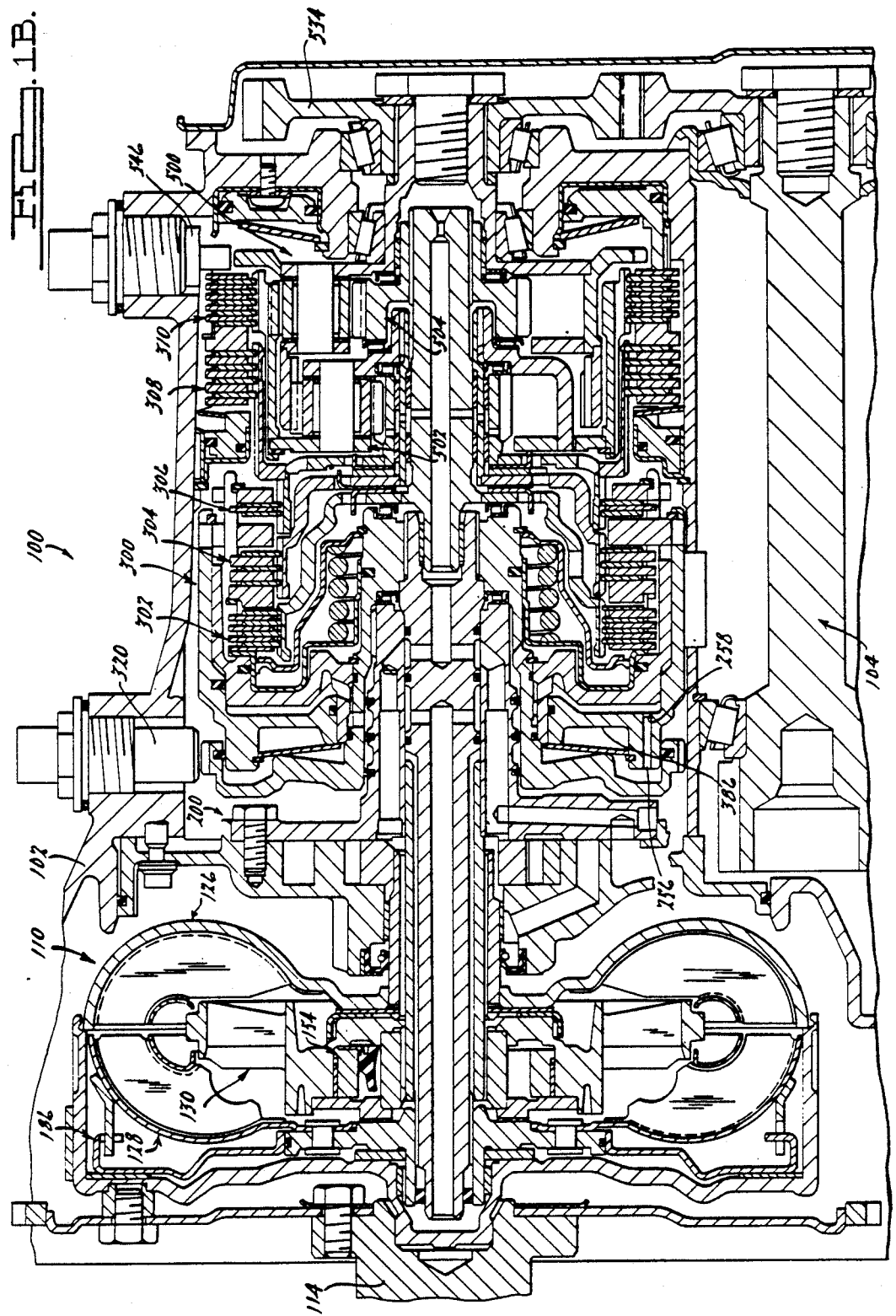

Referring to FIGS. 1A and 1B, an automatic transmission 100 according to one embodiment of the present invention is shown. The transmission 100 is adapted to be used in a vehicle (not shown), such as an automobile. However, it should be appreciated that the principles of the present invention may be employed in other types of vehicles and devices. The transmission 100 includes a transmission housing or case 102 for enclosing the numerous subassemblies which make up the transmission 100, including a torque converter assembly 110, pump assembly 200, mulit-clutch assembly 300 and gear assembly 500.

TORQUE CONVERTER ASSEMBLY STRUCTURE

The torque converter assembly 110 is operative to transmit power from a rotating crankshaft 114 of a prime power mover such as an automobile engine (not shown) to the input member of the transmission 100. This power may then be subsequently transmitted to a drive unit 104 (partially shown) which is connected to one or more drive wheels (not shown) of the vehicle. The torque converter 110 is generally comprised of an impeller assembly 126, turbine assembly 128 and a stator assembly 130.

As illustrated in FIG. 1C, power is transmitted from the rotating crankshaft 114 of the engine to a front cover member 116 of the impeller assembly 126 through a rotatable plate member 118. Balance weights 119 are circumferentially spaced about the outer periphery of the front cover member 116. The plate member 118 is secured proximate its inner periphery to the crankshaft 114 by suitable fastening means such as bolts 120, and is likewise secured proximate its outer periphery to the front cover member 116 by suitable fastening means such as bolts 122. The front cover member 116 is secured, such as by welding at 124, to the impeller assembly 126 of the torque converter 110.

The impeller assembly 126 is fluidly connected in toroidal flow relationship in a known manner with the turbine assembly 128 and the stator assembly 130. The impeller assembly 126 comprises a plurality of circumferentially spaced impeller blades 132 connected to the inside of an impeller shell 134. The impeller shell 134 is secured, such as by welding at 136, to an impeller hub or pump drive shaft 138. The impeller hub 138 is drivingly engaged at its neck portion 140 to the positive displacement pump 200, from which fluid is supplied to the torque converter 110 in a manner to be described herein. An arcuate inner portion 142 of the impeller blade 132 is disposed about one half of a split torus ring 144 which reduces fluid turbulence within the torque converter 110. A thrust plate 146 is connected by tabs (not shown) on the inner surface of a slot 148 of the impeller hub 138 and disposed between the impeller assembly 126 and a stator thrust member 165.

The stator assembly 130 includes a plurality of circumferentially spaced stator vanes 150 which are connected at their inner end to a stator plate 152. The stator plate 152 is mounted on a one-way or over-runnung clutch assembly, generally indicated at 154. The over-running clutch assembly 154 permits rotation only in the direction of the impeller assembly 126. The over-running clutch assembly 154 comprises an over-running clutch cam 156 mounted about over-running clutch rollers 158, which in turn, travel about an over-running clutch race 160. The over-running clutch race 160 is splined at inner surface 162 to a stationary reaction shaft member 164. An annular thrust member 165 having retaining transverse flanges or tabs 167 is disposed between the stator plate 52 and the thrust plate 146.

The turbine assembly 128 includes a plurality of circumferentially spaced turbine blades 166 which are connected to the inside of a tubine shell 168. The turbine shell 168 is secured by rivets 170 or the like to a turbine hub member 172. The turbine hub member 172 is drivingly connected, as by a spline connection 174, to a rotatable input member or shaft 176 to which the gear assembly 500 of the transmission 100 is drivingly engaged. A turbine hub seal 178 is disposed between the inside of the turbine hub member 172 and the input shaft 176 to prevent entry of fluid therebetween. A cover bushing 180 having grooves (not shown) for fluid flow therethrough supports the turbine hub member 172 in a cavity 182 of the front cover member 116. A thrust plate or washer 184 having grooves (not shown) for fluid flow therethrough is disposed between the turbine hub member 172 and the front cover member 116. An annular stepped member 185 having grooves (not shown) for fluid flow therethrough is disposed between the turbine hub member 172 and stator plate 152, as well as the over-running clutch race 160.

The torque converter 110 also includes a lock-up clutch assembly, generally indicated at 186, to prevent slip between the rotating crankshaft 114 of the engine and the turbine assembly 128 of the torque converter 110. The lock-up clutch assembly 186 includes an annular piston member 188 having an inner flange portion 190 disposed about the turbine hub member 172 of the turbine assembly 128. The piston member 188 has a plurality of circumferentially spaced inverted U-shaped outer flange portions 192 which are formed to engage corresponding slots 194 in a drive ring 196 that is welded to the turbine shell 168. The piston member 188 is slidingly and sealingly mounted for axial movement on the outer axial surface of the turbine hub member 172 through annular seal element 198. An annular disc-shaped frictional element or lock-up disc 199 is carried proximate the outer periphery of the front cover member 116 for engagement with a cooperating portion of the piston member 188.

PUMP ASSEMBLY STRUCTURE

Figure 1D:
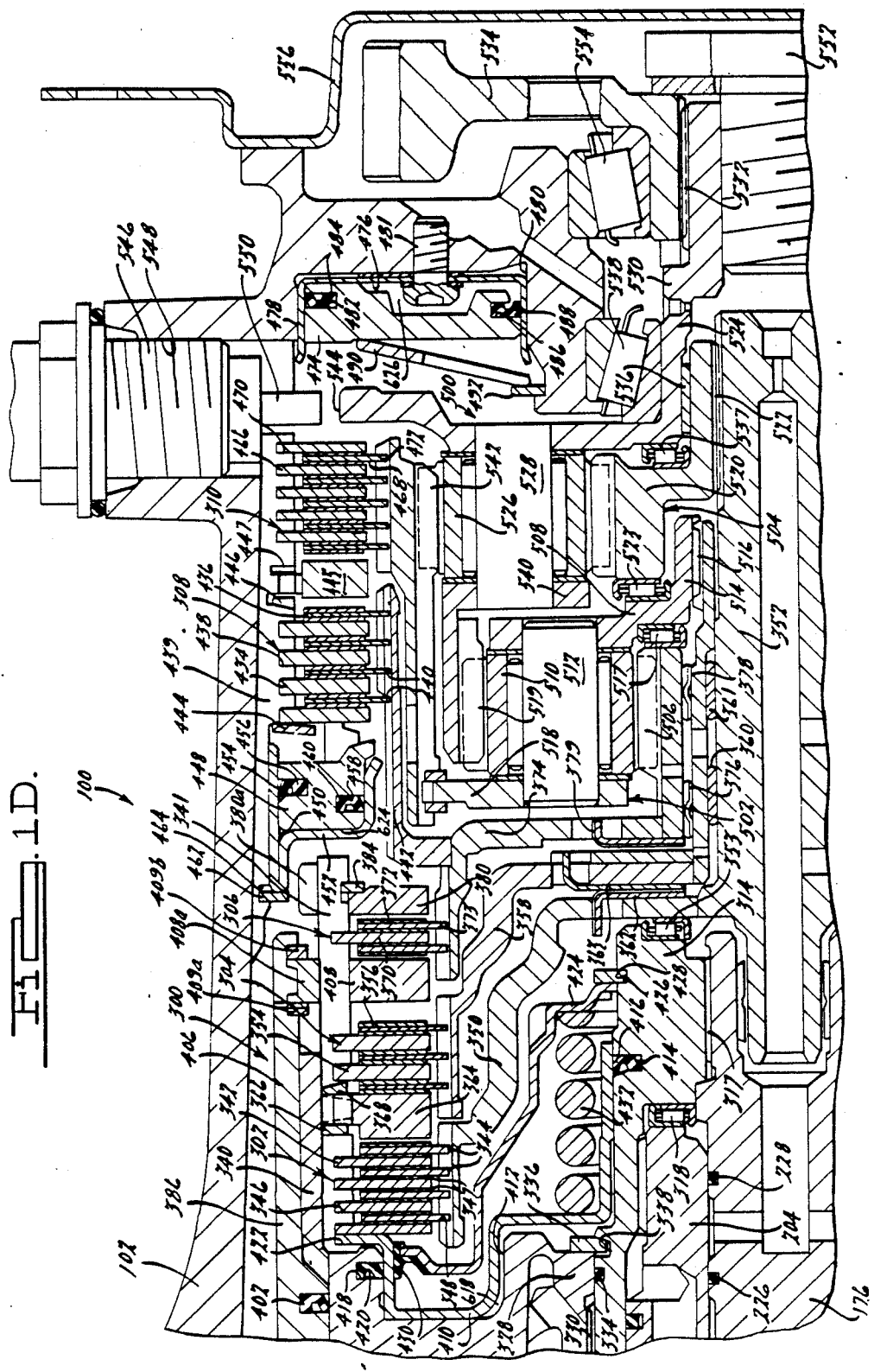

The fixed positive displacement pump assembly 200 includes a pump housing 202 secured proximate its inner periphery to a reaction shaft support 204 by suitable fastening means such as bolts 206. The pump housing 202 is likewise secured proximate its outer periphery to the transmission case 102 by suitable fastening means such as bolts 208. The reaction shaft support 204 is secured, such as by press fitting with splines at 210, to the reaction shaft member 164. The impeller hub or pump drive shaft 138 is supported in the pump housing 202 through a bushing member 212. A seal ring assembly 214 is disposed about the impeller hub or pump drive shaft 138 in a bore or recess 216 at one end of the pump housing 202 to prevent fluid from exiting the end of the pump housing 202. An outer gear or rotor 218 with internal teeth (not shown) operates within a bore 220 of the pump housing 202. An inner gear or rotor 222 having external teeth (not shown), cooperative with the teeth of the outer rotor 218, is disposed within the outer rotor 218. As illustrated in FIGS. 1C and 1D, sealing means, such as seal rings 224, 226 and 228, are axially spaced between the input shaft 176 and reaction shaft support 204. The reaction shaft support 204 includes a fluid passage 230 to allow fluid to flow to the torque converter 110 in a manner to described herein.

MULTI-CLUTCH ASSEMBLY STRUCTURE

During the flow of power through the transmission 100, the multi-clutch assembly 300 provides a means for application and release of two separate members to and from each other. In other words, the multi-clutch assembly 300 is the means by which the gears within the transmission are selectively engaged and disengaged from either the crankshaft 114 of the prime mover or the transmission case 102. Near the input side of the transmission 100, the multi-clutch assembly 300 includes an underdrive clutch 302 (applied in first, second and third gears), overdrive clutch 304 (applied in third and fourth gears) and a reverse clutch 306 (applied in reverse gear) assemblies. Near the output side of the transmission 100, the multi-clutch assembly 300 includes a two/four shift clutch assembly 308 (applied in second and fourth gears), and a low/reverse clutch assembly 310 (applied in first and reverse gears).

As illustrated in FIGS. 1C and 1D, an input clutch retainer hub 312 is provided to house the input clutch assemblies 302, 304 and 306. The input clutch retainer hub 312 has a generally axially extending shoulder portion 313 and a generally axially extending portion 314. A plurality of spaced seal rings 315 are disposed in corresponding annular grooves 316 which are formed along the reaction shaft support 204. The input clutch retainer hub 312 is also splined at 317 to the input shaft 176. A thrust bearing 318 is disposed axially between one end of the reaction shaft support 204 and the axially extending portion 314 of the input clutch retainer hub 312. The input clutch retainer hub 312 has teeth 319 at its outer periphery. A turbine speed sensor 320 threadably engages a bore 322 in the transmission case 102 and has one end 324 disposed or spaced radially just above the teeth 319 of the input clutch retainer hub 312. The turbine speed sensor 320 is used to monitor or sense the revolution rate of the turbine assembly 128 by counting the teeth 319 passing thereby in relation to time. Preferably, a passive type speed sensor is used for the turbine speed sensor 320. However, it should be appreciated that other suiable speed sensors could be employed within or before the transmission 100 to provide an input speed signal for the transmission controller 3010 to be described in connection with FIGS. 28A-G.

An input clutch retainer 326 has a hub portion 328 disposed about and drivingly connected to, as by a spline connection 330, to the axially extending portion 314 of the input clutch retainer hub 312. Sealing means, such as sealing rings 332 and 334, are disposed in corresponding grooves of the input clutch hub retainer 312 between the hub portion 328 and the axially extending portion 314 of the input clutch retainer hub 312. A tapered snap ring 336 is disposed in a groove 338 of the input clutch retainer hub 312 to prevent axial movement of the input clutch retainer 326 toward the gear assembly 500. The input clutch retainer 326 includes an axially extending flange 340 forming a cylinder. A plurality of circumferentially spaced clutch retainer fingers 341 extend radially inwardly from the flange 340 to which the clutch plates, which will be described herein, are mounted.

As illustrated in FIG. 1D, the underdrive clutch assembly 302 comprises a plurality of axially spaced annular clutch plates 342 and a plurality of axially spaced annular clutch discs 344. The clutch discs 344 are alternated between the clutch plates 342 and when the clutch assembly 302 is not applied, these plates and discs are free to move or rotate relative to each other. The clutch plates 342 have splines (not shown) on their outer diameter and mount in grooves 346 of the clutch retainer fingers 341 which are inside the input clutch retainer 326. The clutch discs 344 have internal splines (not shown) and are lined with a friction material 347. The clutch discs 344 are mounted in grooves 348 in an underdrive clutch hub 350. The underdrive clutch hub 350 is integral with a rotatable underdrive gear shaft 352 of the gear assembly 500. A thrust bearing 353 is disposed axially between the axially extending portion 314 of the input clutch retainer hub 312 and underdrive clutch hub 350.

The overdrive clutch assembly 304 comprises a plurality of axially spaced annular clutch plates 354 and a plurality of axially spaced annular clutch discs 356. The clutch plates 354 and clutch discs 356 are similar to those of the underdrive clutch assembly 302. Clutch discs 356 are disposed in splines formed in an overdrive clutch hub 358 which is supported by bushings 360 and 361 about the gear shaft 352. Thrust members 362 and 363 are disposed axially between the underdrive clutch hub 350 and overdrive clutch hub 358. The thrust members 362 and 363 are similar to the thrust member 165. An annular reaction plate 364 is secured to the inside of the input clutch retainer 326 axially between the underdrive and overdrive clutch plates and discs 342, 344 354 and 356, respectively. The reaction plate 364 is shared by the underdrive 302 and overdrive 304 clutch assemblies. Annular snap rings 366 and 368 are disposed on the sides of the reaction plate 364. Snap ring 368 is a tapered ring, restraining reaction plate 364 from axial movement.

The reverse clutch assembly 306 comprises at least one annular clutch plate 370 and a plurality of axially spaced annular clutch discs 372. The reverse clutch plate 370 and clutch discs 372 are similar to those of the underdrive clutch assembly 302. The reverse clutch discs 372 are mounted in splines 373 of a reverse clutch hub 374. The reverse clutch hub 374 is supported by bushings 376 and 378 about one end of the overdrive clutch hub 358. A thrust member 379 is disposed axially between the overdrive clutch hub 358 and reverse clutch hub 379. The thrust member 379 is similar to the thrust member 165. An annular reaction plate 380 is mounted about one end of the flange 340 of the input clutch retainer 326 on one side of the reverse clutch plate 370 and discs 372. Selective snap rings 384 secure the reaction plate 380 from axial movement along the input clutch retainer 326.

To apply the overdrive clutch assembly 304 and reverse clutch assembly 306, a fluid actuating device such as a first hydraulic piston 386 has an axially extending projection 388 which operates in a bore or recess 390 of the input clutch retainer hub 312. The inner diameter of the projection 388 has a groove 392 provided for a snap ring 394, while the recess 390 of the input clutch retainer hub 312 has a groove 396 for a sealing means such as a synthetic rubber seal ring 398. The first hydraulic piston 386 is slidingly and sealingly mounted for axial movement on the outer diameter of the hub portion 328 of the input clutch retainer 326 through sealing means 400 at its inner periphery and near the outer periphery of the input clutch retainer 326 through sealing means 402. A double-acting spring means such as a Belleville like spring 404 is disposed between the first hydraulic piston 386 and the input clutch retainer hub 312 to bias or return the first hydraulic piston 386 to its non-displaced or non-applied position shown in the figure. The double-acting spring 404 has a conical shape with fingers 405 and is formed with a linear slope such that its inner and outer diameters do not lie in the same cross-sectional plane. The double-acting spring 404 will be discussed more in detail under the section heading "DOUBLE-ACTING SPRING".

The first hydraulic piston 386 includes an axially extending cylinder portion 406 which has an annular pressure plate member 408 secured at one end thereof by waved snap ring 409a and snap ring 409b. A pressure plate member 408 is interposed between the overdrive clutch assembly 304 and the reverse clutch assembly 306 to engage the clutch plates 354, 370 and discs 356, 372, respectively. Hence, the single pressure plate member 408 is shared by the overdrive clutch 304 and reverse clutch 306 assemblies.

To engage or disengage the underdrive clutch assembly 302, a second hydraulic piston 410 operates in a recess 412 of the input clutch retainer 326. The smooth outer diameter of the hub portion 314 of the input clutch retainer hub 312 has a groove 414 provided with a sealing means such as a synthetic rubber inner seal ring 416, while the outer periphery of recess 412 has a groove 418 for an outer seal ring 420. The second hydraulic piston 410 has one end 422 abutting the clutch plates 342 of the underdrive clutch assembly 302. An annular conically shaped spring retainer member 424 is abuttingly mounted against a snap ring 426. The snap ring 426 is disposed in a groove 428 formed in the axially extending portion 314 of the input clutch retainer hub 312. The other end of the spring retainer member 424 is in sealing engagement with the second hydraulic piston 410 through sealing means 430. The spring retainer member 424 is filled with fluid fed through an orifice (not shown) in the second hydraulic piston 410 from a passage (not shown) in the input clutch retainer hub 312 to provide the pressure balance for the second hydraulic piston 410. The excess fluid is allowed to leak past the snap ring 426 to cool the underdrive clutch assembly 302. A spring means such as a coiled spring 432 is disposed between the spring retainer member 424 and the second hydraulic piston 410 to bias or return the second hydraulic piston 410 to its original position shown in the figure when not applied.

At the output end of the transmission 100, the transmission case 102 houses the output or brake clutch assemblies such as the two/four shift clutch assembly 308 and the low/reverse clutch assembly 310. The two/four shift clutch assembly 308 comprises a plurality of axially spaced annular clutch plates 434 and a plurality of axially spaced annular clutch discs 436. The clutch plates 434 and clutch discs 436 are similar to those of the underdrive clutch assembly 302. The clutch plates 434 are mounted in splines 438 of circumferentially spaced and radially inwardly extending case clutch fingers 439 inside the transmission case 102. The clutch discs 436 are mounted in splines 440 formed in an axially extending flange 442 of the reverse clutch hub 374. A spring means such as a Belleville like spring 444, similar to spring 404, is mounted inside the transmission case 102 on one side of the two/four shift clutch assembly 308. An annular reaction plate 445 is mounted on the other side of the two/four shift clutch assembly 308 and between the two/four shift clutch assembly 308 and the low/reverse clutch assembly 310. The reaction plate 445 is shared by the two/four shift clutch 308 and low/reverse clutch 310 assemblies. Snap rings 446 and 447 are mounted in the transmission case 102 on the sides of the reaction plate 445 to lock it in place. Snap ring 446 is a tapered ring, restraining reaction plate 445 from axial movement.

To apply the two/four shift clutch assembly 308, a third hydraulic piston 448 operates in a cavity 450 formed by an annular piston housing 452. The piston housing 452 is secured to the transmission case 102 by suitable fastening means (not shown). The smooth diameter of the third hydraulic piston 448 has a groove 454 formed in its outer periphery for an outer seal ring 456 and a groove 458 formed in its inner periphery for an inner seal ring 460. A snap ring 462 is disposed in a groove 464 in the transmission case 102 to prevent axial movement of the piston housing 452.

The low/reverse clutch assembly 310 comprises a plurality of axially spaced annular clutch plates 466 and a plurality of axially spaced annular clutch discs 468. The clutch plates 466 and clutch discs 468 are similar to those of the underdrive clutch assembly 302. The clutch plates 466 are mounted in splines 470 of the case clutch fingers 439 inside the transmission case 102. The clutch discs 468 are mounted in splines 472 of the outer periphery of an annulus gear 542 of the gear assembly 500 to be described further herein.

To apply the low/reverse clutch assembly 310, a fourth hydraulic piston 474 operates in a cavity 476 formed by an annular piston housing 478. The piston housing 478 is disposed in an annular recess 480 of the transmission case 102 and secured by suitable fastening means, such as bolts 481, to the transmission case 102. The smooth diameter of the fourth hydraulic piston 474 has a groove 482 formed in its outer periphery for an outer seal ring 484 and a groove 486 formed in its inner periphery for an inner seal ring 488. A spring means such as a Belleville like spring 490, similar to spring 404, is disposed between the fourth hydraulic piston 474 and the gear assembly 500 to bias or return the fourth hydraulic piston 474 to its original position when not applied as shown in the figure. A snap ring 492 retains one end of the spring 490 to the transmission case 102.

GEAR ASSEMBLY STRUCTURE

During the flow of power, the gear assembly 500 changes the ratio of torque between an input member, such as input shaft 176, and an output member, such as output gear 534 which will be further described herein. The gear assembly 500 comprises a front or first planetary gear set, generally indicated at 502, and an axially spaced rear or second planetary gear set, generally indicated at 504. The first planetary gear set 502 includes a first sun gear 506 at its center. The first sun gear 506 is connected to the reverse clutch hub 374 at its inner periphery and is supported upon bushings 376 and 378. A first planet carrier 508 is disposed about the first sun gear 506. The first planet carrier 508 includes a plurality of circumferentially spaced first pinion gears 510 mounted about shafts 512 connected to the first planet carrier 508. The first planet carrier 508 includes an inner portion 514 splined at 516 to the overdrive clutch hub 358. A thrust bearing 517 is disposed axially between one end of the first sun gear 506 and inner portion 514 of the first planet carrier 508. The first planet carrier 508 also includes an axially extending outer portion 518 forming a cylinder about the first planetary gear set 502. A first annulus gear 519 is disposed about the first planet carrier 508 and engages the first pinion gears 510.

The rear or second planetary gear set 504 includes a second sun gear 520 at its center which is splined at 522 to the gear shaft 352. A thrust bearing 523 is axially disposed between one end of the inner portion 514 of the first planet carrier 508 and the second sun gear 520. A second planet carrier 524 is disposed about the second sun gear 520. The second planet carrier 524 includes a plurality of circumferentially spaced second pinion gears 526 mounted about shafts 528 connected to the second planet carrier 524. The second planet carrier 524 includes an inner portion 530 splined at 532 to a rotatable output gear 534 which acts as the output member of the transmission 100. The inner portion 530 of the second planet carrier 524 is supported by a bushing 536 disposed about the second sun gear 520. A thrust bearing 537 is disposed axially between the second sun gear 520 and second planet carrier 524. A tapered roller bearing assembly 538 supports the inner portion 530 of the second planet carrier 524 within the transmission case 102.

The second planet carrier 524 also includes an outer portion 540 connected to the first annulus gear 519. The second annulus gear 542 is disposed about the second planet carrier 524 and engages the second pinion gears 526. The second annulus gear 542 is connected to the outer portion 518 of the first planet carrier 508.

The second planet carrier 524 includes teeth 544 at its outer periphery of the outer portion 540. An output speed sensor 546 threadably engages a bore 548 in the transmission case 102 and has one end 550 disposed or radially spaced just above the teeth 544 of the second planet carrier 524. The output speed sensor 546 is used to monitor or sense the revolution rate (per minute) of the second planet carrier 524 by counting or sensing the teeth 544 passing thereby relative to time. The output speed sensor 546 is similar to the turbine speed sensor 320. It should also be noted that other suitable speed sensors could be used inside or after the transmission 100 to provide an output speed signal to the transmission's controller 3010.

The output gear 534 is secured to the second planet carrier 524 by suitable fastening means such as a bolt 552. The output gear 534 is supported by a tapered roller bearing assembly 554 within the transmission case 102. A rear cover plate member 556 is connected by suitable fastening means (not shown) to the rear or output end of the transmission case 102 to enclose the output gear 534 and the transfer gear (not shown).

To visualize and understand how power is transmitted from the rotating crankshaft 114 of the engine to the output gear 534 of the transmission 100, the operation of the assemblies described above will now be discussed in connection with FIGS. 1C, 1D and 1E.

OPERATION OF THE TORQUE CONVERTER

Rotation of the crankshaft 114 of the engine causes the front cover member 116 to rotate with it due to the connection between bolts 120, plate member 118 and bolts 122. Since the front cover member 116 is welded at 124 to the impeller shell 134 of the impeller assembly 126, the impeller assembly 126 also rotates with the crankshaft 114. The fluid within the impeller assembly 126 is set into motion by the rotation of the impeller assembly 126 and by the fluid pressure from the pump assembly 200. The impeller blades 132 start to carry the fluid around with them. As the fluid is spun around by the impeller blades 132, it is thrown outward by centrifugal force and into the turbine assembly 128 at an angle. The fluid strikes the turbine blades 166 of the turbine assembly 128, thus imparting torque, or turning effort to the turbine assembly 128 and causing the turbine shell 168 and the turbine assembly 128 to rotate. Since the turbine shell 168 is connected to the turbine hub 172 through rivets 170 and the turbine hub 172 is splined at 174 to the input shaft 176, the input shaft 176 is caused to rotate. As engine speed is increased, the force of the fluid striking the turbine blades 166 is also increased. Thus, torque is imparted to the input shaft 176 of the transmission 100 via the turbine assembly 128.

In the torque converter 110, the stator assembly 130 redirects the fluid flow so that the turbine blades 166 will have more force exerted upon them during a torque multiplication stage. During torque multiplication, the over-running clutch assembly 154 in the stator assembly 130 is locked in a known manner so that the stator assembly 130 will remain stationary. As the fluid passes from the turbine assembly 128 to the impeller assembly 126, the stator blades 150 of the stator assembly 130 "push" the fluid against the impeller blades 132 so that a greater entry angle is imparted to the turbine blades 166, resulting in a greater force on the blades 166 and increasing the torque to the input shaft 176 of the transmission 100.

The over-running clutch assembly 154 also permits the stator assembly 130 to rotate only in the same direction as the impeller assembly 126. The over-running clutch assembly 154 resists torque in one direction for the purpose of making the stator plate 152 and stator vanes 50 stationary. This is accomplished by the clutch rollers 158 engaging radially narrowing recesses (not shown) in the over-running clutch cam 156 to cause the over-running clutch cam 156, rollers 158 and race 160 to form a single unit. Since the over-running clutch race 160 is splined at 162 to the reaction shaft 164 which, in turn, is welded at 210 to the reaction shaft support 204 which cannot rotate, the over-running clutch cam 156, rollers 158 and race 160 remain stationary, resulting in the stator plate 152 and vanes 150 remaining stationary. The over-running clutch assembly 154 allows the stator plate 152 and vanes 150 to rotate freely in the opposite direction when their function as a reaction member is not desired because the rollers 158 do not engage the recesses, resulting in the over-running clutch cam 156 rotating freely about the clutch race 160.

OPERATION OF TORQUE CONVERTER LOCK-UP

The lock-up function of the torque converter 110 will now be described. Fluid flows through the center passage 175 of the input shaft 176 into the cavity 182 of the front cover member 116. The turbine hub seal 178 prevents leakage of the fluid back around the input shaft 176. The fluid in cavity 182 flows through slots (not shown) in the front cover bushing 180 and the thrust washer 184 and against the lock-up piston 188. The fluid pushes the portion 192 of the lock-up piston 188 off the friction disc 199, resulting in non-lock-up operation. At the same time, fluid from the pump assembly 200 flows through passage 230 in the reaction shaft support 204 and between the input shaft 176 and reaction shaft member 164. This fluid flows through slots (not shown) in the stepped member 185 and into the turbine 128, stator 130 and impeller 126 assemblies of the torque converter 110. Fluid also flows from these assemblies 126, 128 and 130 between the lock-up piston 188 and the turbine shell 168. Hence, during normal torque converter operation, fluid flow is acting on the opposite side of the lock-up piston 188, attempting to apply the lock-up piston 188. When the input shaft fluid is vented, the torque converter fluid pushes the lock-up piston 188 against the front cover member 116 with the friction disc 199 sandwiched between the two elements. Engine torque can then go through the front cover member 116 to the lock-up piston 188 and, in turn, to drive ring 196 and turbine shell 168.

As will be appreciated, lock-up of the torque converter 110 is desirable to reduce or eliminate rotational speed difference or "slip" between the crankshaft 114 of the engine and the input shaft 176 of the transmission 100. Lock-up of the torque converter 110 may be partial or full lockup. Partial lockup will reduce slip to predetermined value. Full lockup will eliminate slip or reduce it to a zero value. Lockup of the torque converter 110 may occur in second, third and fourth gears. The methodology for lock-up of the torque converter 110 will be described in more detail below, particularly with reference to FIG. 17.

OPERATION OF PUMP

The general operation of the pump assembly 200 will now be described. Specific fluid flow from the pump 200 to various assemblies in the transmission 100 will be described in other sections herein.

The pump 200 creates flow and applies force to the fluid. As described previously, the impeller shell 134 is welded at 136 to the impeller hub 138 which acts as the pump drive shaft of the pump assembly 200. Rotation of the impeller shell 134 results in rotation of the impeller hub 138. Thus, the external source of power for the pump 200 is the engine.

In the pump assembly 200, both rotor members 218 and 222 rotate together. The inner rotor 222 is splined at 140 to the impeller hub 138 and, therefore, rotates as the impeller hub 138 rotates. As the inner rotor 222 rotates or drives the outer rotor 218, a space (not shown) between the rotors 218, 222 increases as the rotor teeth separate and pass an outlet port (not shown).

In the pump assembly 200, a crescent-shaped protrusion (not shown) of the pump housing 202 divides the rotors 218 and 222. Fluid is trapped between the protrusion and the rotor teeth as it is carried to the outlet port for further use in a manner to be described in other sections herein.

OPERATION OF THE CLUTCHES

As described previously, the input shaft 176 of the transmission 100 is rotating due to torque being transferred from the rotating crankshaft 114 of the engine and through the torque converter 110 to the input shaft 176. The input clutch retainer hub 312 also rotates with the input shaft 176 due to its spline connection 317 with the input shaft 176. The input clutch retainer 326 and clutch plates 342, 354 and 370 also rotate with the input shaft 176 due to the spline connection 330 of the input clutch retainer 326 to the input clutch retainer hub 312 and spline connection of clutch plates 342, 354 and 370 to the input clutch retainer 326.

To apply the underdrive clutch assembly 308, hydraulic pressure from fluid entering between the input clutch retainer 326 and second hydraulic piston 410 moves the second hydraulic piston 410 axially, thereby compressing the spring 432. The second hydraulic piston 410 forces the rotating clutch plates 342 and momentarily stationary discs 344 of the underdrive clutch assembly 302 together and produces frictional force between the clutch plates 342 and discs 344. Because the input clutch retainer 326 and underdrive clutch plates 342 are rotating, the frictional force causes the underdrive clutch discs 344 and hub 350 to rotate, in turn, rotating gear shaft 352 of the gear assembly 500. When the hydraulic fluid to the underdrive clutch assembly 302 is vented, the compressed spring 432 applies a force to the second hydraulic piston 410, thereby returning the second hydraulic piston 410 to its non-applied position as shown in the figure.

To apply the overdrive clutch assembly 304, hydraulic pressure from fluid entering between the first hydraulic piston 386 and the input clutch retainer 326 moves or pulls the first hydraulic piston 386 axially, thereby deflecting axially the spring 404. The pressure plate member 408 of the first hydraulic piston 386 forces the clutch plates 354 and discs 356 of the overdrive clutch assembly 304 together against the reaction plate 364 and produces a frictional force between them. Because the input clutch retainer 326 and overdrive clutch plates 354 are rotating, the frictional force causes the overdrive clutch discs 356 and overdrive clutch hub 358 to rotate, in turn, rotating the first planet carrier 508 and second annulus gear 542. When the hydraulic fluid to the overdrive clutch assembly 304 or first hydraulic piston 386 is vented, the deflected spring 404 applies a force to the first hydraulic piston 386, thereby returning the first hydraulic piston 386 to its non-applied position as shown in the figure.

To apply the reverse clutch assembly 306, hydraulic pressure from fluid entering between the first hydraulic piston 386 and input clutch retainer hub 312 moves or pushes the first hydraulic piston 386 axially, thereby deflecting the spring 404. The pressure plate member 408 of the first hydraulic piston 386 forces the clutch plate 370 and discs 372 of the reverse clutch assembly 306 together against the reaction plate 380 and produces a frictional force between them. Because the input clutch retainer 326 and reverse clutch plate 370 are rotating, the frictional force causes the reverse clutch discs 372 and reverse clutch hub 374 to rotate, in turn, rotating the first sun gear 506. When the hydraulic fluid to the reverse clutch assembly 306 or first hydraulic piston 386 is vented, the deflected spring 404 applies a force to the first hydraulic piston 386, thereby returning the first hydraulic piston 386 to its non-applied position as shown in the figure.

At the output end of the transmission 100, the two/four shift clutch 308 and low/reverse clutch 310 assemblies are used to hold a particular gear element of the gear assembly 500 against rotation by coupling it to the relatively stationary transmission case 102. To apply the two/four shift clutch assembly 308, hydraulic pressure from fluid entering between the third hydraulic piston housing 452 and the third hydraulic piston 448 moves the third hydraulic piston 448 axially, thereby deflecting the spring 444. The third hydraulic piston 448 forces the clutch plates 434 and discs 436 of the two/four shift clutch assembly 308 together against the reaction plate 445 and produces a frictional force between them. Because the two/four clutch plates 434 do not rotate or are stationary, as they are connected to the transmission case 102, the frictional force holds the two/four clutch discs 436 stationary, in turn, holding the flange 442, reverse hub member 374 and first sun gear 506 stationary. When the hydraulic fluid to the two/four shift clutch assembly 308 or third hydraulic piston 448 is vented, the deflected spring 444 applies a force to the third hydraulic piston 448, thereby returning the third hydraulic piston 448 to its non-applied position as shown in the figure.

To apply the low/reverse clutch assembly 310, hydraulic pressure from fluid entering between the fourth hydraulic piston housing 476 and the fourth hydraulic piston 474 moves the fourth hydraulic piston 474 axially, thereby deflecting the spring 490. The fourth hydraulic piston 474 forces the clutch plates 466 and discs 468 of the low/reverse clutch assembly 310 together against reaction plate 445 and produces a frictional force between them. Because the low/reverse clutch plates 466 are stationary, as they are connected to the transmission case 102, the frictional force holds the low/reverse clutch discs 468 stationary, in turn, holding the second annulus gear 542 and first planet carrier 508 stationary. When the hydraulic fluid to the low/reverse clutch assembly 474 or fourth hydraulic piston 474 is vented, the deflected spring 490 applies a force to the fourth hydraulic piston 474, thereby returning the fourth hydraulic piston 474 to its non-applied position as shown in the figure.

OPERATION OF PLANETARY GEARS

In the neutral N or park P modes of transmission operation, the input shaft 176 (which is attached to the turbine assembly 128) freely rotates with the engine crankshaft 114. Since the input clutch retainer hub 312 is also attached to the input shaft 176, the input clutch retainer hub 312 rotates, in turn, causing the input clutch retainer 326 and clutch plates 342, 354 and 370 to freely rotate with the engine crankshaft 114.

When the transmission 100 is desired to operate in first gear, the underdrive clutch assembly 302 and low/reverse clutch assembly 310 are applied. Hydraulic fluid moves the second hydraulic piston 410 axially away from the torque converter 110 to engage the clutch plates 342 and friction discs 344 of the underdrive clutch assembly 302. This engagement causes the underdrive clutch hub 350 to rotate which, in turn, rotates the gear shaft 352. Because the second sun gear 520 is splined at 522 to the gear shaft 352, rotation of the gear shaft 352 causes the second sun gear 520 to rotate. As the low/reverse clutch assembly 310 is applied by the engagement of the low/reverse clutch plates 466 with the discs 468, the second annulus gear 542 is held stationary. Since the second annulus gear 542 is connected to the first planet carrier 508, the first planet carrier 508 is held stationary. As a result, rotation of the second sun gear 520 causes rotation of the second pinion gears 528 and the second planet carrier 524. Because the output gear 534 is splined at 532 to the second planet carrier 524, rotation of the second planet carrier 524 causes the output gear 534 to rotate. Since the second planet carrier 524 rotates, the first annulus gear 519 also rotates, causing the first pinion gears 510 and first sun gear 506 to freely rotate in first gear. The output gear 534 then transfers the torque from the second planetary carrier 524 to the transfer gear (not shown).

When the transmission 100 is desired to operate in second gear, the underdrive clutch assembly 302 and the two/four shift clutch assembly 308 are applied. Once again, the underdrive clutch hub 350 rotates as described above which, in turn, rotates the gear shaft 352. Rotation of gear shaft 352 causes the second sun gear 520 to rotate. As the two/four shift clutch assembly 308 is applied by engagement of the two/four shift clutch plates 434 with the discs 436, the flange 442, reverse clutch hub 374 and first sun gear 506 are held stationary. Because the transmission 100 has been operating in first gear, the first annulus gear 519 and second planet carrier 524 have been rotating at output speed. Also, the first sun gear 506 has been rotating freely. By holding the first sun gear 506 stationary, the first pinion gears 510 and first planet carrier 508 increase in speed. As a result, the first annulus gear 519, second planet carrier 524 and the output gear 534 rotate at a greater r.p.m. than first gear.

When the transmission 100 is desired to operate in third gear, the underdrive clutch assembly 302 and the overdrive clutch assembly 304 are applied. Once again, engagement of the underdrive clutch assembly 302 causes the second sun gear 520 to rotate as previously described. As the overdrive clutch assembly 304 is applied by engagement of the clutch plates 354 and discs 356 of the overdrive clutch assembly 304, the overdrive clutch hub 358 rotates, in turn, rotating the first planet carrier 508 due to the spline connection at 516. Since the first planet carrier 508 rotates, the first pinion gears 510, first sun gear 506 and second annulus gear 542 also rotate. As a result, the second pinion gears 526 of the second planet carrier 524 rotate, causing the second planet carrier 524 to rotate which, in turn, rotates the output gear 534 at input speed or a higher r.p.m. than second gear.

When the transmission 100 is desired to operate in fourth gear, the overdrive clutch assembly 304 and two/four shift clutch assembly 308 are applied. Application of the overdrive clutch assembly 304 causes the overdrive clutch hub 358 to rotate, as previously described. Rotation of the overdrive clutch hub 358 causes the first planet carrier 508 and second annulus gear 542 to rotate. Application of the two/four shift clutch assembly 308 causes the flange 442, reverse clutch hub 374 and first sun gear 506 to be held stationary as previously described. As a result, rotation of the first planet carrier 508 causes the first pinion gears 510, first annulus gear 519 and second annulus gear 542 to rotate. Rotation of the first and second annulus gears 519 and 542, respectively, causes the second pinion gears 526 and second planet carrier 524 to rotate which, in turn, rotates the output gear 534 at a greater r.p.m. than third gear.

When the transmission 100 is desired to operate in reverse gear, the reverse clutch assembly 306 and low/reverse clutch assembly 310 are applied. The reverse clutch assembly 306 is applied by engagement of the reverse clutch plate 370 and discs 372. This engagement causes the reverse clutch hub 374 to rotate which, in turn, rotates the first sun gear 506. Application of the low/reverse clutch assembly 310 causes the first planet carrier 508 and the second annulus gear 542 to be held stationary as previously described. As a result, the first sun gear 506 rotates the first pinion gears 510 which, in turn, rotate the first annulus gear 519 backwards. Rotation of the first annulus gear 519 causes the second planet carrier 524 and second pinion gears 526 to rotate which, in turn, causes rotation of the output gear 534 in a direction opposite to the other gear positions. Rotation of the second pinion gears 526 also causes the second sun gear 520 to rotate freely.

CLUTCH REACTION AND APPLY PLATES

Referring to FIG. 1D, the reaction plate 380 and pressure plate member 408 are shown. The present invention features web means such as an annular web 380a spaced radially at the outer periphery of the reaction plate 380 and connected to the reaction plate 380 at least one location circumferentially, and an annular web 408a spaced radially at the other periphery of the pressure plate member 408 and connected to the pressure plate member 408 at least one location circumferentially. The webs 380a and 408a are an efficient means of increasing axial rigidity to restrict clutch deflection. The reaction plate 380 and pressure plate member 408 resist loads producing a stress pattern like that found in a Belleville spring (i.e. producing a family of moments along the radial direction).

In a standard pressure or reaction plate, the highest stresses occur at the outer diameter (OD) and inner diameter (ID) edges. The distributed loading by the clutch apply piston causes the plate to deflect to a generally conical shape of some angle theta. With the addition to the annular web 380a, 408a, more material is being strained, resulting in lower stresses and less deflection theta. Thus, the addition of the web 380a, 408a produces a plate having a stiffness comparable to the entire volume from ID to OD of the reaction plate 380 or pressure plate member 408 having been filled with material.

Additionally, the inside diameter of the annular web portion 380a is fitted closely with the outside diameter of clutch retainer fingers 341 such that the fingers 341 and snap ring 384 are better supported (effectively stronger) against axial piston loading and centrifugally induced loads.

BLEEDER BALL CHECK VALVES

Figure 2A:
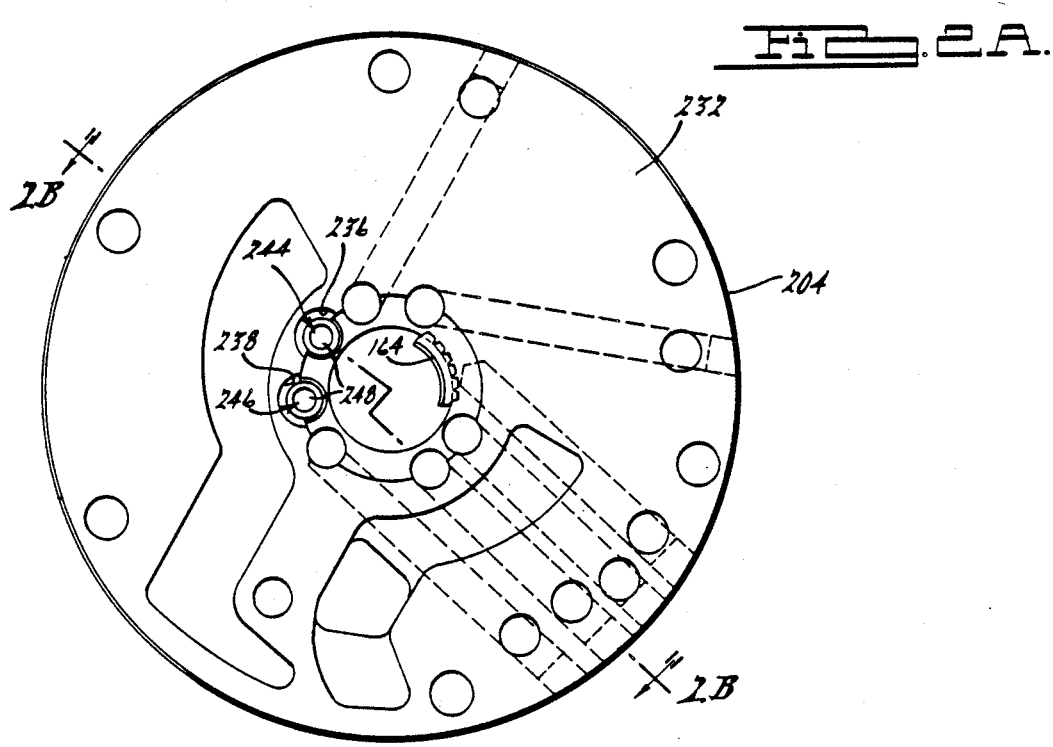
FIGS. 2A and 2B illustrate two views of a bleeder ball check valve assembly according to the present invention.
Figure 2B:
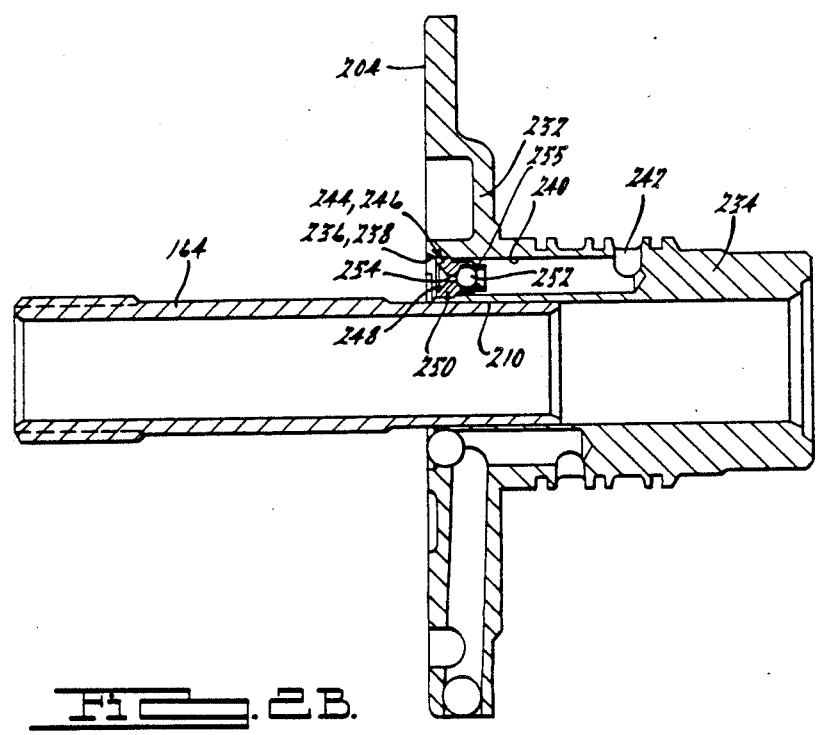

As illustrated in FIGS. 2A and 2B, the reaction shaft member 164 and reaction shaft support 204 are shown. The reaction shaft member 164 is welded at 210 to the reaction shaft support 204. The reaction shaft support 204 comprises a plate portion 232 integral with a hub portion 234. The plate portion 232 includes a pair of circumferentially spaced apertures 236 and 238. Each aperture 236 and 238 has a corresponding passageway 240 communicating therewith and an outlet port 242. Bleeder means such as bleeder ball check valves or dribblers, generally indicated at 244 and 246, are disposed in apertures 236 and 238, respectively, to fill the clutch apply cavities 620 and 622 of the overdrive 304 and reverse 306 assemblies, respectively, as soon as possible after the input clutch retainer 326 begins to rotate and to assure that some fluid always dribbles thereto.

The bleeder ball check valves 244 and 246 each include a screen 248, a ball support 250 disposed in the passageway 240 and a ball 252 supported therein. The ball 252 moves to open and close a narrow aperture or orifice 254 in the ball support 250. The screen 248 acts as a filter to prevent plugging of the orifice 254. The ball support 250 is also formed with inwardly directed fingers 255 which limit the axial movement of the ball 252. The bleeder ball check valves 244 and 246 allow one-way fluid flow to either the overdrive 304 or reverse 306 clutch assemblies, respectively. The size or diameter of the orifice 254 is selected to maintain a minimum pressure, i.e. approximately 0.25 to 2 p.s.i., in the clutch apply cavities 620 and 622 at all times.

In operation, fluid flows from the torque converter 110 to reaction shaft support 204. When either clutch assembly 304, 306 is released, fluid enters apertures 236 or 238 in the plate portion 232 and flows through the corresponding orifice 254 in ball support 250 due to the pressure differential between the fluid pressure from the torque converter 110 and the respective clutch apply cavity being vented. Fluid displaces and moves past the ball 252 to the overdrive 304 or reverse 306 clutch assemblies. When the clutch apply cavity is filled, the fluid pressure moves the ball 252 to close the orifice 254 to prevent backflow. Thus, the bleeder ball check valves 236 and 238 provide fluid to keep the clutch apply cavities 620 and 622, respectively, filled and maintain a pressure balance on the first hydraulic piston 386 whenever rotation exists.

PRESSURE BALANCED PISTONS

Referring to FIG. 1B, the first hydraulic piston 386 includes at least one bleeder orifice 256. The bleeder orifice 256 is typically 0.020 inches in diameter and communicates axially through the first hydraulic piston 386. A filter such as a screen 258 is disposed in the bleeder orifice 256 to prevent plugging of the bleeder orifice 256 by dirt and other contaminants.

In operation, the first hydraulic piston 386 is displaced axially by fluid pressure in the clutch apply cavities 622 and 620 for the application of either the reverse 306 or overdrive 304 clutch assemblies, respectively. When that application is removed, the first hydraulic piston 386 must return to its substantially centered or non-applied position. Due to the centrifugal force acting on the rotating fluid in either of the clutch apply cavities 620 or 622 which applied the piston 386, an unbalanced pressure will exist and cause the first hydraulic piston 386 to be biased and remain in that position even though the fluid apply line is vented. The bleeder orifice 256 acts as a means to allow fluid to pass through the first hydraulic piston 386 due to this differential pressure and allows the first hydraulic piston 386 to be centered by the spring 404 since any centrifugal fluid pressure in the clutch apply cavity is balanced by a comparable centrifugal fluid pressure on the opposite side when both clutch apply cavities 620 and 622 are filled. The second hydraulic piston 410 has a similar bleed orifice (not shown) and secondary source of fluid to fill its pressure balance cavity.

DOUBLE-ACTING SPRING

Figure 3:
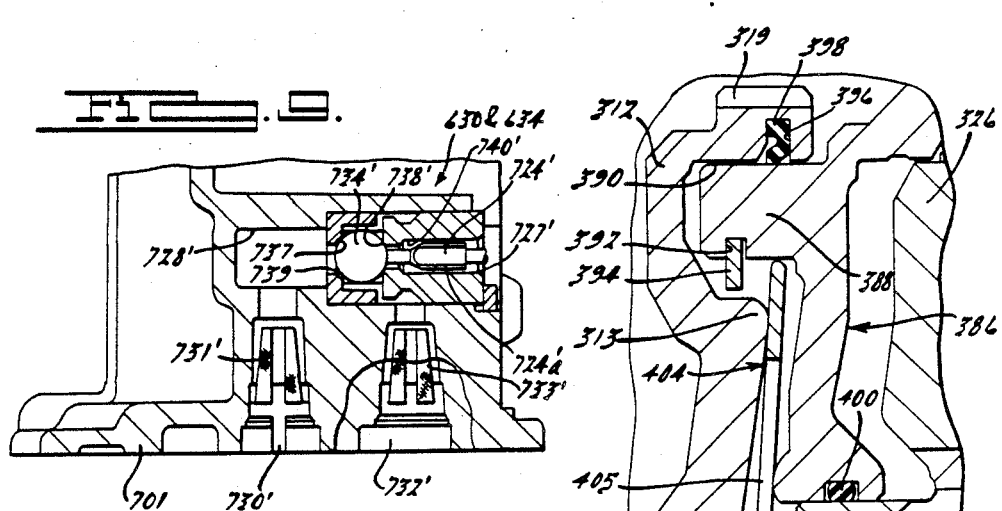
FIGS. 3A-E illustrate the structure and operation of the double acting spring.

As illustrated in FIGS. 1C, 3A and 3B, a means such as a double-acting spring 404 locates and returns the first hydraulic piston 386. The double-acting spring 404 is a Belleville like spring. The double-acting spring 404 is also annular and conically shaped with circumferentially spaced and inwardly extending fingers 405. The double-acting spring 404 provides the advantage of saving space axially in the transmission 100 due to its compactness. In other words, a conventional coil spring would increase the axial length of the transmission 100 as compared to the double-acting spring 404.

Figure 3D:
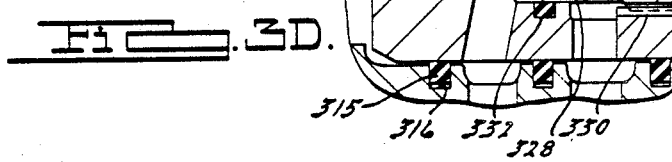
Figure 3C:
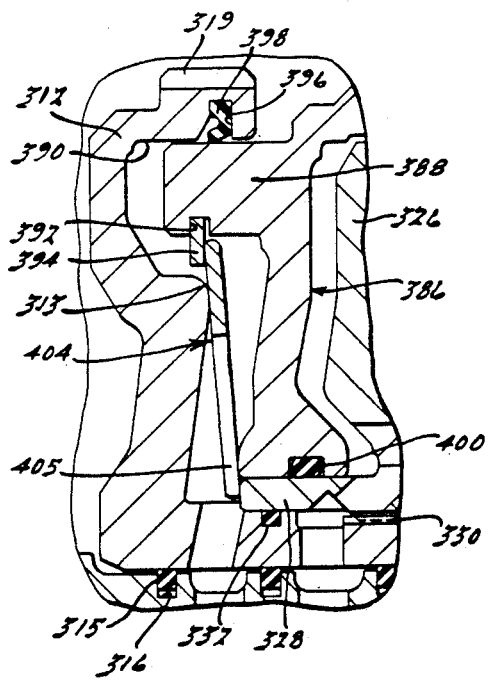

The spring 404 is double-acting; that is, it is applied in two directions at two different focal points. As illustrated in FIG. 3C, when the first hydraulic piston 386 is located or substantially centered in its non-engaged or non-applied position between the input clutch retainer hub 312 and the input clutch retainer 326, the double-acting spring 404 maintains a four point contact. The double-acting spring 404 contacts the snap ring 394, the shoulder portion 313 of the input clutch retainer hub 312, the inner periphery of the first hydraulic piston 386 and one end of the hub portion 328 of the input clutch retainer 326.

When the first hydraulic piston 386 applies the overdrive clutch 304, the double-acting spring 404 is displaced toward the torque converter 110. As illustrated in FIG. 3D, the double-acting spring 404 at its outer periphery contacts the shoulder portion 313 of the input clutch retainer hub 312 and the inner periphery of the first hydraulic piston 386. The double-acting spring 404 applies a return force toward its centered position at the inner periphery of the first hydraulic piston 386.

Figure 3E:
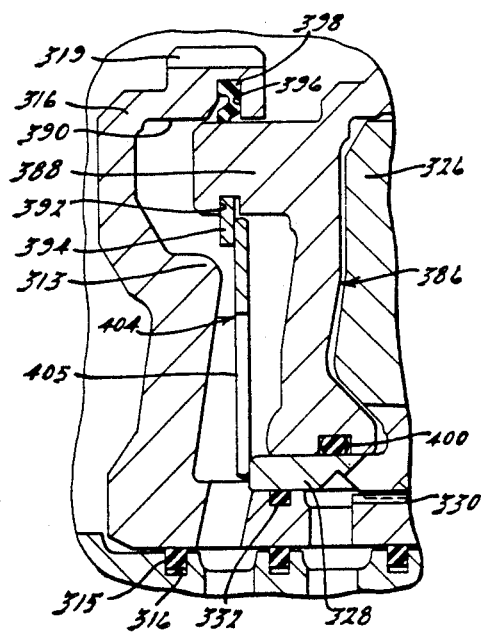

When the first hydraulic piston 386 applies the reverse clutch 306, the double-acting spring 404 is displaced axially in a direction away from the torque converter 110. As illustrated in FIG. 3E, the double-acting spring 404 contacts the snap ring 394 and the end of the hub portion 328 of the input clutch retainer 326. The double-acting spring 404 applies a return force toward its centered position at the snap ring 394.

In other words, double-acting spring 404 applies a force at its outer periphery in the direction of the torque converter 110 to move the first hydraulic piston 386 axially toward the torque converter 110. This focal point is located at the inner periphery thereof. The double-acting spring 404 also applies a force at its inner periphery in the direction of the output gear 534 to move the first hydraulic piston 386 toward the output gear 534. This focal point is located at the outer periphery of the double-acting spring 404.

Additionally, the double-acting spring 404 is preloaded either by the first hydraulic piston 386 or the input clutch retainer hub 312. Since the double-acting spring 404 usually bends as a cantilever beam, the preloading of the spring 404 by the inner periphery of the first hydraulic piston 386 produces a tip deflection at the outer periphery of the double-acting spring 404, resulting in a gap between the spring 404 and the snap ring 394. Preloading at the shoulder 313 by the input clutch retainer hub 312 produces a tip deflection in the opposite direction, reducing the gap between the double-acting spring 404 and snap ring 394 by a large amount. As a result, the double-acting spring 404 will take some intermediate or statically indeterminate position, distributing the load to all four apply points previously described. In other words, the axial lash in the piston position is removed by the double-acting spring 404 as it deforms to take a statically indeterminate position between the first hydraulic piston 386 and the input clutch retainer hub 312.

LOW-EFFORT DOUBLE-ROLLER PARK SPRAG

The park locking mechanism positively locks the second planet carrier 524 of the transmission 100 to the transmission case 102 when the park operating mode of the transmission 100 is manually selected by the driver or operator of the vehicle. The present invention provides an automatic transmission park locking mechanism designed to reduce to the least possible extent the sliding friction and effort required to actuate the park locking mechanism.

Figure 4H:
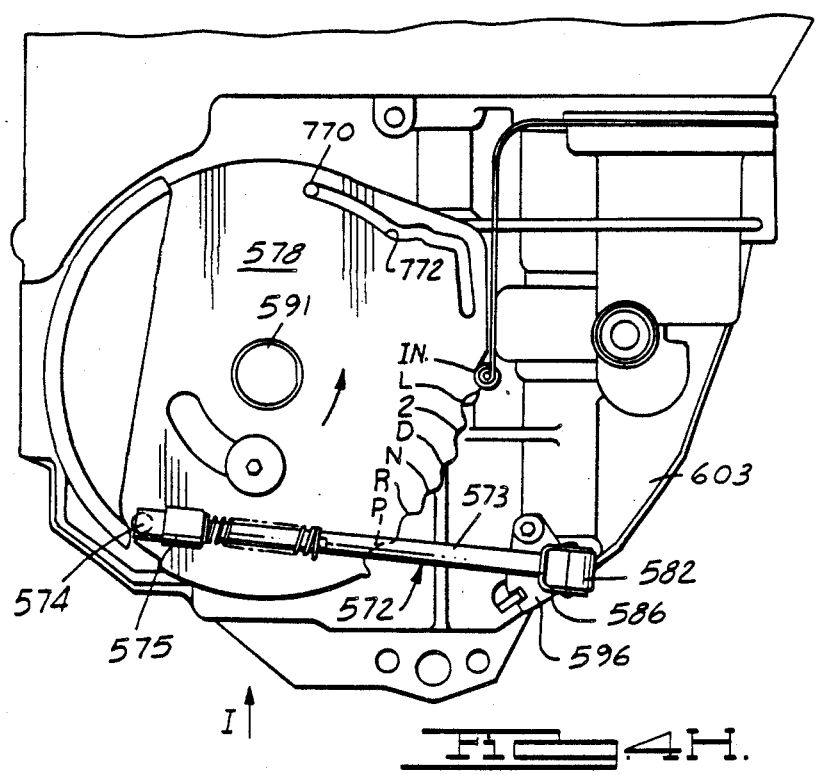

Referring to FIGS. 4A through 4J, a low-effort double-roller park locking mechanism or sprag 560 is shown. As illustrated in FIG. 4E, the park sprag 560 includes a pawl lever or member, generally indicated at 561, having a shape similar to the lower case letter "r". The pawl member 561 includes a head portion 562. A planar edge portion 562a, a sloping cam or ramp portion 562b and a pressure edge portion 562c provide a cam surface, as will be explained below, engageable with rollers. One end 563 of the pawl member 561 is pivotally connected about a dowel or pin 564 of the transmission case 102. The pawl member 561 is supported by the pin 564 between a retainer bracket, generally indicated at 565. The retainer bracket 565 is U-shaped in cross-section and includes an inwardly offset wall portion 565a joined to the principal wall portion 565b by an intermediate oblique or angled wall portion 565c to form a bracket wall. The angled wall portion 565c together with the principal 565b and offset 565a wall portions provide a cam surface for the rollers to be described herein. The offset wall portion 565a terminates in a right-angled stop flange or end wall 565d (FIG. 4D). The retainer bracket 565 includes a pair of side walls 566 extending outwardly from the bracket wall 565a, 565b, 565c.

Washers 567 and 568 are disposed about each side of the pawl member 561 and the pin 564 between the side walls 566 of the retainer bracket 565. A spring means comprising a spring 569 is disposed about the pin 564 and has one end engaging a second dowel or pin 570 of the transmission case 102 and the other end engaging as step or shoulder 571 on the pawl member 561. The spring 569 biases the pawl member 562 toward the offset wall portion 565a of the retainer bracket 565.

The pawl member 561 cooperates with a rod assembly, generally indicated at 572. The rod assembly 572 comprises a rod 573 having a cap member 574 secured at one end. An attachment member 575 is disposed about the rod 573. The attachment member 575 includes a shaft 576 disposed in an aperture 577 of a manual lever or rooster comb 578 and secured thereto by a snap ring 579. A spring 580 is disposed about the rod 573 between the attachment member 575 and laterally extending projections 581 on the rod 573. A more detailed description of the manual lever 578, manual valve 604, shaft member 770, and cam groove 772 can be found under section heading "CAM CONTROLLED MANUAL VALVE".

The other end of the rod 573 includes a pair of laterally adjacent cam rollers 582 and 583 journally supported thereon by their associated support pins 584 and 585, respectively, secured to a U-shaped carrier or bracket member 586, as illustrated in FIG. 4F. Each of the rollers 582, 583 are formed with a central bore 584a and 585a, respectively. Each bore 584a, 585a receive pins 584, 585, respectively, therethrough in an oversize manner such that each of the rollers 582 and 583 are free for predetermined limited transverse movement relative to its associated pin so as to rollingly engage the remaining roller.

The U-shaped bracket member 586 includes an inclined projection 587 extending outwardly parallel with the sides thereof. A projection 588 extends outwardly from each side of the U-shaped bracket member 586 to guide the bracket member 586 between the sides of the retainer bracket 565, as illustrated in FIG. 4G. The U-shaped bracket member 586 also includes an inverted "L" shaped portion 590 at the bottom of the "U".

In operation, the pawl member 561 abuts the retainer bracket 565 due to the biasing of the spring 569, as illustrated in solid lines in FIG. 4C, when the shift lever position is not park P. When a shift position or gear selector lever or shaft 591 connected to the manual lever 578, as illustrated in FIGS. 4B and 4H, is moved to the park P position, the rod 573 is moved. The rollers 582 and 583 roll along the principal wall portion 565b of the retainer bracket 565 and the pressure edge portion 562c of the pawl member 561, respectively. One 583 of the rollers engages a ramp portion 562b of the pawl member 561 and one 582 of the rollers engages the angled wall portion 566 of the retainer bracket 565, as illustrated in FIGS. 4C and 4D. This causes the pawl member 561 to be displaced or rotated about the pin 564. The rod 573 moves until one end of the head portion 562 of the pawl member 561 has engaged a space 592 between a pair of adjacent teeth 544 in the second planet carrier 524 of the gear assembly 500 and the rollers 582 and 583 abutting interconnect the planar edge portion 562a of the pawl member 561 and the offset wall portion 565a of the retainer bracket 565 as illustrated in solid lines in FIG. 4A. The operation is reversed when the shift lever is in a position other than the park P position.

Figure 4I:
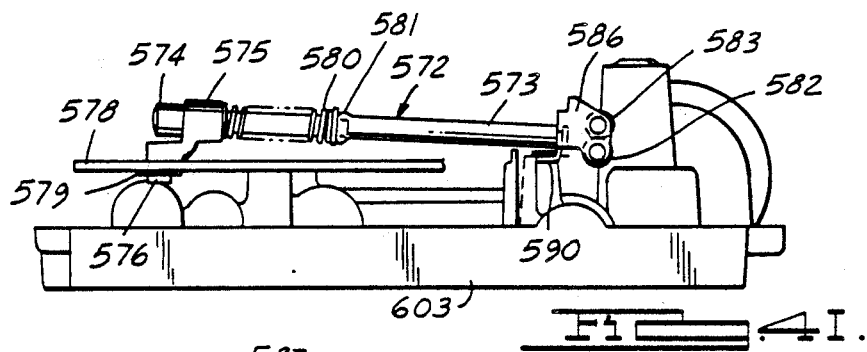
Figure 4J:
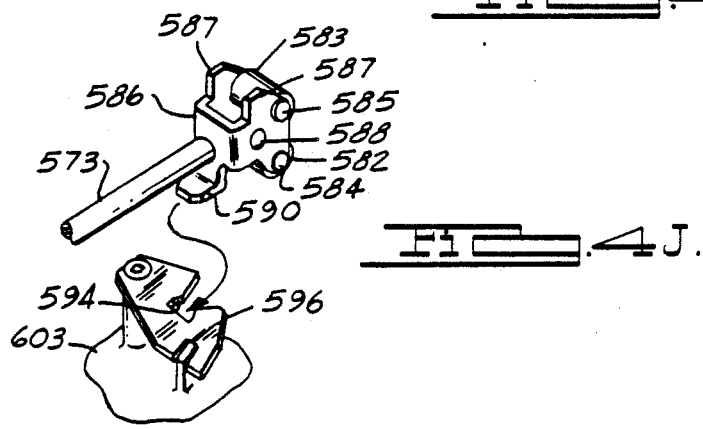

The L-shaped portion 590 engages a slot 594 in a plate member 596 connected to the valve body 603 of the transmission case 102 at the other extreme of the travel, the installation position (IN), as illustrated in FIGS. 4H, 4I and 4J, to limit the travel of the rod assembly 572. During assembly of the transmission 100, the installation position prevents the rod assembly 572 from being moved and maintaining the rod assembly 572 in axial alignment with the guide bracket 565.

When the shift lever position is park P position, the pawl member 561 may not engage a space 592 between adjacent teeth 544 in the second planet carrier 524 as shown in FIG. 4D. In this case, the spring 580 biases the rod 573 toward the end wall 565d of the bracket member 565. This causes the head portion 562 of the pawl member 561 to contact a tooth 544 on the second planet carrier 524. When the vehicle rolls backward, causing the second planet carrier 524 to rotate, the biased spring 580 moves the rod 573 and, in turn, moves the head portion 562 into the next available space 592 in the second planet carrier 524 to lock the second planet carrier 524 in place.

Accordingly, the park locking mechanism 560 provides cam rollers 582, 583 with oversized bores 584a, 585b, respectively, to allow the rollers 582, 583 to shift into load-bearing contact. Thus, the main reaction load applied by the offset wall portion 565b and the cam surface 562b of the pawl member 561 are transmitted first between the rollers 582, 583 to the offset wall portion 565b and, in turn, to the transmission case 102. Hence, substantially reduced reaction loads are transmitted to the pins 584, 585 so as to increase the service life of the pins 584, 584 and rollers 582, 583.

HYDRAULIC SYSTEM STRUCTURE

The function of the hydraulic system is to cooperate with the electronic controls (FIGS. 28A through 28G) to make the transmission 100 fully automatic. Referring to FIGS. 5A through 5L, a schematic diagram of the hydraulic system 600 for controlling and operating the fluid flow throughout the transmission 100 is shown.

The pump assembly 200, clutch assemblies 302, 304, 306, 308 and 310, torque converter assembly 110 of FIG. 1, and valves to be described herein, are connected by a plurality of internal passageways, generally indicated at 602, in or between the valve body 603 (FIG. 6), transfer plate (not shown) and transmission case 102.

The fluid source of the transmission 100 is the fluid contained in the transmission pan (not shown) which acts as a reservoir. A filter 605 is attached to the lower half of a transfer plate at the inlet of the transfer plate to prevent dirt and other foreign matter from entering the hydraulic system 600. Another filter (not shown) is disposed in the valve body 603 at the pump pressure inlet to a pressure regulator valve 608 to protect the pressure regulator valve 608 from any loose chips and dirt in the pump hydraulic circuit.

The pump assembly 200 is also connected by the passageways 602 to a manual valve 604 which is coupled to the manually actuated shift lever or manual shaft 591. The manual shaft 591 is connected to the manual lever 578 (FIG. 4B), its shift lever position PRNODDL being generally indicated by numeral 606. The pump assembly 200 is further connected by passageways 602 to a pressure regulator valve 608 and to a solenoid or fluid switch valve 610. The passageways 602 also connect the pressure regulator 608 to a cooler or torque converter (T/C) control valve 612. The passageways 602 also connect the T/C control valve 612 to a lock-up (LU) switch valve 614. The passageways 602 further connect the LU switch valve 614 to the torque converter 110, and they also provide a path from the torque converter 110 back to the LU switch valve 614 and to T/C control valve 612. A cooler 616 is connected by passageways 602 to the T/C control valve 62. The manual valve 604 is also connected by passageways 602 to an underdrive element or clutch apply cavity 618, an overdrive clutch apply cavity 620, reverse clutch apply cavity 622 and a two/four shift clutch apply cavity 624. A low/reverse clutch apply cavity 626 is connected by passageways 602 to the solenoid switch valve 610 and, in turn, to the manual valve 604.

The clutch apply cavities 618, 620, 622, 624 and 626 are also identified in FIGS. 1C and 1D. The valves 604 and 610 are also connected by passageways 602 to a vent reservoir 628 in the manifold assembly 700 (FIGS. 7-9) which is at a higher elevation than the sump or fluid reservoir in the transmission pan. The other valves vent to the sump as indicated by the letter "V".

The hydraulic system 600 also includes an underdrive element or clutch solenoid-actuated valve 630, overdrive clutch solenoid-actuated valve 632, two/four shift clutch solenoid-actuated valve 634 and low/reverse clutch solenoid-actuated valve 636 which will be described in connection with FIGS. 7-9. The solenoid-actuated valves 630, 632, 634 and 636 control the fluid flow to their respective clutch apply cavities 618, 620, 624 and 626.

The manual valve 604 controls the fluid flow to the reverse clutch apply cavity 622. The low/reverse clutch solenoid-actuated valve 636 includes a second or dual function of controlling fluid flow to the LU switch valve 614 during lock-up of the torque converter 110 (FIGS. 5G, 5I, 5J, 5L). The two/four clutch solenoid-actuated valve 634 also has a dual function of controlling fluid flow to the low/reverse clutch apply cavity 626 when the shift lever position 606 is reverse (FIG. 5C). These solenoid-actuated valves 630, 632, 634 and 636 operate in response to command or control signals from the electronic controls.

In one embodiment according to the present invention, both the underdrive clutch solenoid-actuated valve 630 and two/four shift clutch solenoid-actuated valve 634 are designed to be normally applied. This means that in the absence of electrical power, the solenoid-actuated valves 630 and 634 will allow pressure or fluid flow in the passageways 602 to be transmitted to the underdrive clutch apply cavity 618 and two/four shift clutch apply cavity 624, respectively. Hence, the underdrive clutch assembly 302 and two/four shift clutch assembly 308 will be applied, resulting in the transmission 100 operating in second gear. Likewise, the overdrive clutch solenoid-actuated valve 632 and low/reverse clutch solenoid-actuated valve 636 are designed to be normally vented. This means that in the absence of electrical power, the solenoid-actuated valves 532 and 636 will vent fluid in passageways 602 and thus prevent fluid flow to the overdrive clutch apply cavity 620 and low/reverse clutch apply cavity 626, respectively. Hence, the overdrive clutch assembly 304 and low/reverse clutch assembly 310 will not be applied so that the transmission 100 may operate in second gear.

The hydraulic system 600 also includes accumulators 638, 640, 642 and 644 which are connected to passageways 602 before the underdrive 618, overdrive 620, two/four shift 624 and low/reverse 626 clutch apply cavities, respectively. As illustrated in FIG. 6, the accumulators 638, 640, 642 and 644 comprise a first spring 645a, a second spring 645b and a piston 645c operating in a bore 645d in the valve body 603. The purpose of these accumulators 638, 640, 642 and 644 is to absorb the fluid apply pressure to help cushion the application of the underdrive 302, overdrive 304, two/four shift 308 and low/reverse 310 clutch assemblies, respectively.

As illustrated in FIGS. 5A-5L, pressure switches 646, 648 and 650 are connected to the passageways 602 which lead to the overdrive clutch apply cavity 620, the two/four shift clutch apply cavity 622 and the low/reverse clutch apply cavity 626, respectively. The pressure switches 646, 648 and 650 provide a digital electrical signal of zero (0) value when there is either an absence of fluid pressure or fluid pressure below a predetermined pressure, and a value of one (1) when there is fluid pressure present at or above a predetermined pressure in the passageway 602 leading to the respective clutch apply cavities 620, 624 and 626. However, it should be appreciated that other suitable pressure sensors may be employed in these or other locations in the appropriate application.

The hydraulic system 600 also includes first 652, second 654, third 656, fourth 658 and fifth 660 ball check valves in the passageways 602 leading to the low/reverse 626, underdrive 618, low/reverse 626, reverse 622 and overdrive 620 clutch apply cavities, respectively. The ball check valves 652, 654, 656, 658 and 660 comprise a rubber ball operating against a seat, typically formed in the valve body 603, and are used for flow control to open and close particular passageways 602. The ball is seated by pressure acting against the ball and unseated by pressure being applied on the opposite or seat side of the ball.

As illustrated in FIGS. 5A through 5L, the LU switch valve 614, T/C control valve 612 and pressure regulator 608 include springs 662, 664 and 666, respectively, at one end to preload these valves. A thermal valve 668 is also provided to regulate the fluid flow through check valve 654 at higher fluid temperatures. The thermal valve 668 closes or opens a particular passageway 602 based on the fluid temperature.

OPERATION OF THE HYDRAULIC SYSTEM

As illustrated in FIGS. 5A-L, the hydraulic system 600 is shown. The dense shading or hatching in the passageways 602 shows fluid at pump pressure. The sparse shading or hatching illustrates a low fluid pressure. The intermediate shading or hatching illustrates a fluid pressure between that of pump pressure and a low pressure. The absence of shading or hatching shows the passageways 602 as vented.

When the engine is initially started, the pressure regulator 608 is actuated or moved by fluid pressure to allow fluid from the pump assembly 200 to flow through the pressure regulator 608 between the first 670a and second 670b lands to the T/C control valve 612, as illustrated in FIG. 5A. The T/C control valve 612 is similarly actuated by fluid pressure to allow fluid from the pressure regulator 608 to flow between the first 672a and second 672b lands of the T/C control valve 612 to the LU switch valve 614. Fluid then flows between the first 674a and second 674b lands of the LU switch valve 614 to the torque converter 110. This fluid pressure moves the lock-up piston 188 off or in disengagement with the friction disc 199 of the lock-up clutch assembly 186 so that lock-up is not applied. Fluid also flows from the torque converter 110 back to the T/C control valve 612. Fluid flows between the second 674b and third 674c lands thereof and through the cooler 616 where it is cooled and used for lubrication.

As illustrated in FIG. 5A, when the shift lever position 606 is park P or neutral N with the output speed $N_o$ from the transmission's output speed sensor 546 less than 600 r.p.m., fluid flows from the pump assembly 200 to the manual valve 604. Fluid flows through the manual valve 604 between the first 676a and second 676b lands to the low/reverse clutch solenoid-actuated valve 636 which is energized by the transmission controller 3010 and moves to allow fluid to flow through it to the solenoid switch valve 610. The solenoid switch valve 610 is hydraulic or fluid pressure operated for reciprocal movement between a first position shown in FIG. 5E and a second position shown in FIG. 5F.

Fluid flows through the solenoid switch valve 610 between the second 678b and third 678c lands thereof to the first ball check valve 652. The first ball check valve 652 is moved by fluid pressure to close the flow path to the vent through the manual valve 604 and opens the flow path to the low/reverse clutch apply cavity 626. Fluid flows through the first ball check valve 652 to the low/reverse clutch apply cavity 626 behind the fourth hydraulic piston 474 to apply the low/reverse clutch assembly 310 in a manner controlled by the command signal from the transmission controller 3010 sent to the low/reverse clutch solenoid-actuated valve 636.

As illustrated in FIG. 5A, fluid flows from the manual valve 604 and solenoid switch valve 610 to both sides of the third ball check valve 656. In this case, the third ball check valve 656 is redundant.

The manual valve 604 also allows fluid in the clutch apply cavity 624 of the two/four shift clutch assembly 308 to vent to the vent reservoir 628, resulting in this clutch not being engaged or applied. Similarly, fluid in the clutch apply cavity 618 of the underdrive clutch assembly 302 is vented either through the manual valve 604 to the sump or through the underdrive clutch solenoid-actuated valve 630. Some fluid from the torque converter 110 also flows through the bleeder ball check valves 244 and 246 to the overdrive 620 and reverse 622 clutch apply cavities as previously described. However, the overdrive 304 and reverse 306 clutch assemblies are essentially vented and not applied.

Fluid from the pump assembly 200 also flows to the solenoid switch valve 610 at one end of the first land 678a to pressure balance solenoid switch valve 610. In other words, fluid flow pressurizes one end of the solenoid switch valve 610 to allow the valve to maintain its current position and prevent the valve from moving to one end or the other past its desired or proper position. Fluid also flows from the pump assembly 200 to the LU switch valve 614 between the third 674c and fourth 674d lands and is dead-ended. This is because the LU switch valve 614 is a single diameter valve, therefore no resultant force exists to overcome the spring force of spring 666. Additionally, fluid from the pump assembly 200 flows to one end of a plug 680 of the pressure regulator 608 to pressure balance the pressure regulator 608. Fluid from the pump assembly 200 further flows to the two/four shift clutch solenoid-actuated valve 634. However, this valve is energized by the transmission controller 3010 and moves to block or close fluid flow to the two/four shift clutch apply cavity 624.

Figure 5B:
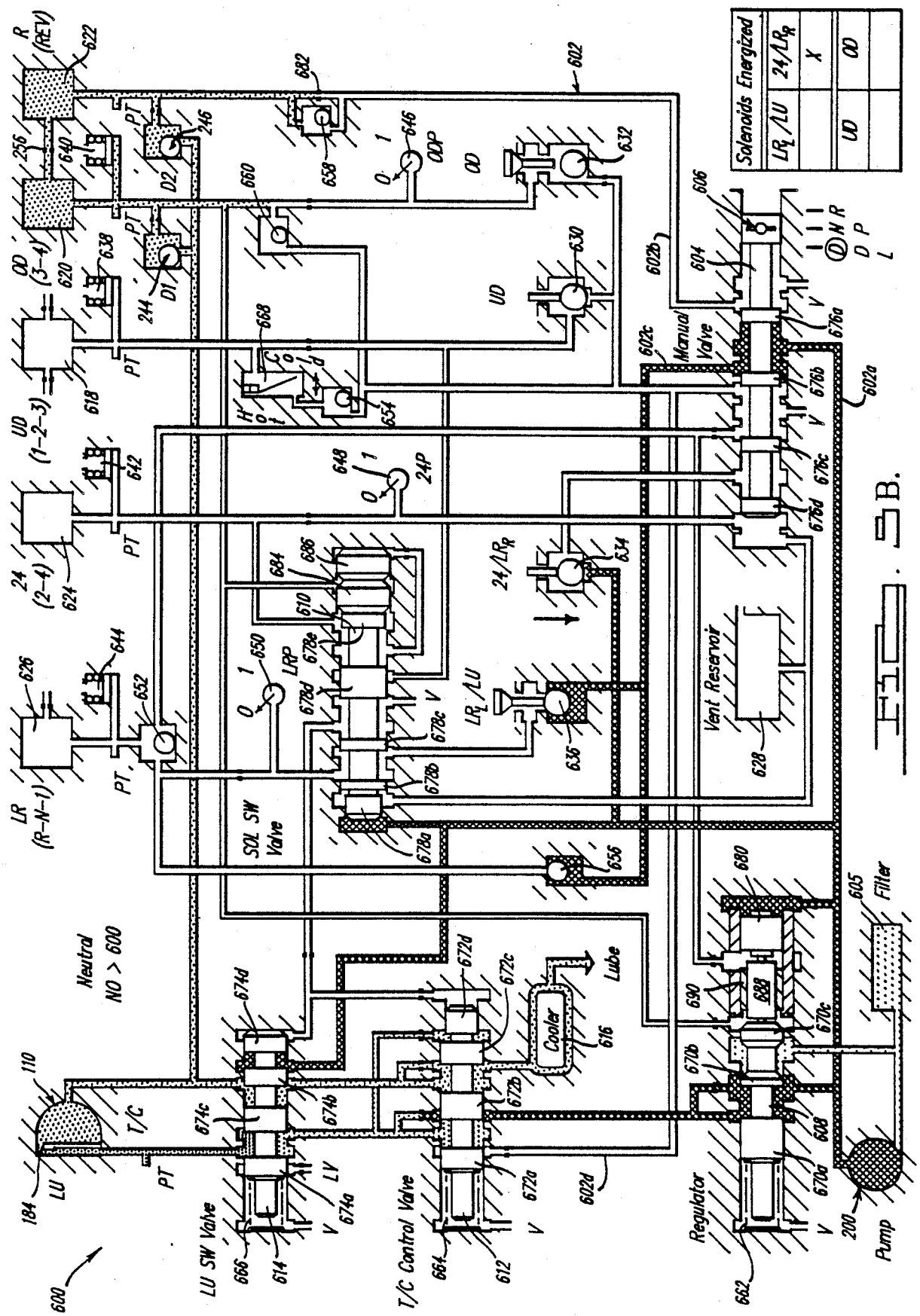

As illustrated in FIG. 5B, when the shift lever position 606 is neutral N with the output speed $N_o$ from the transmission's output speed sensor 546 greater than 600 r.p.m., fluid flows from the pump assembly 200 to the manual valve 604. Fluid flows through the manual valve 604 between the first 676a and second 676b lands to the third ball check valve 656. This fluid pressure moves the third ball check valve 656 to close the flow path to the low/reverse clutch apply cavity 626. Hence, the low/reverse clutch assembly 310 is not applied, but vented through the first ball check valve 652 to either the low/reverse clutch solenoid-actuated valve 636 or the manual valve 604. This prevents the transmission 100 from being shifted into a drive mode OD, D or L above an undesired output speed $N_o$, i.e. 600 r.p.m. Fluid from the manual valve 604 also flows to the low/reverse clutch solenoid-actuated valve 636 which is off or de-energized (i.e. normally vented) and closes the flow path to the solenoid switch valve 610.

The manual valve 604 further allows fluid in the clutch apply cavity 624 of the two/four shift clutch assembly 308 to vent to the vent reservoir 628, resulting in this clutch not being engaged or applied. Fluid in the clutch apply cavity 618 of the underdrive clutch assembly 302 vents through the underdrive clutch solenoid-actuated valve 630 to vent the reservoir 628, resulting in this clutch not being engaged or applied. The overdrive 304 and reverse 306 clutch assemblies receive some fluid but are vented or not applied as previously described. Fluid from the pump assembly 200 also flows to one end of the first land 678a of the solenoid switch valve 610 to hold it in a position for fluid communication by the passageways 602 between the low/reverse clutch solenoid-actuated valve 636 and the clutch apply cavity 626 of the low/reverse clutch assembly 310. Fluid also flows from the pump assembly 200 to the LU switch valve 614 and pressure regulator 608 as previously described. Additionally, fluid from the pump assembly 200 further flows to the two/four shift clutch solenoid-actuated valve 634. However, this valve is energized to block fluid flow as previously described.

As illustrated in FIG. 5C, when the shift lever position 606 is reverse R, the manual valve 604 attached to the manual lever 578 is moved or shifted. Fluid flows from the pump assembly 200 to the manual valve 604. Fluid flows through the manual valve 604 between the first 676a and second 676b lands and through an orifice 682 to the reverse clutch apply cavity 622 between the second hydraulic piston 410 and input clutch retainer hub 312 to apply the reverse clutch assembly 306. Fluid flows to both sides of the fourth ball check valve 658 making it redundant. However, the fourth ball check valve 658 allows fluid flow from the reverse clutch apply cavity 622 to bypass the orifice 682 when venting the reverse clutch apply cavity 622 through the manual valve 604.

The manual valve 604 also allows fluid in the clutch apply cavity 624 of the two/four shift clutch assembly 308 to vent to the vent reservoir 628, resulting in this clutch not being engaged or applied. Fluid in the clutch apply cavity 618 of the underdrive clutch assembly 302 vents through the underdrive clutch solenoid-actuated valve 630. The overdrive clutch assembly 304 receives some fluid but is vented or not applied as previously described. Fluid to the reverse clutch apply cavity 622 causes the reverse bleeder ball check valve 246 to close as previously described.

Fluid from the pump assembly 200 flows through the two/four shift clutch solenoid-actuated valve 634, which is not energized or applied normally, to the manual valve 604. Fluid flows through the manual valve 604 between the third 676c and fourth 676d lands of the manual valve 604 to the first ball check valve 652. This fluid pressure moves the first ball check valve 652 to close the flow path to the solenoid switch valve 610 and opens the flow path to the low/reverse clutch apply cavity 626 behind the fourth hydraulic piston 474 to apply the low/reverse clutch assembly 310. Fluid from the pump assembly 200 further flows to one end of the first land 678a of the solenoid switch valve 610 and the LU switch valve 614 as previously described. Additionally, fluid flows to both ends of the plug 680 of the pressure regulator 608. Since the pressure area of the plug 688 is smaller than plug 680, the valve 680 is shifted, creating a new fluid line pressure.

As illustrated in FIG. 5D, when the shift lever position 606 is reverse R and the output speed $N_o$ is greater than 600 r.p.m., fluid flows from the pump assembly 200 to the manual valve 604. Fluid flows through the manual valve 604 between the first 676a and second 676b lands and through the orifice 682 to the reverse clutch apply cavity 622 between the second hydraulic piston 410 and the input clutch retainer hub 312 to apply the reverse clutch assembly 306. The two/four shift clutch solenoid-actuated valve 634 is energized by the transmission controller 3010 and moves to prevent fluid flow to the manual valve 604, resulting in the low/reverse clutch 310 not being applied. This prevents the transmission 100 from being shifted into the reverse mode above an undesired output speed $N_o$, i.e. 600 r.p.m.

Fluid in the clutch apply cavities 624, 618 and 620 of the two/four shift clutch 308, underdrive clutch 302 and overdrive clutch 304 assemblies, respectively, are vented as previously described, resulting in these clutches not being engaged or applied. The overdrive clutch assembly 304 receives some fluid but is vented or not applied as previously described. Otherwise, fluid flow is similar to the reverse hydraulic schematic of FIG. 5C as previously described.

Figure 5E:
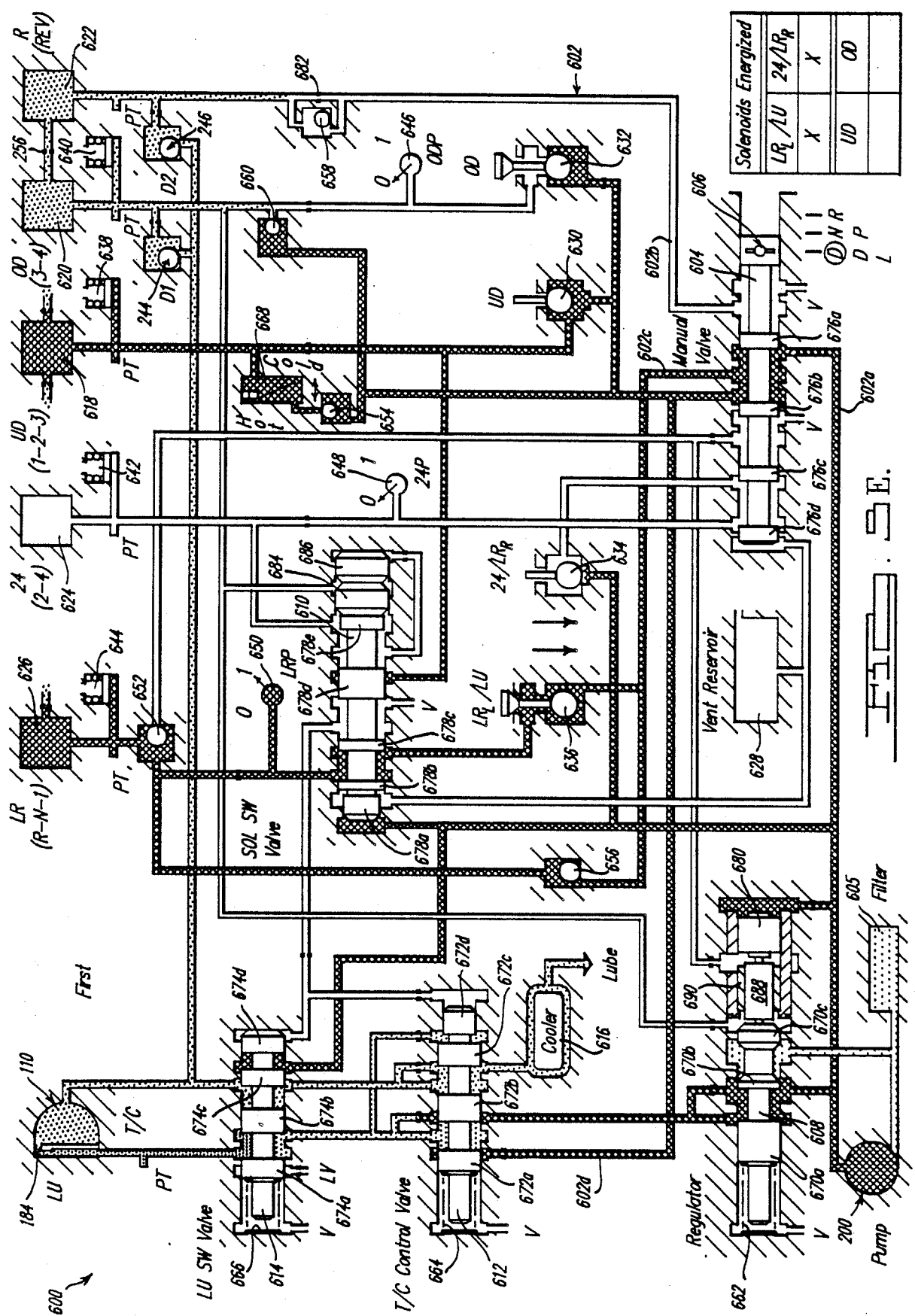

As illustrated in FIG. 5E, when the shift lever position 606 is the drive D position, overdrive OD or low L, the transmission 100 is operated initially in first gear. As a result, the manual valve 604 is moved or shifted. Fluid flows from the pump assembly 200 to the manual valve 604. Fluid flows through the manual valve 604 between the first 676a and second 676b lands to the underdrive clutch solenoid-actuated valve 630. The underdrive clutch solenoid-actuated valve 630 which is normally applied, allows fluid to flow through it and the flow path to the underdrive clutch apply cavity 618 behind the second hydraulic piston 410 to apply the underdrive clutch assembly 302.

Fluid from the manual valve 604 also flows to the second ball check valve 654 which is pressurized from both sides and becomes redundant. Fluid from the manual valve 604 moves the fifth ball check valve 660 to close the flow path to the overdrive clutch apply cavity 620. Fluid from the manual valve 604 further flows to the overdrive clutch solenoid-actuated valve 632 which is normally vented and is prevented from flowing through the flow path to the overdrive clutch apply cavity 620.

Fluid further flows to both sides of the third ball check valve 656, making it redundant. Fluid from the manual valve 604 also flows to the low/reverse clutch solenoid-actuated valve 636. The low/reverse clutch solenoid-actuated valve 636 is energized by the transmission controller 3010 and moves to open the flow path to the solenoid switch valve 610. Fluid flows through the solenoid switch valve 610 between the second 678b and third 678c lands to the low/reverse clutch apply cavity 626 behind the fourth hydraulic piston 474 to apply the low/reverse clutch assembly 310.

Fluid in the clutch apply cavity 624 of the two/four shift clutch assembly 308, is vented as previously described, resulting in this clutch not being engaged or applied. Fluid in the clutch apply cavity 620 of the overdrive clutch assembly 304 is vented through the overdrive clutch solenoid-actuated valve 632. Fluid in the clutch apply cavity 622 of the reverse clutch assembly 306 is vented through the manual valve 604. Hence, the overdrive 304 and reverse 306 clutch assemblies are essentially vented and not applied as previously described.

Fluid from the pump assembly 200 also flows to one end of the first land 678a of the solenoid switch valve 610, the LU switch valve 614, and one end of the plug 680 of the pressure regulator 608 as previously described. Fluid from the pump assembly 200 also flows to the two/four shift clutch solenoid-actuated valve 634. However, this valve is energized and moved to engage its seat to block fluid flow as previously described.

Referring to FIG. 5F, the operation of the hydraulic system is illustrated when the transmission 100 is shifted into second gear. It should be noted that none of the solenoid-actuated valves 630, 632, 634 and 636 are energized, so that they will each assume their normally open (applied) or closed (vented) positions as described earlier.

As illustrated in FIG. 5F, when the shift lever position 606 is in the overdrive OD, drive D or low L position, and the transmission 100 is to be operated in second gear, the manual valve 604 remains in the same position as first gear. Fluid flows from the pump assembly 200 to the manual valve 604. Fluid flows through the manual valve 604 between the first 676a and second 676b lands to the underdrive clutch solenoid-actuated valve 630 which is normally applied and allows fluid flow to the underdrive clutch apply cavity 618 as previously described. Fluid also flows from the manual valve 604 to the overdrive clutch solenoid-actuated valve 632 which is normally vented and prevents fluid flow to the overdrive clutch apply cavity 620. Fluid from the manual valve 604 also flows to the second and fifth ball check valves 654 and 660 as previously described.

Fluid from the pump assembly 200 also flows to the two/four shift clutch solenoid-actuated valve 634 which is normally applied and allows fluid flow to the manual valve 604. Fluid flows between the third 676c and fourth 676d lands of the manual valve 604 to the two/four shift clutch apply cavity 624 behind the third hydraulic piston 448 to apply the two/four shift clutch assembly 308. Fluid also flows between one end of fifth land 678e of the solenoid switch valve 610 and a plug 684. Because the pressure area of fifth land 678e is larger than the pressure area of first land 678a, when these lands 678a and 678e are exposed to the same pressure, the solenoid switch valve 610 is moved to the left as shown in the figure. Hence, the solenoid switch valve 610 is moved by fluid pressure acting on it to allow fluid to flow through the solenoid switch valve 610 between the fourth 678d and fifth 678e lands and to one end of a plug 686 thereof to pressure balance the solenoid switch valve 610.

Fluid in the clutch apply cavity 626 of the low/reverse clutch assembly 308 is vented as previously described, resulting in this clutch not being engaged or applied. The overdrive 304 and reverse 306 clutch assemblies are also vented as previously described. Fluid from the pump assembly 200 further flows through the LU switch valve 614 to one end of plug 680 of the pressure regulator 608 as previously described.

Figure 5G:
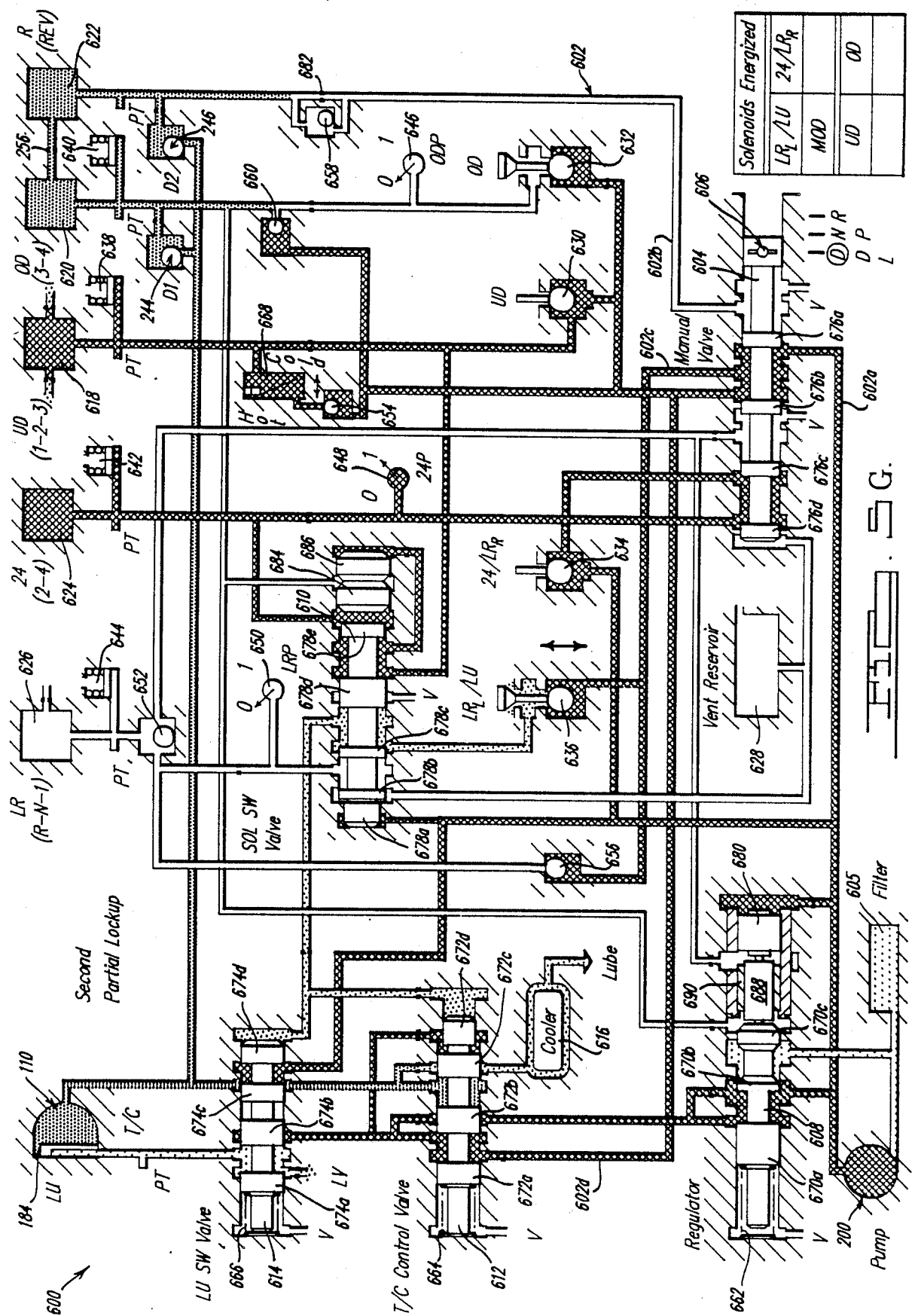
Figure 3J:
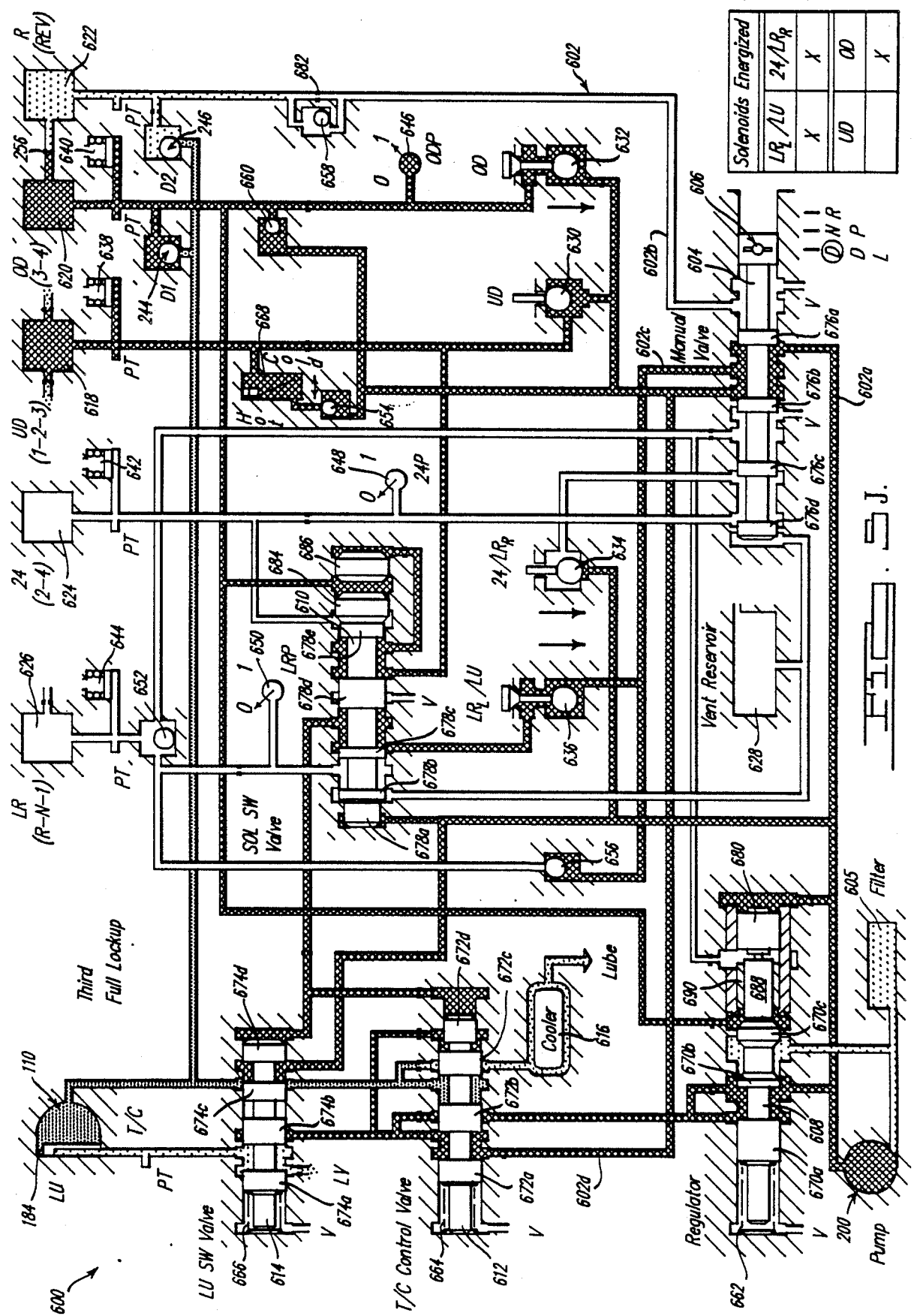

As illustrated in FIG. 5G, when the partial lock-up feature is used in second gear, the LU switch valve 614 is moved or shifted by fluid pressure, from the low/reverse clutch solenoid-actuated valve 636 and the solenoid switch valve 610, to close fluid flow from the T/C control valve 612 to the lock-up clutch assembly 186 of the torque converter 110 because it is dead-ended at second land 674b of the LU switch valve 614. This results in fluid flow from the lock-up clutch assembly 186 being vented at the LU switch valve 614. Fluid flow from the pump assembly 200 to the torque converter 110 causes the lock-up piston 188 to engage the friction disc 199 of the torque converter 110. Lock-up of the torque converter 110 occurs as previously described. The low/reverse clutch solenoid-actuated valve 636 is cycled or modulated (MOD) by command signals from the transmission controller 3010 to allow fluid to flow between the third 678c and fourth 678d lands of the solenoid switch valve 610 to one end of the fourth land 674d of the LU switch valve 614 to actuate or cycle it by fluid pressure, resulting in partial lock-up of the torque converter 110. Fluid also flows to one end of the fourth land 672d of the T/C control valve 612. This is because the fluid to one end of the fourth land 672d moves the T/C control valve 614 to one end of its valve bore and the fluid flow configuration maintains the valve's position during the off period of the duty cycle, causing quick torque build-up by the lock-up clutch 186 and slow torque loss rate by lock-up clutch 186 (i.e. goes to unlock more slowly).

As illustrated in FIG. 5H, when the operating mode of the transmission 100 is to be third gear, the manual valve 604 remains in the same position as first gear. Fluid flows from the pump assembly 200 to the manual valve 604. Fluid flows through the manual valve 604 between the first 676a and second 676b lands to the underdrive clutch solenoid-actuated valve 630 which is normally applied and allows fluid flow to the underdrive clutch apply cavity 618 as previously described. Fluid from the manual valve 604 also flows to the overdrive clutch solenoid-actuated valve 632 which is energized by the transmission controller 3010 and moves to open the flow path to the overdrive clutch apply cavity 620 behind the first hydraulic piston 386 to apply the overdrive clutch assembly 304.

Fluid from the manual valve 604 further flows to the third ball check valve 656 which is moved to close the flow path to the low/reverse clutch apply cavity 626. Fluid also flows to the low/reverse clutch solenoid-actuated valve 636 which is normally vented and is prevented from flowing through the flow path to the solenoid switch valve 610. Fluid from the underdrive clutch solenoid-actuated valve 630 also flows to the solenoid switch valve 610 between the fourth 678d and fifth 678e lands and to both sides of plug 686 of the solenoid switch valve 610 as previously described. Fluid from the overdrive clutch solenoid-actuated valve 632 flows between land 670c and plug 688 and sleeve 690 of the pressure regulator valve 608. Since fluid pressurized plug 680 has the same contact or pressure area as plug and sleeve 688, 690, these plugs are redundant. Hence, pressure area of third land 670c is the only active area, moving the pressure regulator 608 and causing a new line pressure.

Fluid in the clutch apply cavities 626 and 624 of the low/reverse clutch 310 and two/four shift clutch assemblies 308, respectively, is vented as previously described, resulting in these clutches not being engaged or applied. The reverse clutch assembly 306 receives some fluid and is essentially vented as previously described. Fluid from the pump assembly 200 also flows to the LU switch valve 614 as previously described. Fluid from the pump assembly 200 further flows to the two/four shift clutch solenoid-actuated valve 634. However, this valve is energized by the transmission controller 3010 and moves to block fluid flow as previously described.

As illustrated in FIG. 5I, when the partial lock-up feature is used in third gear, the LU switch valve 614 is moved by fluid pressure to prevent fluid flow from the T/C control valve 612 from reaching the lock-up clutch assembly 186 as previously described. Thus, fluid flow is vented from the lock-up clutch assembly 186 of the torque converter 110 at the LU switch valve 614. Fluid from the pump assembly 200 flows through the LU switch valve 614 between the third 674c and fourth 674d lands to the torque converter 110, causing the lock-up piston 188 to engage the friction disc 199 resulting in lock-up of the torque converter 110. Further, fluid from the torque converter 110 flows through the T/C control valve 612 past the cooler 616 and is used for lubrication. The low/reverse clutch solenoid-actuated valve 636 is cycled by command signals from the transmission controller 3010 to allow fluid flow from the manual valve 604 through the solenoid switch valve 610 to one end of fourth land 674d of the LU switch valve 614 and fourth land 672d of the T/C control valve 612 to actuate or cycle these valves for partial lock-up of the torque converter 110 as previously described.

As illustrated in FIG. 5J, when the full lock-up feature is used in third gear, the lock-up switch valve 614 is moved by fluid pressure to prevent fluid from the T/C control valve 612 from reaching the lock-up assembly 186 as previously described. The low/reverse clutch solenoid-actuated valve 636 is energized by the transmission controller 3010 and moves to allow full fluid flow from the manual valve 604 through the solenoid switch valve 610 to one end of fourth land 674d of the LU switch valve 614 and fourth land 672d of the T/C control valve 612 as previously described. In other words, the low/reverse clutch solenoid-actuated valve 636 is not cycled, but energized fully for a predetermined time period, preventing the LU switch valve 614 from being cycled and resulting in full lock-up of the torque converter 110.

Figure 5K:
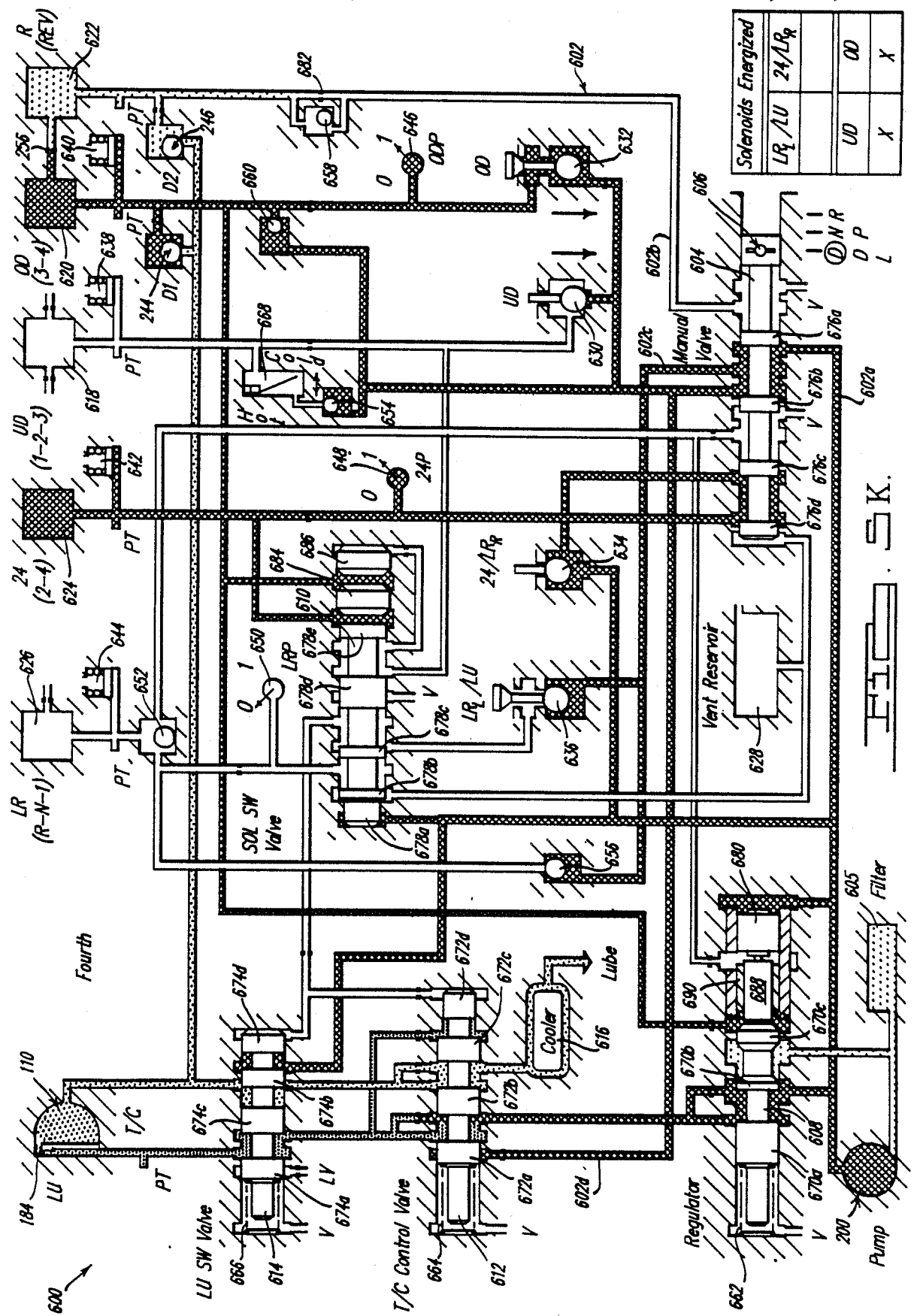

As illustrated in FIG. 5K, when the operating mode of the transmission 100 is to be fourth gear in the overdrive OD position, fluid flows from the pump assembly 200 to the manual valve 604. Fluid flows through the manual valve 604 between the first 676a and second 676b lands to the second ball check valve 654. The second ball check valve 654 is moved by fluid pressure to close one flow path to the underdrive clutch apply cavity 618. Fluid flows from the manual valve 604 to the underdrive clutch solenoid-actuated valve 630 which is energized by the transmission controller 3010 and moves to close the other flow path to the underdrive clutch apply cavity 618. Fluid also flows from the manual valve 604 to the overdrive clutch solenoid-actuated valve 632 which is energized by the transmission controller 3010 and moves to open the flow path to the overdrive clutch apply cavity 620. Fluid from the manual valve 604 also flows to the low/reverse clutch solenoid-actutated valve 636 which is normally vented, preventing fluid flow to the solenoid switch valve 610. Fluid from the manual valve 604 further flows to the third ball check valve 656 which is moved to close the flow path to the low/reverse clutch apply cavity 626. Fluid from the pump assembly 200 further flows to the two/four shift clutch solenoid-actuated valve 634 which is normally applied and allows fluid flow through it to the manual valve 604. Fluid flows between the third 676c and fourth 676d lands of the manual valve 604 to the two/four shift clutch apply cavity 624.

Fluid in the clutch apply cavities 626 and 618 of the low/reverse clutch 310 and underdrive clutch 302 assemblies, respectively, is vented as previously described, resulting in these clutches not being engaged or applied. The reverse clutch assembly 306 receives some fluid but is essentially vented as previously described. Fluid from the pump assembly 200 also flows to the lock-up switch valve 614 and to the pressure regulator 608 as previously described.

As illustrated in FIG. 5L, when the full lock-up feature is used in fourth gear, the LU switch valve 614 is moved by fluid pressure to prevent fluid flow from the T/C control valve 612 from reaching the lock-up clutch assembly 186. Thus, fluid flow is vented from the lock-up clutch assembly 186 of the torque converter 110 to the sump as previously described. The low/reverse clutch solenoid-actuated valve 648 is energized by the transmission controller 3010 for a predetermined time period and moves to allow full fluid flow from the manual valve 604 through the solenoid switch valve 610 to one end of the fourth land 674d of LU switch valve 614 and the fourth land 672d of the T/C control control valve 612 as previously described, resulting in full lock-up of the torque converter 110.

LIMP-HOME MODE PROTECTION

Since a limp-home mode is typically needed in the presence of a failure, it must be designed to have virtually absolute reliability. Accordingly, the transmission controller 3010 is designed with a master power relay which will only remain energized with full and proper controller operation, thus assuring the ability to achieve a power-Off state. The solenoid state in limp-home is "Off" or de-energized. Therefore, the Off or "normal" state of the solenoid-actuated valves 630, 632, 634, 636 provide the needed clutch application. The solenoid-actuated valves 630, 632, 634, 636 are ball-type valves (FIGS. 8 and 9) which function without any dirt-sensitive close clearances and which will be effective even with dirt on the valve seat. The manually actuated valve 604 is the only component which must function to achieve second gear in OD, D or L, neutral in N, reverse in R and park in P.

Referring to FIG. 5F which illustrates the hydraulic schematic for second gear operation, fluid flows through the manual valve 604 between the first 676a and second 676b lands and through the underdrive clutch solenoid-actuated valve 630 which is normally applied, to the underdrive clutch apply cavity 618 as previously described. Fluid also flows from the manual valve 604 to the overdrive clutch solenoid-actuated valve 632 which is normally vented and is prevented from flowing to the overdrive clutch apply cavity 618. Fluid from the manual valve 604 also flows to the third ball check valve 656 which closes the flow path of the low/reverse clutch apply cavity 626. The manual valve 604 further allows fluid in the overdrive clutch 304, reverse clutch 306 and the low/reverse clutch 308 assemblies to vent as previously described, resulting in these clutches not being engaged or applied. Fluid from the pump assembly 200 also flows through the two/four clutch solenoid-actuated valve 34 which is normally applied to the manual valve 604. Fluid then flows between the third 676c and fourth 676d lands of the manual valve 604 to the two/four shift clutch apply cavity 624 as previously described. Hence, second gear is achieved.

It is also important to note that the limp-home mode protection feature of the present invention is also designed to allow reverse gear to be used. The transmission 100 will operate in accordance with the hydraulic schematic of FIG. 5C in order to permit use of the transmission's reverse gear. However, all of the solenoid-actuated valves will be in their "normal" state.

It is further important to note that the limp-home mode protection feature of the prevent invention is also designed to allow park and neutral operating modes to be used. The transmission 100 will operate in accordance with the hydraulic schematic of FIG. 5A except that all of the solenoid-actuated valves will be in their "normal" state.

DIRT-SHEDDING VALVES

In order to keep valves in a hydraulic system from sticking, it is preferable to supply them only with clean or substantially contaminant-free fluid from the pump, taken in through a filter. The LU switch valve 614 and the T/C control valve 612, however, are exposed to the relatively dirty fluid exiting the torque converter 110 where the lock-up friction clutch 186 and the torque converter thrust washers contribute dirt and other contaminants. In order to minimize the chance of these valves 612, 614 from sticking due to this dirt, there is higher pressure fluid in the ports adjacent to a port in which dirty fluid flows. In other words, fluid flow containing substantially no foreign matter or dirt is of a higher pressure than the fluid flow containing a relatively substantial amount of foreign matter or dirt in an adjacent port at a lower pressure. Thus, the pressure differential prevents the dirt from entering the close clearance between the lands of the valves 612, 614 and the valve body 603 (See FIGS. 5A–L, 6 and 11A).

Additionally, in accordance with another aspect of the present invention, the major valves 610, 612 and 614 for controlling the flow of hydraulic fluid through the system 600 have been advantageously designed to collect and subsequently shed or otherwise remove dirt and other contaminants from these valves.

As illustrated in FIG. 11a, the solenoid switch valve 610 includes at least one, preferably a plurality of axially spaced circumferential grooves 692 formed in its lands and plugs. The grooves 692 serve as a means to collect dirt and other contaminants in the fluid. Similar grooves are also formed in the T/C control valve 612 and the LU switch valve 614.

In operation, when the valve 610 passes a land 694 in the valve body 603, the land 694 will push dirt collected on the valve into the groove 692. Then, whenever the groove 692 passes a port 696, the flowing fluid through the port 696 flushes the dirt from the groove 692, thereby keeping dirt and other contaminants from inhibiting the operation of the valves 610, 612 and 614.

VENT RESERVOIR

The vent reservoir 628 is placed in the hydraulic system 600 and acts as a means to reduce unwanted gasses or air intermittently trapped within the hydraulic passageways 602, etc. The vent reservoir 628 is disposed inside the manifold assembly 700, and is further illustrated in FIG. 8. The passageways 602 to the solenoid-actuated valves 630, 632 634 and 636 vent to a chamber inside the manifold assembly 700 forming the vent reservoir 628. The vent reservoir 628 maintains a fluid level above the vent port 727 of each solenoid-actuated valve 630, 632, 634, 636. The vent reservoir 628 is elevated approximately three or four inches above the valve body 603. This, of course, maintains that same fluid level in each clutch passageway 602 and thereby ensures rapid hydraulic response of the overall fluid or hydraulic system 600 by eliminating accumulated air in the hydraulic system 600 and eliminating the necessity of purging the hydraulic passages 602 of air as has been done in the past. Additionally, any trapped air is allowed to vent automatically to the vent reservoir 628.

SOLENOID SWITCH VALVE

The reciprocal fluid or solenoid switch valve 610 is a particularly unique and advantageous feature of the present invention. It provides hydraulic protection against the simulatneous actuation of the low/reverse clutch solenoid-actuated valve 636 and either the two/-four 634 or overdrive 632 clutch solenoid-actuated valves. The solenoid switch valve 610 allows double use of low/reverse solenoid-actuated valve 636 to control fluid flow to the low/reverse clutch assembly 310 and to the lock-up clutch assembly 186. The hydraulic protection feature is achieved by designing the valve 610 so that for a downshift to first gear, a specific logic controlled sequence of solenoid commands from the transmission controller 3010 is required to allow low/reverse clutch application after an upshift from first gear has occurred. Moreover, the valve 610 has been designed so that a failure caused application of either the two/four shift 308 or overdrive 304 clutch assemblies, while the low/reverse clutch assembly 310 is applied, all simply vent the low/reverse clutch assembly 310 and shift the transmission 100 to second ear or third gear, respectively. Any control failure which might attempt to apply the low/reverse clutch assembly 310 while in second, third or fourth gear is prevented from doing so by this valve 610. Apply fluid pressure from two/four 634 or overdrive 632 or underdrive 630 solenoid-actuated valves can keep the valve 610 in the upshifted position (spool to the left in FIG. 5F) which precludes any low/reverse clutch assembly 310 application.

The logic sequence used during a downshift to first gear is FIRST, wait briefly until the two/four or overdrive clutch pressure falls to less than 60% of the fluid line pressure (generated by the combination of the pressure regulator valve 608, pump assembly 200, and other system factors); SECOND, turn OFF the underdrive clutch solenoid-actuated valve 630—this will downshift the valve 610 (move valve 610 to its position in first gear as in FIG. 5E) without allowing slippage in the underdrive clutch 302 since the pressure used is from the solenoid end of a control orifice U1 in the underdrive clutch passage (fluid from control orifice U1 to the solenoid-actuated valve 630 is vented at valve 630 while fluid between control orifice U1 and clutch apply cavity 618 is essentially maintained, resulting in a fluid pressure to keep the underdrive clutch 302 from slipping); THIRD, wait briefly for valve motion to cease; FOURTH, turn ON low/reverse solenoid-actuated valve 636; and FIFTH, look for confirmation from low/reverse pressure switch 650; SIXTH, if confirmation is received, turn OFF low/reverse solenoid-actuated valve 636 briefly to wait for valve actuation pressures to stabilize and SEVENTH, return to normal downshift logic. If low/reverse confirmation is not received, return logic to second gear.

Other features of the solenoid switch valve 610 are obtained. Firstly, by using differential areas on the valve 610 to move the valve 610 instead of a spring, the valve 610 maintains the proper valve position with variations in fluid or line pressure. Secondly, line pressure is always acting on one end of the valve 610 to put it into a position to control fluid flow to the low/reverse clutch assembly 310. Thus, on start-up, a high force is available to position the valve 610 properly. Additionally, high line pressure in the reverse R operating mode acts to dislodge or free the valve 610 if struck in a position to allow control of the LU switch valve 614.

Thirdly, the fluid pressure top of the underdrive clutch assembly 302 to the solenoid switch valve 610 is located on the solenoid side of the control orifice U1 to provide for a rapid drop in the "latch pressure" without causing a significant loss of fluid pressure to the underdrive clutch assembly 302. This provides a means to allow the valve 610 to move back to he low/reverse control position without affecting shift quality.

Fourthly, it is significant that at least one of the three pressures which can keep the valve 610 in its upshifted position (LR vented and LU controlled) is essentially equal to line pressure during any shift which may occur, i.e. 2-3, 3-2, 3-4, 4-3, 2-4 or 4-2. This not only ensures continuous protection against failures, but also maintains the availability of control of the lockup clutch 186 during shifts. Fluid pressure on underdrive clutch 302 keeps the valve 610 upshifted during 2-3 or 3-2; pressure on the overdrive clutch 304 keeps the valve 610 upshifted during the 3-4 or 4-3; pressure on the two-four shift clutch 308 keeps the valve 610 upshifted during the 4-2 or 2-4.

As illustrated in FIGS. 5F through 5L, the solenoid switch valve 610 remains in a valve position at one end of its valve bore in second, third or fourth gears, as well as during shifts between these gears. This valve position disconnects the low/reverse solenoid-actuated valve 636 from the low/reverse clutch apply cavity 626 and connects valve 636 to the LU switch valve 614, and vents the low/reverse clutch assembly 310 as previously described.

The solenoid switch valve 610 eliminates the need for a fifth solenoid-actuated valve for the lock-up mode which would add to the cost and complexity of the system. This double duty operation is illustrated, for example, in FIGS. 5E and 5J.

Referring to FIG. 5E, the solenoid switch valve 610 is shown to be in a first position to allow fluid flow from the manual valve 604 through the low/reverse clutch solenoid-actuated valve 636 and between the second 678b and third 678c lands of the solenoid switch valve 610 to the low/reverse clutch apply cavity 626 as previously described. As illustrated in FIG. 5J, the solenoid switch valve 610 is moved to a second position during an upshift from first gear to allow fluid flow from the manual valve 604 through the low/reverse clutch solenoid-actuated valve 636 and between the third 678c and fourth 678d lands of the solenoid switch valve 610 to one end 691 of the LU switch valve 614 to control engagement of the lock-up clutch assembly 186 as previously described. Thus, the solenoid switch valve 610 has a first position to control fluid flow to the low/reverse clutch assembly 310 and a second position to control fluid flow to the lock-up clutch assembly 186.

DIRECT-ACTING, NON-CLOSE CLEARANCE SOLENOID-ACTUATED VALVES

Advantageously, the present invention provides direct-acting, non-close clearance solenoid-actuated valves, namely solenoid-actuated valves 630, 632, 634 and 636. An example of a solenoid operated directional control valve is disclosed in U.S. Pat. No. 4,338,966, issued July 13, 1982 to Smith, which is hereby incorporated by reference. The solenoid-actuated valves 630, 632, 634 and 636 directly control fluid flow to their respective clutch assemblies. Since the solenoid-actuated valves 630, 632, 634 and 636 have a non-close clearance design to be described herein, dirt and other contaminants do not inhibit these solenoid-actuated valves from achieving either their normal or solenoid-actuated position. Additionally, as previously described, these solenoid-actuated valves 630, 632, 634, 636 are designed to provide a limp-home mode of operation.

Figure 7D:
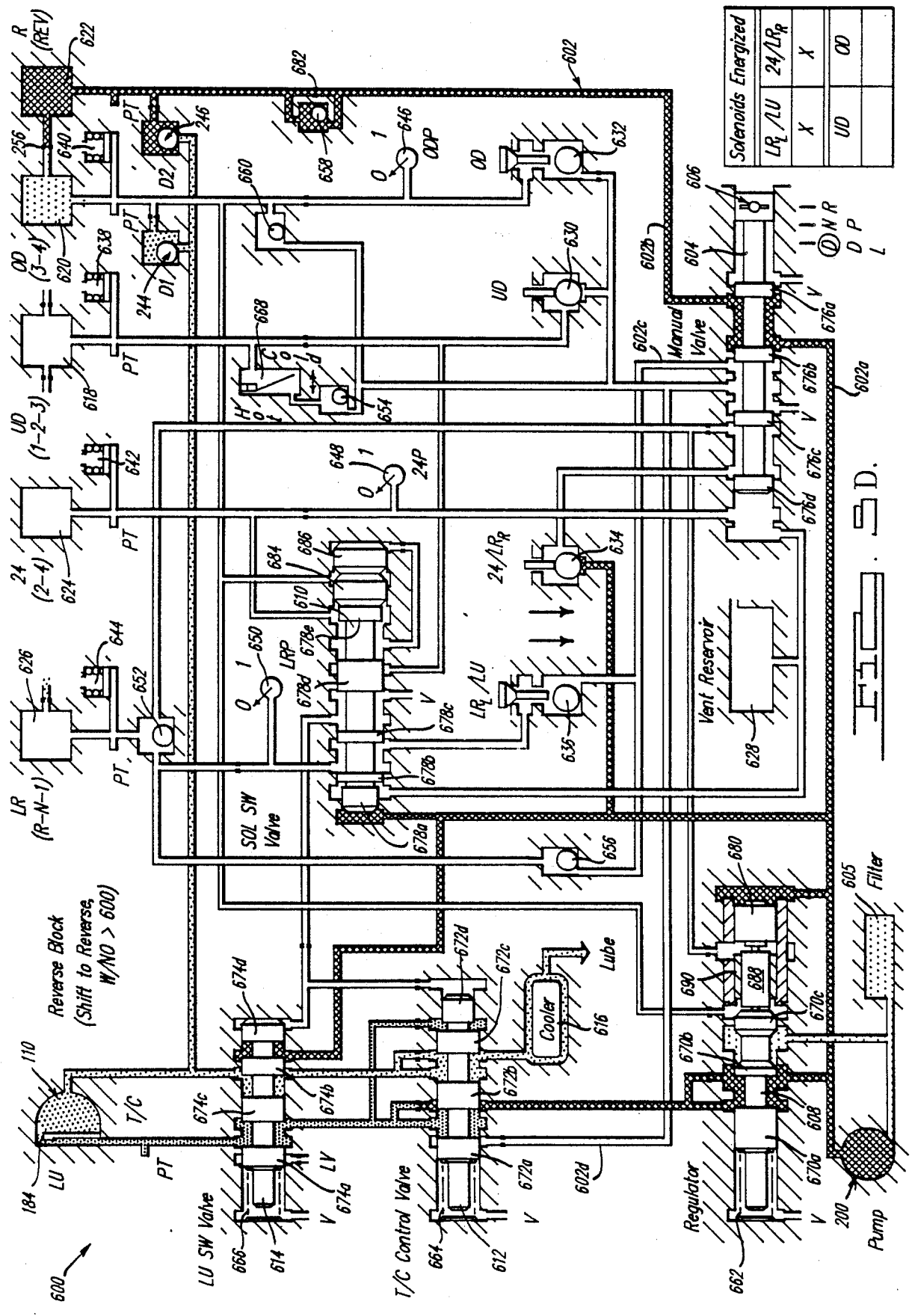
FIG. 7 is a plan view of the solenoid valve manifold assembly with the cover partially broken away of the valves shown in FIGS. 5A-L.

Referring to FIG. 7, a manifold assembly 700 is shown. The manifold assembly 700 houses or contains the solenoid-actuated valves 630, 632, 634 and 636. A cover member 702 is secured by suitable fastening means 704, such as a screw and washer assembly, to a manifold housing 701. A circuit and switch assembly 752 along with two perimeter seals 705 are sandwiched between the cover member 702 and manifold housing 701.

Referring to FIG. 8, the overdrive clutch solenoid-actuated valve 632, which is normally vented, is shown and is identical to the low/reverse clutch solenoid-actuated valve 636. The solenoid which actuates valve 632 includes a stationary core member 706 having an outer cylindrical shape. A threaded portion 707 extends from one end of the core member 706 and is threadably engageable with the manifold housing 701. An electrical coil assembly 710 is disposed coaxially around the core member 706. A movable member or armature 712 is spaced axially from the core member 706 to form a working air gap 714 therebetween. An L-shaped magnetic shunt member 715 is secured between the core member 706 and the manifold housing 701. One edge 716 of the shunt member 715 contacts or abuts the armature 712 to allow the armature 712 to pivot or hinge about that line while efficiently transmitting the magnetic flux through the armature 712 and shunt member 715. A plurality of blades 717 are connected one end of the electrical coil assembly 710 and extend outwardly therefrom. The blades 717 are removably disposed in corresponding biased slots 718 in the circuit and switch assembly 752. A bowed or wave spring 719 is disposed between the shunt member 715 and the coil assembly 710 to bias or cause the blades 717 of the electrical coil assembly 710 to fully engage the slots 718 in the circuit and switch assembly 752. This prevents the electrical contact surfaces between the blades 717 and slots 718 from moving or vibrating which may cause excessive wear of these contact surfaces. Additionally, in conjunction with a cylindrical offset portion 712a of the armature 712, this coil position causes the working air gap 714 to be offset toward the center inside of the coil assembly 710, resulting in a more efficient magnetic flow. Also, resistors 713 are connected to the circuit and switch assembly 752 and will be decribed subsequently.

A nonmagnetic spacer 719a is disposed between the shunt member 715 and core member 706. The outside diameter of the spacer 719a is larger than the diameter of the core member 706 to avoid magnetic bridging due to fine magnetic debris in the system. The spacer center is configured to retain on a corresponding undercut of the core member 706 and on a projection 708 connected to threaded portion 707 to enhance handling and to prevent the projection 708 from contacting radially the shunt member 715 through the corresponding hole in the shunt member 715.

The other end of the armature 712 has an adjustment screw 720 threadably engaged and, in turn, capable of contacting the spherical end 722 of a valve plunger 724, so that the valve plunger 724 will reciprocate in response to appropriate magnetically induced actuations of the armature 712.

The adjustment screw 720 is welded to armature 712 after factory setting is established to prevent further thread movement. The adjustment of the screw 720 establishes the working air gap 714 (typically 0.05 to 0.20 mm) with all parts in the actuated or energized position such that: full force is available at the valve seat; there is allowance for valve wear; noise of armature 712 striking core member 706 is avoided; small ebris in the working air gap 714 does not cause malfunction; and consistent pull-in and drop-out characteristics are maintained.

The valve plunger 724 is formed with a conical portion 725 which, when the solenoid is energized, is shown to be in sealing engagement with a valve insert 726, thereby closing a vent port 727 leading to the vent reservoir 628. The valve insert 726 is disposed in a passageway 728 which communicates between an inlet or supply port 730 and a clutch or element port 732 leading to a clutch apply cavity. Filters or screens 731 or 733 are disposed in the supply port 730 and clutch port 732, respectively, to filter or trap large debris (such as machining chips) and prevent its distribution through the hydraulic system 600 where it could cause malfunction. A movable ball 734 is disposed between a localized, non-sealing travel stop 736 in the passageway 728 and a seat 738 on the valve insert 726. The valve plunger 724 is coaxially disposed within a central passage 740 formed in the valve insert 726 which communicates with the passageway 728, vent port 727 and the clutch port 732. As shown in FIG. 8, the valve plunger 724 has a fluted central portion 724a which supports valve plunger 724 concentrically in the central passage 740, yet permits fluid to flow readily through the central passage 740 around the valve plunger 724.

Conventionally, the transmission shift control valve member is typically a spool type valve having lands and being reciprocal between lands of a housing. The diametrical clearance between the lands of the conventional valve member and housing range from 0.0002 to 0.001 inches, resulting in potential sticking or jamming by small debris. The present invention utilizes a ball 734 in an oversized passageway 728 to allow an open flow path around the ball 734 during actuation or operation. Hence, close clearances are not required between the ball 734 and passageway 728. In fact, momentarily during the valve ball movement from one seat to the other, the present invention allows a burst of fluid flow from supply port 730 to vent port 727 which flushes the passages.

Additionally, the circuit and switch assembly 752 includes an insulative circuit housing 753 disposed between the cover member 702 and the manifold housing 701 (See FIGS. 7 and 8). A male plug member 754 is connected to the circuit housing 753 for attachment to an external source of electrical power such as the transmission controller 3010.

In operation, the overdrive clutch solenoid-actuated valve 632 is normally vented when not energized (i.e. no current flows through the windings of the coil assembly 710). As a result, fluid enters the inlet port 730 and flows through the passageway 728, causing the ball 734 to move and engage the seat 738 of the valve insert 726. The ball 734 on its seat 738 blocks fluid flow from the inlet port 730, preventing fluid from entering clutch port 732. The displacement of the ball 734 moves the valve plunger 724, causing the conical portion 725 to be disengaged or moved off the valve insert 726. As a result, fluid from the clutch port 732 flows through the central passage 740 along the plunger flutes 724a and between the conical portion 725 and valve insert 726, venting through vent port 727 to the vent reservoir 628. Hence, the overdrive clutch solenoid-actuated valve 632 and its related clutch assembly 304 are normally vented.

When the overdrive clutch solenoid-actuated valve 632 is actuated, as shown in FIG. 8, current flows through the coil assembly 710 and creates a magnetic flux loop through the armature member 712, core member 706 and shunt member 715. This magnetic flux causes a magnetic attraction between the armature 712, shunt member 715 and the core member 706. This causes the armature 712 to move toward and contact the edge 716 of the shunt member 715 to reduce the working air gap 714, but not contact the core member 706. The armature 712 pivots about the edge 716 of the shunt member 715 and displaces the valve plunger 724, and in turn, displaces the ball 734 off the seat 738 to allow fluid to flow from the inlet port 730 past the ball 734 by way of passage 740 through the valve insert 726 to the clutch port 732. Simultaneously, fluid also momentarily flows out vent port 727, producing a cleansing flush of conical portion 725. The motion of armature 712 continues to drive valve plunger 724 until conical portion 725 engages the surface of valve insert 726, thereby closing vent port 727 and preventing continued fluid flow from clutch port 732 into vent reservoir 628 and thereby causing clutch pressure to increase toward the level of inlet pressure. By appropriate time-cycling of the current in coil 710, these valve ports will reciprocate rapidly and provide effective control of the pressure in clutch port 732 at any desired level between that of vent reservoir 628 and fluid flow from inlet port 730.

As partially illustrated in FIG. 9, the underdrive clutch 630 and two/four shift clutch 634 solenoid-actuated valves are normally applied when not energized or no current flows through the windings of the coil assembly 710. Prime numerals are used for parts similar to the overdrive clutch solenoid-actuated valve 632 of FIG. 8. As a result, fluid enters the inlet or supply port 730' and flows in the passageway 728', causing the ball 734' to move and engage its seat 738' of the two piece valve insert 726'. When the ball 734' is on or engaging the seat 738', a small gap 739 exists between the ball 734' and another ball seat 737. As a result, fluid flows in the gap 739 past the ball 734' and to the clutch port 732'. By engaging seat 738', the ball 734' prevents fluid flow from exiting clutch port 732' via passage 740' and into the vent reservoir 628. Hence, the solenoid-actuated valves 630 and 634 and their related transmission clutch assemblies 302 and 308 are normally applied.

When the underdrive clutch solenoid-actuated valve 630 is actuated, the armature 712 pivots and displaces the valve plunger 724', and in turn, displaces the ball 734' to engage seat 737. As a result, fluid flow from the supply port 730' is blocked by the ball 734' and is prevented from flowing to the clutch port 732'. Fluid flow from the clutch port 732' is allowed to flow between the ball 734' and seat 738' and through central passage 740', venting through vent port 727' to the vent reservoir 628. As with the normally vented valves, clutch pressure may be regulated by time-cycling the valve.

As illustrated in FIG. 9A, the present invention provides a means for reducing noise resulting from solenoid valve action. A spool 742 having a generally cylindrical shape is disposed in the passageway 728. The spool 742 can slide in the passageway 728. The spool 742 has an axially projecting portion 744 extending into the central passage 740 of the valve seat 726. The projecting portion 744 contacts the ball 734. The spool 742 includes a chamber 745 and an aperture 746 extending axially through the projecting portion 744, both of which allow fluid flow through the spool 742. A spring 747 is disposed within the chamber 745 and biases or lightly loads the spool 742 toward the ball 734. In other words, the spring 747 biases the projecting portion 744 into contact with the ball 734 so that the ball 734 contacts its seat 738. One end of the aperture 746 is closed by the ball 734 during pull-in or energizing of the coil assembly 710. During de-energization of the coil assembly 710 (i.e. during drop-out), the ball 734 will return freely, opening the aperture 746 and allowing the chamber 745 to refill rapidly so that the next pull-in can be cushioned.

The spool 742 also includes a first or supply end land 748 at one end which is slightly smaller in diameter than the passageway 728. Land 748 allows only gradual flow of fluid out of a trapped cavity between land 748 and the manifold housing 701 in passageway 728, thereby slowing pull-in velocity and reducing impact noise. The spool 742 further includes a second or element end land 749 at the other end which is fluted for free flow of fluid.

In operation, during pull-in, the ball 734 moves axially, resulting in axial movement of the spool 742. Land 748 allows only gradual flow of fluid past it out of the trapped cavity between land 748 and the manifold housing 701 in the passageway 728. This gradual flow slows the pull-in velocity of the ball 734 and related valve plunger 724 (See FIGS. 8 and 9), reducing impact noise with the valve seat 726.

During drop-out, the ball 734 returns freely allowing the chamber 745 to refill rapidly so that the next pull-in can be cushioned. Also, spring 747 will return the spool 742 so that the projecting portion 744 once again contacts ball 734 to rest the ball 734 on its seat 738. The spool 742 may be used with both normally applied and normally vented solenoid-actuated valves.

Referring to FIG. 10, a pressure sensor or switch assembly 650 is shown and is similar to pressure switches 646 and 648 of FIGS. 5A-5L. The pressure switch assembly 750 includes a circuit contact or pad 755 communicates through a bore 756 formed in the circuit housing 753. A retainer 758 secures a flexible rubber diaphragm 760 between the manifold housing 701 and the cylindrical wall of the circuit housing 753 forming the bore 756. A contact cup 762 is disposed in the bore 756 between the diaphragm 760 and cover member 702. A spring 764 is disposed between the contact cup 762 and cover member 702.

The diaphragm 760 is compressed between the circuit housing 753 and the retainer 758 to prevent excessive fluid pressure leakage while compensating for differences in dimensional stack-up. This compression, in turn, loads the face of the retainer 758 against the manifold housing 701 such that an assured, highly restrictive leak path is intentionally established to vent air from the hydraulic circuit to assure fast switch response (undamped) to solenoid action while allowing minimal fluid flow.

Additionally, the contact cup 762 has a relatively large diametrical clearance inside of the bore 756 and a large contact gap (long stroke) consistent with maintaining a system which is highly tolerant of dirt and debris. The contact side of the contact cup 762 is common with the vent reservoir 628 to avoid hydraulic damping (allowing fast response), yet protects the circuit contacts 755 from corrosion or electrical erosion (i.e. contacts remain covered by fluid).

In operation, fluid enters through apertures (not shown) in the retainer 758 from the manifold housing 701 and displaces or deflects the diaphragm 760. The diaphragm 760, in turn, displaces the contact cup 762, causing the contact cup 762 to contact the circuit contact 755 completing a circuit through the cup 762, spring 764 and cover member 702 which grounds circuit contact 755 to indicate the presence of pressure to the transmission controller 3010. When the fluid pressure is removed, the spring 764 returns the contact cup 762 out of contact with the circuit contact 755, opening the circuit and indicating an absence of pressure to the transmission controller 3010.

REVERSE LOGIC-DUMP & REAPPLY

Current state of the art automotive transmissions vent all friction elements in the neutral position N of the shift lever. This means that all elements needed to provide motion must be filled when selecting forward or reverse gears.

The present invention keeps the low/reverse clutch apply cavity 626 filled under most conditions in neutral, thus only one clutch apply cavity needs to be filled to provide either first gear or reverse gear. This provides for faster shifting under "rocking" conditions. For the shift from neutral to first gear, the underdrive clutch 302 is applied; for the shift from neutral to reverse gear, the reverse clutch 306 is applied.

In order to obtain a couple unique advantages, however, the shift from neutral to reverse gear is not performed by simply applying the reverse clutch 306. The "fully-applied-in-Neutral" low/Reverse clutch 310 is vented while the apply cavity 622 of the reverse clutch 306 is filling (the hydraulic circuit and controlling logic are designed so that the low/reverse clutch torque is essentially zero before the reverse clutch 306 can apply). The application of the reverse clutch 306, then, simply engages or couples the gear assembly 500 to the input shaft 176, but no reaction element is applied to provide reverse drive. The reverse clutch application, therefore, does not need to be made in a controlled manner since it does not affect the shift quality (i.e. no significant change in transmission output torque occurs during its application). Since this is the only shift which uses the reverse clutch 306, this means that the reverse clutch 306 can simply be applied by the manual valve 604, thereby saving the cost and complexity of an additional solenoid-actuated valve. Moreover, the reverse clutch application does not involve significant energy since it only accelerates gearset inertia; it, therefore, does not require a large number of cluth discs for energy dissipation. These advantages justify the logic complexity involved in the low/reverse "dump and reapply" sequence.

Accordingly, the present invention prrovides a method for applying the reverse clutch 306. In order to achieve good shift quality, the control methodology must vent the low/reverse clutch apply cavity 626 down to a fill level before the reverse clutch 306 applies. In other words, the rapid dump and reapply feature is used to get the low/reverse clutch 310 off rapidly before the reverse clutch 306 can apply. This prevents excessive wear of the reverse clutch 306.

As illustrated in FIG. 5A, the low/reverse clutch apply cavity 626 if filled, resulting in the low/reverse clutch assembly 310 being applied. The first ball check valve 652 has its ball seated on one side to prevent fluid from the low/reverse clutch apply cavity 626 venting into the reverse circuit.

When the manual valve 604 is shifted to reverse R, the pressure of the fluid in the low/reverse clutch apply cavity 626 does not initially allow the ball of the first ball check valve 652 to move, thereby maintaining its seated position. This allows direct and rapid venting of the fluid in the low/reverse clutch apply cavity 626 past the third ball check valve 656 and through the manual valve 604 to the sump. Simultaneously, the low/reverse solenoid-actuated valve 636 is turned off to prevent fluid flow to the low/reverse clutch apply cavity 626. Since the manual valve 604 is shifted to reverse R, the reverse clutch apply cavity 622 is filling rapidly and applying quickly because there is no accumulator or control logic for the reverse clutch 306.

During this time period, the two/four clutch solenoid-actuated valve 634 is energized to prevent fluid pressure build-up through the reverse circuit. After a predetermined time period from the beginning of the shift to reverse, the transmission controller 3010 looks for a signal from the low/reverse pressure switch 650, indicating that the fluid pressure in the low/reverse clutch apply cavity 626 has dropped to a fairly safe level. As soon as the signal from the low/reverse pressure switch 650 is detected, an additional predetermined time period of 0.19 seconds is added to vent the low/reverse clutch apply cavity 626. The two/four clutch solenoid-actuated valve 634 is then turned off (i.e. de-energized) under duty cycle control to allow fluid flow in the reverse circuit. This fluid flow reseats the ball of first ball check valve 652 on its other seat, limiting the remaining amount of venting, and fills the low/reverse clutch apply cavity 626 to reapply the low/reverse clutch 310. This methodology is represented by curves or traces on a shift tape graph or recording for a shift from neutral to reverse gear as illustrated in FIG. 24L.

T/C CONTROL VALVE

Referring to FIG. 5A, the T/C control valve 612 is used to regulate torque converter pressure (i.e. provide various pressures) and improve lock-up control. Generally, normal line pressure from the pressure regulator 608 is used to feed the torque converter 110., resulting in only one pressure level.

As illustrated in FIGS. 5E and 5F, in first and second gear, respectively, the T/C control valve 612 regulates inlet fluid pressure to the torque converter 110 as determined by the area between lands 672c and 672d and spring 664. At this valve position, the torque converter outlet flow to the cooler 616 is unrestricted.

Referring to FIG. 5C, in reverse gear, a passageway 602d to the T/C control valve 612 is not pressurized. The T/C control valve 612 regulates the inlet fluid pressure to the torque converter in a similar manner to first or second gear except that its range of authority is increased (i.e. useful range of solenoid duty cycle of about 40% to 95% as opposed to 60% to 90%) by virtue of passageway 602d being vented.

Referring to FIGS. 5H and 5K, in third and fourth gear, the line pressure to the T/C control valve 612 is low enough for the spring 664 to move the T/C control valve 612 to allow full unrestricted flow to the torque converter 110. The pressure of the fluid to the torque converter 110 is essentially the same as the line pressure minus typical pipe losses, etc.

Referring to FIG. 5I, in partial lock-up, the low/reverse solenoid-actuated valve 636 is cycled by the transmission controller 3010. This pressurizes the end of fourth land 672d of the T/C control valve 612 enough to keep it effectively in the position shown. In this position, both the torque converter inlet and outlet flow are restricted, which reduces the lock-up clutch rate of torque reduction during the solenoid-actuated valve 636 off period as previously described. This extends the lock-up clutch control range (i.e. useful range of solenoid duty cycle) down to lower duty cycles of solenoid-actuated valve 636.

CAM CONTROLLED MANUAL VALVE

The present invention provides a cam controlled manual valve 604. Referring to FIG. 11B, a pin or shaft member 770 is connected by suitable means to one end of the manual valve 604. The shaft member 770 is disposed in a slot or cam groove 772 of the manual lever 578 which is connected to the manual shaft 591, as illustrated in FIG. 4B. The shaft member 770 follows the irregular path of the cam groove 772 to move or reciprocate the manual valve 604 axially in its bore of the valve body 603.

In operation, the operator or driver moves the manual shaft 591 to the desired gear or operating mode position, i.e. PRNODDL. This causes the manual lever 578 to rotate. As the manual lever 578 is rotated, the engagement of the cam groove 772 and shaft member 770 acts as a cam means, causing the manual valve 604 to be displaced or shifted in its bore of the valve body 603 to connect the proper ports between the lands thereof to allow fluid flow to the proper clutch apply cavities to move the corresponding fluid actuating device or clutch apply piston.

Accordingly, the present invention allows additional PRNODDL positions without changing either the manual valve 604 or valve body 603. This is accomplished by the irregular path of the cam groove 772. The cam groove 772 defines a park position at one end for a park operating mode of the transmission 100 and an installation position at the other end for installing the park locking mechanism 560. The cam groove 772 further defines a reverse, neutral, overdrive, drive and low position for their corresponding operating mode, respectively. Also, the present invention reduces the travel and length of the manual valve 604. The present invention further permits solenoid switching (described below) while maintaining a balanced valve, i.e. no sine loads from the fluid flow.

MANUAL VALVE SOLENOID SWITCHING

As illustrated in FIG. 11B, the manual valve 604 is shown. The manual valve 604 has lands 676a, 676b, 676c, 676d located such that it is able to switch the fluid flow between the two/four shift clutch solenoid-actuated valve 634 and the low/reverse clutch solenoid-actuated valve 636. Referring to FIG. 5C, in reverse gear, fluid flows through passageway 602a to the manual valve 604. The manual valve 604 allows fluid to flow between lands 676a and 676b and through passageway 602b to the reverse clutch apply cavity 622. Fluid also flows from the pump assembly 200 through the two/four shift clutch solenoid-actuated valve 634 to the low/reverse clutch apply cavity 626.

Referring to FIG. 5E, in low gear, i.e. first gear, fluid flows through passageway 602a to the manual valve 604. The manual valve 604 is shifted or moved to allow fluid to flow through the manual valve 604 between lands 676a and 676b and through passageway 602c and through the low/reverse clutch solenoid-actuated valve 636 to the low/reverse clutch apply cavity 626. Thus, the position of the manual valve 604 is such to switch fluid flow between solenoid-actuated valves 634 and 636 to allow fluid flow to the low/reverse clutch apply cavity 626 in first and reverse gears.

TRANSMISSION CONTROL METHOD

Figure 12:
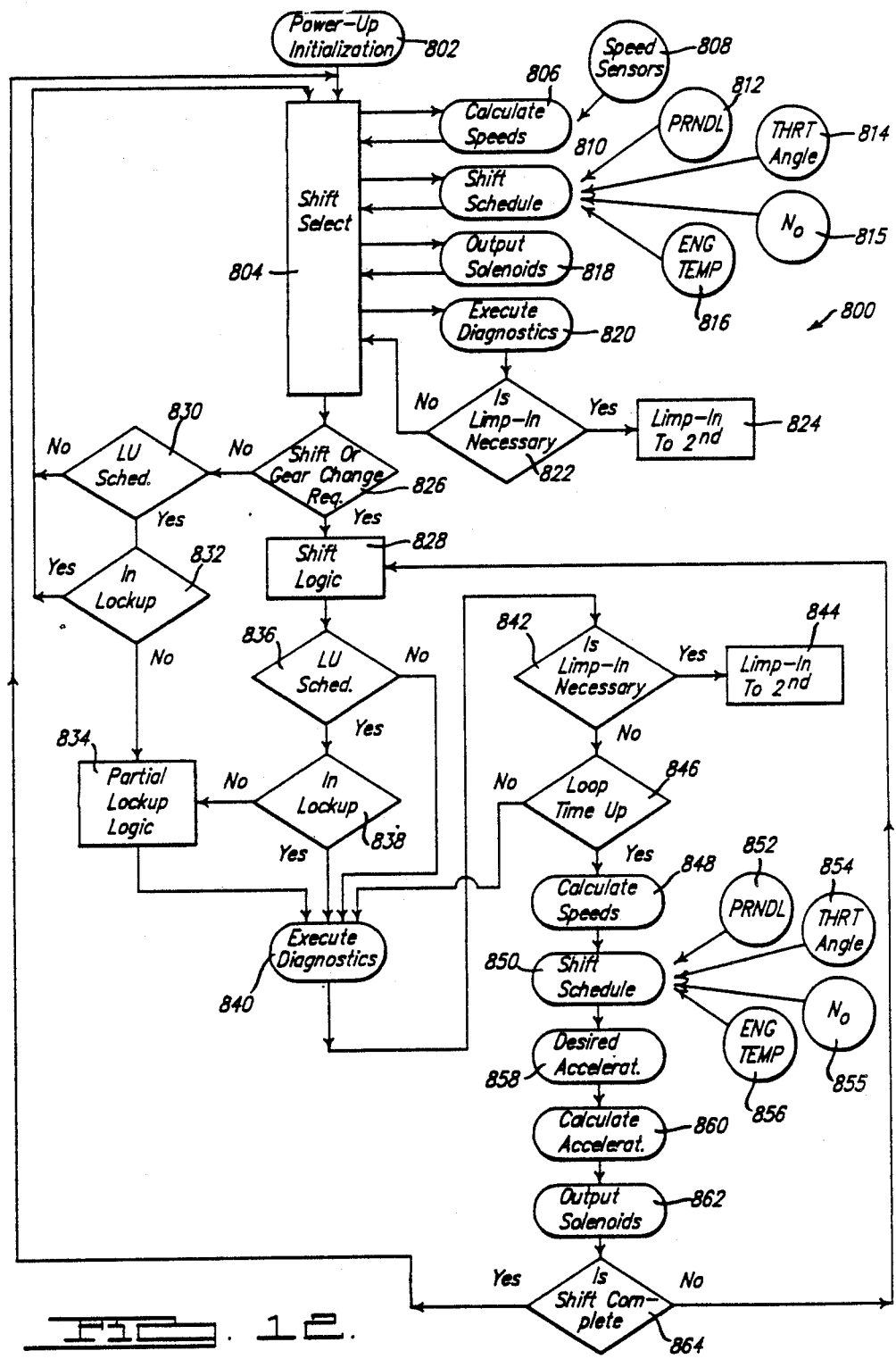
FIG. 12 is a flow chart of the overall operational methodology of the transmission controller according to the present invention.

Referring to FIG. 12, the logic or methodology, of the transmission controller 3010 is shown at 800. When the key of the vehicle is turned on, power-up of the transmission controller 3010 occurs in bubble 802. Next, the transmission controller 3010 performs or enters a seven millisecond (7 ms.) main program or control loop. At the beginning of the main control loop, the methodology advances to block 804 called shift select to "orchestrate" various methods used to determine the operating mode or gear, i.e. first gear, the transmission 100 is presently in and which gear the transmission 100 should be in next, and comparing the two to each other to determine if a shift is required. The methodology advances to bubble 806 to calculate the speed and acceleration of the turbine 128, output gear 534 and engine crankshaft 114. The transmission controller 3010 receives input data from the turbine speed sensor 320 (turbine speed $N_t$), output speed sensor 546 (output speed $N_o$) and engine speed sensor (not shown) (engine speed $N_e$) in circle 808. In bubble 806, the engine speed $N_e$, turbine speed $N_t$ and output speed $N_o$ are calculated from the input data. The methodology advances to bubble 810 called the shift schedule to be described under section heading "SHIFT SCHEDULE METHOD". The shift schedule bubble 810 reads or determines the shift lever position 606, PRNQDDL, of the manual lever 578 by contact switch sensors ($NS_1$, $NS_2$) (See FIG. 4B) in circle 812. The shift schedule bubble 810 also determines the throttle angle THRT ANGLE of the engine, to be described under section heading "THROTTLE ANGLE COMPUTATION AND FAILURE DETECTION", by an input of a potentiometer (not shown) connected to the throttle (not shown) in circle 814. The shift schedule bubble 810 further determines the engine temperature, to be described under section heading "PRESSURE SWITCH TEST AND TRANSMISSION TEMPERATURE DETERMINATION METHOD" in circle 816. The shift schedule bubble 810 uses the data items such as output speed $N_o$ in circle 815 (generated by bubble 806), PRNODDL (generated by circle 812) and throttle angle (generated by circle 814) to determine the appropriate gear the transmission 100 should be placed.

The methodology advances to bubble 818 which outputs the appropriate command signals to the solenoid-actuated valves 630, 632, 634 and 636 and properly energizes or de-energizes them based on which gear the transmission 100 is in, as determined by circle 812. The methodology advances to bubble 820 to execute diagnostic or monitoring routines. In diagnostic bubble 820, the transmission controller 3010 determines if the proper pressure switches 646, 648 and 650, previously described, are pressurized by either looking for signals from a specific pressure switch combination for the present in-gear condition of the transmission 100 or from a specific pressure switch to a non-controlling clutch during a pressure switch test to be described. The transmission controller 3010 also determines if the wires in the control system are not shorted or open by looking for a flyback voltage or EMF spike during a solenoid continuity test to be described under section "SOLENOID CONTINUITY TEST METHOD". The methodology then advances to diamond 822 and determines whether a failure has occurred. If a failure has occurred, the methodology advances to block 824 in which the transmission controller 3010 de-energizes the solenoid-actuated valves 630, 632, 634 and 636 which assume their normal positions to allow the transmission 100 to operate in second gear in the drive mode, i.e. limp-home mode previously described. If a failure has not occurred, the methodology advances to the shift select block 804. Based on the calculated speeds and shift schedule output (SSOUTP), the methodology determines if a shift is required. This process is done every 7 ms.

Since the shift select block 804 compares the gear the transmission 100 is presently in, to the SSOUTP, the methodology advances to diamond 826 and determines if a shift or gear change is required. If a shift is required, the methodology advances to block 828 called the shift logic to be described herein. Otherwise, if a shift is not required, the methodology advances to diamond 830 and looks at the lock-up schedules, i.e. a plot of THRT ANGLE verses $N_t$, etc., to determine if lock-up of the torque converter 110 is required. If lock-up is not required, the methodology returns to the beginning of the shift select block 804 again for another 7 ms. loop. Otherwise, if lock-up is required, the methodology advances to diamond 832 and determines if the torque converter 110 is presently locked-up by looking for a flag that has previously been set during full lock-up of the torque converter 110. If the torque converter 110 is presently locked-up, the methodology returns to the shift select block 804. Otherwise, the methodology advances to block 834 called partial lock-up logic or methodology, to be described under section heading "TORQUE CONVERTER LOCK-UP METHOD", for the torque converter 110.

If a shift or gear change is needed or required, the shift logic block 828 uses one of twelve unique shift programs or routines. The shift routines are 1-2, 2-3, 2-4, 3-4 (upshifts); 4-3, 4-2, 3-2, 3-1, 2-1, (downshifts); and N-1, R-N, N-R (garage shifts) to be described herein. The shift logic block 828 has to identify the proper shift logic routine, and then execute it. The shift logic block 828 controls the solenoid-actuated valves 630, 632, 634 and 636 to shift the transmission 100 from its present gear to the next gear in a smooth manner.

After the shift logic block 828, the methodology advances to diamond 836 and determines if lock-up of the torque converter 110 is required as previously described. If lock-up is required, the methodology advances to diamond 838 and determines whether the torque converter 110 is already locked-up as previously described. If the torque converter 110 is not already locked-up, the transmission controller 3010 executes the partial lock-up block 834, to be described herein.

The partial lock-up block 834 is used to reduce slip of the torque converter 110. Slip equals $N_e$ minus $N_t$. The partial lock-up block 834 instructs or causes the transmission 100 to fully lock, partially lock or fully unlock the torque converter 110. If unlock is desired, the transmission controller 3010 will hold the solenoid-actuated valve 636 in the de-energized or normally vented mode to move the LU switch valve 614 and allow fluid pressure to disengage the lock-up clutch 186. If partial lock is desired, the transmission controller 3010 will reduce slip to a low or predetermined desired value, but not completely eliminate it. The transmission controller 3010 calculates the slip by $N_e$ minus $N_t$ based on the input from the sensors previously described. The transmission controller 3010 compares this to a predetermined desired value of slip, e.g. 60 r.p.m., and thus, determines if the torque converter 110 is slipping too much or too little. If too much slip occurs, the transmission controller 3010 will increase the duty cycle ("ON" time) of the low/reverse clutch solenoid-actuated valve 636 and the LU switch valve 614, which will increase the pressure differential across the lock-up clutch assembly 186 and thus, decrease the slip. This technique is called "pulse-width modulation".

If full lock-up is desired, the transmission controller 3010 will gradually increase the fluid pressure to the lock-up clutch 186, adding more "ON" cycle time to the solenoid-actuated valve 636 thereby increasing the "ON" cycle time at the LU switch valve 614 until maximum, resulting in zero slip.

Returning to diamond 836, if the transmission controller 3010 determines the lock-up of the torque converter 110 is not required, the methodology advances to bubble 840 to execute diagnostic or monitoring routines as previously described. Similarly, if the transmission controller 3010 determines that the torque converter 110 is already locked-up in diamond 838, the methodology advances to bubble 840 to execute diagnostic or monitoring routines as previously described. Further, once the partial lock-up block 834 is completed, the methodology advances to bubble 840 to execute diagnostic or monitoring routines as previously described.

From diagnostic bubble 840, the methodology advances to diamond 842 and determines whether a failure has occurred as previously described. If a failure has occurred, the methodology advances to block 844 and causes the transmission 100 to default to or operate in second gear. Otherwise, if no failure occurs in diamond 842, the methodology advances to diamond 846 and determines if the time period for the diagnostic loop has expired by any suitable method such as looking at a counter. If the time has not expired, the methodology advances to bubble 840 to execute the diagnostic routines again until the time period has expired. If the time period has expird, the methodology advances to bubble 848 to calculate speeds $N_e$, $N_t$ and $N_o$ as previously described. The methodology then advances to bubble 850 to perform another shift schedule as previously described using PRNODDL circle 852, output speed $N_o$ circle 855, THRT ANGLE circle 854, and engine temperature circle 856.

To perform the shift in a smooth manner, the transmission controller 3010 slips the clutches of the multi-clutch assembly 300. The transmission controller 3010 has to control the pressure on applying clutches and releasing clutches in an orchestrated manner. To do this, the methodology advances from the shift schedule bubble 850 to bubble 858 and determines the appropriate rate of acceleration, called the "desired acceleration" (alpha$_{desired}$ or $\alpha^*$) to control the turbine 128. The desired acceleration may be predetermined by an equation, point/slope interpolation or any other suitable method. The methodology advances to bubble 860 and calculates the present acceleration (alpha$_t$ or $\alpha_t$) of the turbine 128 based on turbine speed $N_t$ which tells the transmission controller 3010 how quickly the shift is happening. The transmission controller 3010 indirectly compares the value of desired acceleration with the calculated acceleration. This may be accomplished by placing the above values into an equation to decide the duty cycle for proportional control to be described. The methodology advances to bubble 862 to output the appropriate command signals to either actuate and/or deactuate (turn logically either "ON" or "OFF") the solenoid-actuated valves 630, 632, 634 and 636 for the engaging (apply) or disengaging (release) of the clutches.

For upshifts, if the turbine 128 is decelerating too fast, the transmission controller 3010 reduces the pressure on the applying clutch by either actuating and/or deactuating the solenoid-actuated valves 630, 632, 634 and 636 in bubble 862. For downshifts, if the turbine 128 is accelerating too rapidly, the transmission controller 3010 increases the pressure on the applying clutch by either actuating and/or deactuating the solenoid-actuated valves 630, 632, 634 and 636 in bubble 862. If the turbine assembly 128 is accelerating at the desired acceleration level, the solenoid-actuated valves 630, 632, 634 and 636 are either actuated and/or deactuated to obtain the shift or gear change. At the end of 7 ms. loop, the methodology advances to diamond 864. The transmission controller 3010 tallies the ratios of $N_t$ to $N_o$ again to determine if the shift or gear change is complete. If $N_o$ and $N_t$ are at proper values, i.e. ratio $\times N_o = N_t$ for a predetermined time period which is different for each shift, the transmission controller 3010 determines that the shift or gear change is complete. The methodology returns to the beginning of the control loop to the shift select block 804. If the shift or gear change is not complete, the methodology returns to the shift logic block 828 to repeat the method as previously described.

SHIFT SELECTION METHOD

Figure 13B:
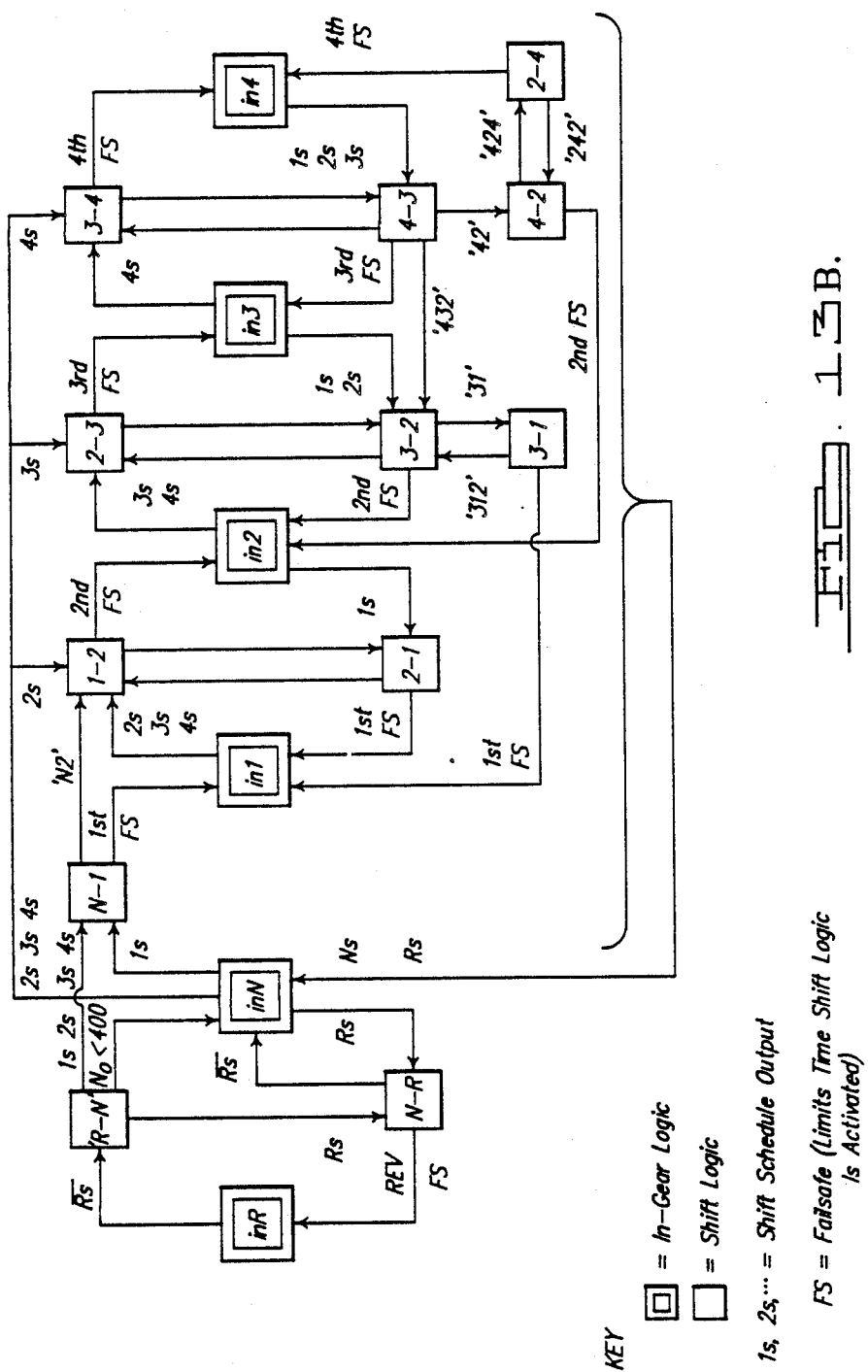

The shift "select" routine or method in block 804 of FIG. 12 falls in the main loop immediately after system start-up in bubble 802 of FIG. 12. The shift schedule routine of bubble 810 is called before shift selection analysis is performed. All other key variables such as output speed $N_o$, turbine speed $N_t$, acceleration, etc. are also updated prior to shift selection analysis. The shift schedule routine of bubble 810 determines the appropriate gear the transmission 100 of the vehicle should be placed in (See FIG. 13B) as described subsequently herein. This information is conveyed by setting the bits of "shift schedule output" (SSOUTP). The shift selection block 804 compares the gear related bits of the in-gear code (IGCODE) as defined by circle 812 and SSOUTP. If they are equal, no shift is required. In this case, the methodology will decode what gear the transmission 100 is in and will revalidate the proper "clutch" and "solenoid" states (i.e. either logically "ON" or "OFF") of the valves 630, 632, 634 and 636 (FIGS. 5A-L).

The shift selection method (FIG. 13B) has enormous complexity. In order to minimize the size of the method to a manageable level and to derive RAM and ROM efficacy, a technique using a shift "control table" is employed. Each row of the shift control table has four bytes. The shift control table format is defined as follows:

| MASK | IGCODE | SHCODE IF IGCODE TRUE | COMPLEMENT SHCODE |
|---|---|---|---|
| (1) | (2) | (3) | (4) |

The SHCODE is the "shift code", i.e. from first to second gear. IGCODE is the in-gear code, i.e. present operating gear of the transmission 100. MASK is the eight bit binary code for the result of a logical operation.

As illustrated in FIG. 13A, the shift select block 804 is generally shown for a shift selection while the transmission 100 is operating "in gear", i.e. the transmission 100 is presently in first gear for example. After power-up in bubble 802 of FIG. 12, the methodology enters the shift select through bubble 866. The methodology advances to block 868 and points to the beginning or start of the shift control table (first row), previously described, which is stored in memory. The methodology advances to block 870 and prepares a "select mask" (M) from which the IGCODE and SSOUTP are "logically AND-ed". The methodology advances to block 872 and compares mask (M) with the first byte in the shift control table row. The methodology advances to diamond 874 and determines whether a matching row was found. If a matching row was found, the methodology advances to block 876 and points to the next row in the shift control table. The methodology then loops back to diamond 874 previously described.

If a matching row was found at diamond 874, the methodology advances to diamond 876 and determines whether the present IGCODE equals the second byte of the shift control table row. If the present IGCODE equals the second byte, the methodology advances to block 878 and picks the third byte containing the shift to be performed, i.e. first to second gear. If the present IGCODE does not equal the second byte, the methodology advances to block 880 and picks the fourth byte containing the shift to be performed. The methodology advances from blocks 878 and 880 to bubble 882. At bubble 882, the methodology returns or goes to top of shift in shift logic block 828 of FIG. 12 to perform the shift just selected. The shift select block 804 is shown schematically in FIG. 13B.

If the present shift is to be abandoned for a new shift, i.e. a shift selection while the transmission 100 is presently performing a shift, a selection process called "change-mind" analysis is used as illustrated in FIG. 13C. During the shift loop, the methodology enters the change-mind portion of the shift selection block 804 through bubble 884. The methodology then advances to diamond 886 and determines whether a new shift schedule is different from the present shift schedule by looking at the shift schedule output (SSOUTP) which may be a coded register. If not, the methodology advances to bubble 888 and determines that change-mind analysis is not allowed and continues the present shift. If the new shift schedule (SSOUTP) is different from the present shift schedule, the methodology advances to block 890 and vectors to the proper change-mind processing point based on a change mind table stored in memory which is similar to the shift control table. In other words, the methodology uses a vector table oriented method for analysis of each "present shift" and jumps to the proper process point. The methodology then advances to block 892 and performs checks using key variables (i.e. speeds, throttle angle, speed ratios, SSOUTP, IGCODE, etc.) at its appropriate processing point. The methodology advances to diamond 894 and determines whether change-mind conditions are valid by the old SSOUTP not matching the new or recent SSOUTP. If the conditions are not valid, the methodology advances to bubble 888 previously described to continue the present shift. If the change-mind conditions are valid, the methodology advances to bubble 896 and aborts the present shift and selects the new shift from the processing point.

SHIFT SCHEDULE METHOD

The shift schedule method determines the appropriate gear in which the transmission 100 should be placed. The shift schedule method first determines the present gear of the transmission 100 by the shift lever position 606 of the manual lever 578 in circle 812 of FIG. 12. Based on the shift lever position 606, the shift schedule method determines the appropriate gear in which the transmission 100 should be placed.

Referring to FIG. 1A, the bubble 810 of FIG. 12 for the shift schedule method is shown. The methodology enters from the shift select block 804 through bubble 900 and advances to diamond 902. At diamond 902, the methodology determines whether the shift lever position (SLP) 606 of the manual lever 578 is park P or neutral N by reading a coded signal from the sensors $NS_1$ and $NS_2$ (FIG. 4B) to be described. If SLP 606 is park or neutral, the methodology advances to block 904 and sets the new output (SSOUTP) of the shift schedule (SS) to neutral. The methodology then returns or exits through bubble 906.

At diamond 902, if SLP 606 is not park or neutral, the methodology advances to diamond 908 and determines whether SLP 606 is reverse R by the signal from the sensors $NS_1$ and $NS_2$. If SLP 606 is reverse, the methodology then advances to block 910 and sets shift schedule to reverse. The methodology then returns or exits through bubble 906.

At diamond 908, if SLP 606 is not reverse, the methodology advances to block 912 concludes or determines that SLP 606 is equal to overdrive OD, drive D or low L. The methodology then advances to block 914 and selects two adjacent lines based on the present shift schedule and the shift schedule graphs shown in FIGS. 14B through 14D for a SLP 606 of overdrive OD, drive D or low L. The methodology advances to block 916 and scans these lines using a technique called "point slope" (PSLOPE), to be described under section heading "PSLOPE METHOD" (FIGS. 15A and 15B) which is a linear interpolation technique ($N_o$ on X-axis and throttle angle on Y-axis). The methodology advances to diamond 918 and determines whether there is a new shift schedule to a coastdown shift, i.e. second to first gear from the SSOUTP (for a downshift) and throttle angle (for coast versus kick). If there is a new shift schedule to a coastdown shift, the methodology advances to block 920 and checks the gear ratios of the gear assembly 500 by performing speed calculations to avoid a "shock" from a power-plant reversal situation. A power-plate reversal situation or condition exists when the wheels of the vehicle drive the engine through the transmission during deceleration rather than the engine driving the transmission, in turn, driving the wheels. The methodology advances to diamond 922 and determines whether a power-plant reversal situation or condition exists. If a power-plant reversal condition exits, the methodology advances to block 924 and does not change the shift schedule. The methodology returns or exits through bubble 926.

At diamond 918, if there is not a new shift schedule to a coastdown shift, the methodology advances to block 928. Also, if a power-plant reversal condition does not exist at diamond 922, the methodology advances to block 928. At block 928, the methodology allows for a new shift schedule. The methodology then advances to block 930 and checks for diagnostic situations or conditions as previously described in conjunction with FIG. 12. The methodology advances to diamond 932 and determines whether a diagnostic situation or condition exists. If a diagnostic condition does not exist, the methodology advances to block 934 and allows the shift schedule to proceed or be changed to the new shift schedule. If the diagnostic condition does exist, the methodology advances to block 936 and does not change the shift schedule. The methodology advances from blocks 934 and 936 to bubble 938 and exits or returns.

PSLOPE METHOD

Figure 14A:
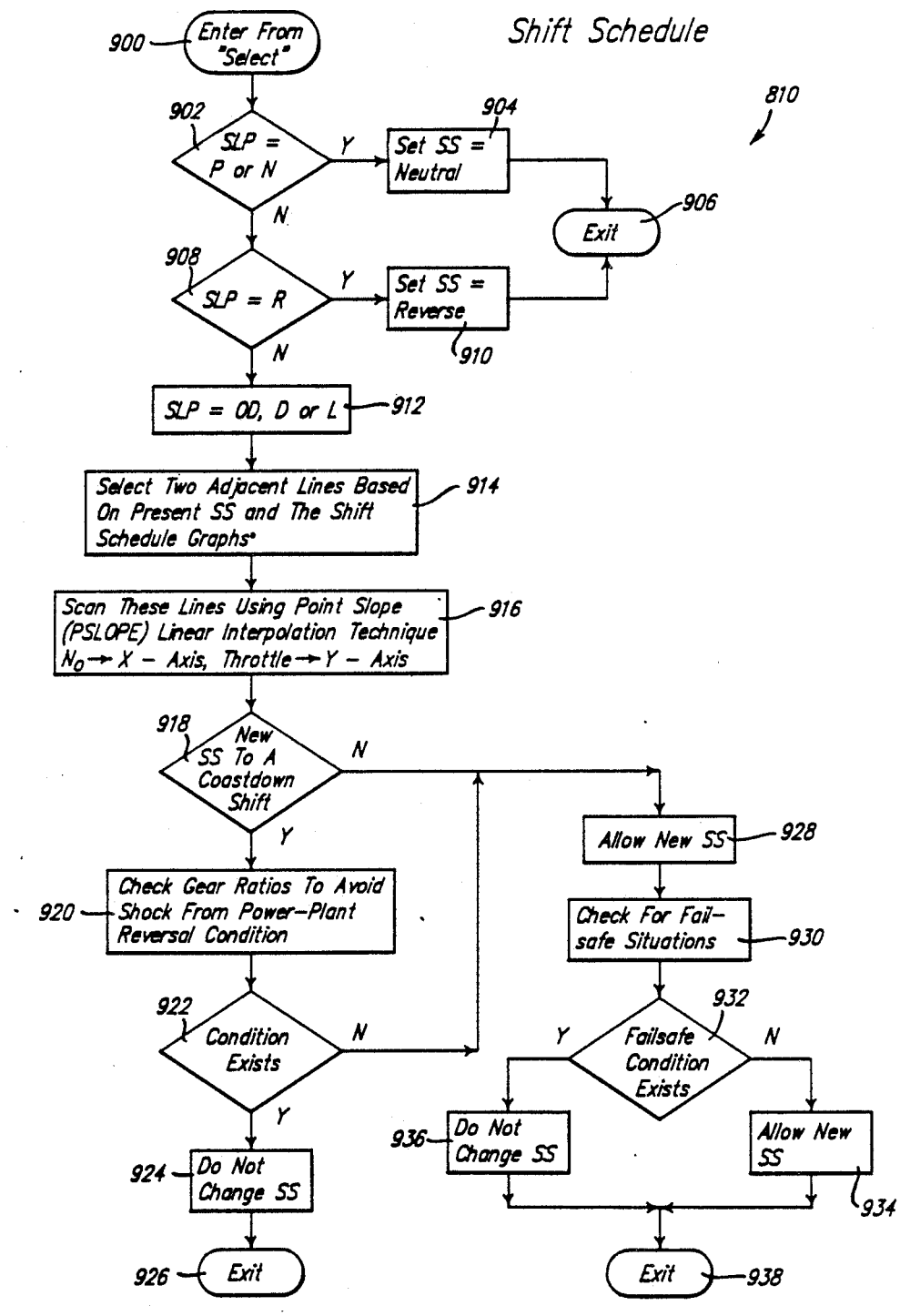
FIGS. 14A-D illustrate the shift schedule methodology according to the present invention.
Figure 14B:
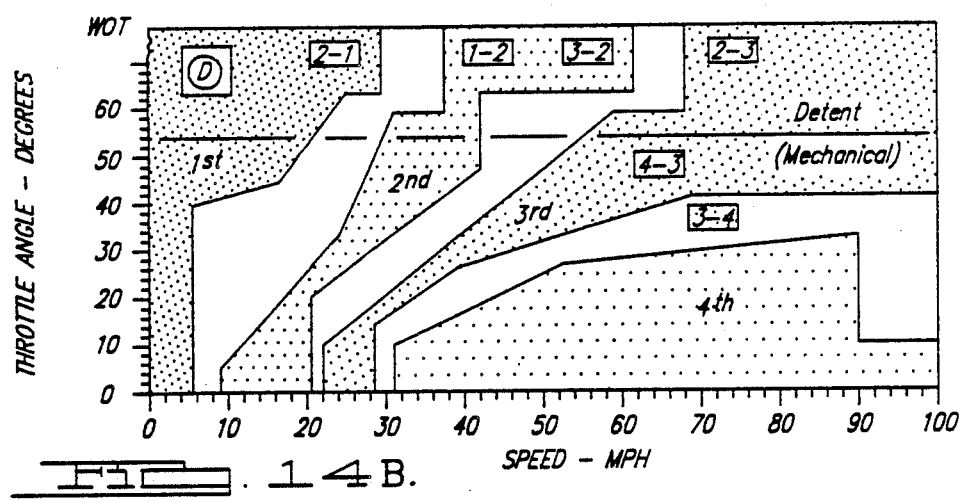
Figure 14C:
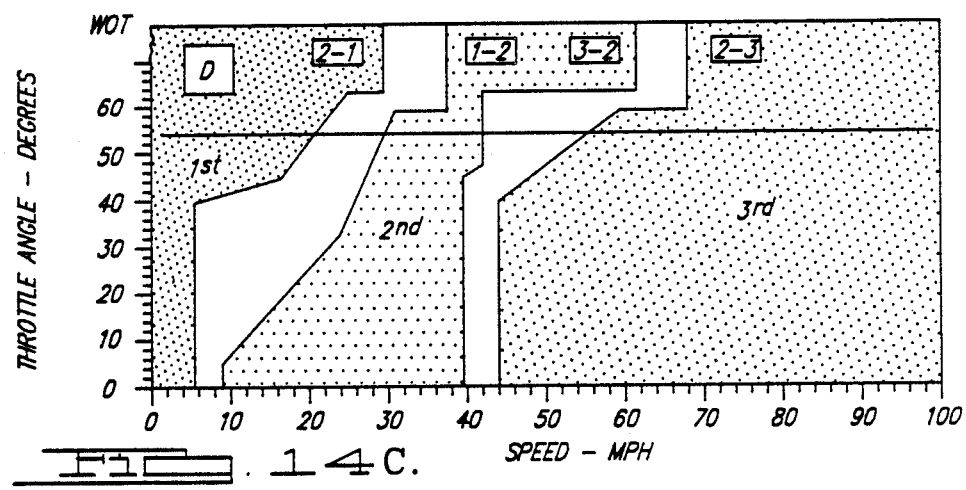
Figure 14D:
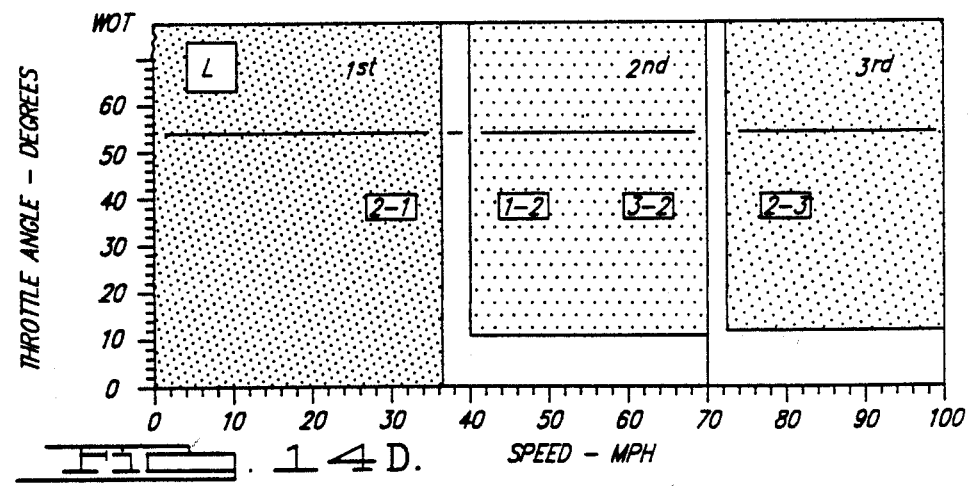
Figure 15A:
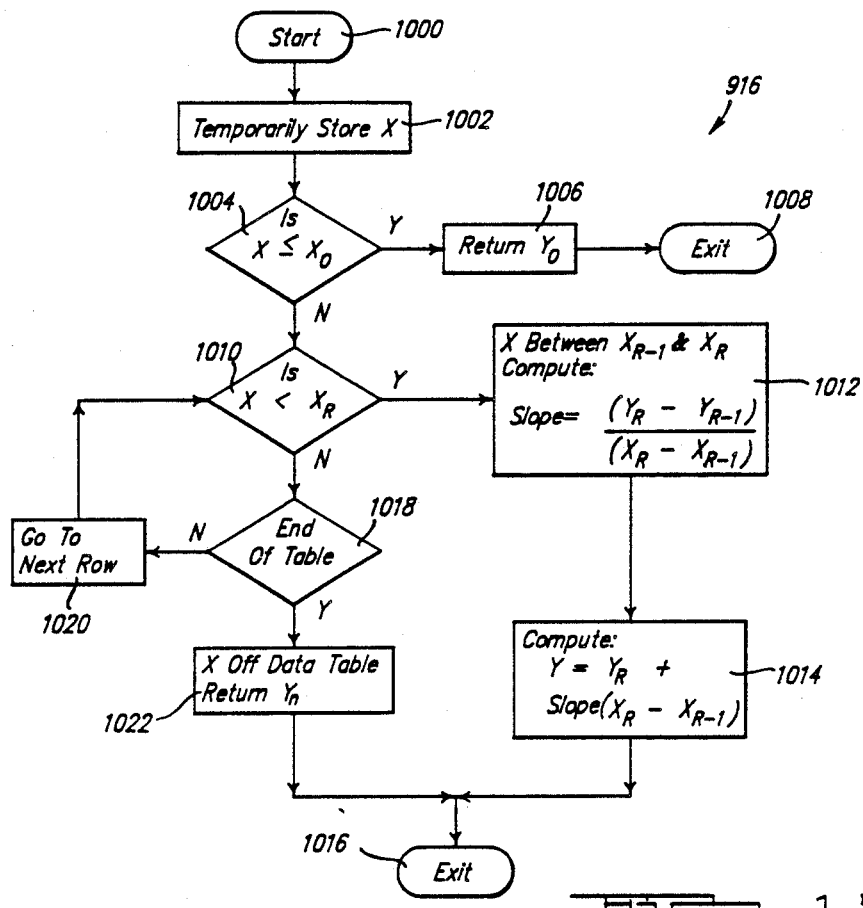
FIGS. 15A-B illustrate the PSLOPE methodology according to the present invention.
Figure 15B:
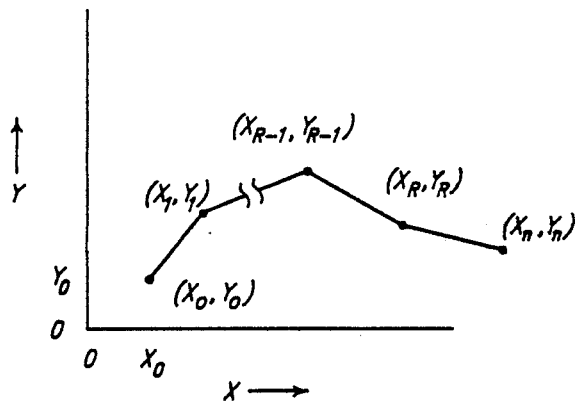

Referring to FIGS. 15A and 15B, the "point slope" (PSLOPE) routine of block 916 of FIG. 14A is shown. The PSLOPE method determines the throttle angle given output speed $N_o$ by scanning the shift lines in FIGS. 14B through 14D stored as a table in the memory of the transmission controller 3010. At the start of the PSLOPE routine in bubble 1000 of FIG. 15A, the methodology advances to block 1002 and temporarily stores the value for X in the memory of the transmission controller 3010. The methodology then advances to diamond 1004 and determines whether X is less than or equal to $X_o$ (FIG. 15B) which is a point on the shift line. If X is less than or equal to $X_o$, the methodology advances to block 1006 and gets or obtains the value for $Y_o$ and returns or exits through bubble 1008. If X is greater than $X_o$, the methodology advances to diamond 1010 and determines whether X is less than $X_R$. If X is less than $X_R$, the methodology advances to block 1012 and computes the slope between the points $X_R$ and $X_{R-1}$. The methodology then advances to block 1014 and computes Y based on $Y_R$ plus slope. The methodology then returns or exits through bubble 1016.

At diamond 1010, if X is not less than $X_R$, the methodology advances to diamond 1018 and determines whether the method is at the end of a table of values for the shift schedule graphs (FIGS. 14B-D), i.e. $X_o$; $Y_o$; $X_R$; $Y_R$; $X_n$; $Y_n$. If the method is not at the end of the table, the methodology advances to block 1020 and goes to the next row of the table. The methodology then loops back to diamond 1010.

If the methodology is at the end of the table at diamond 1018, the methodology advances to block 1022 and concludes or determines that the value for X is not in the table but greater than $X_n$ (FIG. 15B), and gets the $Y_n$ value, i.e. the last value $Y_n$ from the data table based on the value for $X_n$. The methodology then returns or exits through bubble 1016.

SHIFT LOGIC METHOD

The shift logic block 828 contains twelve unique shift programs. The shift logic block 828 identifies the shift logic or routine to be executed. For example, if the transmission 100 is in first gear and the shift schedule output (SSOUTP) changes to call for second gear, the shift selection block 804 picks a SHCODE and shift logic block 828 identifies and executes the SHCODE for first to second (1-2) logic.

Each of the twelve different shifts involves extensive calculations and logical manipulations to determine the "ON" or "OFF" states of the solenoids of the solenoid-actuated valves 630, 632, 634 and 636 (FIGS. 5A-L) for engaging (applying) or disengaging (releasing) of the clutches for the shifts. These shifts are organized into three sets of shifts as follows: upshifts 1-2, 2-3, 3-4 and 2-4; downshifts 2-1, 3-1, 4-3, 4-2 and 3-2; and garage shifts N-1, N-R and R-N.

The methodology consists of three major routines, one for each of the above sets of shifts. To make this possible, a "Control Table" method is used. The key parametric entities are imbedded in a shift control table as follows:

| SHIFT CONTROL TABLE | |
|---|---|
| FORMAT | NUMBER OF BYTES |
| RELEASE ELEMENT BIT | (1) |
| APPLY ELEMENT BIT | (1) |
| ADDR. OF VF (APPLY) | (1) |
| ADDR. OF VF (REL.) | (1) |
| NI GEAR (initiating ratio) | (2) |
| NJ GEAR (destination ratio) | (2) |
| DESTINATION ELEMENT MASK | (1) |

All calibration variables are segregated into a separate table called a "Volume Table" for example, as follows:

| VOLUME TABLES | |
|---|---|
| CLUTCH IDENTIFIER | ELEMENT |
| 103 | QF CU. INCH/MS. |
| 54 | QV CU. INCH/MS. |
| 1802 | C CU. INCHES |
| 18514 | VA CU. INCHES |
| 17 | SLOPE QF |
| 74 | SLOPE QV |
| VFLRC | ADDR. OF "VF" |

Thus, during product development, the key flow-rate and volumetric parameters can be efficiently and manageably altered. As a result, each major shift routine (upshift, downshift or garage shift) can do one of its many shifts just by getting the necessary fixed parameters from the shift control table and the calibration (volumetric, flow rates, etc.) data from the volume tables.

Accordingly, this shift logic method provides the following advantages: efficient management of ROM and RAM resources of the transmission controller 3010; efficiency during product calibration cycle; and defect preventiveness during development due to the segregation by upshifts, downshifts and garage shifts and by fixed versus calibration parameters.

Referring to FIG. 16A, for upshifts of the shift logic block 828 of FIG. 12, the methodology enters the start or top of shift in the shift logic block 828 through bubble 1100. The methodology advances to diamond 1102 and determines whether the torque converter 110 is presently in the lock-up mode as previously described. If the torque converter 110 is presently locked, the methodology advances to block 1104 and instructs the transmission controller 3010 to unlock the torque converter 110 when slip from the present gear toward the target gear begins, i.e. from first to second gear. The methodology then advances to block 1106.

At diamond 1102, if the torque converter 110 is not in the lock-up mode, the methodology advances to block 1106. At block 1106, the transmission controller 3010 computes variables, such as $t_f$ (time remaining to nearly fill the apply clutch), $t_r$ (time to nearly release), $DC_t$ (torque phase duty cycle) etc., states/flags to be used in shift logic equations and intercepts/calculates variables used for "learning", to be described under section heading "LEARN METHODOLOGY" at the end of the shift. The methodology advances to block 1108 and solves a predetermined logic equation for the apply element such as a clutch. The methodology then advances to diamond 1110 and determines whether the solenoid for the apply element or oncoming clutch should be logically "ON" based on calculated speeds, throttle angle and SSOUTP.

It should be appreciated that the friction element (apply or release) such as a clutch is turned logically "ON or OFF" by either the energization or de-energization of the solenoid-actuated valve. It should also be appreciated that "ON" or "OFF" can be either "applying or venting" of the function element.

If the apply clutch should be ON, the methodology advances to diamond 1112 and determines whether the apply clutch is under duty cycle control, i.e. solenoid-actuated valve to the clutch is cycled "ON" and "OFF", by looking for a flag previously set. If the apply clutch is not under duty cycle control, the methodology advances to block 1114 and turns ON or applies the apply clutch by energizing or de-energizing the solenoid of the respective solenoid-actuated valve. If the apply clutch is under duty cycle control, the methodology advances to block 1116 and starts or continues the duty cycle.

At diamond 1110, if the apply clutch should not be ON, or applied the methodology advances to block 1118 and turns OFF or disengages the apply clutch. The methodology advances from blocks 1114, 1116 or 1118 to block 1120 and solves a predetermined the release clutch or off-going clutch logic equation. The methodology advances to diamond 1122 and determines whether the release clutch or off-going clutch should be ON based on calculated speeds, throttle angle and SSOUTP. If the release clutch should not be ON, the methodology advances to block 1124 and turns OFF or disengages the release clutch. The methodology then returns or exits through bubble 1126.

At diamond 1122, if the release clutch should be ON or applied, the methodology advances to diamond 1128 and determines whether the release clutch is under duty cycle control by looking for a flag as previously described. If the release clutch is not under duty cycle control, the methodology advances to block 1130 and turns ON or applies the release clutch. The methodology returns or exits through bubble 1126.

At diamond 1128, if the release clutch is under duty cycle control, the methodology advances to block 1132 and starts or continues the duty cycle. The methodology exits through bubble 1126.

Figure 16C:
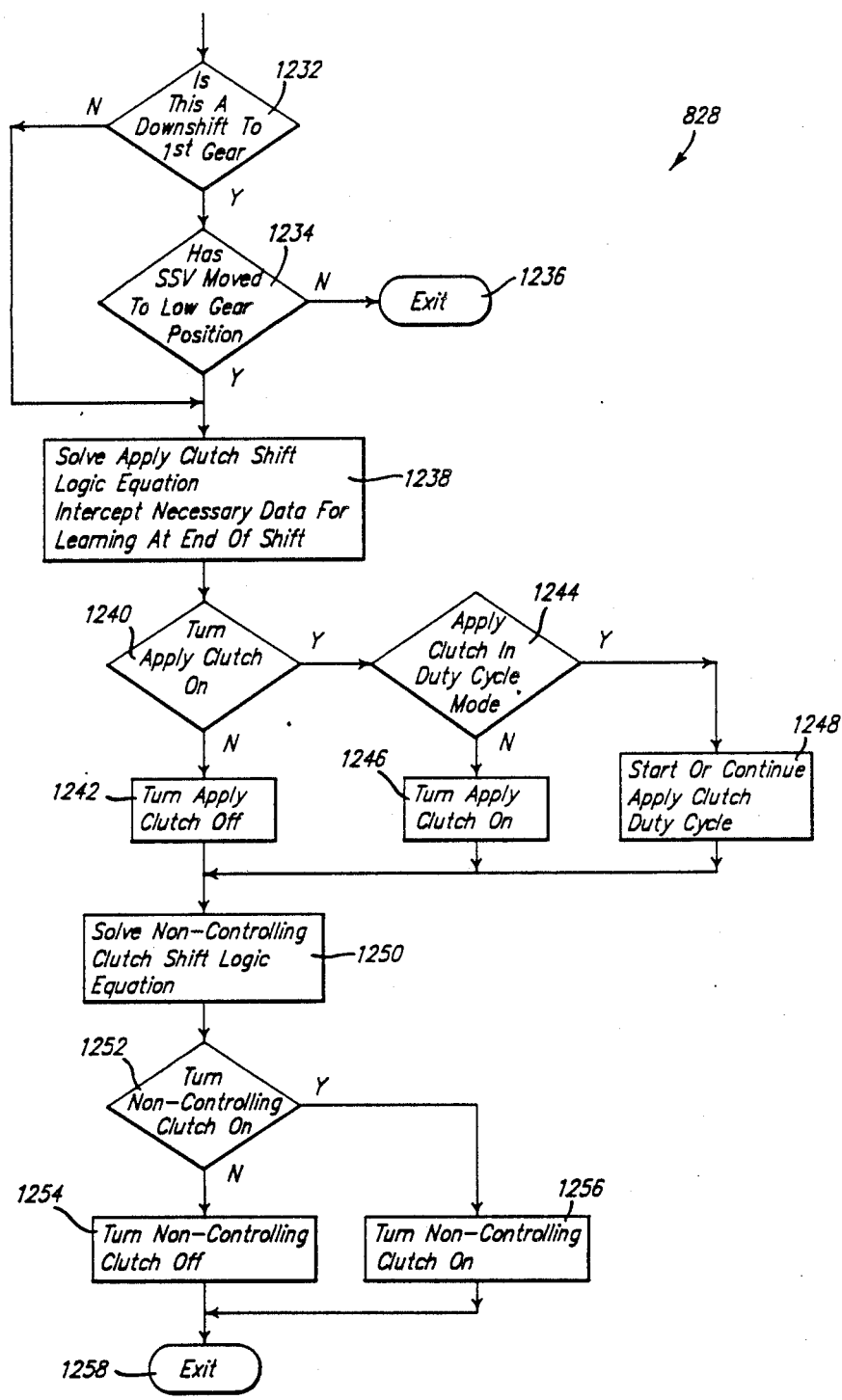

Referring to FIGS. 16B and 16C, the downshift logic for the shift logic block 828 of FIG. 12 is shown. The methodology enters through bubble 1200. The methodology advances to diamond 1204 and determines whether the torque converter 110 is unlocked as previously described. If the torque converter 110 is not unlocked, the methodology advances to block 1206 and aborts partial or full lock-up operation. The methodology advances to block 1208.

At diamond 1204, if the torque converter 110 is unlocked, the methodology advances to block 1208. At block 1208, the transmission controller 3010 computes variables and states of flags to be used in similar shift logic equations of the upshift logic. The methodology advances to diamond 1210 and determines whether the present shift is a downshift to first gear by the SSOUTP. If the present shift is a downshift to first gear, the methodology advances to diamond 1212 and determines whether the solenoid switch valve 610 has moved to the low gear position (See FIG. 5E). The position of the solenoid switch valve 610 is determined by checking pressure switch data from the pressure switches 646, 648 and 650 within a predetermined time period. If the solenoid switch valve 610 has moved to the low gear position, the methodology advances to diamond 1214 and determines whether the solenoid switch valve 610 has moved back to the high gear or lock-up position (See FIG. 5F). If the solenoid switch valve 610 has moved back to the high gear position, the methodology returns or exits through bubble 1216.

At diamond 1212, if the solenoid switch valve 610 has not moved to the low gear position, the methodology advances to block 1218 and executes solenoid switch valve control logic (energizing and de-energizing the solenoid-actuated valves 634 and 636), previously described, to move the solenoid switch valve 610 to the low gear position. The methodology then advances to block 1220.

At diamond 1214, if the solenoid switch valve 610 has not moved back to the high gear position, the methodology advances to block 1220. At diamond 1210, if the present shift is not a downshift to first gear, the methodology advances to block 1220. At block 1220, the transmission controller 3010 solves the release clutch shift logic equation. The methodology advances to diamond 1222 and determines whether the release clutch should be turned ON or applied as previously described. If the release clutch should not be turned ON, the methodology advances to block 1224 and turns OFF or disengages the release clutch.

At diamond 1222, if the release clutch should be turned ON, the methodology advances to diamond 1226 and determines whether the release clutch is in the duty cycle mode as previously described. If the release clutch is not in the duty cycle mode, the methodology advances to block 1228 and turns ON or applies the release clutch. If the release clutch is in the duty cycle mode, the methodology advances to block 1230 and starts or continues the release clutch duty cycle. The methodology advances from blocks 1224, 1228 and 1230 to diamond 1232.

At diamond 1232, the transmission controller 3010 determines whether the present shift is a downshift to first gear as previously described. If the present shift is a downshift to first gear, the methodology advances to diamond 1234 and determines whether the solenoid switch valve 610 has moved to the low gear position as previously described. If the solenoid switch valve 610 has not moved to the low gear position, the methodology exits or returns through bubble 1236. If the solenoid switch valve 610 has moved to the low gear position, the methodology advances to block 1238. If the present shift is not a downshift to first gear at block 1232, the methodology advances to block 1238.

At block 1238, the transmission controller 3010 solves the shift logic equation for the apply clutch and intercepts/calculates the necessary data for "learning" at the end of the shift to be described subsequently. The methodology advances to diamond 1240 and determines whether to turn ON the apply clutch.

If the transmission controller 3010 determines not to turn ON the apply clutch, the methodology advances to block 1242 and turns OFF or disengages the apply clutch. If the transmission controller 3010 determines to turn ON the apply clutch, the methodology advances to diamond 1244 and determines whether the apply clutch is in the duty cycle mode as previously described. If the apply clutch is not in the duty cycle mode, the methodology advances to block 1246 and turns ON the apply clutch. If the apply clutch is in the duty cycle mode, the methodology advances to block 1248 and starts or continues the apply clutch duty cycle. The methodology advances from blocks 1242, 1246 and 1248 to block 1250.

At block 1250, the transmission controller 3010 solves a non-controlling clutch shift logic equation similar to the controlling shift logic equations needed for the shift to occur as previously described. A clutch other than one needed to make the shift or gear change is called the non-controlling clutch. This clutch is cycled ON and OFF by the appropriate solenoid-actuated valve to improve shift quality. The methodology advances from block 1250 to diamond 1252 and determines whether to turn ON or apply the non-controlling clutch based on calculated speeds, throttle angle and SSOUTP. If the transmission controller 3010 determines not to turn ON the non-controlling clutch, the methodology advances to block 1254 and turns OFF or disengages the non-controlling clutch. If the transmission controller 3010 determines to turn ON the non-controlling clutch, the methodology advances to block 1256 and turns ON the non-controlling clutch. The methodology returns or exits from blocks 1256 and 1256 through bubble 1258.

Referring to FIG. 16C, the garage shift methodology for the shift logic block 828 of FIG. 12 is shown. The methodology enters the shift logic block 828 through bubble 1300. The methodology advances to block 1302 and turns the non-controlling clutches either ON or OFF, i.e. engages or disengages the clutches not needed to perform the garage shifts. The methodology advances to diamond 1304 and determines whether the present shift is a garage shift to first gear by looking at SHCODE. If the present shift is a garage shift to first gear, the methodology advances to diamond 1306 and determines whether the solenoid switch valve 610 has moved to the first gear position (FIG. 5E) as previously described. If the solenoid switch valve 610 has not moved to the first gear position, the methodology advances to block 1308 and performs solenoid switch valve control logic as previously described. The methodology then exits or returns through bubble 1310.

At diamond 1304, if the shift is not a garage shift to first gear, the methodology advances to block 1312. At diamond 1306, if the solenoid switch valve 610 has moved to the first gear position, the methodology advances to block 1312. At block 1312, the transmission controller 3010 computes variables and states of flags to be used in a controlling shift logic equation similar to those in the upshift logic. The methodology advances to block 1314 and solves the controlling clutch shift logic equation. The methodology advances to diamond 1316 and determines whether to turn ON the controlling clutch as previously described. If the controlling clutch is not to be turned ON, the methodology advances to block 1318 and turns OFF the controlling clutch. If the controlling clutch is to be turned ON, the methodology advances to diamond 1320 and determines whether the controlling clutch is under duty cycle control as previously described. If the controlling clutch is not under duty cycle control, the methodology advances to block 1322 and turns ON the controlling clutch. If the controlling clutch is under duty cycle control, the methodology advances to block 1324 and starts or continues the apply clutch duty cycle. The methodology returns or exits from blocks 1318, 1322 and 1324 through bubble 1326.

TORQUE CONVERTER LOCK-UP METHOD

Partial lock-up (PLU) of the torque converter 110 is used in transition from unlock (UL) to full lock-up (FL). This occurs when the transmission 100 is operating in "top gear", i.e., the highest gear available according to the shift lever position 606 (PRNODDL). PLU is used for steady-state slight slippage operation. From either PLU or FL operation, a return to UL operation is effected upon any of the following conditions: throttle angle less than a predetermined angle, e.g., 2 degrees, turbine speed $N_t$ less than a predetermined speed, e.g., 1400 r.p.m. in fourth gear; start of a downshift; start of a speed change in an upshift or; application of the brakes of the vehicle.

In PLU, the methodology controls the initial application of the lock-up clutch assembly 186 and maintains a limited slip condition if FL is not used. The duty cycle (DC, %ON period) of the low/reverse clutch solenoid-actuated valve 636 is calculated according to the following:

$$DC = DC(i-1) + deltaDC,$$

where $deltaDC = -0.8 \, delta \, DC(i-1) + K(E_a - A)$.

The methodology attempts to control slip at a predetermined value, e.g. 80 r.p.m. In each 0.028 second cycle, the methodology finds the slip error, which is $N_e$ minus $N_t$ minus a predetermined value such as 80 r.p.m. This and three previous slip errors are used to calculate an anticipated slip error $E_a$. The difference between $E_a$ and an anticipated error modification term A is multiplied by a gain K to give a duty cycle increment term, i.e. either the "ON" or "OFF" time of the low/reverse clutch solenoid-actuated valve 636 to cycle the LU switch valve 614. In effect, this provides a proportional-/integral/differential control with some filtering included because of the poor quality of the $N_e$ data. The other duty cycle increment term consists of a constant, such as −0.8, times the previous duty cycle increment. This provides a lead/lag to improve system stability.

This basic operation is modified in a number of ways depending on conditions. The gain K is reduced by half in second gear in recognition of the higher plant gain due to higher line pressure. Also, the gain K is high at large errors in order to gain control more quickly, and low at small errors in order to improve stability. The "A" term provides the following features: for values of error above 30 r.p.m., it causes the logic to try to control the rate of error or slip reduction to about 300 r.p.m./sec., rather than controlling the error to zero as above, in order to provide a smooth pull-in; and for values of slip below 10 r.p.m., it backs the duty cycle out somewhat faster than it would otherwise, in order to reduce the exposure to FL torsionals at low $N_t$.

The initial duty cycle is 60% in third or fourth, and 55% in second because of the higher line pressure. This value is also the upper limit for the first five cycles. Otherwise, during tip-ins (operator backs off the accelerator pedal of the vehicle), the duty cycle would increment rapidly before the lock-up clutch 186 applies, causing a sharp pull-in.

For full lock-up, once PLU has brought the slip down to 80 r.p.m., the duty cycle simply increments by 1% per cycle in order to finish the pull-in smoothly. Once 90% is reached, the methodology goes to full ON. In order to prevent immediate FL during tip-ins before the lock-up clutch 186 is applied, 0.25 seconds of PLU is required.

Figure 17:
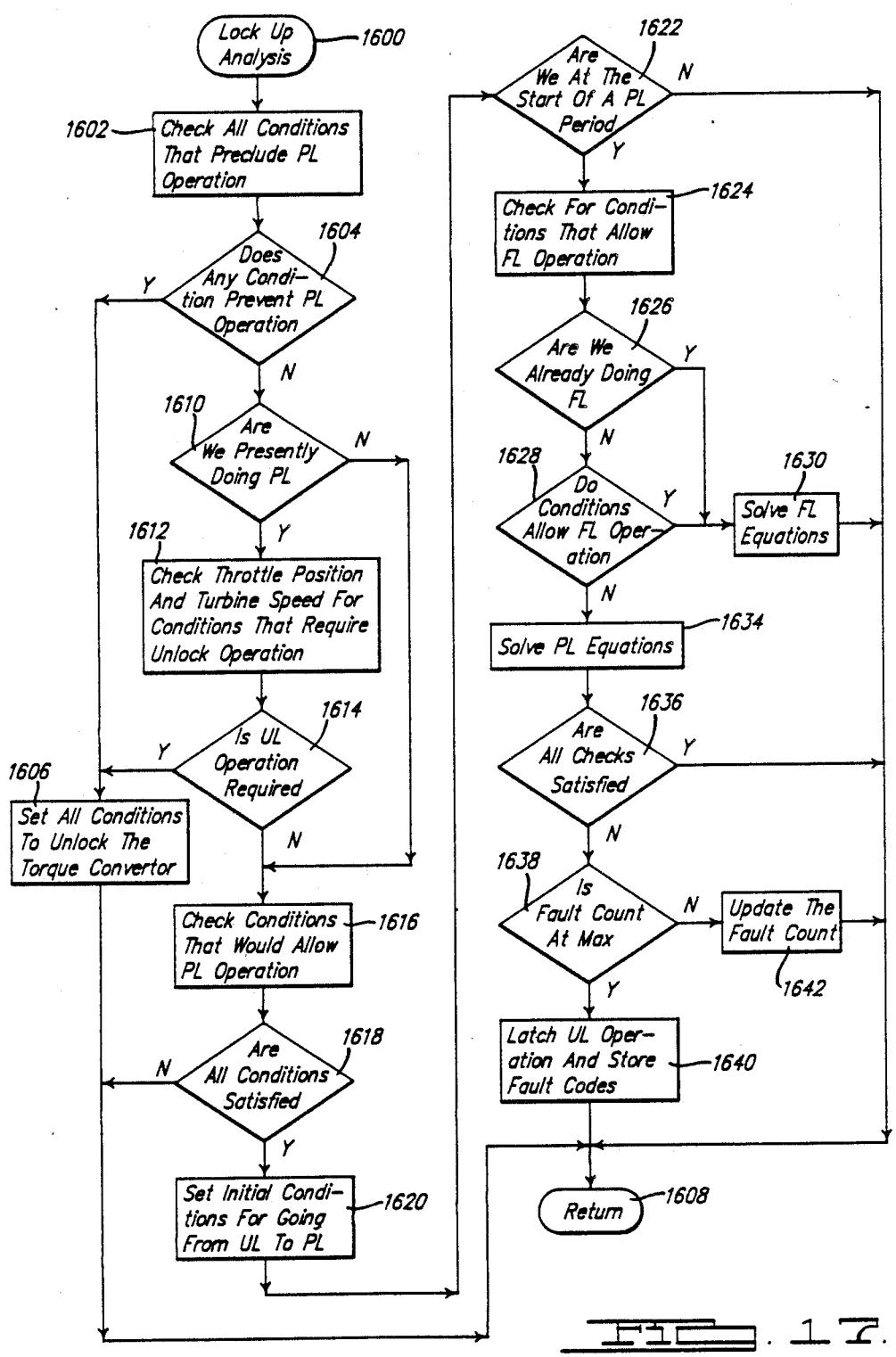
FIG. 17 is a flow chart of the lock-up methodology of FIG. 12 according to the present invention.

Referring to FIG. 17, the torque converter lock-up methodology for the partial lock-up block 834 of FIG. 12 is shown. At the start of the lock-up analysis in bubble 1600, the methodology advances to block 1602 and checks all conditions that may preclude partial lock-up operation as previously described (i.e. to unlock). The methodology advances to diamond 1604 and determines whether any of the conditions in block 1602 prevent partial lock-up operation. If any condition prevents partial lock-up operation, the methodology advances to block 1606 and sets all conditions (resets all bits in the transmission controller 3010 that were used during partial lock-up) to unlock the torque converter 110 of the transmission 100. The methodology then returns through bubble 1608.

At diamond 1604, if there are no conditions which prevent partial lock-up operation, the methodology advnces to diamond 1610 and determines whether the transmission controller 3010 is presently partial locking the torque converter 110 by looking for the absence of a flag as previously described. If partial lock-up is presently happening, the methodology advances to block 1612 and checks the position of the throttle and turbine speed $N_t$ for conditions that require lock operation as previously described. The methodology advances to diamond 1614 and determines whether unlock (UL) operation is required based on the check in block 1612. If unlock operation is required, the methodology advances to block 1606 previously described to set all conditions to unlock the torque converter 110.

If partial lock-up is not presently happening at diamond 1610 or unlock operation is not required at diamond 1614, the methodology advances to block 1616 and checks for conditions previously described that would allow partial lock-up operation (i.e. prevent unlock from occurring). The methodology advances to diamond 1618 and determines whether all the conditions in block 1616 were satisfied. If all the conditions were not satisfied, the methodology returns.

At diamond 1618, if all the conditions in block 1616 were satisfied, the methodology advances to block 1620 and sets the initial conditions (i.e. bits in the transmission controller 3010) for going from unlock to partial lock-up. The methodology advances to diamond 1622 and determines whether the methodology is at the start of a partial lock-up time period, i.e. the starting point of a time period for the duty cycle of valve 636. This is accomplished by looking at a counter in the transmission controller 3010 which cycles from zero to four (zero being the start of a time period). If the methodology is not at the start of a partial lock-up time period, the methodology returns.

If the methodology is at the start of a partial lock-up time period, the methodology advances to block 1624 and checks for conditions that allow full lock-up (FL) operation (i.e. prevent unlock from occurring). The methodology advances to diamond 1626 and determines whether full lock-up of the torque converter 110 is already occurring by looking for a flag as previously described. If full lock-up is not occurring, the methodology advances to diamond 1628 and determines whether all conditions checked in block 1624 allow full lock-up operation. If all conditions allow full lock-up operation or full lock-up is already occurring at diamond 1626, the methodology advances to block 1630 and solves the equation, previously described, for full lock-up. The methodology then returns.

At diamond 1628, if any of the conditions in block 1624 do not allow full lock-up operation, the methodology advances to block 1634 and solves the equations, previously described, for partial lock-up. The methodology then advances to diamond 1636 and determines whether all checks that preclude partial lock-up operation, as previously described, were satisfied. If all checks or conditions were not satisfied, the methodology advances to diamond 1638 and determines whether the fault count is at or exceeds a predetermined maximum value. If the fault count is at the predetermined maximum value, the methodology advances to block 1640 and performs unlock operation and stores the fault codes in memory of the transmission controller 3010. If the fault count is not at the predetermined maximum value, the methodology advances to block 1642 and updates the fault count. The methodology returns from blocks 1640 and 1642. Also, if all safety checks were satisfied at diamond 1626, the methodology returns.

ADAPTIVE IDLE METHOD

The present invention provides an "adaptive idle" method. Adaptive idle is a feature whereby in the idle condition with the engine idling and the vehicle stopped in "OD", "D", or "L", the PRNODDL position is almost like a neutral, i.e. resulting in a turbine-free idle, in contrast to a normal turbine-installed idle. This reduction in torque converter torque reduces engine torque, and thus improves idle fuel consumption.

A true neutral idle under these conditions is not possible, because this implies a complete release of one of the first gear friction elements (the underdrive clutch 302 in this case). Then, when the throttle is opened, the clutch apply cavity must fill, with the engine and turbine running away before the clutch can apply; a highly unsatisfactory launch will result.

In the near-neutral adaptive idle strategy, the underdrive clutch 302 is maintained at a very lightly applied condition, ready to pick up torque when the throttle is opened. This condition is inferred from a slight difference between engine $N_e$ and turbine $N_t$ speeds, and thus the strategy is to control the duty cycle of the underdrive clutch solenoid-actuated valve 630 for the underdrive clutch 302 to maintain this difference. The target turbine speed $(N_j)$ is 50 r.p.m. below engine speed $N_e$ if the engine speed $N_e$ is at or below its target (AIS), then decreases as the engine speed $N_e$ increases above this. The duty cycle control is a proportional/integral/differential control based on turbine speed error (actual versus target).

If the throttle is opened or if the vehicle is rolling at more than a few miles per hour, adaptive idle exit is triggered. It may be that brake-off triggers the exit as well; this is intended as a feature to prevent a driver from leaving the car while it is in adaptive idle, by returning it to a normal creep idle condition if the driver removes their foot from the brake. The adaptive idle exit routine increases the duty cycle until turbine deceleration is detected, then goes to a proportional/integral turbine deceleration control, with desired turbine deceleration increasing with throttle opening. A direct throttle effect on duty cycle is also included in order to get earlier response and thus prevent runaway as previously described.

To allow for quick response on vehicle launch, the underdrive clutch 302 is not fully released, but is allowed to slip. The amount of slip is controlled by duty cycling the underdrive clutch 302 using a "steady state" adaptive idle equation. Upon vehicle launch (adaptive idle exit), the rate at which the underdrive clutch 302 is applied is controlled by duty cycling the underdrive clutch 302 using an "exit" adaptive idle equation to allow for smooth clutch application. Since adaptive idle unloads the engine when the vehicle is brought to a stop, the engine can be idled at a lower speed which will cause an increase in fuel economy.

Figure 18A:
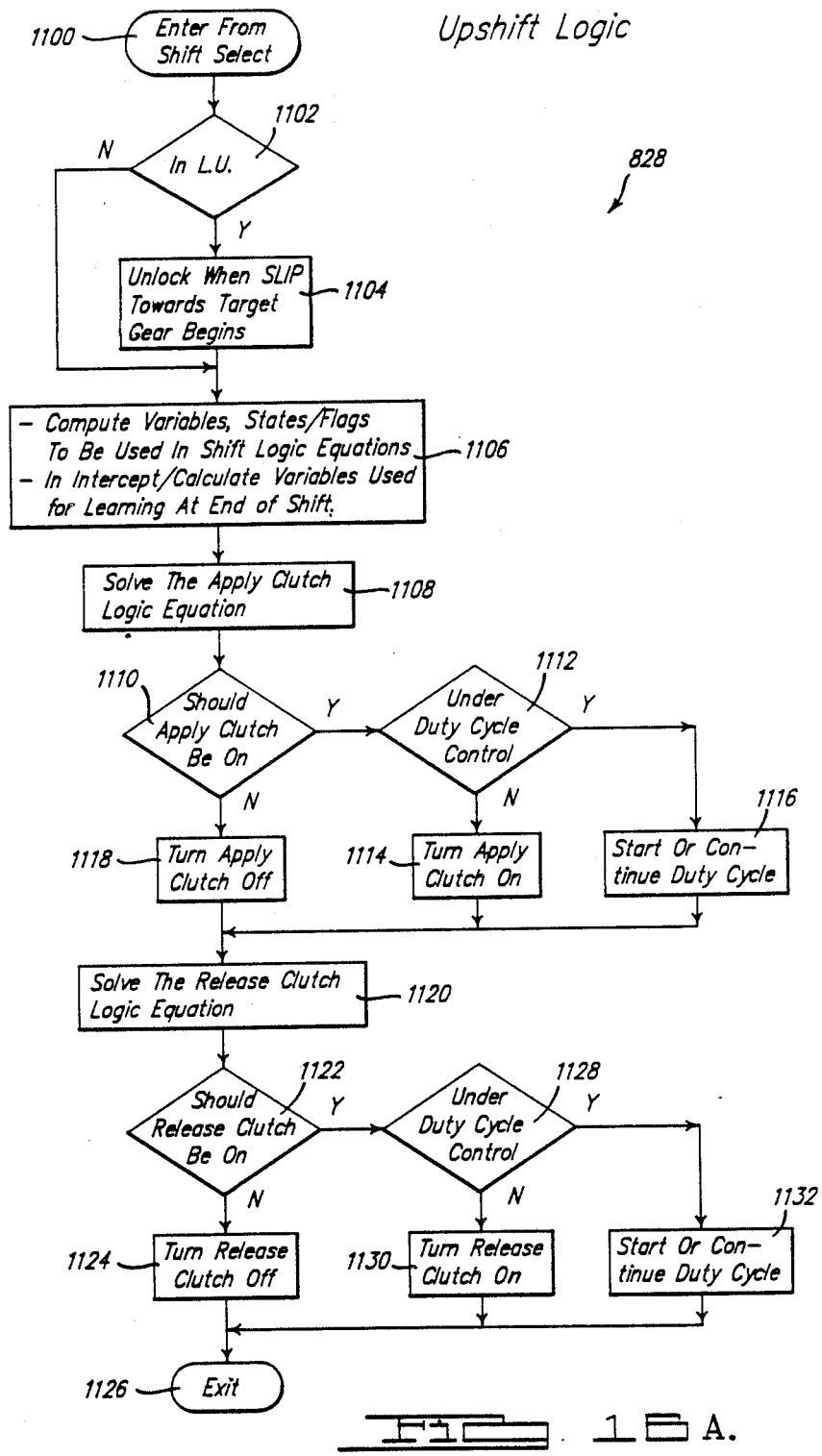
FIGS. 18A-C illustrate the adaptive idle methodology according to the present invention.

Referring to FIG. 18A, the adaptive idle methodology 1700 is shown. At the start of the adaptive idle in bubble 1702, the methodology advances to block 1704 to solve an adaptive idle conditions equation. The adaptive idle condition equations may be defined as follows:

SET: (Throttle angle less than 2°) and ($N_o$ less than 250 r.p.m.) and (BRAKE-ON)

CLEAR: (Throttle angle greater than 4°) or ($N_o$ greater than or equal to 250 r.p.m.) or (BRAKE-OFF)

The above conditions have to be met to get into or out of adaptive idle. The result of the above equations is for setting or clearing a flag which is stored. The methodology advances to diamond 1706 and determines whether adaptive idle is in a "steady state" mode (FIG. 18C) by looking for a flag or performing calculations of speed for example. If adaptive idle is not in the steady state mode, the methodology advances to diamond 1708.

At diamond 1708, the transmission controller 3010 determines whether adaptive idle is in an adaptive idle "exit" mode (FIG. 18C) by looking for a flag or performing calculations of speed for example. If not, the methodology advances to diamond 1710 and determines whether the adaptive idle conditions previously described are true by looking for a flag of block 1704. If the adaptive idle conditions are not true, the methodology advances to block 1712 and turns ON or applies the underdrive clutch 302. The methodology then returns through bubble 1714.

Figure 18B:
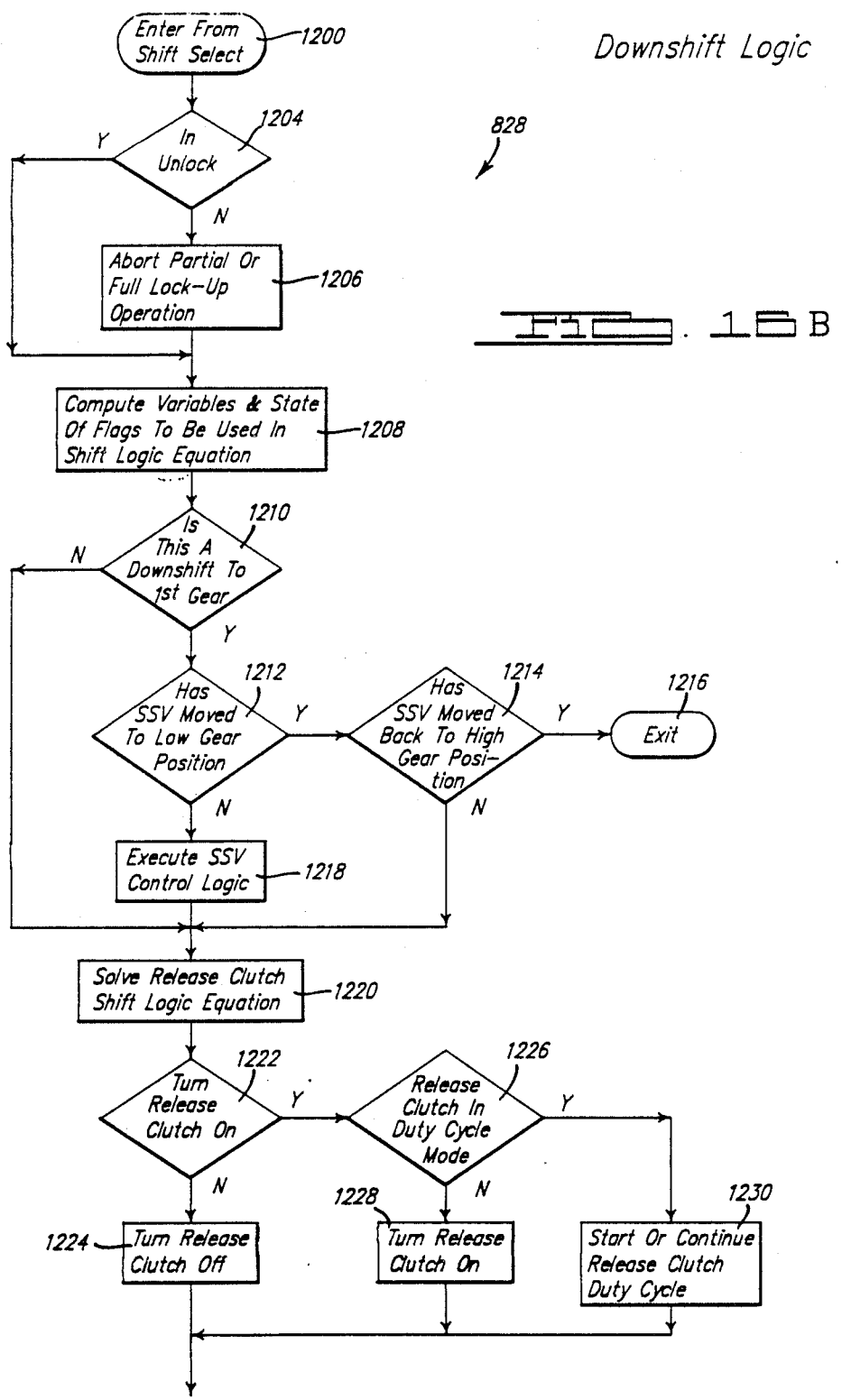
Figure 18A:
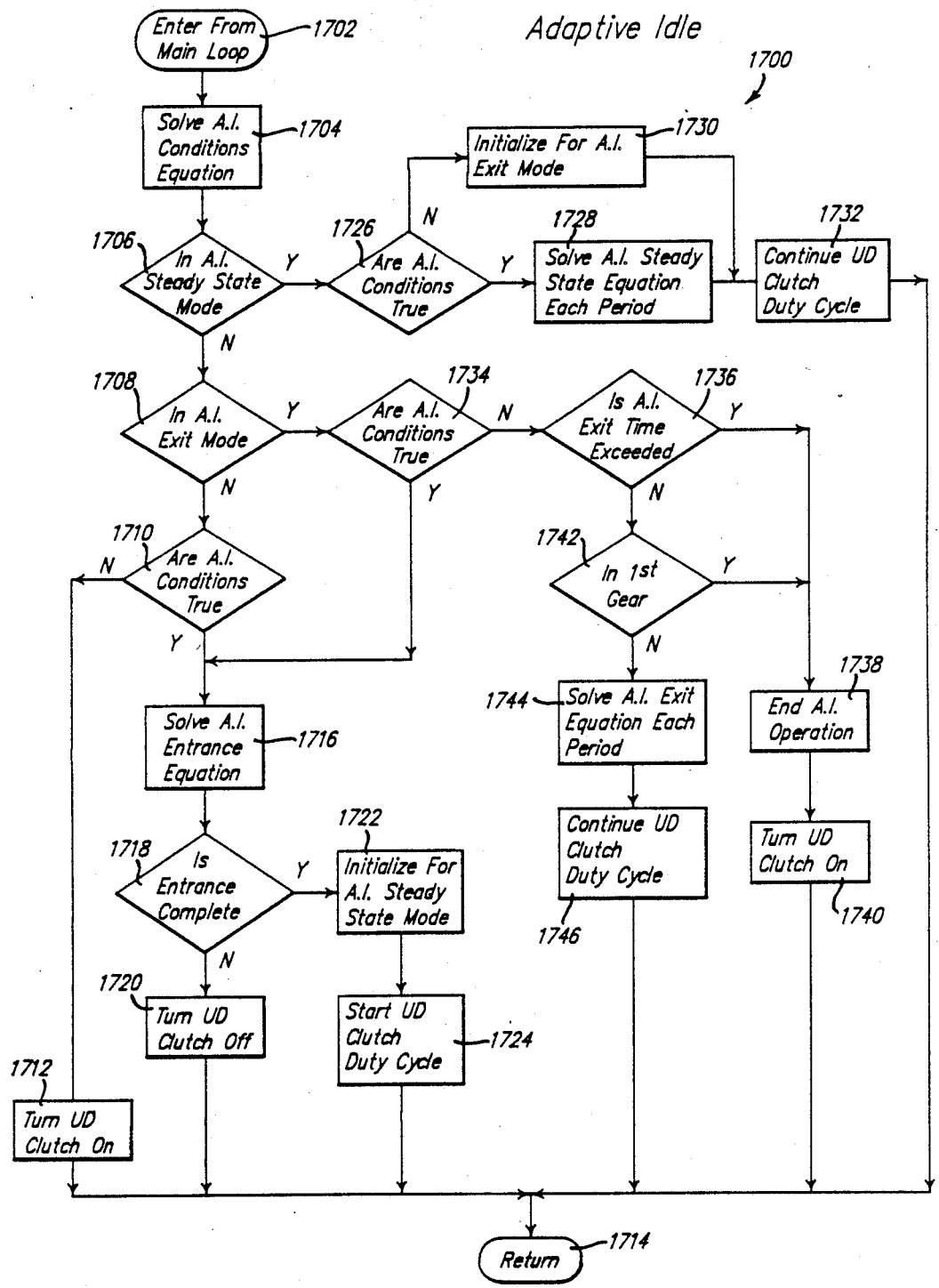
Figure 18B:
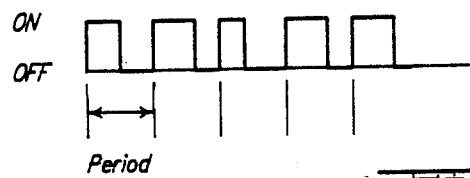
Figure 18C:
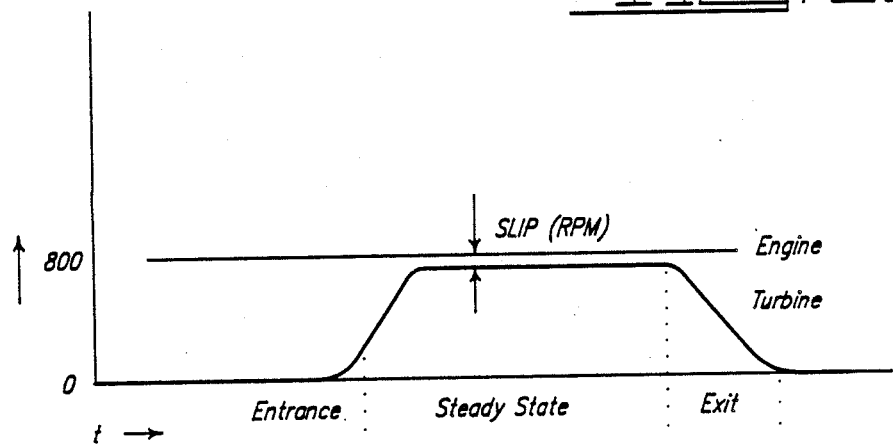

At diamond 1710, if the adaptive idle conditions are true, the methodology advances to block 1716 to solve the adaptive idle entrance equation, representing part of the curve illustrated in FIG. 18C. The adaptive idle entrance equation may be defined as follows:

$T(i) = 0$ until $[N_t(i)$ is greater than first gear $N_t$ plus 50 r.p.m.] and $[N_t(i)$ is greater than 100 r.p.m.], then $T(i) = 7700$ for one cycle In the above equations, $T(i)$ is the calculated ON time of the underdrive clutch solenoid-actuated valve 630 at the start of each cycle, and $N_t(i)$ is the current turbine speed. The underdrive clutch 302 is kept fully OFF (i.e. $T(i) = 0$) until adaptive idle conditions are met. The methodology advances to diamond 1718 and determines whether the entrance into adaptive idle is complete by looking for a flag or performing calculations of speed for example. If the entrance is not complete, the methodology advances to block 1720 and turns OFF or disengages the underdrive clutch 302. If the entrance is complete, the methodology advances to block 1722 and initializes predetermined variables such as the percent ON time (i.e. $T(i) = 7700$ for one cycle) for adaptive idle steady state mode. The methodology advances to block 1724 and starts the duty cycle of the solenoid-actuated valve 630 for the underdrive clutch 302. The methodology then returns through bubble 1714.

At diamond 1706, if the transmission 100 is in the adaptive idle steady state mode, the methodology advances to diamond 1726 and determines whether the adaptive idle conditions previously described in block 1704 are true by looking for a flag. If the adaptive idle conditions are true, the methodology advances to block 1728 and solves the adaptive idle steady state equation each predetermined time period of the duty cycle (See FIG. 18B). The steady state equation may be defined as follows:

$$T(i) = T(i-1) + 36[N_t(i) - N_t(i-1)] - 24[N_t(i-1) - N_t(i-2)] + 4[N_t(i) = N_d]$$

where:
 $T(i-1)$ = previous cycle ON time for the solenoid of the solenoid-actuated valve; and
 $N_d$ = desired turbine speed.

If the adaptive idle conditions are not true, the methodology advances to block 1730 and initializes predetermined variables previously described for the adaptive idle exit mode, representing part of the curve illustrated in FIG. 18C. The exit equation may be initialized as follows:

$T(i) = T_{AI} + 8400$ until ($a_t$ is less than $-500$), then
 $T(i) = 0.8 T_{AI} + 2240$ for one cycle, where:
 $T_{AI}$ = last $T(i)$ in adaptive idle before adaptive idle exit The methodology advances from block 1728 and 1730 to block 1732 and continues the duty cycle for the underdrive clutch 302. The methodology then returns through bubble 1714.

At diamond 1708, if the transmission 100 is in the adaptive idle exit mode, the methodology advances to diamond 1734 and determines whether the adaptive idle conditions in block 1704 previously described are true by looking for a flag. If the adaptive idle conditions are true, the methodology advances to block 1716 previously described to solve the adaptive idle entrance equation. If the adaptive idle conditions are not true, the methodology advances to diamond 1736 and determines whether a predetermined adaptive idle exit time has been exceeded by looking at a timer. If the adaptive idle exit time has been exceeded, the methodology advances to block 1738 and ends adaptive idle operation. The methodology advances to block 1740 and turns ON or applies the underdrive clutch 302. The methodology then returns through bubble 1714.

At diamond 1736, if the adaptive idle exit time has not been exceeded, the methodology advances to diamond 1742 and determines whether the transmission 100 is presently in first gear by looking at speed ratios of $N_t$ to $N_o$. If the transmission 100 is presently in first gear, the methodology advances to block 1738 previously described to end adaptive idle operation. If the transmission 100 is not presently in first gear, the methodology advances to block 1744 and solves the adaptive idle exit equation each time period of the duty cycle. The exit equation may be defined as follows:

$$T(i) = T(i-1) + 52[N_t(i) - N_t(i-1)] - 34[N_t(i-1) - N_t(i-2)] + 700 + 14 Thr(i) + 258[Thr(i) - Thr(i-1)],$$

where:
 $Thr(i)$ = current throttle angle

The methodology advances to block 1746 and continues the duty cycle of the solenoid-actuated valve 630 for the underdrive clutch 302. The methodology then returns.

PRNODDL METHOD

The PRNODDL method is used to read sensors sensing the position of the manual lever 578 to determine the drive-selected operating mode or shift lever position 606, i.e. PRNODDL. Referring to FIG. 4B, the manual shaft 591 is connected to the manual lever 578. Neutral start grounding contacts of contact switch sensors (NS$_1$ and NS$_2$) threadably engage the transmission case 102 and are in radial alignment with a pair of circumferentially spaced outwardly extending projections or metal areas 3084 (FIG. 19) when the shift lever position is park P. The metal areas 3084 extend through an insulator or cap member 578a made of plastic and disposed partially and circumferentially about the manual lever 578. The contact switch sensors NS$_1$ and NS$_2$ can only be grounded when they are in radial alignment with the metal areas 3084 on the manual lever 578. A further detailed description of the structure is found under the "ADAPTIVE CONTROL CIRCUITS" heading.

The gear selector or shift lever position (PRNODDL) is measured by the contact switch sensors NS$_1$ and NS$_2$. Reverse light contacts (RL$_1$ and RL$_2$ in FIG. 19) are connected to the backup lights of the vehicle in a known manner. NS$_1$ can only be grounded in park P and neutral N. The contact switch sensors NS$_1$ and NS$_2$ cannot be grounded with RL contacts closed. As a result, the contact switch sensors NS$_1$ and NS$_2$ make electrical contact with the RL contacts when the manual lever 578 is in the reverse position. Hence, continuity to the backup lights can only exist in reverse R.

Figure 19:
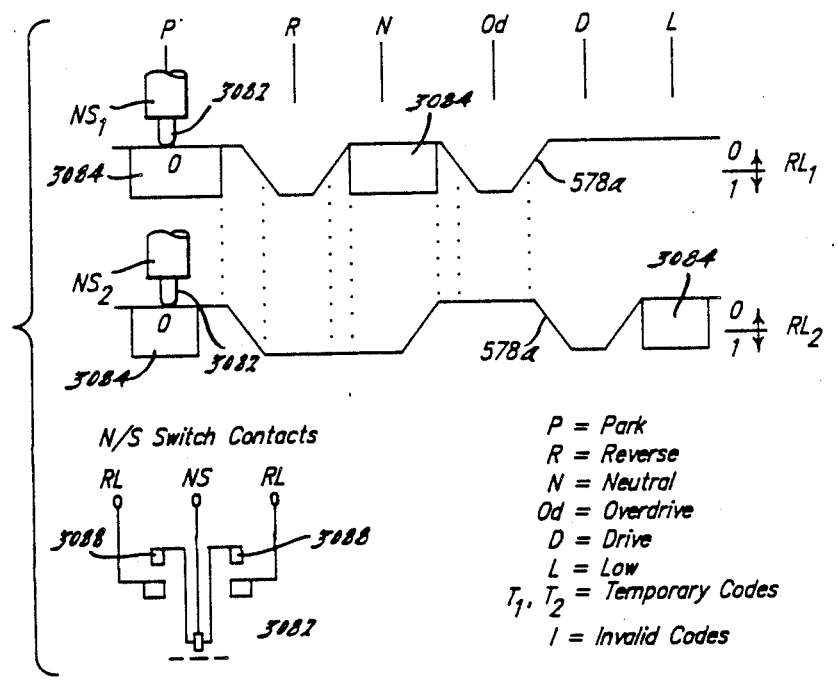
FIG. 19 is a schematic diagram of the PRNODDL methodology of FIG. 12 according to the present invention.

Referring to FIG. 19, the PRNODDL method is shown schematically. The manual lever 578 and cap member 57a act as a cam and the contact switch sensors NS$_1$ and NS$_2$ act as the follower. NS$_1$ and NS$_2$ provide a binary zero input when the center terminal or spring loaded contact pin 3082 is grounded by contacting the metal areas 3084 on the manual lever in 578. RL$_1$ and RL$_2$ provide a zero whenever the manual lever 578 pushes spring loaded contact pin 3082 on the contact switch sensors NS$_1$ and NS$_2$ upward disconnecting two internal contacts 3088 of the contact switch sensors NS$_1$ and NS$_2$ with the RL contacts. For example, in P, NS$_1$, NS$_2$, and RL$_1$, RL$_2$ provide a zero input. The remaining inputs are shown in the table below:

|       | P | R    | N | OD   | D | L |
|-------|---|------|---|------|---|---|
| NS$_1$ | 0 | 0 1 1 | 1 1 0 | 0 1 | 1 1 1 | 1 |
| RL$_1$ | 0 | 0 0 0 | 1 0 0 | 0 0 | 1 0 0 | 0 |
| NS$_2$ | 0 | 1 1 1 | 1 1 1 | 1 1 | 1 1 1 | 0 |
| RL$_2$ | 0 | 0 0 1 | 1 1 1 | 0 0 | 0 0 1 | 0 |
| CODE  | P | T$_1$T$_2$D | R D N | T$_1$T$_2$ | OD T$_2$ D | T$_2$ L |

The PRNODDL codes are verified by pressure switch data to be described herein. If the engine of the vehicle is running ($N_e$ is less than 500 r.p.m.), the transmission controller 3010 checks its permanent memory to see if the PRNODDL code determined above corresponds with pressure switch data from the pressure switches 646, 648 and 650 (FIGS. 5A–L) at the last "Engine running" check ("PRNODDL OK"). If the data corresponds, the transmission controller 3010 displays a valid PRNODDL code. If data does not correspond, the transmission controller 3010 displays "??" and reports "PRNODDL Failures—Engine Off" to permanent menory.

If the engine is running at or above a predetermined speed ($N_e$ equal or greater than 500 r.p.m.), the transmission controller 3010 reads the PRNODDL code as above-described. If PRNODDL code is valid, the transmission controller 3010 verifies with the pressure switch data in the table below:

| PRNODDL CODE/PRESSURE SWITCH | LR | 2-4 | OD |
|---|---|---|---|
| PN | ON | OFF | OFF |
| R | OFF | OFF | OFF |
| OD,D,L | ON | ON | ON |

SHIFT LEVER POSITION METHODOLOGY

The transmission control logic relies on the Shift Lever Position (SLP) methodology to identify the mode of transmission operation selected by the driver to provide hysteresis between the PRNODDL positions, and to permit limited operation of the transmission controller 3010 without functioning PRNODDL contact switch sensors ($NS_1$, $NS_2$, $RL_1$, $RL_2$) by utilizing pressure switch data from the pressure switches 646, 648 and 650 (FIGS. 5A-L) to identify the three hydraulic modes of operation (i.e. reverse R, neutral N and drive D). In the SLP methodology, P, R, N, and OD (overdrive) PRNODDL codes are accepted as being valid without regard to pressure switch data since the corresponding hydraulic porting (park and neutral are identical) condition must occur first. Testing for SLP position (checking pressure switch input) is only done with temporary or invalid codes present since this is the area where hydraulic porting changes occur.

Figure 20A:
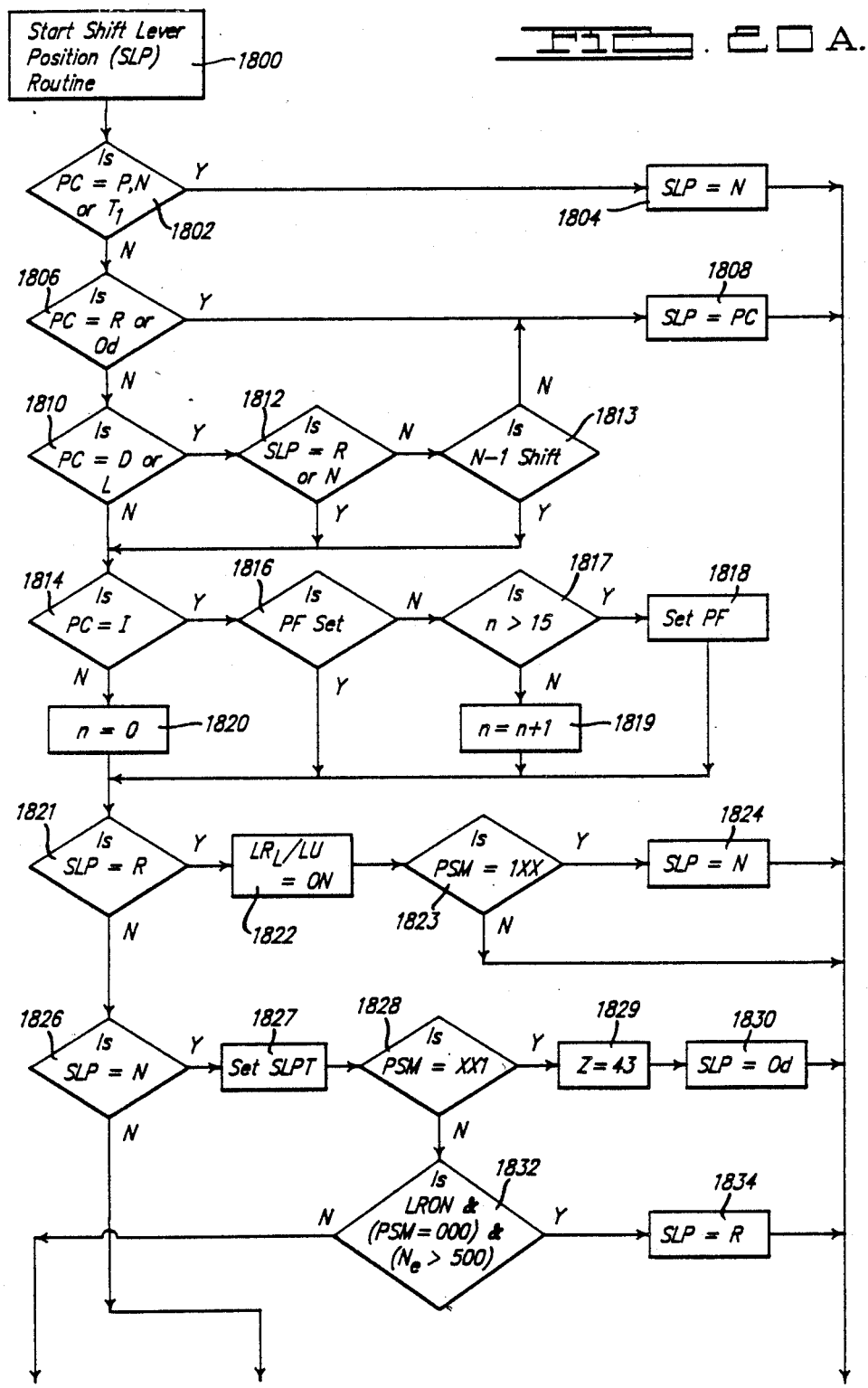
FIGS. 20A and 20B are flow charts of the shift lever position methodology according to the present invention.
Figure 20B:
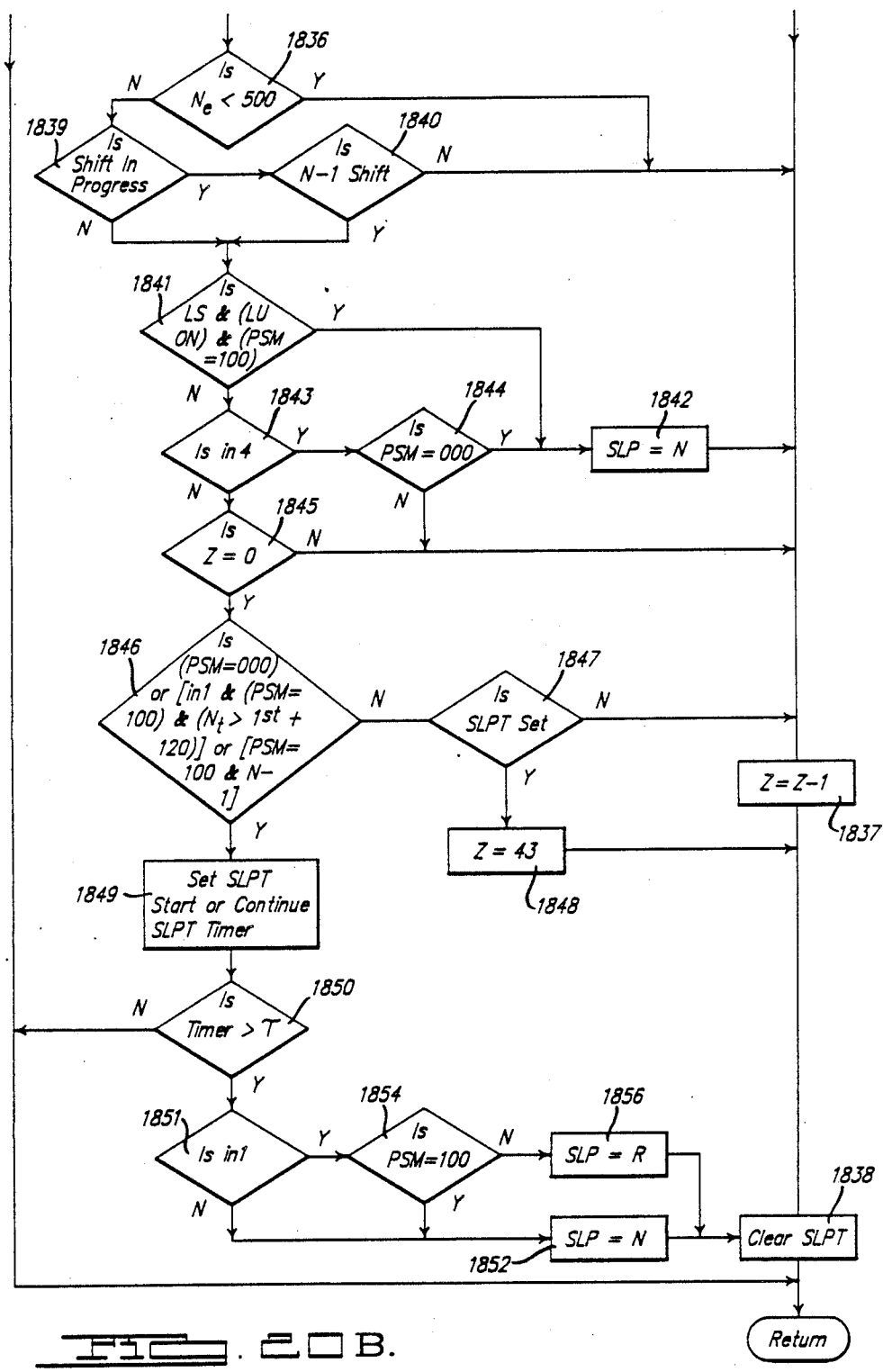

Referring to FIGS. 20A and 20B, the shift lever position (SLP) methodology is shown. At the beginning in block 1800, the methodology advances to diamond 1802 and determines whether the PRNODDL code (PC) from the sensors ($NS_1$, $NS_2$, $RL_1$, $RL_2$) is equal to a code for park P, neutral N or a temporary code ($T_1$) stored in memory in the transmission controller 3010. If PC is equal to park, reverse or a temporary code, the methodology advances to block 1804 and sets the shift lever position (SLP) 606 (FIGS. 5A-L) equal to neutral. If PC is not equal to park, neutral or a temporary code, the methodology advances to diamond 1806 and determines whether PC is equal to reverse R or overdrive OD. If PC equals reverse or overdrive, the methodology advances to block 1808 and sets the SLP 606 equal to PC. If PC is not equal to reverse or overdrive, the methodology advances to diamond 1810 and determines whether PC is in drive D or low L. If PC is drive or low, the methodology advances to diamond 1812 and determines whether SLP 606 is reverse or neutral. If SLP 606 is not reverse or neutral, the methodology advances to diamond 1813 and determines whether a neutral to first gear (N−1) shift is in progress by looking for a flag. If a neutral to first gear shift is not in progress, the methodology advances to block 1808 previously described and sets SLP 606 equal to PC.

If SLP 606 is reverse or neutral at diamond 1812, or PC does not equal drive or low at diamond 1810, or a neutral to first gear shift is in progress, the methodology advances to diamond 1814 and determines whether PC equals an invalid code (I) stored in memory. If PC is an invalid code, the methodology advances to diamond 1816 and determines whether a PRNODDL FAIL (PF) flag has been set. If PF has not been set, the methodology advances to block 1817 and determines whether a count n on a counter is greater than a predetermined value such as 15. If the count n is greater than the predetermined value, the methodology advances to block 1818 and sets PF. If the count n is not greater than the predetermined value, the methodology advances to block 1819 and increments the count n. The methodology then advances to diamond 1821. If PC is not an invalid code at diamond 1814, the methodology advances to block 1820 and sets the count n on the counter equal to a predetermined value such as zero. The methodology then advances to diamond 1821. If PF was previously set at diamond 1816 or once the PF flag has been set at diamond 1818, the methodology advances to diamond 1821 and determines whether SLP 606 is reverse. If SLP is reverse, the methodology advances to block 1822 and turns ON the low/reverse clutch solenoid-actuated valve 636. The methodology then advances to diamond 1823 and determines whether the low/reverse pressure switch 650 is equal to one or pressurized. If the low/reverse pressure switch 650 is equal to one, the methodology advances to block 1824 and sets SLP 606 equal to neutral. This occurs because the low/reverse pressure switch 650 is pressurized or producing a signal equal of one (See FIG. 5A) only when the transmission 100 is not in reverse gear and the low/reverse clutch 310 is being applied. If the low/reverse pressure switch 650 is not equal to one, the methodology advances to block 1837 to be described.

If SLP 606 is not reverse at diamond 1821, the methodology advances to diamond 1826 and determines whether SLP 606 is equal to neutral. If SLP is neutral, the methodology advances to block 1827 to set an SLP test flag. The methodology then advances to diamond 1828 and determines whether the overdrive pressure switch 646 is equal to one or pressurized. If the overdrive pressure switch 646 equals one, the methodology advances to block 1824 and sets a count Z on a counter equal to a predetermined value such as 43. The methodology then advances to block 1830 and sets SLP 606 equal to overdrive OD. This occurs because the overdrive clutch 304 is being applied when the overdrive pressure switch 646 is pressurized or producing a signal equal to one (See FIG. 5H). If the overdrive pressure switch 646 does not equal one, the methodology advances to diamond 1832 and determines whether the low/reverse solenoid-actuated valve 656 is ON, the pressure switches 646, 648 and 650 are not pressurized or are equal to zero (See FIG. 5C) and $N_e$ is greater than a predetermined value, i.e. 500 r.p.m. If that criteria is true, the methodology advances to block 1834 and sets SLP 606 equal to reverse. If that criteria is not true, the methodology returns.

At diamond 1826, if SLP 606 is not neutral, the methodology advances to diamond 1836 and determines whether engine speed $N_e$ is less than a predetermined speed, i.e. 500 r.p.m. If engine speed $N_e$ is less than the predetermined speed, the methodology advances to block 1837 and decrements the count Z on the counter by a predetermined value. The methodology then advances to block 1838 and clears the SLP test flag. The methodology then returns. If engine speed $N_e$ is not less than the predetermined speed, the methodology advances to diamond 1839 and determines whether a shift is in progress or occurring by looking for a flag. If the shift is in progress, the methodology advances to diamond 1840 and determines whether a neutral to first gear shift is in progress as previously described. If a neutral to first gear shift is not in progress, the methodology advances to block 1837 previously described. If the shift is not in progress, or a neutral to first gear shift is in progress, the methodology advances to diamond 1841 and determines whether the LU switch valve 614 is being applied as a result of the low/reverse element solenoid-actuated valve 636 being energized or on and low/reverse pressure switch 650 equals one and both the two/four 648 and overdrive 646 pressure switches equal zero. If that criteria is true, the methodology advances to block 1842 and sets SLP 606 equal to neutral. If that criteria is not true, the methodology advances to diamond 1843 and determines whether the transmission 100 is presently in fourth gear by calculating speeds. If the transmission 100 is presently is fourth gear, the methodology advances to diamond 1844 and determines whether the pressure switches 646, 648 and 650 equal zero. If the pressure switches equal zero, the methodology advances to block 1842 previously described. If all the pressure switches 645, 648 and 650 do not equal zero, the methodology advances to block 1837 previously described.

If the transmission 100 is not presently in fourth gear, the methodology advances to diamond 1845 and determines whether count Z equals a predetermined value such as zero. If Z does not equal zero, the methodology advances to block 1837 previously described. If Z equals zero, the methodology advances to diamond 1846 and determines whether the transmission 100 is presently in first gear by speed calculations, the low/reverse pressure switch 650 equals one and turbine speed $N_t$ is greater than a predetermined r.p.m., or the pressure switches 646, 648 and 650 equal zero, or the low/reverse pressure switch 650 equals one and a neutral to first gear shift is in progress. If any of that criteria is not true, the methodology advances to diamond 1847 and determines whether the SLP test flag has been set. If the SLPT flag has not been set, the methodology advances to block 1837 previously described. If the SLP test flag has been set, the methodology advances to block 1848 and sets Z equal to a predetermined value such as 43. The methodology then advances to block 1838 previously described. If any of the criteria in diamond 1846 is true, the methodology advances to block 1849 and sets the SLP test flag and starts or continues a SLP timer (SLPT). The methodology then advances to diamond 1850 and determines whether the time on the SLPT timer is greater than a predetermined time period. If the time on the SLPT timer is not greater than the predetermined time period, the methodology returns. If the time on the SLPT timer is greater than the predetermined time period, the methodology advances to diamond 1851 and determines whether the transmission 100 is operating in first gear by performing speed calculations. If the transmission 100 is not operating in first gear, the methodology advances to block 1852 and sets SLP 606 equal to neutral. The methodology then advances to block 1848 previously described. If the transmission 100 is operating in first gear, the methodology advances to diamond 1854 and determines whether the low/reverse pressure switch 650 equals one. If the low/reverse pressure switch 650 does not equal one, the methodology advances to block 1856 and sets SLP 606 equal to reverse (See FIG. 5C). The methodology then advances to block 1838 previously described. If the low/reverse pressure switch 650 does equal one, the methodology advances to block 1852 and sets SLP 606 equal to neutral (See FIG. 5A). The methodology then advances to block 1838 previously described.

ACCELERATION CALCULATION

The purpose of the acceleration calculation is to control transmission operation during a shift or gear change. The acceleration calculation determines the actual acceleration of the turbine 128. This is a major factor in determining overall response of the control system.

Referring to FIG. 12, the calculated speed bubble 806 is illustrated. At most speeds, the speed calculation is made by counting the number of teeth 319, 544 during a predetermined cycle and dividing that tooth count by the actual time elapsed between the first and last tooth. Time is measured by counting clock cycles in the transmission controller 3010. The tooth center lines are determined by reading a magnetic sensor 320, 546 for the sixty-tooth input clutch retainer hub 312 for turbine speed $N_t$, and for the twenty-four-tooth second planet carrier 524 for output speed $N_o$, respectively. At lower speeds, when no tooth passes during the 7 millisecond (ms.) cycle, the update rate must be extended to more than one predetermined cycle, i.e. 14 ms., 21 ms., etc., to provide data down to the minimum speed needed.

Referring to FIG. 12, the calculated acceleration bubble 860 is illustrated. Acceleration is calculated by dividing the speed change between the last two measurements by the average of the two elapsed times.

$$N_t = n(i)/T(i)$$

$$\text{alpha}_t = \frac{N_t - n(i-1)/T(i-1)}{0.5[T(i) + T(i-1)]}$$

$$N_o = \frac{60n(i)}{24T(i)}$$

$N_t$ = calculated turbine r.p.m.
$N_o$ = calculated output r.p.m.
$\text{alpha}_t$ $\alpha_t$ = calculated turbine acceleration, r.p.m./sec.
$n(i)$ = no. of teeth in latest count
$n(i-1)$ = no. of teeth in previous count
$T(i)$ = time required for $n(i)$ teeth, seconds
$T(i-1)$ = time required for $n(i-1)$ teeth, etc.

For turbine speed $N_t$ and acceleration $\text{alpha}_t$, the calculation range is from 40 to 6500 r.p.m. Acceleration must be calculated as soon as practical after reading turbine speed data because any time use slows the overall system response. For output speed $N_o$, the calculation range is from 40 to 6000 r.p.m. Due to problems with low speed data integrity, the maximum change for any update must be limited to plus/minus 30 r.p.m. when the previous output speed is less than 300 r.p.m.

At low speeds (below about 1500 r.p.m.), an alternate method of calculating turbine acceleration is used. At higher speeds, however, the run-out inherent in the turbine speed wheel would generate a large first-order alternating acceleration term if this approach were used, thus interfering with good control.

To overcome this, a first-order filter is employed, which calculated acceleration over an entire revolution. Speed is calculated based on each quarter-revolution, the fourth previous speed (one revolution before) is subtracted, and the difference is divided by the time for the one revolution. Because this acceleration calculation is more delayed, particularly at low speed, anticipation is necessary in order to achieve acceptable frequency response.

The following table defines the speed and acceleration calculations as functions of $\Omega$, the number of quarter revolutions times. $\Omega=0$ represents low speed operation. As the turbine accelerates, when 11 or more teeth (out of 60) pass in 7 ms., the switch to quarter revolution is initiated and $\Omega$ begins to increment. After the fifth quarter revolution, one revolution acceleration can be calculated; and after two more quarter revolutions anticipation is effected. Low speed operation is resumed when more than 11.3 ms. is required for a quarter revolution.

| $\Omega$ | $N_t$ | $\alpha(i)$ | $\alpha_t$ |
|---|---|---|---|
| 0 | $n(i)/T(i)$ | $\dfrac{N_t - n(i-1)/T(i-1)}{.5 * [T(i) + T(i-1)]}$ | $\alpha(i)$ |
| 1 | $15/T(i)$ | " | " |
| 2-4 | " | $\dfrac{N_t - 15/T(i-1)}{.5 * [T(i) + T(i-1)]}$ | " |
| 5-6 | " | $\dfrac{N_t - 15/T(i-4)}{2 * [T(i) + T(i-4)]}$ | " |
| 7 | " | " | $\alpha_a$ | where:
n(i)=no. of teeth in latest count (assuming 60-tooth wheel)
n(i−1)=no. of teeth in previous count
T(i)=time required for n(i) teeth, seconds
T(i−1)=time required for n(i−1) teeth, etc.
$N_t$=calculated turbine r.p.m.
$\alpha(i)$=calculated turbine acceleration, r.p.m./sec.
$\alpha_t$=turbine acceleration term for use in shift logic
$\alpha_a$=anticipated turbine acceleration, where
$\alpha_a=(\frac{1}{4})*[(36-3B)*\alpha(i)-(52-5B)*\alpha(i-1)+(20-2B)*\alpha(i-2)]$
$\alpha(i-1)$=calculated accel. for previous quarter revolution, etc.
B=INT [$N_t/512$]; limit B≧9

PRESSURE SWITCH TEST AND TRANSMISSION TEMPERATURE DETERMINATION METHOD

The purpose of the pressure switch test method is to verify that "OFF" element or clutch pressure switches will read high if a failure should occur. The purpose of the transmission temperature determination method is to determine when the transmission 100 has warmed up sufficiently to impose normal response requirements when the transmission controller 3010 sets the initial transmission temperature range (r) to either "warm" or "cold".

Figure 21A:
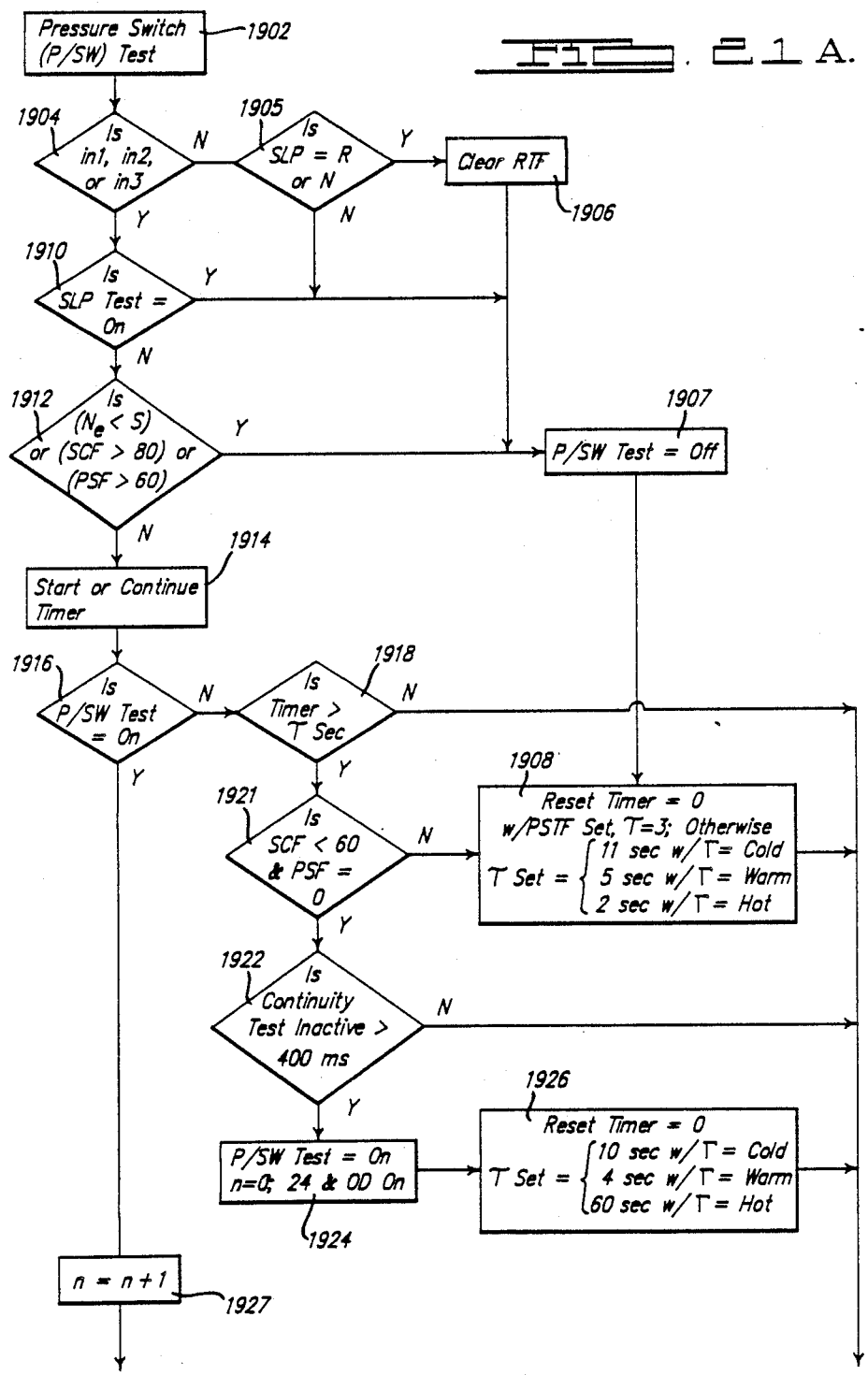
FIGS. 21A-D illustrate the transmission temperature determination methodology according to the present invention.
Figure 21B:
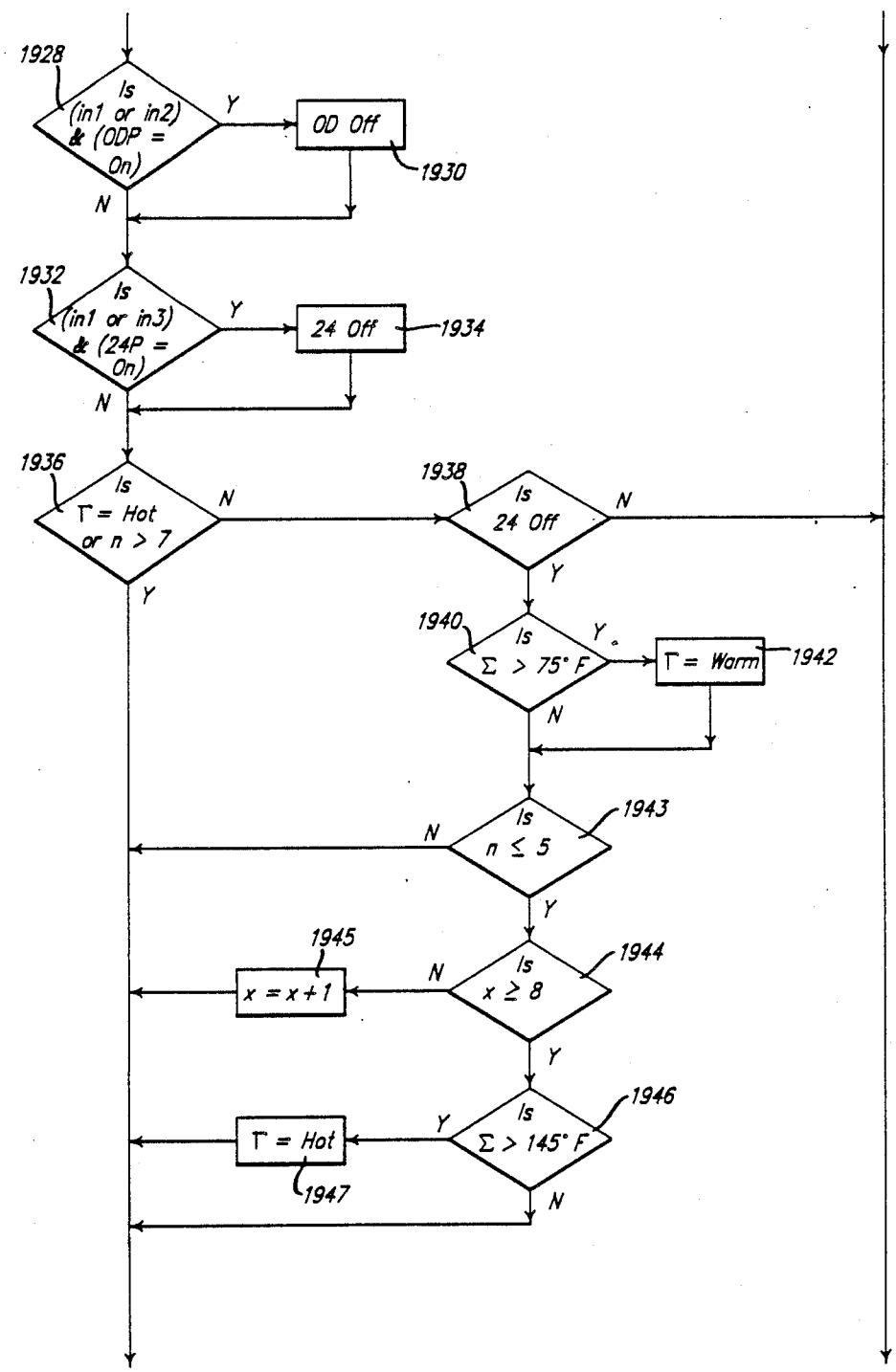
Figure 21C:
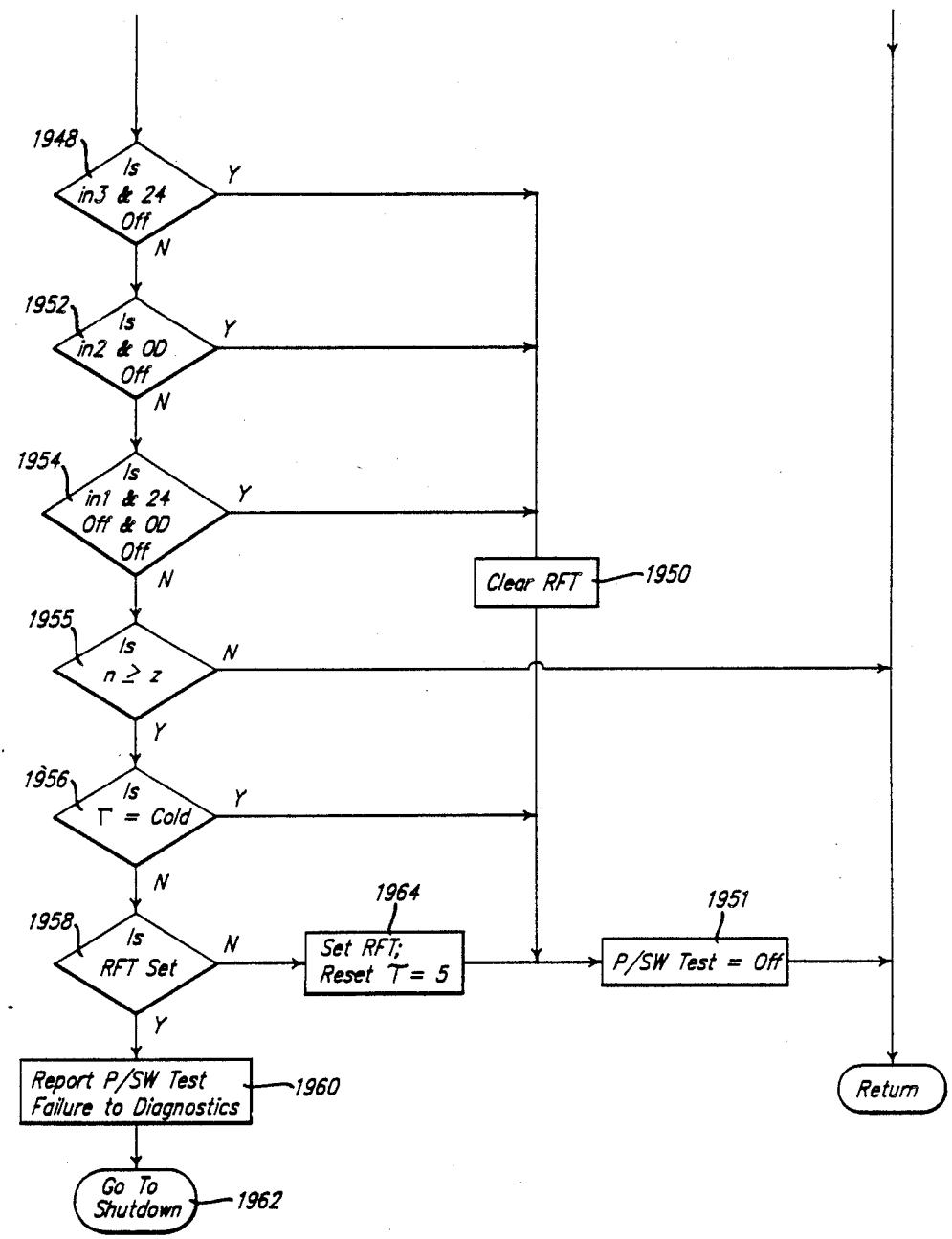

Referring to FIGS. 21A through 21C, the methodology for the pressure switch test and transmission temperature determination is shown at 1900. At the beginning or start in block 1902, the methodology advances to diamond 1904 and determines whether the transmission 100 is presently operating in first, second or third gear by performing speed calculations. If the transmission 100 is not presently operating in first, second or third gear, the methodology advances to diamond 1905 and determines whether the shift lever position (SLP) 606 is reverse R or neutral N by either the SLP or PRNODDL methods previously described. If SLP 606 is reverse or neutral, the methodology advances to block 1906 and clears a retest flag. The methodology then advances to block 1907 and turns OFF or terminates the pressure switch test. If SLP is not reverse or neutral, the methodology also advances to block 1907. The methodology then advances to block 1908. At block 1908, the transmission controller 3010 resets a timer to a predetermined value such as zero and sets a default value of time corresponding with three seconds if a pressure switch test flag (PSTF) has been set or eleven seconds with the transmission fluid temperature cold; five second with the transmission temperature fluid warm; and two seconds with the transmission fluid temperature hot. Once this has been accomplished, the methodology returns.

At diamond 1904, if the transmission 100 is operating in either first, second or third gear, the methodology advances to diamond 1910 and determines whether the shift lever position (SLP) method or test, previously described, is ON or in progress by looking for a flag. If the SLP test is ON, or in progress, the methodology advances to block 1907 previously described to terminate the pressure switch test. If the SLP test is not ON, the methodology advances to diamond 1912 and determines whether engine speed $N_e$ is less than a predetermined speed, S, i.e. 650 r.p.m. when the transmission fluid temperature is cold, or less than 1000 r.p.m. when the transmission fluid temperature is warm or hot. Also, the transmission controller 3010 determines whether a $N_o/N_t$ speed check fault count (SCF) is greater than a predetermined value or a pressure switch fault count (PSF) is greater than another predetermined value. If any of the above criteria is met in diamond 1912, the methodology advances to block 1907 previously described to terminate the pressure switch test. If all of the criteria is not met in diamond 1912, the methodology advances to block 1914 and starts or continues a timer. The methodology then advances to diamond 1916 and determines whether the pressure switch test is ON or in progress by looking for a flag. If the ppressure switch test is not ON, the methodology advances to diamond 1918 and determines whether the time on the timer is greater than a predetermined time period. If the time on the timer is not greater than the predetermined time period, the methodology returns. If the time on the timer is greater than the predetermined time period, the methodology advances to diamond 1921 and determines whether SCF is less than a predetermined value such as 60 and the PSF equals zero. If that criteria is not true, the methodology advances to block 1908 previously described. If that criteria is true, the methodology advances to diamond 1922 and determines whether a solenoid continuity test, to be described under section heading "SOLENOID CONTINUITY TEST METHOD", has been inactive for a predetermined time period, i.e. greater than 400 ms, by looking for a flag. If the solenoid continuity test has not been inactive for the predetermined time period, the methodology returns. If the solenoid continuity test has been inactive for more or greater than the predetermined time period, the methodology advances to block 1924. At block 1924, the transmission controller 3010 turns ON or activates the pressure switch test, sets count n on the counter equal to a predetermined value such as zero, and turns ON both the two/four shift 634 and overdrive 632 solenoid-actuated valves. The methodology then advances to block 1926 and resets the timer equal to zero and sets a default value corresponding to ten seconds with the transmission fluid temperature cold; four seconds with the transmission fluid temperature warm; and sixty seconds with the transmission fluid temperature hot. The methodology then returns.

If the pressure switch test is ON or activated at diamond 1916, the methodology advances to block 1927 and adds a value of 1 to the count n on the counter such that n equals n plus 1. The methodology then advances to diamond 1928 (FIG. 21B) and determines whether the transmission 100 is presently operating in first or second gear by performing speed calculations and the OD pressure switch 646 is ON or pressurized. If that criteria is true, the methodology advances to block 1930 and turns OFF the overdrive solenoid-actuated valve 632. The methodology then advances to diamond 1932. If that criteria is not true, the methodology advances to diamond 1932 and determines whether the transmission 100 is operating in first or third gear as previously described and the two/four shift pressure switch 648 is ON or pressurized. If that criteria is true, the methodology advances to block 1934 and turns OFF the two/four shift solenoid-actuated valve 634. The methodology then advances to diamond 1936. If that criteria is not true, the methodology advances to diamond 1936 and determines whether the transmission temperature range is hot or the count n is greater than a predetermined value such as 7.

At diamond 1936, if the transmission fluid temperature is not hot or the count n is not greater than 7, the methodology advances to diamond 1938 and determines whether the two/four shift solenoid-actuated valve 634 has been turned OFF. If the two/four shift solenoid-actuated valve 634 is not OFF, the methodology returns. If the two/four solenoid-actuated valve 634 is OFF, the methodology advances to diamond 1940 and determines whether the engine temperature is greater than a predetermined temperature such as 75 degrees F. (Fahrenheit). If the engine temperature is greater than the predetermined temperature, the methodology advances to block 1942 and determines or concludes that the transmission temperature range is warm. If the engine temperature is not greater than the predetermined temperature, the methodology determines or concludes that the transmission temperature range is still cold. The methodology advances from block 1942 and diamond 1940 to diamond 1943 and determines whether the count n is less than or equal to a predetermined value such as 5. If n is greater than 5, the methodology advances to diamond 1948 to be described. If n is less than or equal to 5, the methodology advances to diamond 1944, which is initially set to zero, and determines whether a count x on a counter is greater than or equal to a predetermined value such as 8. If x is less than 8, the methodology advances to block 1945 and adds a predetermined value of 1 to x such that x equals x plus 1. The methodology then advances to diamond 1948. If x is equal to or greater than the predetermined value, the methodology advances to diamond 1946 and determines if the engine temperature is greater than a second predetermined temperature such as 145 degrees F. If the engine temperature is greater than the second predetermined temperature, the methodology advances to block 1947 and determines or concludes that the transmission fluid temperature is hot and advances to diamond 1948. If the engine temperature is not greater than the second predetermined temperature, the transmission controller 3010 maintains that the transmission fluid temperature is warm and advances to diamond 1948.

If the transmission fluid temperature is hot at diamond 1936, the methodology advances to diamond 1948 and determines whether the transmission 100 is operating in third gear and that the two/four solenoid-actuated valve 634 has been turned OFF (i.e. at block 1934). If that criteria is true, the methodology advances to block 1950 and clears the retest flag (RTF). The methodology then advances to block 1951 and turns OFF or terminates the pressure switch test and returns. If the criteria in diamond 1948 is not true, the methodology advances to diamond 1952 and determines whether the transmission 100 is operating in second gear and the overdrive solenoid-actuated valve 630 has been turned OFF. If the above criteria is met or true at diamond 1952, the methodology advances to block 1950 previously described. If the above criteria is not met at diamond 1952, the methodology advances to diamond 1954 and determines whether the transmission 100 is operating in first gear and the two/four 634 and overdrive 630 solenoid-actuated valves have been turned OFF. If that criteria is true, the methodology advances to block 1950 previously described. If that criteria is not true, the methodology advances to diamond 1955 and determines whether the value of n is greater than or equal to the value of Z. If n is less than Z, the methodology returns. If n is greater than or equal to Z, the methodology advances to diamond 1956 and determines whether the transmission fluid temperature is cold. If the transmission fluid temperature is cold, the methodology advances to block 1951 previously described to terminate the pressure switch test. If the transmission fluid temperature is not cold, the methodology advances to diamond 1958 and determines whether the retest flag (RTF) has been set. If the RTF has been set, the methodology advances to block 1960 and reports a pressure switch test failure to the diagnostics to be described under section heading "ON-BOARD DIAGNOSTICS". The methodology then advances to bubble 1962 and goes to shutdown mode. If the RTF is not set, the methodology advances to block 1964 and sets the RTF and the time on the timer equal to a predetermined value such as 5. The methodology then advances to block 1951 previously described to terminate the pressure switch test and returns.

The preferred method of determining the fluid temperature of the transmission 100 is an "accumulated run time" method. This method predicts $T_o$, transmission fluid temperature. It bases the prediction on ambient and/or engine coolant temperatures and on observed transmission and engine warm-up rates. By using ambient temperature, the engine block heaters use is accommodated. If engine temperature is lower than ambient, it will be used since it is more accurate. In the absence of any temperature sensor data, $-3°$ F. is used for ambient. The sensor data is received via the CCD link from the engine controller 3020.

Figure 21D:
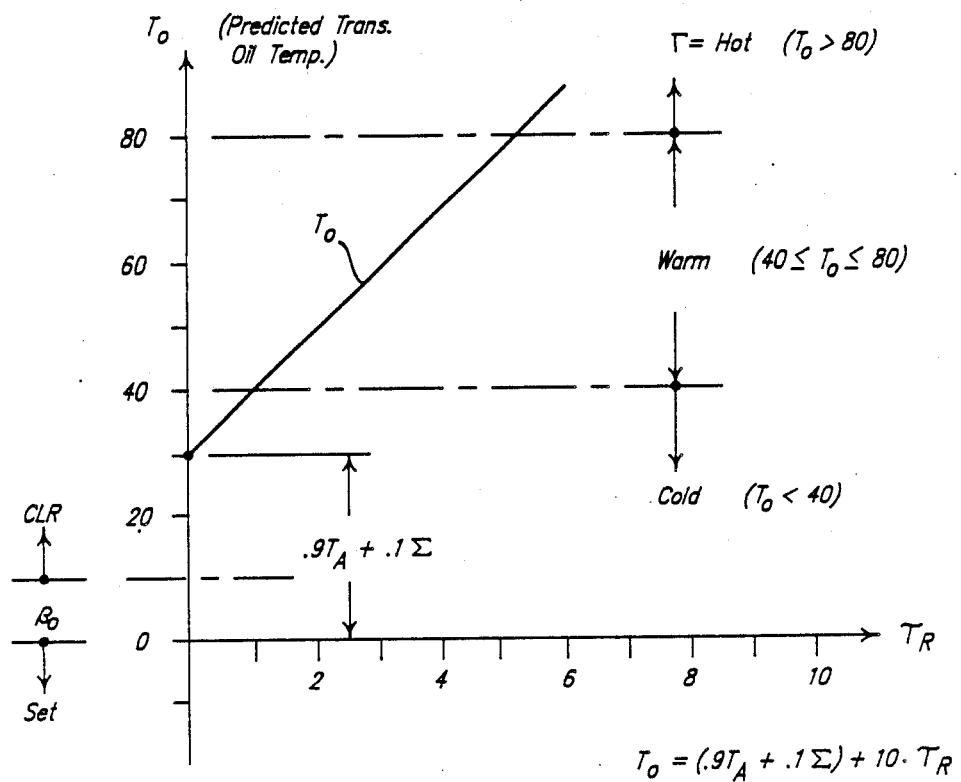

This method includes measuring the time spent in a non-neutral gear condition which represents effectively torque converter slippage. When the torque converter 110 is slipping while transmitting torque from the engine to the transmission 100, heat is generated by energy conversion. This heat elevates the temperature of the transmission fluid. The transmission controller 3010 monitors time ($T_R$) (FIG. 21D) and approximates with acceptable accuracy, the quantity of heat generated, and thereby the elevation of transmission fluid temperature. Testing can be conducted to determine the relationship between the "run time" $T_R$ and the quantity of temperature use (ΔT) in the transmission sump as illustrated in FIG. 21D.

The method includes reading the temperature of the engine by an input sensor and multiplying the engine temperature by a predetermined value such as 0.1. The method also includes reading the temperature of the ambient air by an input sensor and multiplying the ambient temperature ($T_A$) by a predetermined value such as 0.9. These values are added together to obtain the temperature point on the $T_o$ ordinate. The transmission controller 3010 monitors or resumes the rum time period ($T_R$) once the SLP 606 does not equal neutral N and $N_e$ is greater than a predetermined speed such as 800 r.p.m. The measured run time is multiplied by a predetermined slope value such as 10 and is added to the summed value of the multiplied engine and ambient temperature. Thus, the equation of the curve $T_o$ in FIG. 21D may be defined as follows:

$$T_o=(0.9T_A+0.1\Sigma)+10*T_R$$

Accordingly, if $T_o$ is less than 40° Fahrenheit (F.), the transmission fluid temperature will be predicted or set to cold. If $T_o$ is greater than 80° F., the transmission fluid temperature will be predicted or set to hot. Otherwise, the transmission fluid temperature is predicted as or set to warm.

Additionally, a transmission temperature flag $\beta_o$ (super cold) allows for near-normal operation under sub-zero conditions. This flag is set when $T_o$ is less than 0° F. and cleared when $T_o$ is greater than 10° F. The super cold flag $\beta_o$ is used by the transmission controller 3010 to extend shift times and inhibit a third to first (3-1) shift by setting a flag. Other uses are also available.

Accordingly, this alternative, but preferred method allows the transmission controller 3010 to determine the transmission fluid temperature without a dedicated temperature sensor immersed in the transmission fluid.

SOLENOID CONTINUITY TEST METHOD

Figure 22E:
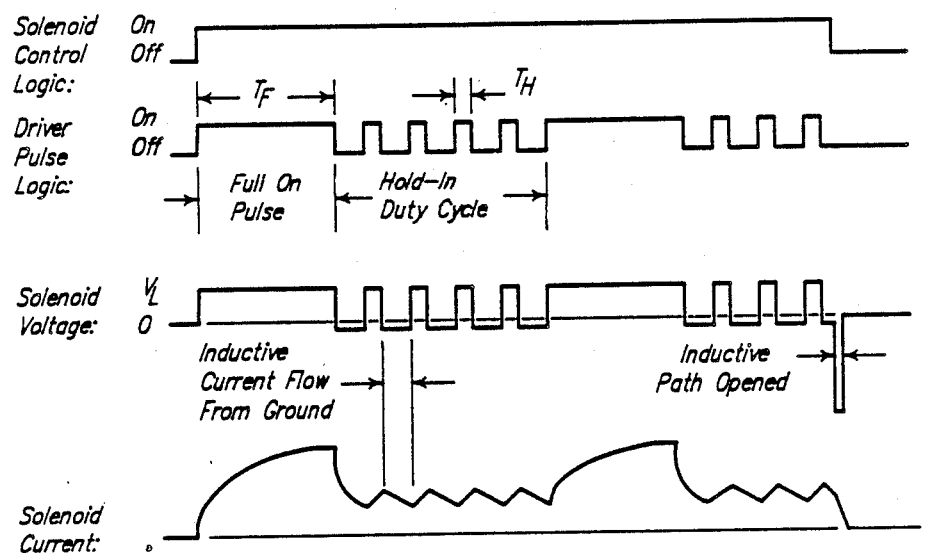

The purpose of the driver circuit continuity test is to check the solenoid circuitry for proper operation. Since the solenoid driver controls the ground side of each solenoid coil 710 (FIG. 8), a direct short to ground in the line from the solenoid of the solenoid-actuated valves 630, 632, 634 and 636 to the transmission controller 3010 would energize the solenoid coil 710 at a power level that can result in permanent coil damage from overheating. An open circuit (or direct short to supply voltage) would also prevent turning the solenoid-actuated valves "ON". Since these failures result in a loss of the normal inductive "OFF" spike (See FIG. 22E), a test which checks for the presence of this spike is used to confirm circuit continuity.

The transmission controller 3010 of the present invention uses one spike monitor circuit to test all the solenoids of the solenoid-actuated valves 630, 632, 634 and 636. The transmission controller 3010 uses a unique scheduling method or routine to ensure that the response of the spike monitor circuit is from the appropriate solenoid as shown by the blocks and diamonds enclosed by the dashed line of FIGS. 22B and 22C. When the torque converter 110 is either in unlock or pullback, no solenoids are under duty cycle control. The solenoids of the solenoid-actuated valves are tested sequentially to guarantee the spike monitor circuit response is from the appropriate solenoid.

When the torque converter 110 is in partial lock-up, the low/reverse clutch solenoid-actuated valve 636 is under duty cycle (interrupt) control. The low/reverse clutch solenoid-actuated valve 636 is tested by looking for the spike monitor circuit response caused by normal turn OFF (de-energizing) via the interrupt control. The remaining solenoids are then tested in sequence.

If the low/reverse clutch solenoid is ON (energized), a low/reverse interrupt is disabled to guarantee the spike monitor circuit response is from the solenoid under test and not from the low/reverse solenoid which is under interrupt control. If the low/reverse clutch solenoid is OFF, a low/reverse recirculation driver is turned ON to make sure the spike monitor circuit has recovered from the spike caused by the last turn OFF of the low/reverse clutch solenoid via the interrupt. This method or technique guarantees that the response of the spike monitor circuit is from the appropriate solenoid.

Referring to FIGS. 22A through 22D, the methodology for the solenoid continuity test is shown. At the beginning, in bubble 2000, the methodology advances to diamond 2002 and determines whether the solenoid continuity test is in progress by looking for a flag. If the solenoid continuity test is not in progress, the methodology advances to diamond 2004 and determines whether it is time to run the solenoid continuity test by looking for a flag for example. If it is not time to run the solenoid continuity test, the methodology returns. If it is time to run the solenoid continuity test, the methodology advances to diamond 2006 and determines whether a shift is in progress by looking for a flag. If a shift is in progress, the methodology returns. If a shift is not in progress, the methodology advances to diamond 2008 and determines whether the shift lever position (SLP) test, previously described, is in progress by looking for a flag. If the SLP test is in progress, the methodology returns. If the SLP test is not in progress, the methodology advances to diamond 2010 and determines whether the pressure switch (P/SW) test, previously described, is in progress by looking for a flag. If the P/SW test is in progress, the methodology returns. If the P/SW test is not in progress, the methodology advances to block 2012 and sets a "solenoid test in progress flag", "turn solenoid ON" flag, and a "low/reverse LR solenoid under test" flag and returns. The above methodology is used because a solenoid continuity test sequence cannot occur while a shift, shift lever position test or pressure switch test is in progress.

At diamond 2002, the transmission controller 3010 determines whether the solenoid continuity test is in progress as previously described. If the solenoid continuity test is in progress, the methodology advances to diamond 2014 and determines whether a SLP test is in progress as previously described. If a shift lever position test in in progress, the methodology advances to block 2016 and aborts the test sequence by clearing the "solenoid test in progress" flag and advances to block 2018. At block 2017, the transmission controller 3010 outputs the normal in-gear solenoid mask (i.e. logical states) to the solenoid-actuated valves and returns. If the SLP test is not in progress at diamond 2014, the methodology advances to diamond 2020 and determines whether a shift is in progress as previously described. If a shift is in progress, the methodology advancess to block 2016 previously described. The above methodology is used to interrupt the test sequence for a shift lever position test or a shift in progress.

If a shift is not in progress, the methodology advances to diamond 2022 and determines whether the low/- reverse solenoid-actuated valve 636 is under test by looking for a flag for example. In the test sequence, each solenoid-actuated valve must be tested separately to ensure that the response is from the appropriate solenoid. Therefore, if the low/reverse solenoid-actuated valve 636 is not under test, the methodology advances to diamond 2024 and determines whether it is time to turn ON the solenoid under test by looking for a flag for example. If it is time to turn ON the solenoid under test, the methodology advances to block 2026 and turns ON the solenoid under test, clears the "turn solenoid ON" flag, and clears the "in partial lock-up (PL) last loop" flag and returns. If it is not time to turn ON the solenoid under test, the methodology advances to diamond 2054 to be described.

At diamond 2022, the transmission controller 3010 determines whether the low/reverse solenoid-actuated valve 636 is under test by looking for a flag for example. If the low/reverse solenoid-actuated valve 636 is under test, the methodology advances to diamond 2028 and determines whether partial lock-up of the torque converter 110 is in progress by looking for a flag. If partial lock-up is not in progress, the methodology advances to diamond 2024 previously described. If partial lock-up is in progress, the methodology advances to diamond 2030 and determines whether it is it time to turn ON the solenoid-actuated valve under test as previously described. If it is time to turn ON the solenoid-actuated valve under test, the methodology advances to diamond 2031 and determines whether the methodology is at the start of a partial lock-up period, previously described (FIG. 18B), by looking for a flag for example. If the methodology is at the start of a partial lock-up period, the methodology returns. If the methodology is not at the start of a partial lock-up period, the methodology advances to block 2032 and clears a "spike monitor edge detect" flag, a "spike response" flag, a "turn ON solenoid" flag, and "first partial lock-up period has elapsed" flag. The methodology then advances to block 2033 and sets a "in partial lock-up last loop" flag. The methodology then returns.

At diamond 2030, if it is not time to turn ON the solenoid-actuated valve under test, the methodology advances to diamond 2034 and determines whether partial lock-up of the torque converter 110 occurred in the last loop by looking for a flag. If partial lock-up did not occur in the last loop, the methodology advances to block 2035 and sets the "turn ON solenoid" flag. The methodology then advances to block 2036 and outputs a normal in-gear solenoid mask as previously described. The methodology then returns.

If partial, lock-up occurred in the last loop at diamond 2034, the methodology advances to diamond 2037 and determines whether a "spike response" previously described was received from the low/reverse interrupt. If a spike response was not received, the methodology advances to diamond 2038 and determines whether the partial lock-up period has expired by looking for a flag for example. If the period has not expired, the methodology advances to block 2036 previously described. If the period has expired, the methodology advances to diamond 2040 and determines whether the "first partial lock-up period has elapsed flag" has been set. If the flag has not been set, the methodology advances to block 2042 and sets the "first partial lock-up period has elapsed" flag. The methodology then advances to block 2036 previously described. If the flag has been set, the methodology advances to diamond 2048 to be described herein.

At diamond 2037, if a spike response was not received, the methodology advances to block 2044 and points to the next solenoid-actuated valve to be tested. The methodology then advances to block 2046 and sets the "turn solenoid ON" flag. The methodology then advances to block 2047 and outputs the normal in-gear solenoid mask for the solenoid-actuated valves as previously described. The methodology then returns.

At diamond 2040, if the "first partial lock-up period has elapsed flag" has been set, the methodology advances to diamond 2048 and determines whether a second failure has occurred by looking for a flag for example. If a second failure has occurred, the methodology advances to block 2050 and notifies the diagnostics, to be described, of the transmission controller 3010 and advances to shut down mode. If a second failure has not occurred, the methodology advances to block 2052 and sets a "first test failed" flag, sets a "shift inhibit" flag, clears the "solenoid test in progress" flag, and reschedules the next test sequence, in a predetermined time period, i.e. 2 seconds. The methodology then advances to block 2047 previously described.

At diamond 2054, the transmission controller 3010 determines whether the low/reverse solenoid-actuated valve 6363 is under test as previously described. If the low/reverse solenoid-actuated valve 636 is under test, the methodology advances to diamond 2056 and determines whether partial lock-up of the torque converter 110 occurred in the last loop by looking for a flag. If partial lock-up occurred in the last loop, the methodology advances to block 2058 and sets the "turn solenoid ON" flag. The methodology advances to block 2059 and outputs the normal in-gear solenoid mask as previously described and returns.

If the low/reverse solenoid-actuated valve 636 is not under test or partial lock-up did not occur in the last loop, the methodology advances to diamond 2060 and determines whether the low/reverse solenoid-actuated valve 636 is ON as previously described. If the low/reverse solenoid-actuated valve 636 is not ON, the methodology advances to block 2062 and turns ON the LR/LU recirculation driver to guarantee that the spike monitor circuit has recovered. The methodology advances to block 2064 and delays for a predetermined time period ($T_2$). The methodology then advances to block 2068 to be described herein.

At diamond 2060, if the low/reverse solenoid-actuated valve 636 is ON, the methodology advances to diamond 2065 and determines whether the LR/LU interrupt is enabled by looking for a flag for example. If the LR/LU interrupt is enabled, the methodology advances to block 2066 and disables the LR/LU interrupt. The methodology then advances to block 2068. If the LR/LU interrupt is not enabled, the methodology advances to diamond 2068 and clears the "spike monitor edge detect" flag. The methodology then advances to block 2070 and turns OFF the solenoid-actuated valve under test. The methodology then advances to diamond 2072 and determines whether the spike monitor circuit has responded by looking for a back EMF spike when the solenoid is turned OFF. If the spike monitor circuit has responded, the methodology advances to block 2074 and sets a "spike response" flag. If the spike monitor circuit has not responded, the methodology advances to diamond 2076 and determines whether the predetermined time period ($T_2$) has expired by looking at a timer for example. If the predetermined time period has not expired, the methodology loops back to diamond 2072 previously described. If the predetermined time period has expired, the methodology advances to block 2078 and clears the "spike response" flag.

From blocks 2074 and 2078, the methodology advances to block 2080 and restores the LR/LU recirculation driver and LR/LU interrupt to their original state. The methodology then advances to diamond 2082 and determines whether the "spike response" flag has previously been set. If the spike response flag has not been set, the methodology advances to diamond 2048 previously described. If the spike response flag has been set, the methodology advances to diamond 2084 and determines whether all four solenoid-actuated valves 630, 632, 634 and 636 have been tested by looking to see if four spikes have been received. If all four solenoid-actuated valves have been tested, the methodology advances to block 2086. At block 2086, the transmission controller 3010 clears the "shift inhibit" flag, clears the "first test failed" flag, clears the "solenoid in progress" flag, and reschedules the next test sequence in a predetermined time period such as 10 seconds. The methodology advances to block 2047 previously described.

THROTTLE ANGLE COMPUTATION AND FAILURE DETECTION

The purpose of the throttle angle computation and failure detection method is to compute the throttle angle and to detect any failures of the throttle pot and associated circuitry as described in U.S. Pat. No. 4,637,361, issued Jan. 20, 1987, in the name of Killen, et. al., which is hereby incorporated by reference. The throttle angle value is used in circle 814 and 854 of FIG. 12 for the shift schedule method (FIG. 14). This parameter must be checked and upon detecting a failure, a default throttle value is used to ensure satisfactory operation.

Figure 23C:
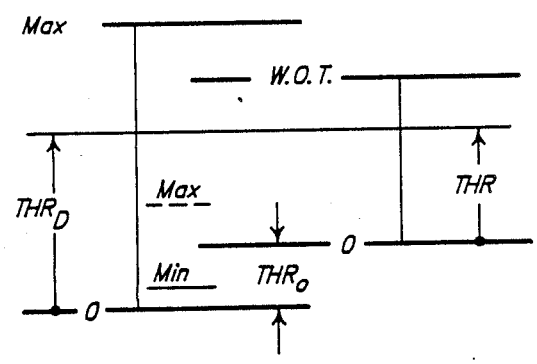
FIGS. 23A-C illustrate the throttle angle computation methodology according to the present invention.
Figure 23A:
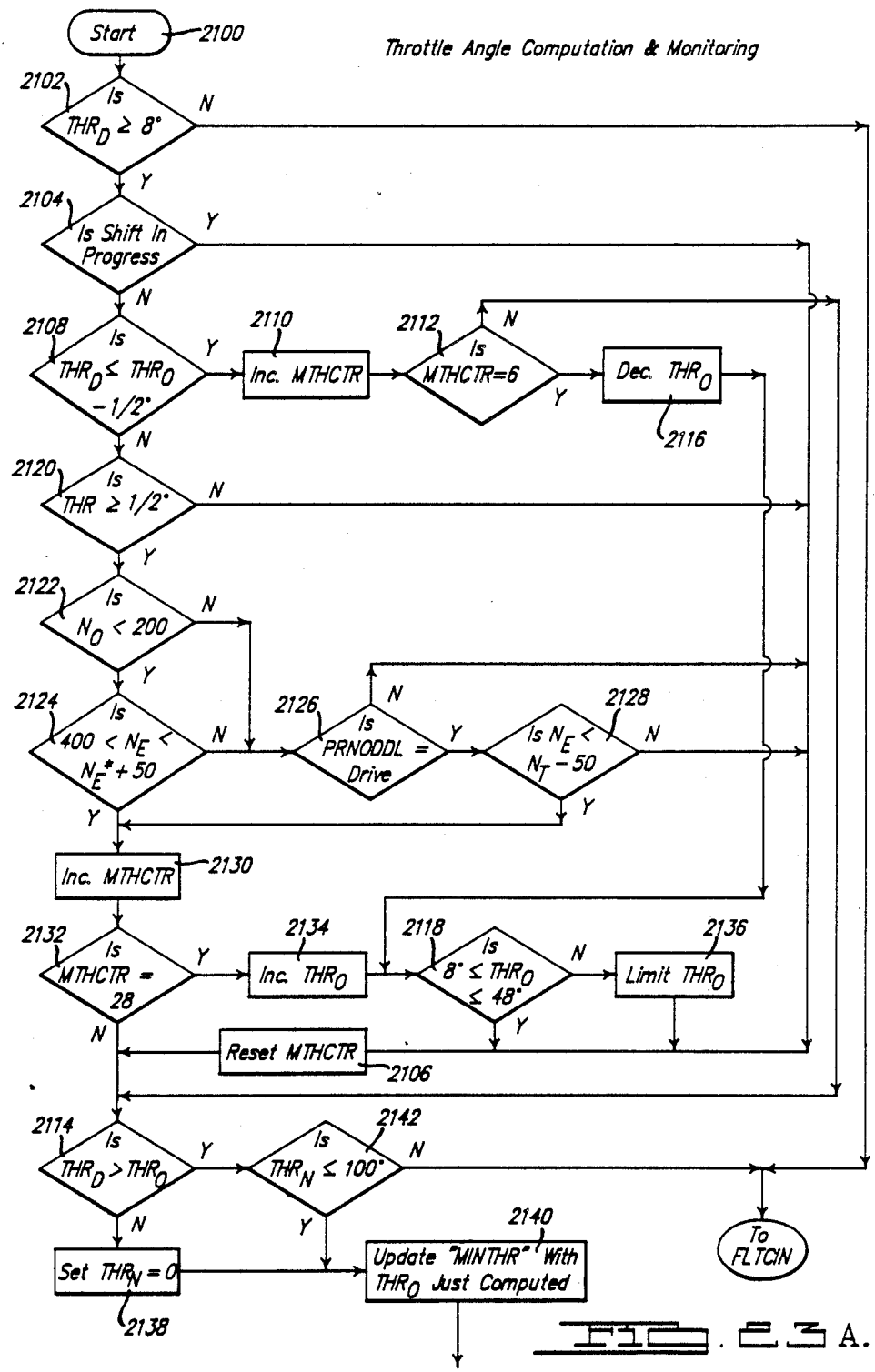
Figure 23B:
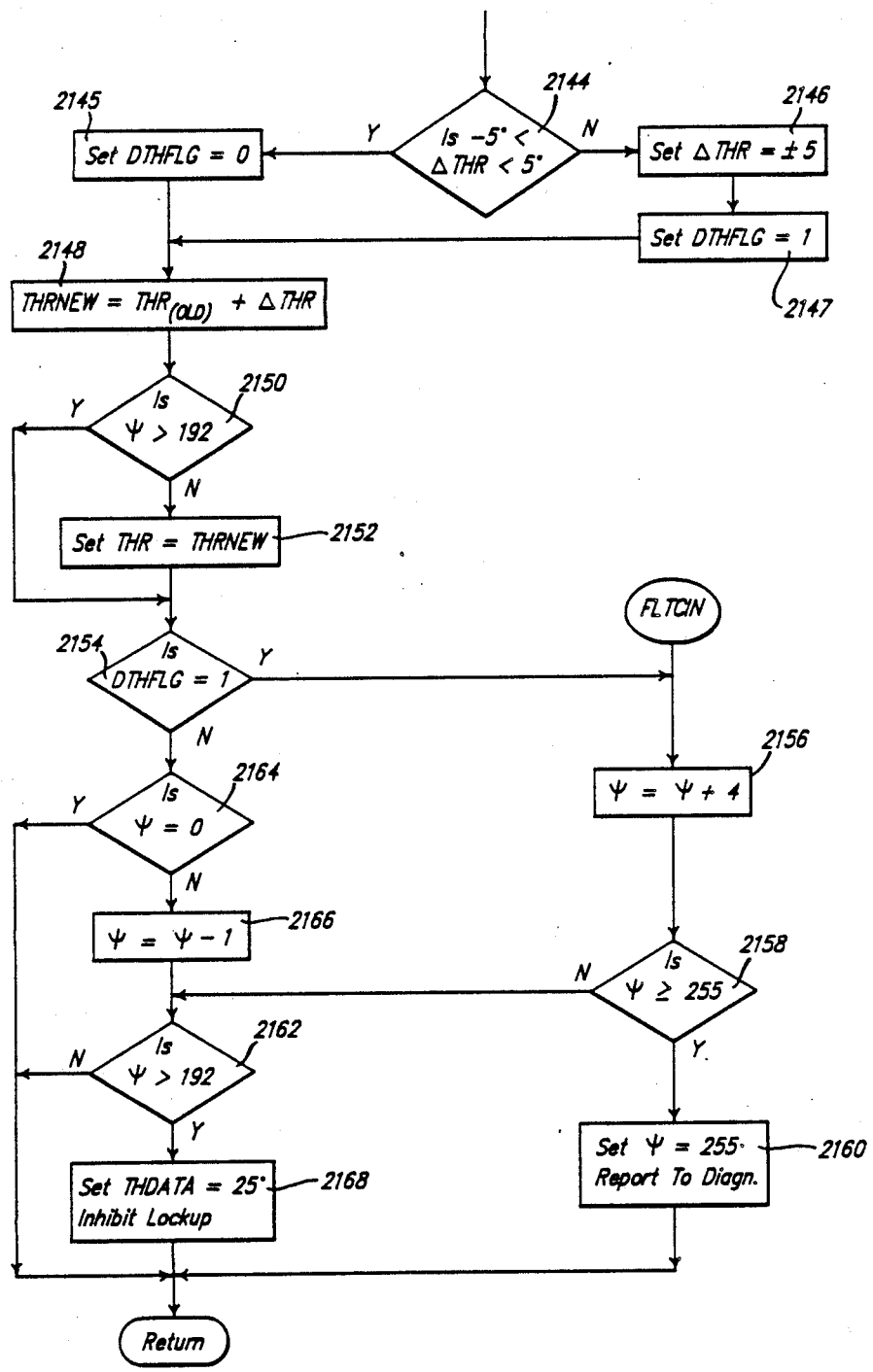

Referring to FIGS. 23A and 23B, the methodology for the throttle angle computation is shown. The methodology starts in bubble 2100 and then advances to diamond 2102. At diamond 2102, the transmission controller 3010 determines whether the raw throttle angle data ($THR_D$) from the throttle pot is greater than or equal to a predetermined value such as eight degrees (See FIG. 23C). If that criteria is not true, the methodology advances to block 2156 to be described. If that criteria is true, the methodology advances to diamond 2104 and determines whether a shift is in progress by looking for a flag which is set when the shift begins. If a shift is in progress, the methodology advances to block 2106 at be described herein.

If the shift is not in progress, the methodology advances to diamond 2108 to determine whether the raw throttle angle data ($THR_D$) is less than or equal to the closed minimum throttle value ($THR_o$) of the throttle data minus a predetermined value such as ½ (0.5) degrees (See FIG. 23C). If that criteria is true, the methodology advances to block 2110 and increments a minimum throttle counter such as a timer in the methodology. The methodology then advances to diamond 2112 to determine whether the minimum throttle counter is equal to a predetermined value such as six counts. If that criteria is not true, the methodology advances to diamond 2114 to be described herein. If that criteria is true, the methodology advances to block 2116 and decrements the closed minimum throttle value ($THR_o$) of the raw throttle angle data ($THR_D$). The methodology advances to diamond 2118 to be described herein.

At diamond 2108, if the raw throttle angle data is greater than the closed minimum throttle value minus a predetermined value such as ½ (0.5) degrees, the methodology advances to diamond 2120. At diamond 2120, the transmission controller 3010 determines whether the throttle angle at update (THR) is greater than or equal to a predetermined value such as ½ degree (See FIG. 23C). If that criteria is not true, the methodology advances to block 2106 to reset the minimum throttle counter. If that criteria is true, the methodology advances to diamond 2122 and determines whether output speed $N_o$ is less than a predetermined value such as 200 r.p.m. If the output speed $N_o$ is less than the predetermined value, the methodology advances to diamond 2124 and determines whether engine speed $N_e$ is greater than a predetermined value such as 400 r.p.m. but less than a maximum predetermined value such as $N_e$ (maximum engine speed) plus a value such as 50 r.p.m. If that criteria is true, the methodology advances to block 2130 to be described. If $N_o$ is not less than 200 r.p.m. or $N_e$ is not greater than 400 r.p.m., or $N_e$ is not less than $N_e$ plus 50 r.p.m., the methodology advances to diamond 2126 and determines whether the PRNODDL code from the contact switch sensors $NS_1$ and $NS_2$ equals drive. If the PRNODDL code does not equal drive, the methodology advances to block 2106 previously described. If the PRNODDL code does equal drive, the methodology advances to diamond 2128 and determines whether engine speed $N_e$ is less than turbine speed $N_t$ minus a predetermined value such as 50 r.p.m. If that criteria is not true, the methodology advances to block 2106 previously described. If that criteria is true, the methodology advances to block 2130 and increments the minimum throttle counter. The methodology advances to diamond 2132 and determines whether the minimum throttle counter equals a predetermined value such as 28. If that criteria is not true, the methodology advances to diamond 2114 to be described herein. If that criteria is true, the methodology advances to block 2134 and increments the closed minimum throttle value of raw throttle angle data and advances to diamond 2118.

At diamond 2118, the transmission controller 3010 determines whether the closed minimum throttle value is greater than or equal to a minimum predetermined value such as eight degrees, but less than or equal to a maximum predetermined value such as forty-eight degrees. If that criteria is true, the methodology advances to block 2106 previously described. If that criteria is not true, the methodology advances to block 2136 and limits the closed minimum throttle value. The methodology then advances to block 2016 previously described to reset the minimum throttle counter. The methodology then advances to diamond 2114.

At diamond 2114, the transmission controller 3010 determines whether the raw throttle angle data is greater than the closed minimum throttle value. If that criteria is not true, the methodology advances to block 2138 and sets a new unlimited throttle angle equal to a predetermined value such as zero. The methodology then advances to block 2140 to be described herein.

At diamond 2114, if the throttle data is greater than the closed minimum throttle value, the methodology advances to diamond 2142 and determines whether the new unlimited throttle angle is less than or equal to a predetermined value such as 100 degrees. If that criteria is not true, the methodology advances to block 2156. If that criteria is true, the methodology advances to block 2140 and updates the minimum throttle angle memory location with $THR_o$ just computed. The methodology then advances to diamond 2144 (See FIG. 23B) and determines whether the change in the new unlimited throttle angle ($\Delta THR$) is between a predetermined range such as $-5$ to $5$ degrees. If that criteria is not true, the methodology advances to block 2146 and sets the change in throttle angle within a predetermined limit such as $\pm 5$ degrees. The methodology then advances to block 2147 and sets the delta ($\Delta$) throttle exceeded limit flag (DTHFLG) equal to one. The methodology then advances to block 2148 to be described herein.

At diamond 2144, if the change in the new unlimited throttle angle is between the predetermined range, the methodology advances to block 2145 and clears the delta throttle exceeded limit flag (set equal to zero). From block 2145, the methodology advances to block 2148 and calculates a new throttle angle based on the old throttle angle at update plus the change in throttle angle. The methodology advances to diamond 2150 and determines whether the throttle error counter ($\psi$) is greater than a predetermined value such as 192 counts. If this criteria is true, the methodology advances to block 2154 to be described. If that criteria is not true, the methodology advances to block 2152 and sets the throttle angle at update equal to the new throttle angle because normal operation of the hardware is occurring. The methodology advances to diamond 2154 and determines whether the delta ($\Delta$) throttle exceeded limit flag has previously been set. If that criteria is true, the methodology then advances to block 2156 and increments the throttle error counter. The methodology advances to diamond 2158 and determines whether the throttle error counter is greater than or equal to a predetermined value such as 255. If that criteria is true, the methodology advances to block 2160 and sets the throttle error counter to this predetermined value and reports a failure to the diagnostics providing that engine speed $N_e$ is greater than a predetermined value such as 500 r.p.m. and the raw throttle angle data ($THR_D$) is less than a predetermined value such as 6° or greater than a predetermined value such as 120.5°. The methodology then returns. If the throttle error counter is less than the predetermined value, the methodology advances to diamond 2162.

At diamond 2154, if the delta throttle exceeded limit flag has not previously been set, the methodology advances to diamond 2164 to determine whether the throttle error counter is equal to a predetermined value such as zero. If the throttle error counter equals zero, the methodology returns. If the throttle error counter does not equal zero, (i.e. an error has occurred), the methodology advances to block 2166 and decrements the throttle error counter. The methodology advances to diamond 2162 to determine whether the throttle error counter is greater than a predetermined value such as 192. If that criteria is not true, the methodology returns. If that criteria is true, the methodology advances to block 2168 and sets the throttle angle data equal to a predetermined value such as 25 degrees (default value) and inhibits lock-up operation of the torque converter, previously described, by setting a flag for example. From block 2168, the methodology returns.

SHIFT METHODOLOGY

The present invention provides fully adaptive electronic transmission controls. These adaptive controls perform their functions on real-time feedback sensor information, as is likewise performed by electronic antiskid brake controls. Additionally, the adaptive controls "learn" particular information by monitoring data such as the value for the fill time and apply rate of the applying element such as a clutch. This information is then stored in the memory of the transmission controller 3010 for future use.

UPSHIFT METHODOLOGY

The upshift methodology uses the learned values for the fill time and apply rate (torque build-up rate) of the ON-coming or applying element such as a clutch and for the release time of the OFF-going or releasing element such as a clutch. Learning apply element fill time permits timing the beginning-of-fill so as to compensate for orifice size or clutch clearance variations, etc. Learning the apply rate and release time allows compensation for variations in orifice size, clutch capacity, solenoid response, and torque requirement (included to some extend, different engines). Although learning is restricted to the HOT mode, some temperature compensation occurs between summer and winter.

In the power-ON upshift, the methodology adjusts the apply and release events so that release element slip occurs just before the apply element begins to develop torque. Slip must be allowed to occur so that the release and apply events can be identified by speed measurements. In simplified terms, release time is measured as the interval between initial-element-vent and beginning-of-slip; fill time is from beginning-of-fill to end-of-bump-along; and apply rate is from end-of-bump-along to beginning-of-speedchange. Bump-along is a term coined to describe the bang-bang (fixed percent ON-OFF time) control period that the methodology uses to maintain a small amount of backward slip prior to the application of the apply element. The methodology delays either the beginning of the release vent or the beginning of apply fill so as to achieve approximately one cycle of bump-along.

This control methodology reduces the release element pressure to the minimum that will still support the input torque reaction, thereby establishing the optimum beginning conditions for the element exchange. The apply rate, then, is selected to develop the torque needed to begin speed change just as release element net-apply-pressure reaches zero. Thus, the duty-cycle-controlled apply rate matches the ballistic release rate of the OFF-going or releasing element. The purpose of the matched exchange, of course, is to minimize fight between the elements. Release time and apply rate are both learned relative to the throttle angle.

Once the speed change begins, the apply element pressure is controlled to provide the desired turbine acceleration alpha$_t$. This speed change control is the heart of adaptive control since it adapts to changes in engine torque, friction coefficient, etc. and provides consistent control.

The acceptability of the power-OFF upshift must be verified with the appropriate engine control methodology. With carburetors, the engine speed $N_e$ drops quickly and may pull the turbine 128 through the speed change faster than desired. This can result in both elements going or staying off, which, if the throttle is opened, will result in a runaway bump as both elements race to apply. In order to prevent this, methodology was devised which uses both elements to control the speed change and gradually accomplish the hand-off.

With the electronic engine control, the engine may vary between power-ON and power-OFF. It may even provide the correct programmed rate past the target speed ($N_t=N_j$) without either element controlling, thus defeating the above approach. Methodology has been added which simply turns ON the apply element when the speed change is complete. Also, with this shift, it is desirable to release the OFF-going element quickly to avoid excessive engine braking torque.

The learned term for fill time is time remaining to nearly fill, $T_f$. Using $T_f$ minimizes the possibility of a too aggressive element application and allows the use of a duty cycle to soften the initial application. $T_f$ is actually calculated from the learned clutch fill volume, $V_f$. This term is stored in cubic inches so that different flow rates may be used to calculate $T_f$. This allows the same learned volume to be used for different shifts which may have a different line pressure. The program or methodology continually tracks the fluid volume needed to apply each element.

The learned term for release time, above, is time to nearly release, $T_r$, which is calculated as $K_s*T_s-0.063$. $T_s$ is a table value for the nominal observed release time. $K_S$ is the learned multiplier for that individual package. Since $T_s$ varies with THR (i.e. engine torque), a multiplier provides the best data match for the variables being accommodated. The 0.063 seconds, together with the $T_f$ differential, provides a margin to ensure that fight is minimized.

KICKDOWN METHODOLOGY

For good kickdown feel, it is essential that the shift occur quickly. The use of accumulators delays the clutch or element release so every effort is made to minimize the accumulator fill/vent times. The methodology turns OFF the release element at the start of the shift and does not apply it again until turbine acceleration exceeds a desired level by a small amount. A duty cycle (DC) may then be initialized and updated to provide proportional control for the speed change. The primary element DC acceleration or proportional control ($DC_{alpha}$, i.e. variable percent ON or OFF time) initialization level is calculated for $N_e$ and $N_t$, the torque converter characteristics, and the element capacity; each $DC_{alpha}$ update is based on an anticipated turbine acceleration ($alpha_t$) error.

As illustrated in FIG. 24A, a shift tape of the transmission characteristics for a third to first (3-1) kickdown shift is generally shown at 2200. Curve 2202 represents throttle angle. As throttle angle increases, engine speed $N_e$ shown in curve 2204 also increases. Simultaneously, the release element is released as shown in curve 2206 to drop its torque capacity. In other words, for a third to first (3-1) gear kickdown shift, the overdrive clutch 304 is released at the start of the shift. As shown by curve 2208, the fluid pressure of the overdrive clutch 304 vents down. When the torque capacity of the overdrive clutch 304 is low enough (at the fill volume), the turbine 128 will breakaway and a speed change will start as indicated by numeral 2210.

The present invention limits the rate at which the turbine 128 accelerates. This is accomplished by calculating and comparing an instantaneous turbine acceleration ($alpha_t$) shown in curve 2212 against a desired acceleration ($alpha_{desired}$ or $\alpha*$) level shown in curve 2214. Once the speed change begins at 2210, the controller 3010 attempts to match $alpha_t$ approximately equal with $alpha_{desired}$.

When $alpha_t$ exceeds $alpha_{desired}$, the release element is reapplied to control the rate at which the turbine 128 accelerates. The release element is reapplied under duty cycle acceleration or proportional control ($DC_{alpha}$) to provide a controlled slope of speed change on the turbine 128.

As illustrated in FIG. 24A, curve 2212 of $alpha_t$ crosses curve 2214 of $alpha_{desired}$ at point 2216. At point 2216, the overdrive clutch 304 is reapplied by duty cycling the solenoid-actuated value 632 as shown by part 2218 of curve 2206.

Simultaneously with speed change, the kickdown methodology adaptively applies the applying element (low/reverse clutch 310) as shown by curve 2220 based n the remaining turbine speed change which has to occur. As turbine speed $N_t$ increases in curve 2222, the methodology compares the actual turbine speed $N_t$ to a target speed $N_j$ (for a 3-1 shift, first gear ratio of first gear $N_j$). Because the speed change is made at a known rate (because controlling release element at that rate), the methodology can predict how much time remains to fill the applying element. The methodology attempts to get the applying element filled after achieving the target speed $N_j$ for a predetermined time period such as 120 ms, which region 2224 of curve 2214 is called "hold-speed".

When $N_t$ exceeds the target speed $N_j$ at point 2226, i.e. enters the hold-speed region 2224, $alpha_{desired}$ is lowered again to a negative value at point 2228 on curve 2214 so that the release element will prevent further increases in $N_t$. $DC_{bb}$ is again used for improved response before reentering $DC_{alpha}$ control. The release element hold-speed continues until the apply element is filled, begins to develop torque, and pulls $N_t$ down to the target level, $N_j$. The methodology then turns OFF the release element when $N_t$ equals $N_j$.

To reduce the energy (and provide a faster shift), learning is used to limit the hold-speed period to the minimum that will accomplish the "apply" identification and improve "shift feel". To know whether to turn ON the apply element (i.e. cause the solenoid to apply), the methodology starts which a "hold-speed" time allowance and adds to that a time-to-complete-speed-change, which is calculated by $(N_j-N_t)/alpha_{desired}$. This "time available (from now until the element should apply)", is continuously compared to the "time required (element volume divided by fill rate)" and the solenoid-actuated value is turned ON or OFF as required. Since the methodology tracks element volume during solenoid OFF and ON times, there is little error that can develop if $alpha_t$ is lower than $alpha_{desired}$. When $alpha_t$ is low and the actual $N_t$ becomes lower than projected, the methodology simply turns OFF the element and waits for $N_t$ to catch up to the projected level. If $alpha_t$ is higher than $alpha_{desired}$, the controls have no means to catch up, but since the initial release element vent time and the $alpha_{desired}$ "feather" control cause $alpha_t$ to be lower than $alpha_{desired}$ normal, there is no opportunity for significant "fall-behind" error to develop.

To achieve 120 ms. of hold-speed, the present invention utilizes "adaptive" kickdown start logic which is based on a "learned" fill volume of the applying element. The equation for the kickdown start logic may be defined as follows:

$$N_t > N_j - S, \text{ where } S = alpha_{desired}*t_f = r.p.m.$$

S is the kickdown start value (r.p.m. of turbine remaining) which equals $t_f$ multiplied by alpha$_{desired}$. As illustrated in FIG. 24A, curve 2232 represents the kickdown start value S. $t_f$ is the time needed to fill the applying element to the level that will provide the correct amount of bump-along time or kickdown hold-speed time (i.e. 120 ms). It is continuously updated and includes compensation for any expected duty cycle use during the remaining fill time. $t_f$ is calculated as follows:

$$t_f = \frac{[V_f - V]}{M \cdot Q_f} - .12 \cdot K_f \text{ Limit: } t_f \geq 0$$

$K_f$ = DC COMPENSATION FACTOR: Corrects for the reduced fill rate when DC use is expected. $K_f = 1$ for kickdown shift
$V_f$ = fill volume of the applying element
$Q_f$ = flow rate of the applying element
M = correction factor for line pressure
V = instantaneous element volume Since $N_j$ is the ratio multiplied by $N_i$, $N_t$ can be controlled at a desired slope by the release element so that $N_t$ goes to $N_j$ during $t_f$ having 120 ms of hold-speed to completely fill the apply element. $t_f$ is continuously calculated to give the kickdown start value S. Whenever $N_t$ crosses S (i.e. $N_t > N_j - S$), the apply element is turned ON which reduces S because the apply element is filling. If $N_j - S > N_t$ (i.e. $N_t$ falls below S), the apply element is turned OFF. This results in an irregular or variable DC on the apply element. In other words, once the kickdown start value S is calculated, the transmission controller 3010 compares $N_t$ to S. If $N_t$ is greater than $N_j$ minus S, the methodology instructs the transmission controller 3010 to turn ON the applying element to reduce S to zero. Hence, the methodology drives S to equal zero just as $N_t$ crosses or equals $N_j$ at point 2226. This allows 120 ms. of time remaining to complete the fill (hold-speed), resulting in better shift quality. Otherwise, the shift quality would be "jerky" if the apply element were applied just as $N_t$ crossed $N_j$.

TURBINE TORQUE CALCULATION

Referring to FIG. 24A, until alpha$_t$ crosses alpha$_{desired}$ for the first time at point 2216, the release element is held completely OFF so that any initial speed change is not delayed. Once the speed change is complete at point 2228, it is desired not to overshoot alpha$_{desired}$. Therefore, a duty cycle is calculated that will hold or maintain alpha$_{desired}$. The turbine torque calculation is used to calculate the initial percent ON time, indicated at 2216, for the duty cycle (DC) of the release element.

The initial percent ON time of the release element for either a downshift or garage shift is calculated as follows:

Initial %ON = $DC_o + (T_t - I_t *\text{alpha}_{desired})/K_t$ whereby,
$DC_o$ = Zero torque DC estimate
$I_t$ = Equivalent turbine inertia
$K_t$ = Gain, DC to turbine torque ($T_t$)

Figure 24B:
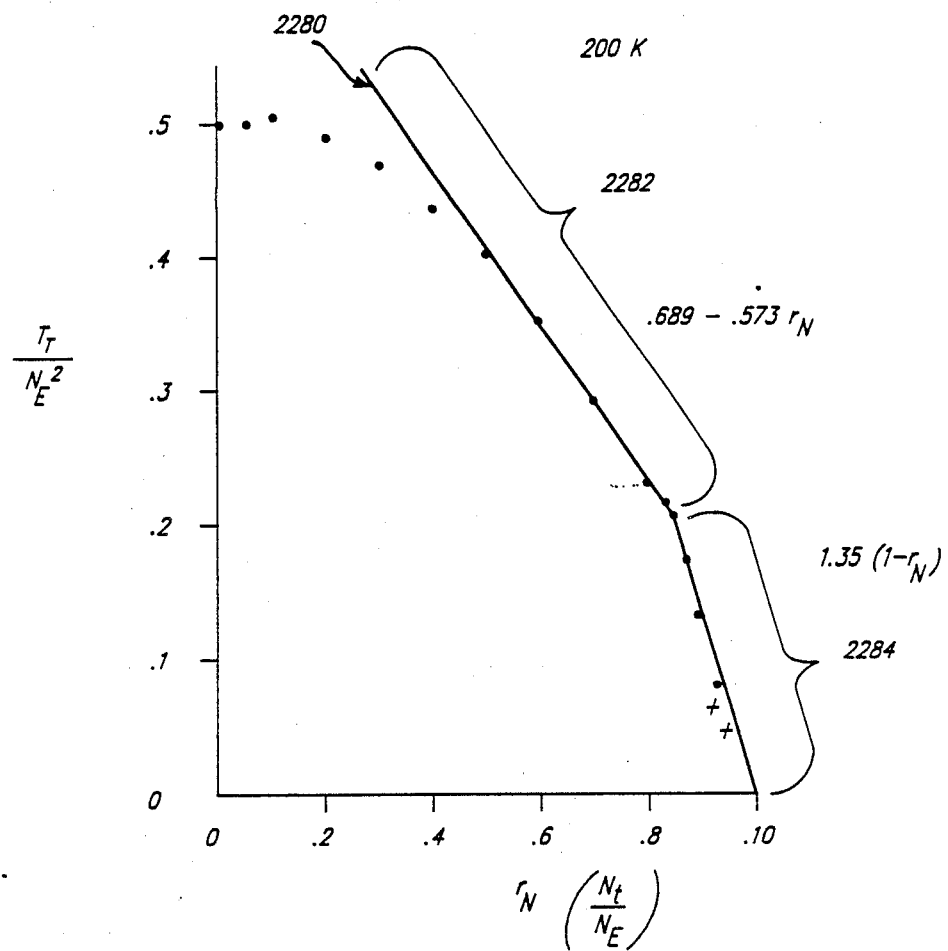

In the above equation, $DC_o$ is the duty cycle needed to maintain fill pressure on the release element, which is a predetermined value. $I_t \times \alpha_{desired}$ is the net torque to maintain desired acceleration which is also a predetermined value. $K_t$ is the gain from the DC to the turbine torque which is a predetermined value. $DC_o$, $I_t$ and $K_t$ vary for the shift involved, i.e. fourth to third gear, fourth to second gear, etc. The equation for turbine torque ($T_t$) is defined below:

$T_t = (K_1 N_e - K_2 N_t) N_e$ if $N_t$ is less than $K_3 N_e$ $T_t = K_4 (N_e - N_t) N_e$ if $N_t$ is greater than or equal to $K_3 N_e$ As illustrated in FIG. 24B, the equation for the turbine torque ($T_t$) is derived by the graph of turbine torque $T_t$ divided by engine speed $N_e$ squared (which is the same as impeller speed squared) versus speed ratio of turbine speed $N_t$ divided by engine speed $N_e$ which is curve 2280. For turbine speed $N_t$ less than a predetermined constant $K_3$ times engine speed $N_e$, the equation for turbine torque $T_t$ is indicated by part 2282 of curve 2280. For turbine speed $N_t$ equal to or greater than $K_2$ multiplied by $N_e$, the equation for turbine torque $T_t$ is indicated by part 2284 of curve 2280.

FIG. 24B is based on the characteristics of a particular model of torque converter. This can be used at any time that the lockup clutch is disengaged to calculate an input torque to the transmission 100. For a particular element involved (knowing what its capacity is), the transmission controller 3010 can calculate the DC necessary to provide the appropriate level of element torque (i.e. initial DC). After the initial percent ON time for the DC, the DC adaptively adjusts to maintain alpha$_{desired}$.

LEARN METHODOLOGY

The only learned quantity used for making downshifts is the fill time of the applying element or clutch. As previously mentioned, the element volumes are actually learned and stored. Fill times are calculated by using the learned element volume and an appropriate flow rate from a look-up table and graph of flow rate characteristics for each element for example. The learned volume information for a given element is shared between different shifts, both upshifts and downshifts. The flow rate used accounts for the individual hydraulic flow rates and compensates for line pressure differences which exist between different shifts (i.e. for element fill rates, not vent rates).

With a coastdown shift, however, the pump 200 will not, under all conditions, have the capacity to maintain the regulated line pressure. To compensate for the resulting low line pressure, a learned fill rate is used for coastdown shifts only. This fill rate is set at the regulated line pressure level with each start-up (because with cold fluid, the pump 200 will maintain the regulated pressure) and it will learn any reduction in the fill rate with each subsequent shift.

Learning fill time with downshifts is similar to upshifts in that the beginning of apply (end of fill time for the apply element) is identified by the ending of a "hold-speed" control maintained by the release element in power-ON shifts. Implicit with this is the necessity of establishing some "hold-speed" control rather than timing an exact application to be described herein. It is also necessary to handle OFF and ON times correctly since the fill event is seldom a continuous ON; the flow rates, mentioned above, provide this capacility.

The learn logic for kickdown shifts tracts the instantaneous volume of the apply element and compares that value with the current fill volume such that the apply element is completely filled at the end of the hold-speed region.

Figure 24C:
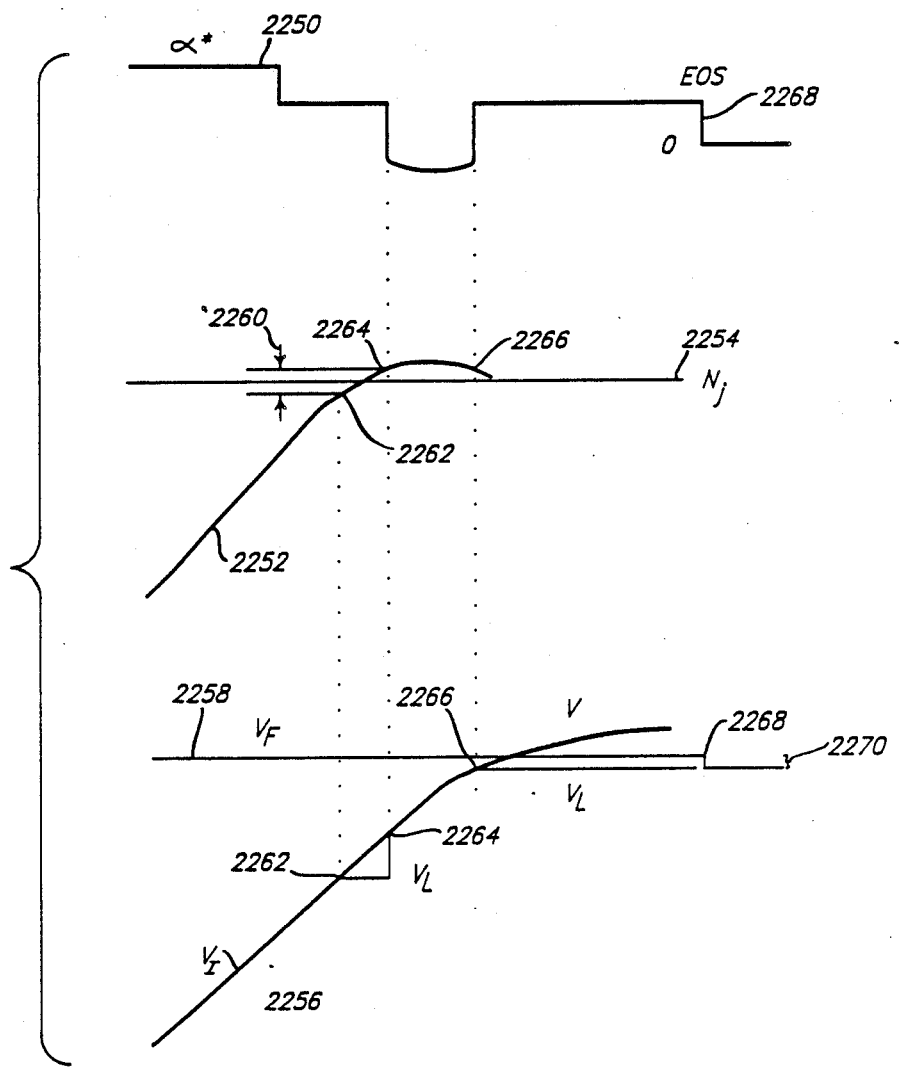

As illustrated in FIG. 24C, curve 2250 represents a desired acceleration ($\alpha^*$) of the turbine 128. Curve 2252 represents turbine speed $N_t$ and curve 2254 represents a target speed ($N_j$) of the turbine 128. Curve 2256 represents an instantaneous fill volume ($V_I$) of the apply element and curve 2258 represents the current fill volume ($V_f$) of the apply element. As $N_t$ approaches $N_j$, $N_t$ comes within a predetermined range 2260 of $N_j$. At point 2263 when $N_t$ reaches the lower limit of the predetermined range 2260, the learned volume ($V_L$) of the apply element is latched at that volume of the instantaneous fill volume ($V_I$). Once $N_t$ leaves the upper limit of the predetermined range 2260 at point 2264, the learned volume again tracks the instantaneous fill volume until $N_t$ enters the predetermined region 2260 at point 2266. At point 2266, the learned volume of the apply element is latched at that value of the instantaneous fill volume. At the end of the shift (EOS), the transmission controller 3010 takes a step out of current fill volume ($V_f$) which is a percentage of the difference between $V_f$ and $V_L$ at point 2266.

The fill volume ($V_f$) of the apply element is also "learned" and adaptively adjusted based on bump-along (i.e. element slip). As illustrated in FIG. 24D, a shift tape of the transmission characteristics is shown for a first to second (1-2) upshift. Curve 2270 represents the stored or previously learned current fill volume ($V_f$) of the apply element. Curve 2272 represents the instantaneous volume ($V_I$) of the apply element (i.e. two/four shift clutch 308). Curve 2274 represents the learned volume ($V_L$).

While a shift is in progress, the learned volume ($V_L$) is set equal to the instantaneous fill volume ($V_I$) whenever ($t_f > 0$) or ($t_f \neq 0$ and $N_f > N_j + 30$). As shown in FIG. 24D, $V_L$ tracts $V_I$ until point 2274 because $t_f$ was greater than 0. At point 2276, $t_f$ equals zero and $V_L$ stops tracking V and is set equal to the value of $V_I$ at point 2276. When $t_f = 0$, the apply element is filling in the hold-speed region. If $N_t$ is greater than $N_j$ plus a predetermined value such as 30 (i.e. slip occurs), called bump-along, $V_L$ is updated to the value of $V_I$ at point 2278. At point 2278, $V_L$ again tracks $V_I$ until $N_t$ is not greater than $N_j$ plus the predetermined value at point 2280. At point 2280, $V_L$ is set equal to the value of $V_I$ and stops tracking. This methodology is repeated whenever $N_t$ is greater than $N_j$ plus the predetermined value. At the end of the shift, the transmission controller 3010 compares $V_L$ to $V_f$. If $V_L$ is greater than $V_f$, as shown in FIG. 24D, $V_f$ is adjusted or increased a percentage of difference between $V_L$ and $V_f$. If $V_L$ equals $V_f$, no adjustment is made. Otherwise, if $V_L$ is less than $V_f$, $V_f$ is decreased.

Figure 24E:
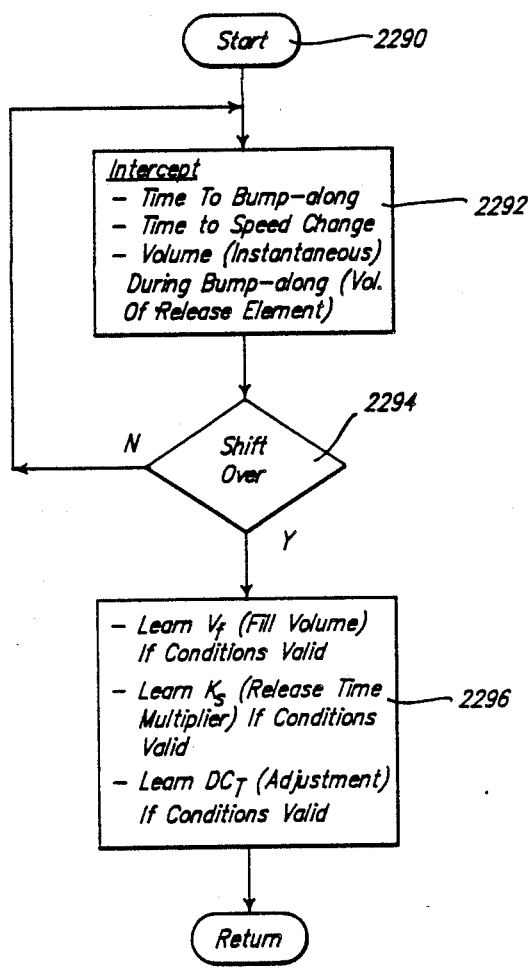

Referring to FIG. 24E, a flow chart of the learn methodology is shown. At the start of the methodology in bubble 2290, the methodology advances to block 2292. At block 2292, the methodology intercepts or determines the time to bump-along, time to speed change, and instantaneous volume during bump-along of the element. The methodology then advances to diamond 2294 and determines whether the shift has been completed. If no, the methodology loops back to block 2292. If the shift has been completed, the methodology advances to block 2296 and learns the fill volume if the conditions are valid, learns $K_s$ (release time multiplier), if conditions are valid and learns $DC_t$ (adjustment) if conditions are valid. From block 2186, the methodology returns.

COASTDOWN METHODOLOGY

The shift schedule (bubble 810 of FIG. 12) has logic which compares engine speed $N_e$ and target speed $N_j$ and delays any coastdown shift that would go from power-ON to power-OFF since these shifts involve crossing drivetrain backlash and may result in a "clunk". The 3-1 and 2-1 shifts are power-ON coastdowns (a 3-2 power-ON coastdown shift is not made); the 4-3 is typically a power-OFF shift (it may be power-ON if the shift is inhibited by the below "backlash" logic).

Figure 24F:
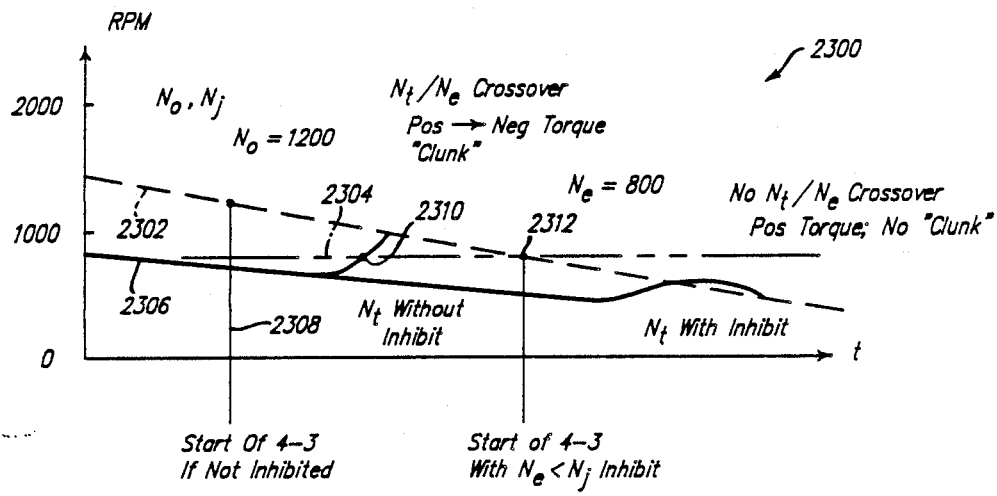

As illustrated in FIG. 24F, a graph of speed (r.p.m.) versus time is shown at 2300 for an adaptive fourth to third (4-3) gear coastdown shift. Curve 2302 represents the output speed $N_o$ or target speed $N_j$ for third gear. Curve 2302 represents the engine speed $N_e$. Curve 2306 represents turbine speed $N_t$.

If a shift is scheduled by the transmission controller 3010 when $N_e$ is less than $N_j$, the start of the 4-3 shift will occur at point 2308. As the shift occurs, $N_t$ will increase and cross over $N_e$, as indicated by point 2310, from positive to negative torque, resulting in a "clunk" of the drivetrain.

The present invention provides the feature of delaying or inhibiting the start of the shift by the transmission controller 3010 until $N_e$ is at least equal to or greater than $N_j$, as indicated by point 2312. This is accomplished by delaying the actuation and/or deactuation (i.e. turning ON and/or OFF) of the appropriate solenoid-actuated valves. By inhibiting the shift, $N_t$ will remain less than $N_e$ during the entire shift, resulting in only positive torque and preventing any "clunk" of the drivetrain.

Figure 24G:
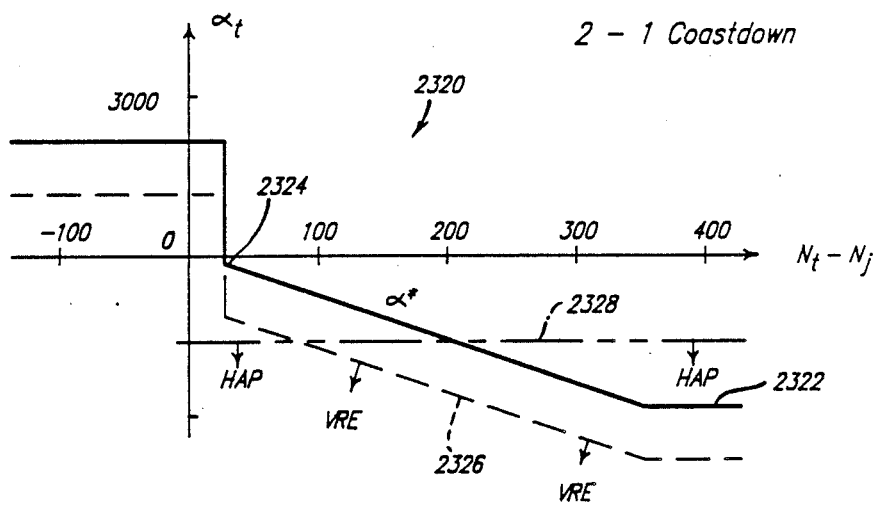

As illustrated in FIG. 24G, a phase plane graph of turbine acceleration (alpha$_t$) versus turbine speed $N_t$ minus target $N_j$ (first gear) for a second to first (2-1) gear coastdown shift is shown at 2320. The solid line curve 2322 represents the desired acceleration (alpha$_{desired}$ or $\alpha^*$) which is a function of slip. Alpha$_{desired}$ goes to a negative value in the hold-speed region of the downshift.

The present invention provides methodology for controlling alpha$_t$ at point 2324 which is approximately 25 r.p.m. This is accomplished by using proportional control ($DC_{alpha}$ or $DC\alpha$). $DC_{alpha}$ is used during coastdown shifts because real tight control hold-speed is needed and is lacking otherwise.

Referring to FIG. 24G, curve 2326 represents the vent release element (VRE) which is identified during a coastdown shift by alpha$_{desired}$ minus a predetermined value such as 1000. VRE is used where the applying element may be ON, or it is desired to vent the release element faster than normal $DC_{alpha}$ would (rather than backing off the release element's duty cycle by $DC_{alpha}$, which would eventually release the element). If actual alpha$_t$ is below VRE curve 2326, as indicated by the arrow, the release element is turned OFF. This would result in actual alpha$_t$ coming back above the VRE curve 2326 if the apply element was not ON. Once alpha$_t$ was above the VRE curve 2326, the methodology would instruct the transmission controller 3010 to turn the release element ON. If the apply element was ON, alpha$_t$ would not come back above the VRE curve 2326.

Referring to FIG. 24G, curve 2328 represents hold the apply pressure (HAP). HAP is used where there is too much negative alpha$_t$. In other words, HAP is used where alpha$_t$ is less than a predetermined value such as −1700. HAP prevents the apply element from applying hard quickly by duty cycling the apply element to maintain it at a predetermined pressure. This prevents the apply element from building up torque any faster in the hold-speed region, causing alpha$_t$ to come back above the HAP curve 2328.

Figure 24H:
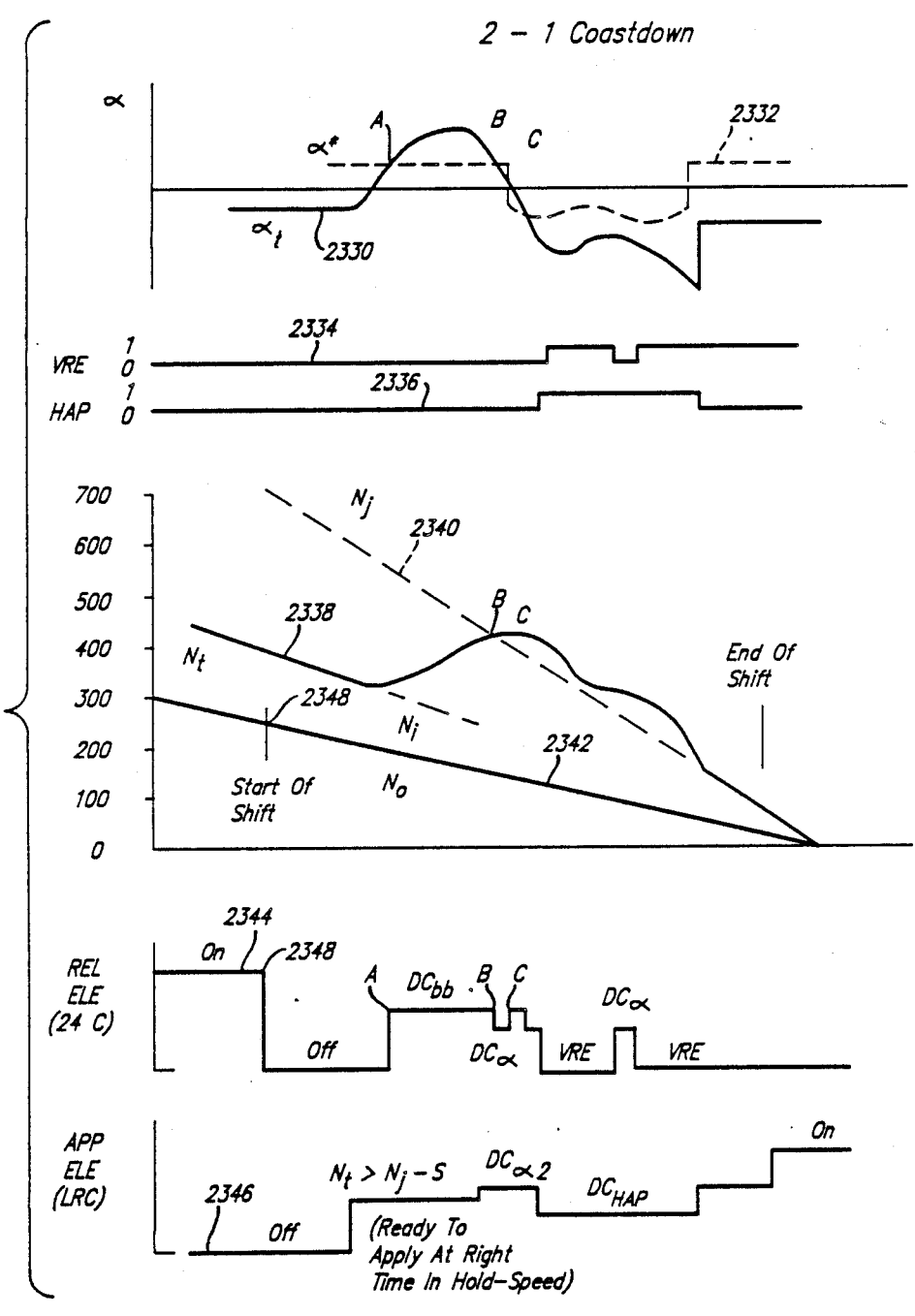

As illustrated in FIG. 24H, a plot of actual turbine acceleration (alpha$_t$) represented by curve 2330 and desired acceleration (alpha$_{desired}$ or $\alpha^*$) represented by curve 2332 is shown for a second to first (2-1) gear coastdown shift. A logic curve 2234 represents VRE and logic curve 2236 represents HAP. A plot of turbine speed N$_t$ represented by curve 2338, target speed N$_j$ represented by curve 2340, and output speed N$_o$ represented by curve 2342 is shown from the start to the end of the second to first gear coastdown shift. Logic curves 2344 and 2346 show the element logic for the release element (two/four shift clutch 308) and the apply element (low/reverse clutch 310), respectively.

Referring to FIG. 24H, the release element is ON until the start of shift at point 2348. At that time, the methodology turns the release element OFF. Simultaneously, the apply element which has been previously OFF is maintained OFF. Also, curve 2338 of N$_t$ is less than curve 2340 of N$_j$.

After the start of shift at point 2348, alpha$_t$ starts to rise or increase. When alpha$_t$ crosses alpha$_{desired}$ at point A (wait until slip), the release element is turned ON or reapplied using duty cycle bang-bang (DC$_{bb}$). DC$_{bb}$ is used until alpha$_t$ again crosses alpha$_{desired}$ at point B. Also, N$_t$ crosses N$_j$ at point B. At point B, the release element switches from DC$_{bb}$ to proportional control (DC$_{alpha}$ or DC$\alpha$).

Referring to FIG. 24H, the apply element comes on before point B to be ready at the right time into hold-speed region (starts at point C). At point C, alpha$_{desired}$ enters the hold-speed region. The release element against switches to DC$_{bb}$ while the apply element is under DC$_{alpha}$. If alpha$_t$ goes too far below alpha$_{desired}$, VRE is applied as previously described. Alternatively, if alpha$_t$ is below the HAP value, HAP will be applied as previously described. Thus, N$_t$ is matched to N$_j$ and alpha$_t$ is matched to alpha$_{desired}$ at the end of the shift by using DC$_{bb}$, DC$_{alpha}$, VRE and/or HAP.

Figure 24I:
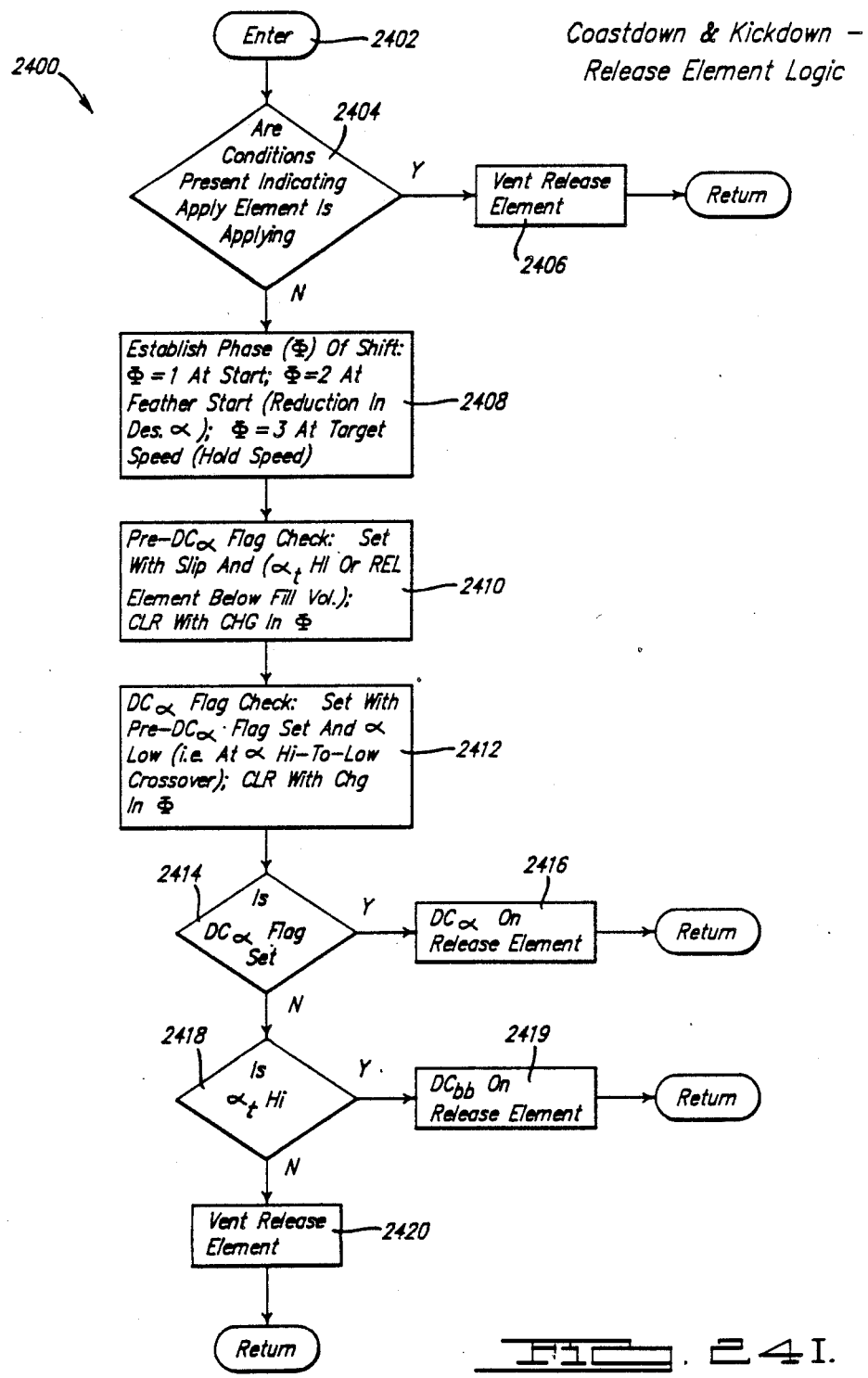

Referring to FIG. 24I, the methodology for the release element used during a coastdown or kickdown shift is generally shown at 2400. The methodology enters through bubble 2402 and advances to diamond 2404. At diamond 2404, the methodology determines whether the conditions are present indicating that the apply element is applying. In other words, are conditions present for VRE (i.e. THR<5° and alpha$_t$<alpha$_{desired}$−1000). If that criteria is true, the methodology advances to block 2406 and vents the release element (applies VRE). The methodology then returns. If that criteria is not true, the methodology advances to block 2408 and establishes the phase of the shift: phase 1 equals the start; phase 2 equals the feather start (reduction in desired acceleration); and phase 3 equals target speed (hold-speed). This is accomplished by performing speed calculations and setting a flag for each phase of the shift. The methodology then advances to block 2410 and performs a pre-DC$_{alpha}$ flag check by setting the flag with slip and alpha$_t$ is HI or the release element is below fill volume, and clearing the flag with a change in the phase of the shift. The methodology then advances to block 2412 and performs a duty cycle$_{alpha}$ flag check. The methodology sets the DC$_{alpha}$ flag when the pre-DC$_{alpha}$ flag has been set and alpha is LOW (i.e. alpha$_t$, high-to-low crossover) and it cleared with the change in phase of the shift. The methodology then advances to diamond 2414 and determines whether the DC$_{alpha}$ flag has been set. If the flag has been set, the methodology advances to block 2416 and uses DC$_{alpha}$ control or DC$_{alpha}$ on release element. DC$_{alpha}$ control is when the total period is fixed and the ON and OFF time is calculated and adjusted (i.e. variable ON and OFF time). The methodology then returns. If the flag has not been set, the methodology advances to diamond 2418 and determines whether alpha$_t$ is HI. If that criteria is true, the methodology advances to block 2418 and performs DC$_{bang-bang}$ control or DC$_{bb}$ on the release element and returns. DC$_{bb}$ control is when the total period is fixed and the ON and OFF time is fixed (e.g. at 60% ON). If that criteria is not true, the methodology advances to block 2420 and vents the release element and returns.

Figure 24J:
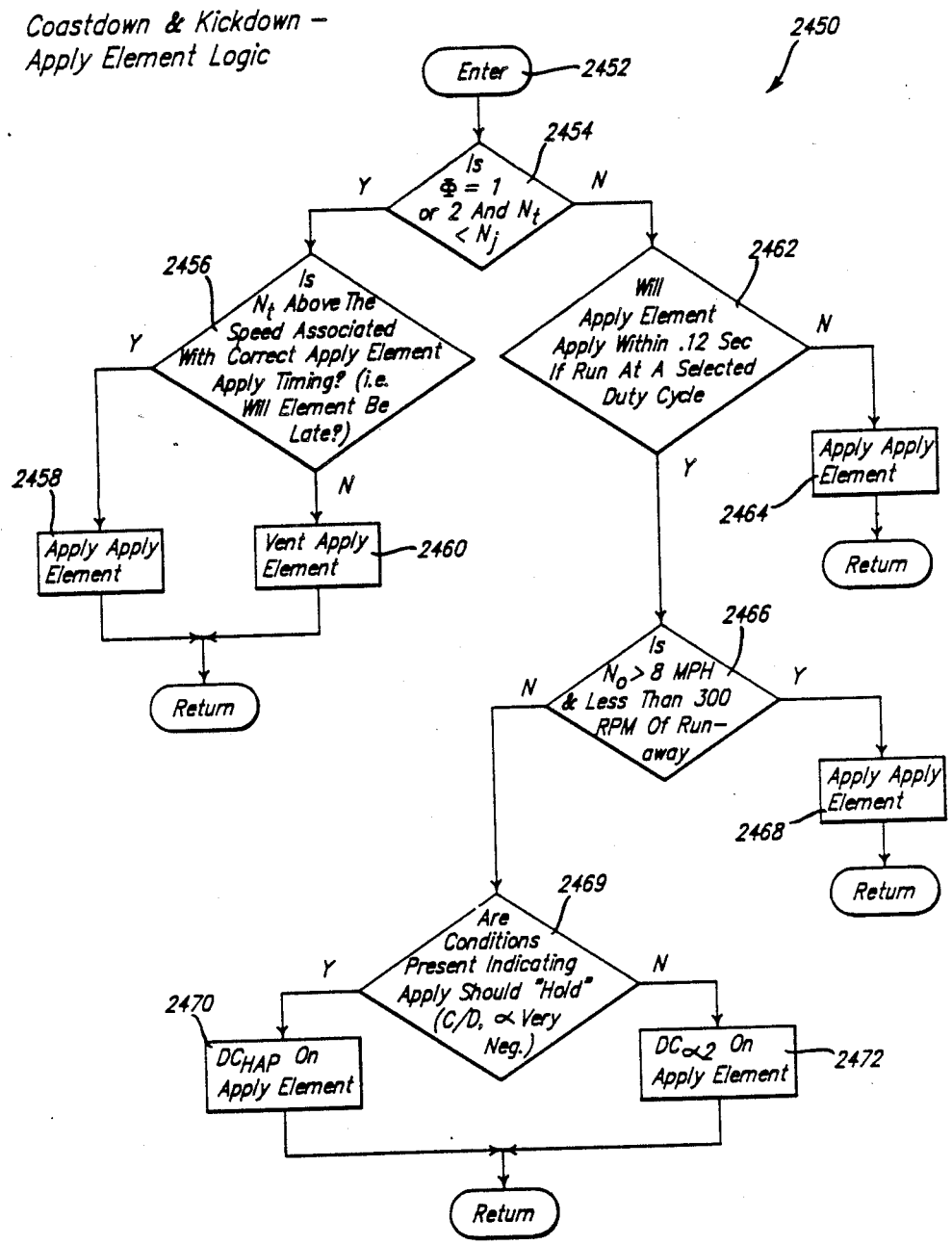

Referring to FIG. 24J, the methodology for the apply element is generally shown at 2450 for a coastdown or kickdown shift. The methodology enters through bubble 2452 and advances to diamond 2454. At diamond 2454, the methodology determines whether the phase of the shift is equal to one or two and N$_t$ is less than N$_j$. If any of this criteria is true, the methodology advances to diamond 2456 and determines whether N$_t$ is above the speed associated with the correct apply timing (i.e. will element be late). In other words, the methodology determines whether N$_t$ is greater than S (kickdown start valve previously described). If that criteria is true, the methodology advances to block 2458 and applies the apply element and returns. If that criteria is not true, the methodology advances to block 2460 and vents the apply element and returns.

At diamond 2454, if any of that criteria is not true, the methodology advances to diamond 2462 and determines whether the apply element will apply within 120 ms if run at a predetermined duty cycle by looking at the fill volume (V$_f$). If that criteria is not true, the methodology advances to block 2464 and applies the apply element and returns. If that criteria is true, the methodology advances to diamond 2466 and determines whether vehicle speed or N$_o$ is greater than a predetermined speed such as 8 mph and less than 300 r.p.m. of run away for the turbine 128. If that criteria is true, methodology advances to block 2468 and applies the apply element and returns. If that criteria is not true, the methodology advances to diamond 2468 and determines whether conditions are present indicating apply element should "hold" (for a coastdown, alpha$_t$ very negative). In other words, the methodology determines whether the conditions are present to apply HAP (i.e. THR<5° and $\alpha_t$<−1700). If that criteria is true, the methodology advances to block 2470 and performs DC$_{HAP}$ on the apply element and returns. If that criteria is not true, the methodology advances to block 2472 and performs DC$_{alpha2}$ (secondary element DC acceleration control) on the apply element and returns.

Another feature of the present invention used during a coastdown shift is a methodology called "wait-for-slip". At the beginning of the coastdown shift, the release element is vented. Whenever slip is present (i.e. N$_t$≠N$_j$) and V$_I$<V$_f$ for the release element and V<V$_f$ for the apply element, and THR≧5° or 2-1 or 3-2 or 3-1 shift is occurring, the methodology controls the release element at a low limit percent ON for its $DC_{alpha}$. The methodology attempts to keep the release element from further venting because the release element may be needed to apply again. Once, the above conditions are no longer present, the release element continues to vent.

ACCUMULATOR CONTROL

As illustrated in FIGS. 5A-L, the hydraulic system 600 includes accumulators 630, 604, 642, 644 for the clutch assemblies 302, 304, 308 and 310, respectively. The accumulators provide mechanical cushion so that extreme changes in pressure are not realized as the solenoid-actuated valves are turned ON or OFF. These accumulators help reduce the axial length of the transmission 100 and give more flexibility to the hydraulic system. This is advantageous over prior systems which used large cushion springs built in the clutch packs, increasing the axial length of the transmission.

Figure 24K:
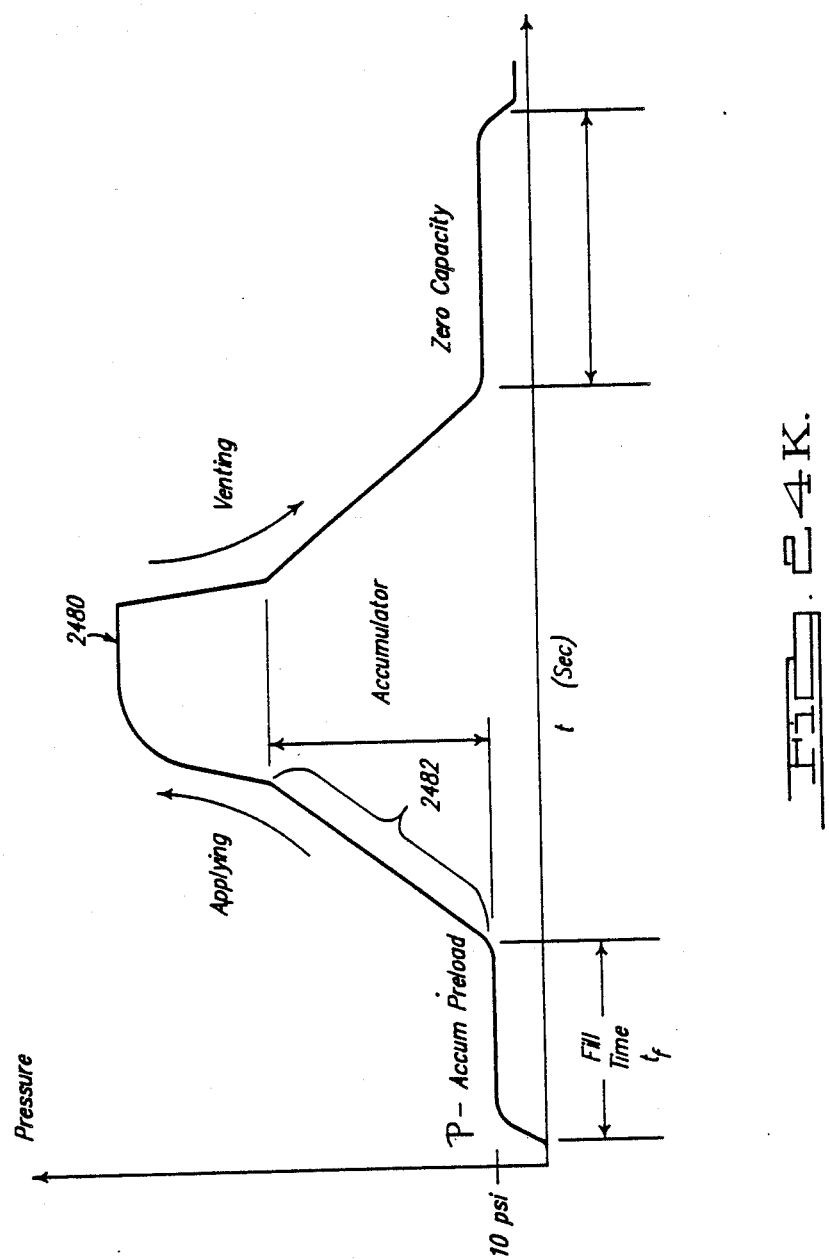

As illustrated in FIG. 24K, a curve 2480 of pressure versus time for applying and venting (releasing) of an element or clutch is shown. The accumulator control zone, represented by part 2482 of the curve 2480, provides compliance or softness so that it takes time to develop a large change in pressure. Otherwise, if no accumulator was used, the slope of this part of the curve would be steeper and a small change in ON time would result in a large change in pressure, making torque capacity and shift quality unbearable.

In other words, control is performed in the accumulator control zone to prevent large excursions in the output torque ($T_o$) which would create jerkiness or harshness in shift quality. For example, turning the release element ON during slip or bump-along without an accumulator would produce a steeper slope in the output torque, resulting in an inability to limit slip without harsh control.

TORQUE PHASE SHIFT CONTROL METHODOLOGY

The learned term for apply rate is torque phase duty cycle, $DC_t$. The purpose of the torque phase duty cycle is to make the hand-off smooth between the release element letting go of torque and the apply element taking over torque. This is accomplished by timing the apply element to have sufficient capacity to start the speed change just as the release element capacity reaches zero. In other words, the methodology attempts to build-up apply element torque capacity to match torque fall-off capacity of the release element.

The torque phase duty cycle is adaptively adjusted to match torque build-up of the apply element to torque fall-off of the release element according to the following equation:

$$DC_t = DC_{tt} + DC_{ta} + \text{delta} +$$

$$10\% \begin{cases} 10\% \text{ with } N_t < N_j - B \text{ \& } THR > 10° \\ 0\% \text{ with } N_t \geq N_j - B \text{ or } THR \leq 10° \end{cases}$$

Where:
THR = throttle angle
B = slip (40 r.p.m.)

The above equation is based on a table value, $DC_{tt}$ or nominal $DC_t$ values (fixed % ON time) based on throttle angle, plus a learned adjustment, $DC_{ta}$. Since the intent is to have the speed change begin as the release element net-apply-pressure reaches zero, the methodology selects a $DC_t$ which will achieve the start of speed change at an interval after the start of venting of the release clutch. This interval is equal to the learned time to release at zero degrees throttle angle plus an allowance for one bump-along cycle. The transmission controller 3010 does this by achieving and maintaining $t_f$ equal to zero until slip occurs, then $DC_t$ is allowed to proceed.

Referring to FIG. 24D, curve 2500 represents the logic state of the release element. Curve 2502 represents slip in the transmission 100. At point 2504 on curve 2500, the release element is turned OFF or starts to vent. The interval between the start of vent at point 2504 until the start of speed change, which is point 2506 on curve 2502, is known as t* which is a predetermined value different for each upshift. Curve 2508 represents the logic state of the apply element. At point 2510 on curve 2508, the apply element is initially turned OFF or vented. At point 2510, $t_f$ is equal to zero and $DC_t$ starts for the apply element.

The slope of $DC_t$ is tailored so that it matches the build-up in apply element torque capacity. For throttle angles greater than 10°, the apply element is given a 10% boost in its duty cycle so that the actual turbine acceleration (alpha$_t$ or $\alpha_t$) will achieve the desired acceleration (alpha$_{desired}$ or $\alpha^*$).

As illustrated in FIG. 24D, curve 2512 represents the desired acceleration (alpha$_{desired}$) and curve 2514 represents the actual turbine acceleration (alpha$_t$). At point 2506 on curve 2502, the speed change begins. Alpha$_t$ is greater than alpha$_{desired}$. Therefore, $DC_{ta}$ adds 10% boost in ON time to $DC_t$ for the apply element such that alpha$_t$ will be momentarily equal to alpha$_{desired}$ at or near the end of $DC_t$.

As shown and described above, $DC_{ta}$ is the learned adjustment to $DC_t$. $DC_{ta}$ is used so that the start of the speed change from the initial release occurs within a predetermined time period called time to start speed change ($t_n$). This time is when it is desired to have the speed change begin because the release element pressure will have decayed down to the fill pressure such that no torque capacity is on the element. Otherwise, if the speed change begins earlier or prior to this time, fight will occur because both the apply and release element have capacity. $t_n$ is defined as follows:

$t_n = t_t - t_v$ at the end of shift, where:
$t_t$ = value of time 't' with $N_t \geq N_i - B$ or previous value of $t_t$ with $N_t < N_i - B$
$t_v$ = value of time 't' at initial venting of release element or last occurrence of $V \geq V_f + V_a$ for release element Initially, $DC_{ta}$ is equal to zero (i.e. battery disconnect). Then, $DC_{ta}$ is defined as follows:

$$DC_{ta} = DC_{ta} + 1.2\%, \text{ with } t_n > t^{*a} + 0.028$$

$$DC_{ta} - 1.2\%, \text{ with } t_n < t^{*a} + 0.028$$

In the above equation, $t^{*a}$ is an adjusted value of t* (a predetermined table value) based on a learned value of $K_s$. $K_s$ is used to predict where the first cycle of bump-along occurs because of changes in temperature. $K_s$ is used to adjust t* based on temperature so that start of $DC_t$ for the apply element occurs just prior to the first bump-along cycle.

Referring to the equation for $DC_t$, a delta term is used when the transmission system has not learned out properly the above variables. If t* is less than the start of speed change at point 2506 on curve 2502, the % ON time for $DC_t$ is increased or incremented until the start of speed change begins at the end of $t^*$. Thus, the delta term provides added protection by reacting immediately.

GARAGE SHIFT METHODOLOGY

Referring to FIG. 24L, a shift tape representation of various characteristics of the transmission 100 is shown. Curve 2502 represents the logic state of the apply element and curve 2504 represents the logic state of the release element. Curve 2506 represents the desired acceleration (alpha$_{desired}$) and curve 2508 represents the actual turbine acceleration (alpha$_t$). Curve 2510 represents the pressure of low/reverse element and curve 2512 represents the pressure of the reverse element.

When the manual value 604 is shifted to reverse R, the low/reverse element starts to vent. The low/reverse clutch solenoid-actuated valve 636 is turned OFF as indicated by point 2514 on curve 2502. The pressure in the low/reverse element starts to decrease or decay as shown by part 2516 of curve 2510. During this time, the reverse element is filling and the pressure starts to increase as shown by part 2518 of curve 2512. When the pressure in the low/reverse element has decayed to a fairly low level as indicated by point 2520 on curve 2510, the low/reverse element is reapplied under DC control at point 2520 on curve 2504.

ON-BOARD DIAGNOSTICS

The on-board diagnostics provide diagnostic test routines to quickly identify control problems. An example of such diagnostics is found in U.S. Pat. No. 4,612,638, issued Sept. 16, 1986, in the name of Kissel, which is hereby incorporated by reference. The transmission controller 3010 also includes a set of diagnostics to isolate transmission problems.

Figure 25A:
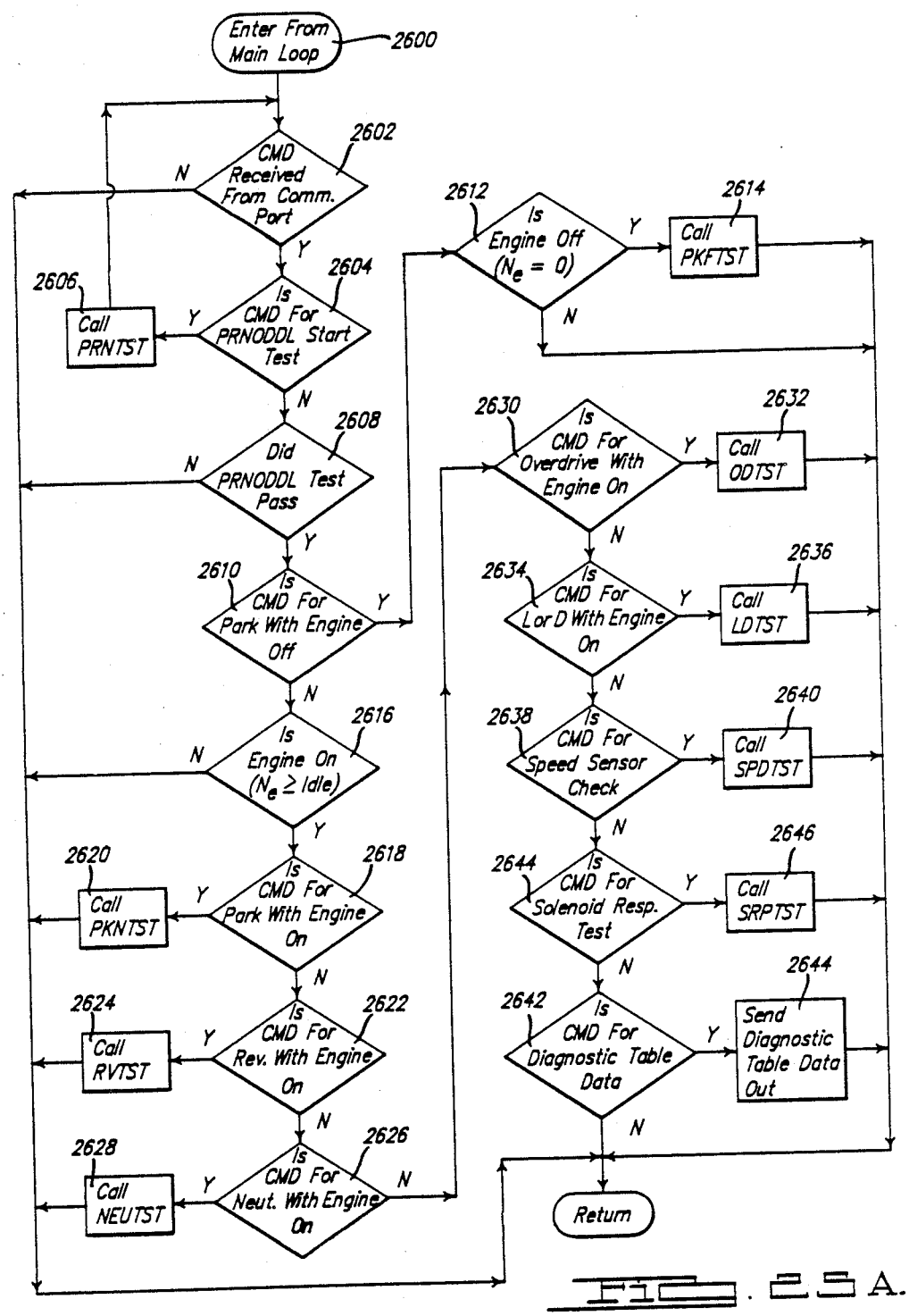
Figure 23B:
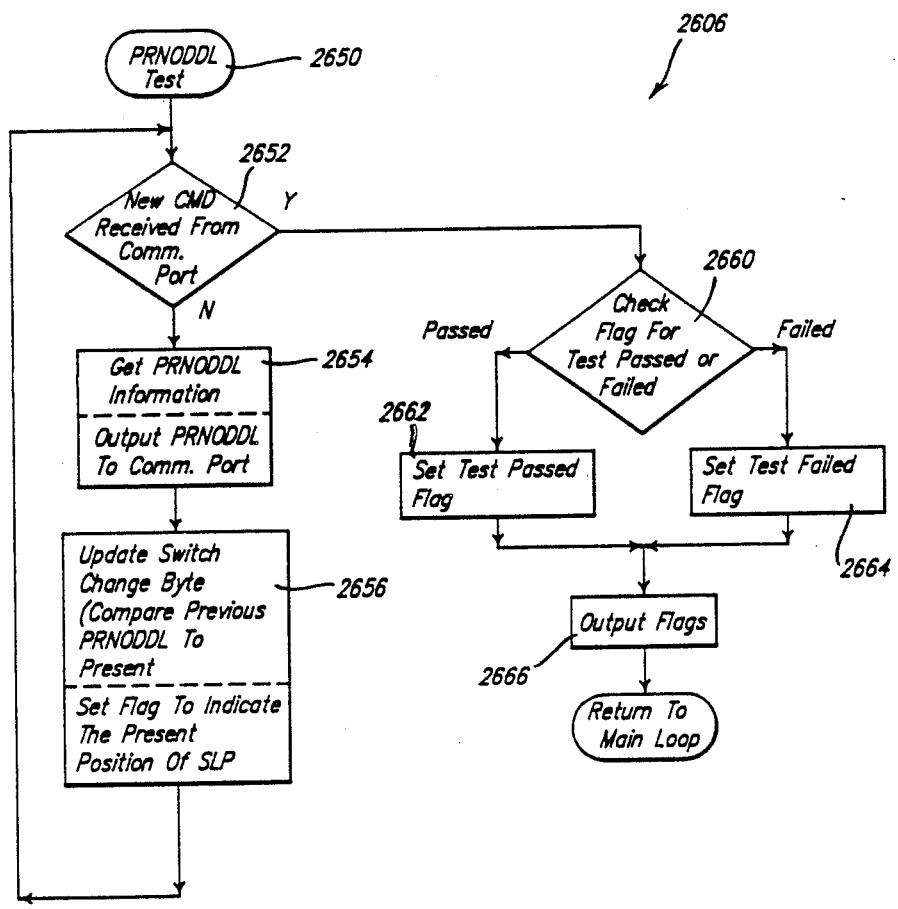

Referring to FIG. 25A, the methodology for the on-board diagnostics is shown. At the start of the methodology in bubble 2600, the methodology advances to diamond 2602 and determines whether a command (CMD) was received by looking for a string of bytes from a communications port on the transmission controller 3010. If a command was not received, the methodology advances to block 2642 to be described herein. If a command was received, the methodology advances to diamond 2604 and determines whether the command received was for a PRNODDL start test. If the command received was for a PRNODDL start test, the methodology advances to block 2606 and calls the PRNODDL test routine or methodology to be described (See FIG. 25B). The methodology then returns to diamond 2602.

At diamond 2604, if the command received was not for a PRNODDL start test, the methodology advances to diamond 2608 and determines whether the PRNODDL test passed by looking for a flag for example. If the PRNODDL test did not pass, the methodology advances to block 2642. If the PRNODDL test did pass, the methodology advances to diamond 2610 and determines whether the command received is for a solenoid/pressure switch test routine based on the transmission 100 operating in park P with the engine of the vehicle off by looking for a coded output or a flag for example. If the command was received, the methodology advances to diamond 2612 and determines whether the engine is off ($N_e = 0$). If the engine is not off, the methodology advances to block 2642. If the engine is off, the methodology advances to block 2614 and calls the park engine-off test to be described (See FIG. 25C).

At diamond 2610, if the command received was not for the park with the engine off solenoid/pressure switch test, the methodology advances to diamond 2616 and determines whether the engine is on ($N_e$ is greater than or equal to a predetermined value such as idle speed). If that criteria is not true, the methodology advances to block 2642. If that criteria is true, the methodology advances to diamond 2618 and determines whether the command received was for a solenoid/pressure switch test routine based on the transmission 100 operating in park with the engine on ($N_e$ greater than or equal to the engine idle speed). If the command was received, the methodology advances to block 2620 and calls the park engine test to be described (See FIG. 25D). The methodology then advances to block 2642.

At diamond 2618, if the command received was not for park with the engine on solenoid/pressure switch test, the methodology advances to diamond 2622 and determines whether the command received was for a solenoid/pressure switch test routine based on the transmission 100 operating in reverse with the engine on. If that criteria is true, the methodology advances to block 2624 and calls the reverse test to be described (See FIG. 25E). The methodology then advances to block 2642.

At diamond 2622, if the command received was not for reverse with the engine on, solenoid/pressure switch test, the methodology advances to diamond 2626 and determines whether the command received was for a solenoid/pressure switch test routine based on the transmission 100 operating in neutral with the engine on. If that criteria is true, the methodology advances to block 2628 and calls the neutral test to be described (See FIG. 25F). The methodology then advances to block 2642.

At diamond 2626, if the command received was not for neutral with the engine on solenoid/pressure switch test, the methodology advances to diamond 2630 and determines whether the command received was for a solenoid/pressure switch test routine based on the transmission 100 operating in overdrive with the engine on. If that criteria is true, the methodology advances to block 2632 and calls the overdrive test to be described (See FIGS. 25G to 25H). The methodology then advances to block 2642.

At diamond 2630, if the command received was not for overdrive with the engine on solenoid/pressure switch test, the methodology advances to diamond 2634 and determines whether the command received was for a solenoid/pressure switch test routine based on the transmission 100 operating in low or drive with the engine on. If that criteria is true, the methodology advances to block 2636 and calls the low/drive test to be described (See FIG. 25I). The methodology then advances to block 2642.

At diamond 2634, if the command received was not for low or drive with engine on solenoid/pressure switch test, the methodology advances to diamond 2638 and determines whether the command received was for a speed sensor test made with the engine on. If that criteria is true, the methodology advances to block 2640 and calls the speed sensor test to be described (See FIG. 25J). The methodology then advances to block 2642.

At diamond 2638, if the command received was not for a speed sensor test, the methodology advances to diamond 2644 and determines whether the command received was for a solenoid response test. If the command received was for a solenoid response test, the methodology advances to block 2646 and calls the solenoid response test to be described (See FIG. 25K). Once this has been completed, or the command received was not for a solenoid response test, the methodology advances to diamond 2262. At diamond 2262, the transmission controller 3010 determines whether the command received was for diagnostic table data. If yes, the methodology advances to block 2644 and sends out diagnostic table data such as $N_e$, $N_t$ and $N_o$ from the transmission controller 3010 to another electronic device. The methodology then returns. If the command was not for diagnostic table data, the methodology returns.

Referring to FIG. 25B, the methodology for the PRNODDL test routine or methodology in block 2606 of FIG. 25A is shown. This methodology checks the operation of the PRNODDL contact switch sensors ($NS_1$, $NS_2$, $RL_1$, $RL_2$) previously described. At the start of the test in bubble 2650, the methodology advances to diamond 2652 and determines whether a new command was received from the communications port as previously described. If a new command was not received, the methodology advances to block 2654 and gets the information as to the position of the manual lever 578 (i.e. park P) (See FIG. 19) as previously described. The methodology then advances to block 2656 and updates the memory of the transmission controller 3010 and compares the previous position of the manual lever 578 to the present position to determine a match. The methodology also sets a flag in the PRNODDL start test to indicate the present position of the shift lever (SLP) or manual lever 578. The methodology then returns to diamond 2652.

At diamond 2652, if a new command was received, the methodology advances to diamond 2660 and checks the PRNODDL states for whether the test was passed or failed. If the test passed, the methodology advances to block 2662 and sets a test passed bit or flag. If the test failed, the methodology advances to block 2664 and sets a test failed flag. The methodology advances from blocks 2662 and 2664 to block 2666 and outputs the flags to a diagnostic readout box (DRB) or the like. The methodology then returns to the main loop.

Figure 25C:
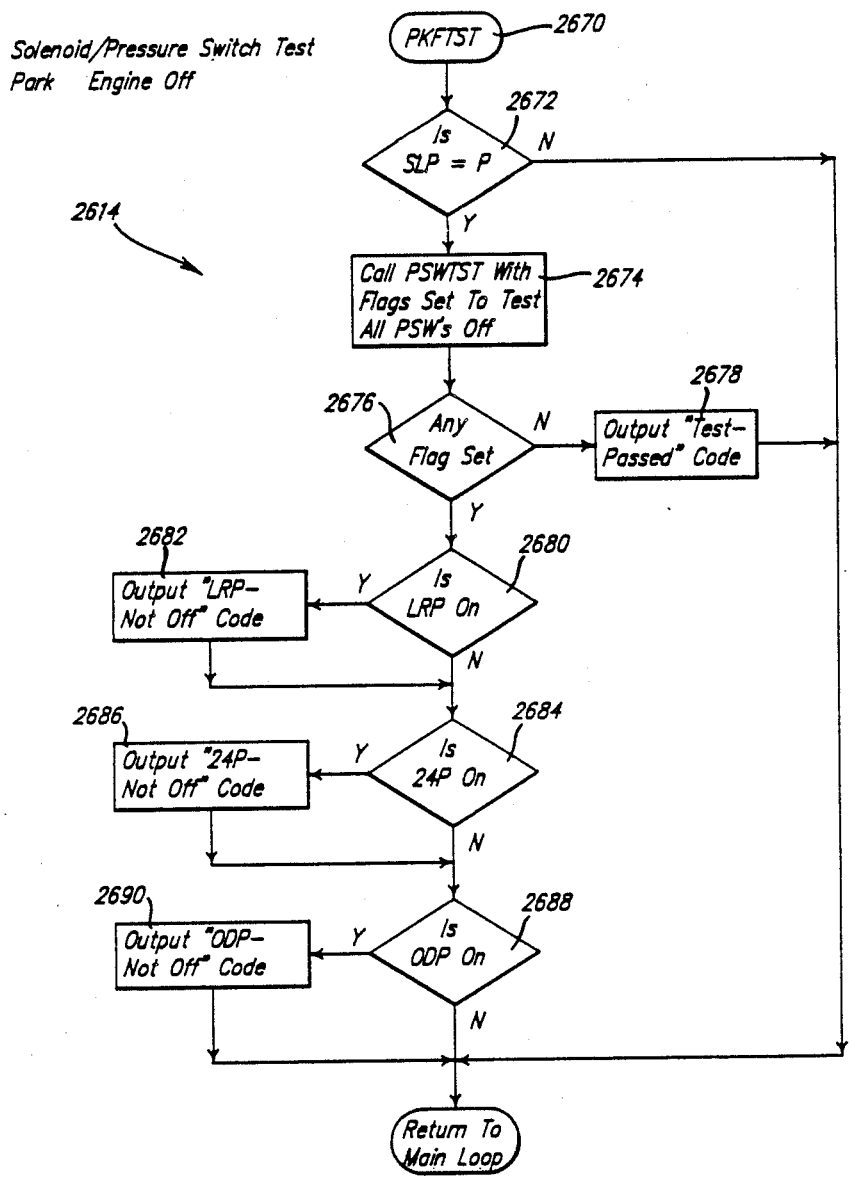

Referring to FIG. 25C, the solenoid/pressure switch test for the transmission 100 operating in park with engine off routine or methodology in block 2614 of FIG. 25A is shown. The methodology is used to check the operation of the solenoid-actuated valves 630, 632, 634 and 636 and pressure switches 646, 648 and 650 (FIGS. 5A-L). At the beginning of the methodology in bubble 2670, the methodology advances to diamond 2672 and determines whether the shift lever position (SLP) 606 is park P as previously described. If the SLP 606 is not park, the methodology returns to the main loop. If the SLP 606 is park, the methodology advances to block 2674 and calls the pressure switch test routine or methodology, previously described in connection with FIGS. 21A and 21B, to test all pressure switches 646, 648 and 650. The methodology then advances to diamond 2676 and determines whether any flags were set. If no flags were set, the methodology advances to block 2678 and outputs a "test-passed" code to the DRB. The methodology then returns to the main loop.

At diamond 2676, if any of the flags are set, the methodology advances to diamond 2680 and determines whether the low/reverse pressure switch 650 is on or pressurized by checking on input port to see if ON or OFF. If that criteria is true, the methodology advances to block 2682 and outputs a code that the "low/reverse pressure switch not off" to the DRB. The methodology advances from block 2682 to diamond 2684. At diamond 2684, the methodology determines whether the two/four pressure switch 648 is on or pressurized as previously described. If that criteria is true, the methodology advances to block 2686 and outputs a code that "two/four pressure switch is not off". The methodology then advances to diamond 2688 and determines whether the overdrive pressure switch 646 is on or pressurized as previously described. If that criteria is not true, the methodology returns to the main loop. If that criteria is true, the methodology advances to block 2690 and outputs a code that the "overdrive pressure switch is not off". The methodology then returns to the main loop.

Figure 25D:
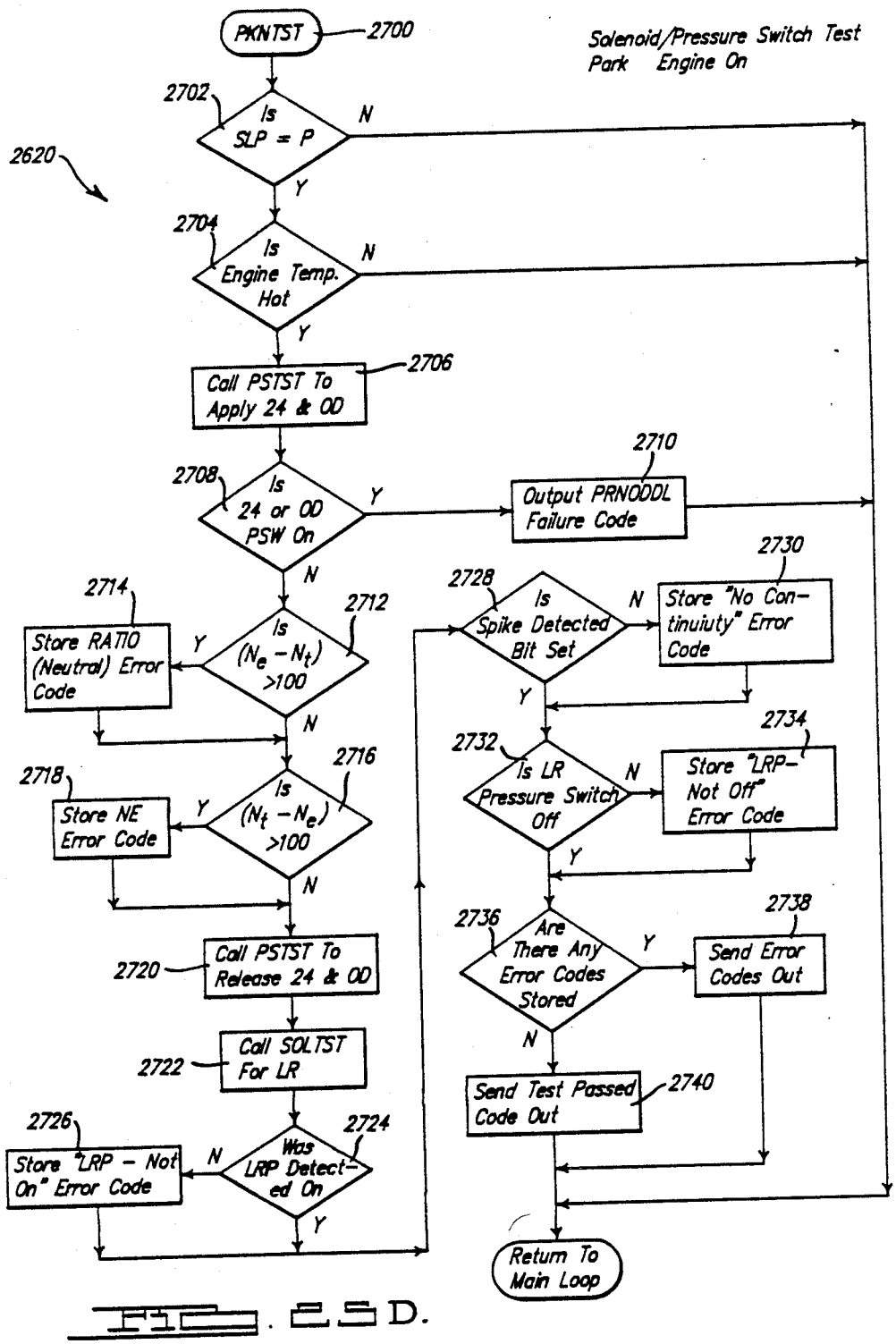

Referring to FIG. 25D, the methodology for the solenoid/pressure switch test for the transmission 100 operating in park with engine on (i.e. $N_e$ greater than a predetermined value) of block 2620 of FIG. 25A is shown. At the beginning of the methodology in bubble 2700, the methodology advances to diamond 2702 and determines whether the SLP 606 is park P as previously described. If the SLP 606 is not park, the methodology returns to the main loop. If the SLP 606 is park, the methodology advances to diamond 2704 and determines whether the engine temperature is hot, from the transmission temperature routine as previously described, by looking for a flag for example. If the engine temperature is not hot, the methodology returns to the main loop. If the engine temperature is hot, the methodology advances to block 2706 and calls the pressure switch test previously described to apply the two/four 648 and overdrive 646 pressure switches. The methodology then advances to diamond 2708 and determines whether the two/four 648 or overdrive 646 pressure switch is on or pressurized as previously described. If either pressure switch is on, the methodology advances to block 2710 and outputs "PRNODDL failure" code to the DRB. The methodology then returns to the main loop.

At diamond 2708, if the two/four 648 or overdrive 646 pressure switch is not on or pressurized, the methodology advances to diamond 2712 and determines whether the difference between $N_e$ and $N_t$ is greater than a predetermined value such as 100 r.p.m. If that criteria is true, the methodology advances to block 2714 and stores in memory the ratio "neutral" error code. Once this has been accomplished or the difference is not greater at diamond 2712, the methodology advances to diamond 2716 and determines whether the difference between $N_t$ and $N_e$ is greater than a predetermined value such as 100 r.p.m. If that criteria is true, the methodology advances to block 2718 and stores in memory an engine speed "$N_e$" error code. Once this has been accomplished or the difference is not greater at diamond 2716, the methodology advances to block 2720 and calls the pressure switch test to release the two/four 648 and overdrive 646 pressure switches. The methodology then advances to block 2722 and calls a solenoid test for the low/reverse solenoid-actuated valve 636. The solenoid test in an internal routine which turns the solenoid ON or OFF to check for pressure and spike response. The methodology then advances to diamond 2724 and determines whether the low/reverse pressure switch 650 was on or pressurized. If the pressure switch 650 is not on, the methodology advances to block 2726 and stores in memory an error code that the "low/reverse pressure switch not on". The methodology then advances to diamond 2728. At diamond 2728, the transmission controller 3010 determines whether a spike detected bit or flag (i.e. flyback voltage) was set. If the spike detected bit or flag was not set, the methodology advances to block 2730 and stores in memory a "no continuity" error code. The methodology then advances to diamond 2732.

At diamond 2732, the transmission controller 3010 determines whether the low/reverse pressure switch 650 is off or not pressurized. If that criteria is not true, the methodology advances to block 2734 and stores in memory an error code that the "low/reverse pressure switch not off". The methodology then advances to diamond 2736.

At diamond 2736, the transmission controller 3010 determines whether any error codes are stored. If any error codes are stored, the methodology advances to block 2338 and sends out the error codes to the DRB. The methodology then returns to the main loop. If there are no error codes stored, the methodology advances to block 2740 and sends out a "test-passed" code. The methodology then returns to the main loop.

Figure 25E:
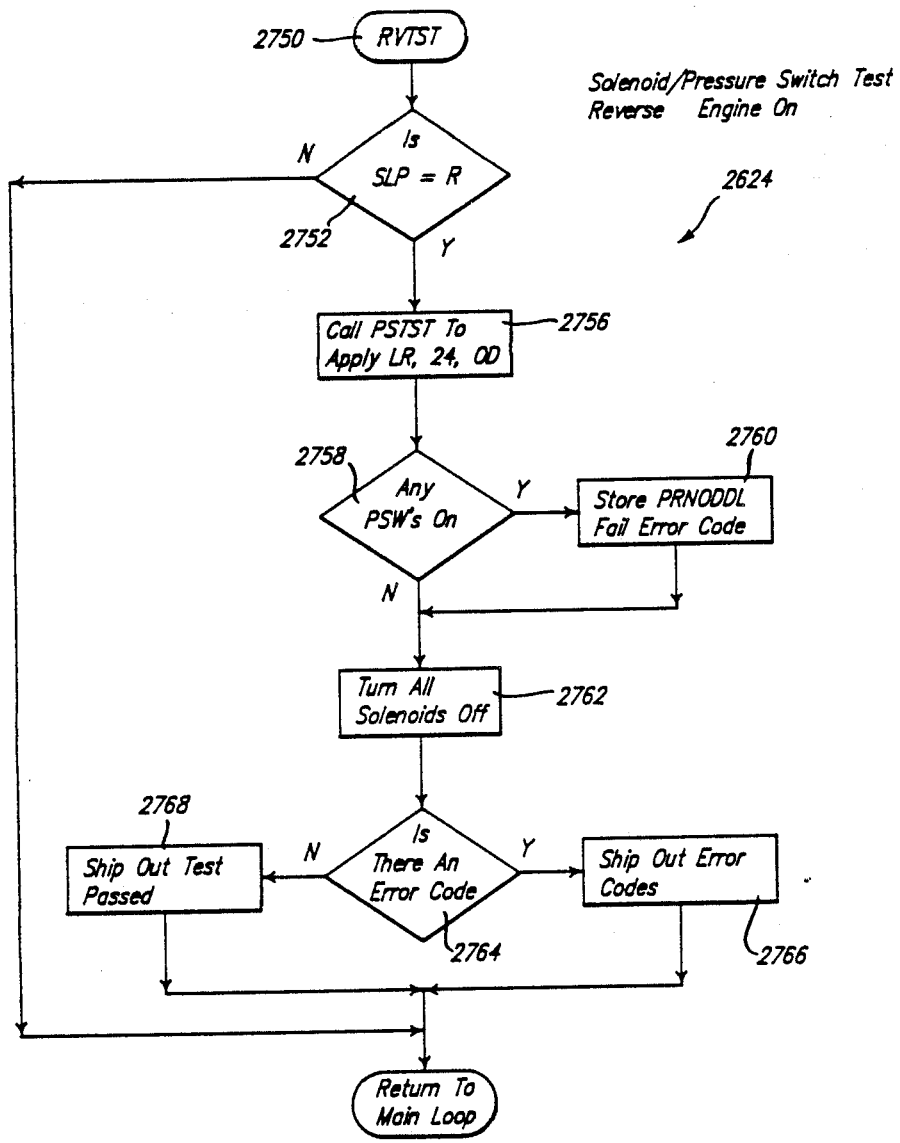
Figure 23G:
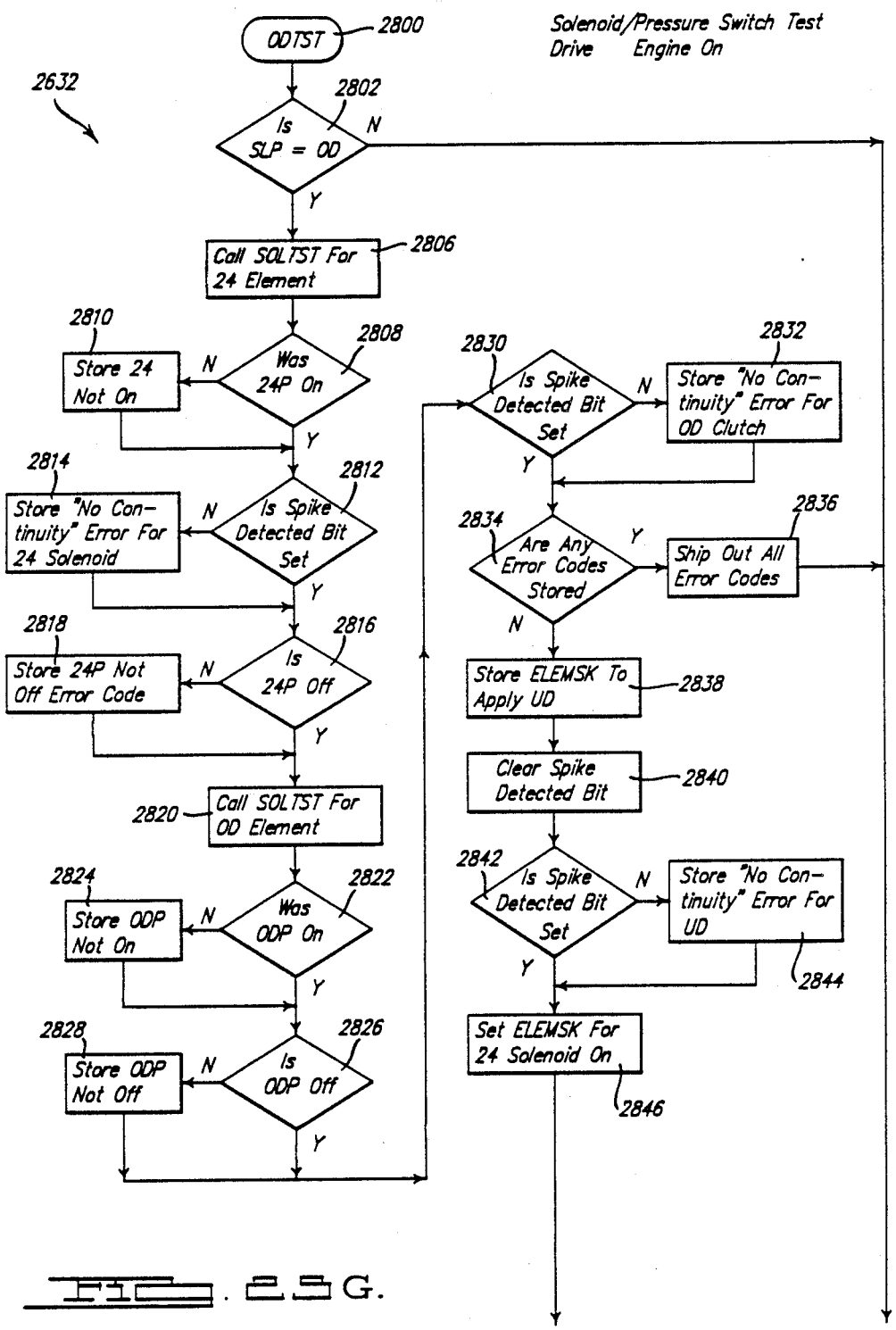

Referring to FIG. 25E, the methodology for the solenoid/pressure switch test for the transmission 100 operating in reverse gear with the engine on of block 2624 of FIG. 25A is shown. At the start of the methodology in bubble 2750, the methodology advances to diamond 2752 and determines whether the SLP 606 is reverse R. If the SLP 606 is not reverse, the methodology returns to the main loop. If the SLP 606 is reverse, the methodology advances to block 2756 and calls the pressure switch test routine previously described to apply the low/reverse 650, two/four 648 and overdrive 646 pressure switches. The methodology then advances to diamond 2758 and determines whether any of the pressure switches 646, 648 and 650 are on or pressurized. If any pressure switches are on, the methodology advances to block 2760 and stores in memory a "PRNODDL" fail error code. The methodology then advances to block 2762 and turns off or de-energize all solenoids of the solenoid-actuated valves 630, 632, 634 and 636. The methodology then advances to diamond 2764 and determines whether there are any error codes. If there are any error codes, the methodology advances to block 2766 and ships out the error codes. The methodology then returns to the main loop.

At diamond 2764, if there are no error codes, the methodology advances to block 2768 and ships out a test passed signal. The methodology then returns to the main loop.

Referring to FIG. 25F, the methodology for the solenoid pressure switch test routine for the transmission 100 operating in neutral gear with the engine on of block 2628 of FIG. 25A is shown. At the start of the methodology in bubble 2770, the methodology advances to diamond 2772 and determines whether the SLP 606 is neutral as previously described. If the SLP 606 is not neutral, the methodology returns to the main loop. If the shift lever position is neutral, the methodology advances to block 2774 and calls the pressure switch routine previously described to apply or turn on the two/four 648, overdrive 646 and low/reverse 650 pressure switches. The methodology then advances to block 2776 and turns OFF the solenoids of the solenoid-actuated valves 630, 632, 634 and 636 at the end of the main loop. The methodology then advances to diamond 2778 and determines whether the two/four 648 or overdrive 646 pressure switches were on or pressurized. If either pressure switch 646 or 648 was on, the methodology advances to block 2780 and stores in memory a "PRNODDL failure" error code. The methodology then advances to diamond 2782.

At diamond 2782, the transmission controller 3010 determines whether the low/reverse pressure switch 650 was on or pressurized. If the pressure switch 650 was not on, the methodology advances to block 2784 and stores in memory an error code that the "low/reverse pressure switch not on". The methodology then advances to diamond 2786.

At diamond 2786, the transmission controller 3010 determines whether there are any error codes. If there are error codes, the methodology advances to block 2788 and ships out the error codes. The methodology then returns to the main loop. If there are no error codes, the methodology advances to block 2790 and ships out a test passed signal. The methodology then returns to the main loop.

Figure 25H:
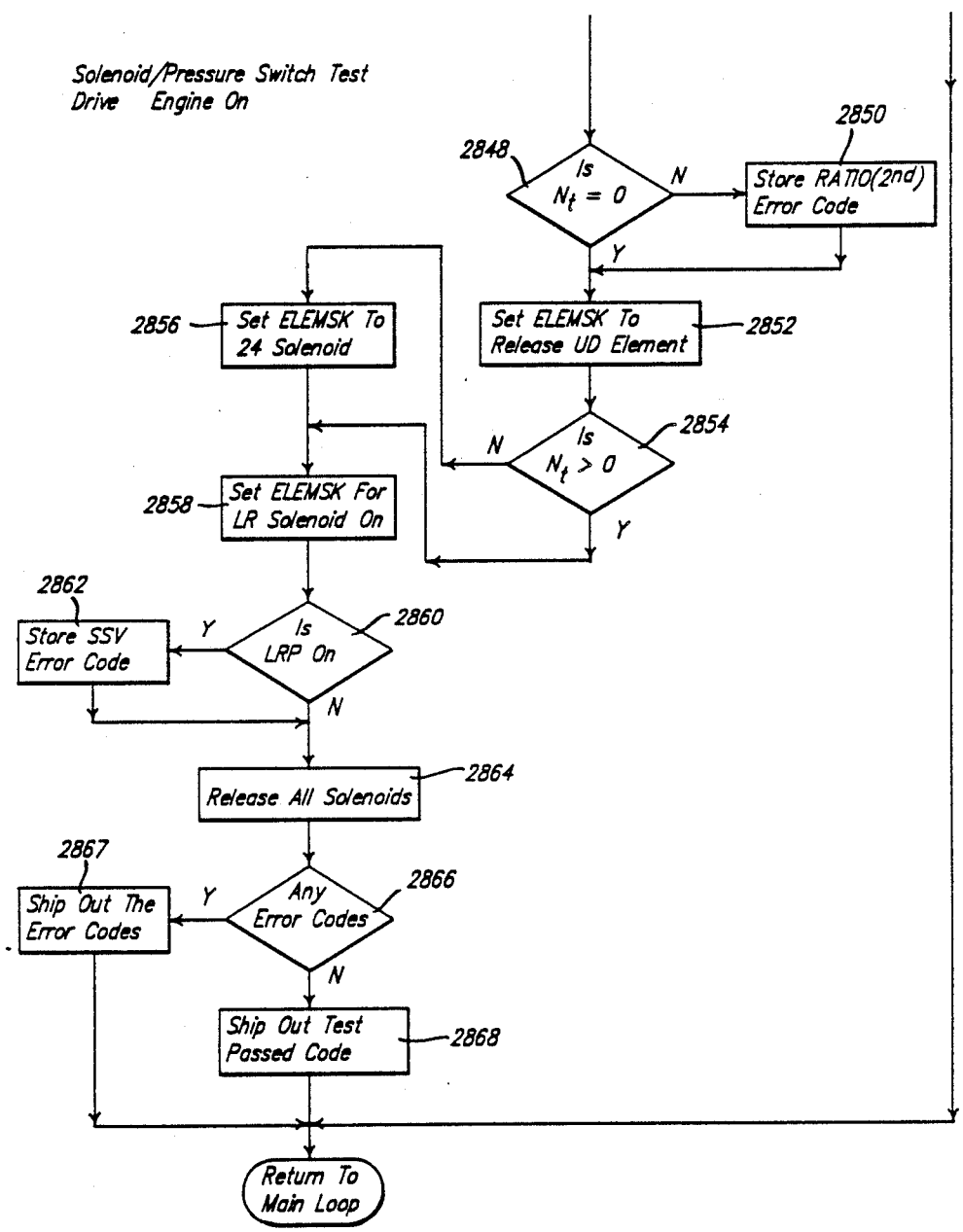
Figure 231:
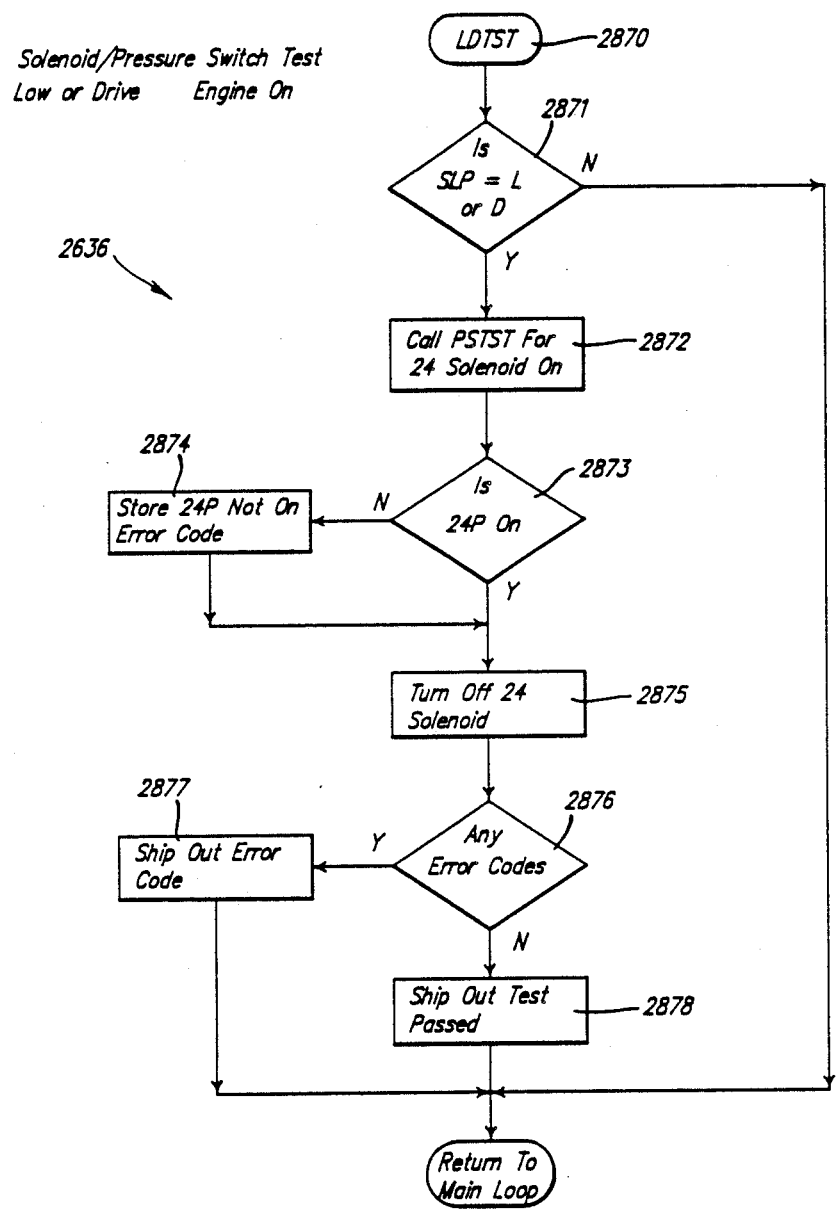

Referring to FIGS. 25G and 25H, the methodology for the solenoid pressure switch test routine for the transmission operating in overdrive with the engine on of block 2632 of FIG. 25A is shown. At the start of the methodology in bubble 2800, the methodology advances to diamond 2802 and determines whether the SLP 606 is overdrive OD as previously described. If the SLP 606 is not overdrive, the methodology returns to the main loop. If the SLP 606 is overdrive, the methodology advances to 2806 and calls the solenoid test for the two/four shift solenoid-actuated valve 634. The methodology then advances to diamond 2808 and determines whether the two/four pressure switch 648 was on or pressurized. If the pressure switch 648 was not on, the methodology advances to block 2810 and stores in memory an error code that the "two/four pressure switch 648 was not on". The methodology then advances to diamond 2812 and determines whether a spike detected bit was set as previously described. If the bit was not set, the methodology advances to block 2814 and stores a "no continuity" error code for the two/four shift solenoid-actuated valve 634. The methodology then advances to diamond 2816 and determines whether the two/four pressure switch 648 was off or not pressurized. If the pressure switch 648 was not off, the methodology advances to block 2818 and stores an error code that the "two/four pressure switch not off". The methodology then advances to block 2820.

At block 2820, the methodology calls the solenoid test for the overdrive solenoid-actuated valve 632. The methodology then advances to diamond 2822 and determines whether the overdrive pressure switch 646 was on or pressurized. If the pressure switch 646 was not on, the methodology advances to block 2824 and stores an error code that the "overdrive pressure switch was not on". The methodology then advances to diamond 2826 and determines whether the overdrive pressure switch 646 was off or not pressurized. If the pressure switch 646 was not off, the methodology advances to block 2828 and stores an error code that the "overdrive pressure switch not off". The methodology then advances to diamond 2830 and determines whether a spike detected bit is set. If a spike detected bit was not set, the methodology advances to block 2832 and stores a "no continuity" error code for the overdrive solenoid-actuated valve 632. The methodology then advances to diamond 2834 and determines whether any error codes were stored. If there are error codes stored, the methodology advances to block 2836 and ships out all error codes. The methodology then returns.

At diamond 2834, if no error codes are stored, the methodology advances to block 2838 and stores in memory a solenoid mask (i.e. logical states) to turn ON the underdrive solenoid-actuated valve 630. The methodology then advances to block 2840 and clears any spike detected bit. The methodology then advances to diamond 2842 and determines whether a spike detected bit was set. If a spike detected bit was not set, the methodology advances to block 2844 and stores a "no continuity" error code for the underdrive solenoid-actuated valve 630. The methodology then advances to block 2846 and sets a solenoid mask to turn ON the two/four solenoid-actuated valve 634. The methodology then advances to diamond 2848 and determines whether turbine speed $N_t$ is equal to zero. If $N_t$ is not equal to zero, the methodology advances to block 2850 and stores in memory a ratio (2nd) error code. The methodology then advances to block 2852 and turns OFF or releases the underdrive solenoid-actuated valve 630. The methodology then advances to diamond 2854 and determines whether $N_t$ is greater than zero. If $N_t$ is not greater than zero, the methodology advances to block 2856 and releases the two/four shift solenoid-actuated valve 634. The methodology then advances to block 2858.

If $N_t$ is greater than zero, the methodology advances to block 2858 and sets a solenoid mask to turn ON the low/reverse solenoid-actuated valve 636. The methodology then advances to diamond 2860 and determines whether the low/reverse pressure switch 650 is on or pressurized. If the pressure switch 650 is on, the methodology advances to block 2862 and stores in memory a "solenoid switch valve" (SSV) error code. The methodology then advances to block 2864 and releases all solenoid-actuated valves 630, 632, 634 and 636. The methodology then advances to diamond 2866 and determines whether there were any error codes. If there are any error codes, the methodology advances to block 2867 and ships out the error codes. The methodology then returns to the main loop. At diamond 2866, if there were no error codes, the methodology advances to block 2868 and ships out a test passed code. The methodology then returns to the main loop.

Referring to FIG. 25I, the methodology for the solenoid pressure switch test routine for the transmission 100 operating in low or drive with the engine on of block 2636 of FIG. 25A is shown. At the start of the methodology in bubble 2870, the methodology advances to diamond 2871 and determines whether the SLP 606 is low L or drive D as previously described. If the SLP 606 is not low or drive, the methodology returns to the main loop. If the SLP 606 is low or drive, the methodology advances to block 2872 and calls the pressure switch test previously described to turn ON the two/four clutch solenoid-actuated valve 634. The methodology advances to diamond 2873 and determines whether the two/four pressure switch 648 is on or pressurized as previously described. If the pressure switch 648 is not on, the methodology advances to block 2874 and stores in memory an error code that the "two/four pressure switch not on". The methodology then advances to block 2875 turns .OFF the two/four shift solenoid-actuated valve 634. The methodology then advances to diamond 2876 and determines whether there are any error codes. If there are error codes, the methodology advances to block 2877 and ships out the error codes. The methodology then returns to the main loop.

At diamond 2876, if there are no error codes, the methodology advances to block 2878 and ships out a test passed code. The methodology then returns to the main loop.

Referring to FIG. 25J, the speed sensor test mode for the engine on of block 2640 of FIG. 25A is shown. At the beginning of the methodology in bubble 2880, the methodology advances to diamond 2881 and determines whether the SLP 606 is reverse R as previously described. If the SLP 606 is not reverse, the methodology returns to the main loop. If the SLP 606 is reverse, the methodology advances to block 2882 and verifies the in-gear ratio of output speed $N_o$. The methodology then advances to diamond 2884 and determines whether the transmission 100 is in reverse based on the in-gear ratio of block 2882. If the transmission 100 is not in reverse, the methodology advances to block 2885 and sets the ratio (reverse) error code. The methodology then advances to block 2886 and gets the present value of $N_o$ and $N_t$ and saves these values in memory as Past $N_o$ and Past $N_t$, respectively. The methodology then advances to diamond 2887 and determines whether $N_o$ equals a predetermined value such as zero. If $N_o$ is not zero, the methodology advances to block 2888 and sets Past $N_o$, the stored value of $N_o$, as $N_o$. The methodology then advances to diamond 2889 and determines whether $N_t$ equals zero. If $N_t$ is not zero, the methodology advances to block 2890 and sets Past $N_t$, the stored value of $N_t$, as $N_t$. The methodology then advances to diamond 2891 and determines whether both $N_t$ and $N_o$ are zero. If that criteria is not true, the methodology then loops back to diamond 2887.

At diamond 2891, if both $N_t$ and $N_o$ equal zero, the methodology advances to diamond 2892 and determines whether Past $N_t$, the previously stated value of $N_t$, equals a predetermined value, i.e. a minimum value of $N_t \pm 20$ r.p.m. If that criteria is not true, the methodology advances to block 2893 and stores a ratio (neutral) error code. The methodology then advances to diamond 2894 and determines whether the Past $N_o$, the previously stored value of $N_o$, equals a predetermined value, i.e. minimum $N_o \pm 20$ r.p.m. If that criteria is not true, the methodology advances to block 2895 and stores "$N_o$" error code. The methodology then advances to diamond 2896 and determines whether any error codes exist. If there are error codes, the methodology advances to block 2897 and ships out a test passed code. The methodology then returns to the main loop.

At diamond 2896, if there are no error codes, the methodology advances to block 2898 and ships out the error codes. The methodology then returns to the main loop.

Referring to FIG. 25K, the methodology for the solenoid response test mode of block 2646 of FIG. 25A is shown. At the beginning of the methodology in bubble 2900, the methodology advances to diamond 2901 and determines whether the transmission fluid temperature is hot as previously described. If the fluid temperature is not hot, the methodology returns to the main loop. If the fluid temperature is hot, the methodology advances to diamond 2902 and determines whether the SLP 606 is correct. If the SLP 606 is not correct, the methodology returns to the main loop. If the SLP 606 is correct, the methodology advances to block 2903 and sets all bits or flags to turn OFF the solenoid-actuated valves 630, 632, 634 and 636. The methodology then advances to block 2904 and sets all flags to turn ON the solenoid-actuated valves 630, 632, 634 and 636. The methodology then advances to diamond 2905 and determines whether the duty cycle (DC) counter is greater than a predetermined value such as zero. If that criteria is not true, the methodology advances to block 2906 and increments the DC counter. The methodology then loops back to block 2904.

At diamond 2905, if the DC counter is greater than zero counts, the methodology advances to diamond 2907 and determines whether the DC counter is equal to a predetermined value such as 5. If that criteria is not true, the methodology advances to block 2908 and sets flags for the solenoid-actuated valves to be turned OFF. The methodology then advances to block 2909 and increments the DC counter. The methodology then loops back to diamond 2907.

At diamond 2907, if the DC counter is equal to 5, the methodology advances to block 2910 and clears the DC counter. The methodology then advances to diamond 2912 and determines whether a message has been received from the DRB to end the test. If a message has not been received to end the test, the methodology advances to block 2904 previously described. If a message has been received to end the test, the methodology returns to the main diagnostic loop.

ENGINE TORQUE MANAGEMENT METHOD

Referring to FIGS. 26A through 26D, a method is disclosed to control the engine torque and coordinate its output in response to conditions existing in the transmission 100. More specifically, certain conditions which occur in the transmission 100 will dictate that the torque output from the engine must be controlled in such a way so as to minimize the potential for interference and possible damage with any of the electronically controlled transmission components.

To this end, the methodology begins in the FIG. 26A in block 2920 by beginning a group of steps in the engine control module starting with the saving in memory of a normal spark advance setting. In other words, a normal spark advance is the spark advance that the engine controller 3020 will calculate on its own without regard to what is happening in the transmission 100.

Following through to the next step in decision block 2922, a redundant check is performed to make sure that the engine controller 3020 has acknowledged to the transmission controller 3010 that a control signal has been received from the transmission controller 3010. If the engine controller 3020 has not yet acknowledged receipt of the signal from the transmission controller 3010, the receipt is acknowledged in block 2924. If the transmission controller 3010 has been acknowledged as checked in decision block 2922, the routine falls through to block 2926.

As previously mentioned, blocks 2922 and 2924 are a redundant check of the acknowledgment of the receipt of a control signal from the transmission controller 3010 to the engine controller 3020. The purpose for the signal from the transmission controller 3010 to the engine controller 3020 is to time the shift event and communicate this to the engine controller 3020 to prevent unwanted conditions from interfering with the shift event in the transmission 100 though these signals are generated and/or received later in the below-described methodology. The blocks 2922 and 2924 exist here to provide a redundant check of the acknowledgement of such a signal to provide additional diagnostic information regarding the mechanism to transmit the signal between the transmission controller 3010 and the engine controller 3020. More specifically, this signal may be transmitted between the transmission controller 3010 and engine controller 3020 by means of a hardwire or by means of a data bus. In the case of a data bus, since instant access to the bus might not be possible, it is recommended that the communication of the shift event signal be handled on a hardwire basis and the acknowledgement be handled at a later time as allowed by the data bus protocols.

The next portion of the methodology of engine torque management can be broken into two major sections. The first section deals with the portion of the FIG. 26A beginning with decision blocks or diamonds 2926 and 2934 which deal with the launch or break-away condition. The second major section of the engine torque management methodology is illustrated in FIG. 26A by referring to diamond 2938 and 2946 for the engine torque management under conditions of a shift event at wide open throttle (WOT).

Returning now to the section of FIG. 26A dealing with the launch or break-away condition, the overall control strategy in this condition is to control the engine speed $N_e$ directly, which results in an indirect control of the differential speed between the engine and the turbine 128 of the torque converter 110. This indirectly controls the torque on the torque converter 110 which provides the input into the transmission 100. It should be noted that the torque on the torque converter 110 is the item that must be controlled within certain ranges during a launch or break-away condition. In other words, it is desired to control the engine speed $N_e$ such that the desirable torque, which is acceptable during a launch or break-away condition, will stay within the prescribed boundaries.

Referring again to diamond 2926, certain conditions are checked to see if spark control is needed during launch. More specifically, these conditions include a throttle angle greater than a predetermined value such as approximately 26 degrees and a vehicle or output speed $N_o$ less than a predetermined value such as approximately six miles per hour. These conditions represent those at which peak torques will occur which will be the maximum conditions probably experienced. If the operation of the engine and transmission 100 can be managed properly during these peak torque conditions, the durability and life of the transmission 100 can be extended.

Returning again to diamond 2926, if the conditions of throttle angle and output speed $N_o$ are such that spark control is needed at launch, the methodology advances to block 2928 to look up or calculate a desired maximum engine speed $N_e$ for the current output speed $N_o$. The concept behind the utilization of a table or a formula to get the desired maximum engine speed $N_e$ with a given output speed $N_o$ is derived from the fact that transmission input (or turbine torque) is equal to the engine torque as multiplied by the torque converter 110 with the amount of multiplication depending on the ratio between the engine $N_e$ and turbine $N_t$ speeds. Using the characteristics of the torque coverter 110, a table of engine speed $N_e$ versus turbine speed $N_t$ can be created so that turbine torque is a constant for the launch or break-away condition. Turbine speed $N_t$ is replaced by vehicle or output speed $N_o$ in the table or formula because the latter is already sensed by the engine controller 3020 and is a good approximation.

The methodology next advances to block 2930 to compute an error term which is equal to the difference between the actual engine speed and the desired maximum engine speed. It is desired to control this error term and drive it to zero by adjusting the spark advance versus the error as shown in block 2932. This can be done in many ways, namely by using integration or proportional adjustment methods including formula or look-up tables. The important thing is to drive the error term to zero and adjust the spark advance to accomplish that result. Next, the methodology returns to the main program.

Returning now to diamond 2926, if the conditions are not right for a spark control to occur during launch, the methodology branches from diamond 2926 to diamond 2934 to check to see whether or not the launch spark control methodology is finishing. If so, the methodology advances to block 2936 to return the spark advance to its normal condition as determined by the engine controller 3020 and originally sensed through block 2920. In this particular embodiment, the spark advance is merely ramped up to the normal values. It should be appreciated that this can be accomplished in many ways. Next, the methodology returns to the main engine control routine.

If launch spark control is not just finishing at diamond 2934, the methodology advances to diamond 2938 to determine whether the conditions are right for a shift spark control at wide open throttle (WOT). More specifically, wide open throttle is defined as when the throttle angle is greater than or equal to a predetermined value such as 53 degrees, for example. If the conditions are right for a wide open throttle shift spark control, the methodology advances to diamond 2940 and determines whether a start shift signal has been received. More specifically, the engine controller 3020 is signalled by the transmission controller 3010 via a hardwire, for example, between the two. Upon reception of this "start-of-shift" signal, the methodology advances to block 2942 and acknowledges receipt of the signal over the CCD bus. The methodology then advances to block 2944 and the spark advance is held to a predetermined minimum level until an "end-of-shift" signal is received. The ramp down and up and the minimum spark advance level are collectively calibrated for both shifts to achieve a predetermined value such as a 20% reduction in shift energy. Shift energy is determined experimentally. Oncoming element or clutch pressure is measured and then multiplied by delta turbine speed, the difference between old and new gear turbine speeds, to get clutch shift power. Shift power is then integrated over the time of the shift to get clutch shift energy. Once the spark advances has been ramped down to the minimum level or, if it is already there, held to that value, the methodology returns to the main engine control program.

Returning to diamond 2940, if the start-of-shift signal has not been received for a wide open throttle shift, the methodology advances to diamond 2946 and determines whether an end-of-shift signal has been received. If the end-of-shift signal has been received, the methodology advances to block 2948 and acknowledges receipt of the end-of-shift signal over the CCD bus. The methodology then advances to block 2950 and ramps the spark advance up to its normal level. The methodology then returns to the main engine control program.

Returning to diamond 2938, if the conditions are not right for shift spark control for a wide open throttle shift, the methodology advances to block 2952 and uses a predetermined normal spark advance value. The methodology then returns to the main engine control program. Similarly, at decision block 2946, if an end-of-shift signal has not been received, the methodology advances to block 2952 to use a normal spark advance value. The methodology then returns to the main engine control program.

The above-described engine torque management routine, with respect to a shift condition at wide open throttle, is done from an open loop perspective. That is, predetermined conditions are stored and utilized in the methodology which end up approximating the control desired. However, physical differences between the transmission and engines and even engine controllers which occur during the manufacturing process due to tolerances of components and variations in the componentry due to temperature and other physical conditions, can cause unique characteristics for the individual transmissions, engine, and/or controllers. Therefore, each system will have its own "signature". More specifically, there is no feedback provided in the above routine to adapt or confirm that the control was exactly as theoretically desired.

Therefore, additional methods are proposed which can be implemented essentially anywhere in the engine torque management shift controls for wide open throttle conditions as described above. Two control methods, in particular, are of note. The first can be performed in the transmission controller 3010 and the second can be performed in the engine controller 3020. Both methods rely on the feedback of information available in the individual controllers to closely approximate the shift energy that the particular clutches in the transmission 100 must absorb, by calculating the shift power from the available pieces of information. Next, the shift power is integrated to approximate the shift energy which must be absorbed. It should be appreciated that the methods proposed are calculations and that, without the addition of a pressure sensor to sense the actual pressure on the specific clutch at issue, a direct measurement and subsequent calculation of the actual shift power will be impossible.

Referring to FIGS. 26B and 26C, the two routines are displayed. The first routine which shall be described in from the perspective of closing the loop for wide open throttle shift energy management and the second routine from the perspective of the engine controller 3020.

Referring to FIG. 26B, the routine can, as above-described, be placed essentially anywhere in the transmission module to work with the engine torque management controls for shifting at wide open throttle described in FIG. 26A. The routine or methodology is begun in block 2954 and a calculation is performed to approximate shift power. This is done by utilizing the various parameters available in the transmission controller 3010, namely, turbine speed $N_t$, the duty cycle (DC) of the clutches, and the condtions of the pressure switches 646, 648 and 650 which will only be energized or de-energized at certain pressure levels. The calculation is performed essentially by multiplying the approximation of the pressure on the specific clutch in question which is derived from the duty cycle information and the pressure switches, multiplied by the turbine speed $N_t$.

Next, the routine falls through to block 2956 to calculate the shift energy by integrating the above-calculated shift power over time. This calculation represents the approximate shift energy which must be absorbed by the particular clutch during the shift. The routine then falls through to block 2958 to calculate the shift energy error which is equal to a desired shift energy minus the actual shift energy calculated above. The desired shift energy is a predetermined amount which is a maximum condition beyond which the clutch should not be forced to operate. The routine falls through to block 2960 to transmit the error signal calculated in block 2958 to the engine controller 3020.

Next, in block 2962, the engine controller 3020 must take over from the transmission controller 3010 in block 2962 to adjust the spark advance for the particular shift versus the error term. This utilizes the ramp spark advance to a minimum level from block 2944 in FIG. 26A. The adjustment described in block 2962 is used in the next shift which is the result of an accumulated adaptation from previous shifts.

Referring now to the second routine to manage engine torque, the routine is also displayed in FIG. 26C and is from the perspective of the control done in the engine controller 3020. Referring to block 2964, a calculation of the engine horsepower (hp) is made during the shift condition. This is done by the engine controller 3020 taking advantage of various parameters available to it, namely, parameters such as air flow, engine speed $N_e$, injector pulse width (an indirect measure of the amount of fuel used), spark advance, etc. From these variables, the engine horsepower is approximated.

Next, in block 2966, the methodology correlates the calculated engine horsepower with tables stored in memory to approximate the amount of shift power which would be transmitted to the clutches in the electronically controlled transmission 100. This table is experimentally derived and can also be accomplished by means of using a formula. In block 2968, the methodology calculates the shift energy that the clutches in the transmission 100 must absorb. This, as previously stated, is an approximation. In block 2970, the methodology calculates the shift energy error which is the difference between a desired shift energy and that calculated as actual shift energy in block 2968. The desired shift energy is a maximum amount that is predetermined and stored in memory.

Next, in block 2972, the engine controller 3020 adjusts the shift spark versus the error term for use on the next shift. The above "closed loop" methods to manage the engine torque during wide open throttle shifts are both performed from an "after the fact" perspective. In other words, they are computed after the shift has occurred and utilized for the next occurrence of the condition.

A technique to handle the "closing the loop" engine torque management during wide open throttle shifts by the engine controller 3020 is also illustrated in FIG. 26D. This routine essentially replaces blocks 2942 and 2944 of FIG. 26A.

The methodology begins in block 2974 with the calculation of the current engine horsepower versus time or r.p.m. This again is an approximation of the engine horsepower above-described with respect to block 2964.

Next, the methodology falls through to block 2976 to correlate the calculated current engine horsepower to a stored table or formula of current electronically transmission shift power. This is analogous to what occurs in block 2966 which has been described above. The methodology then falls through to block 2978 to compare the current shift power found during the correlation in block 2976 with another stored expression, namely, the nominal desired power trace representing a nominal shift power curve. This is used in block 2980 to calculate a power error which is equal to the difference between the nominal desired power trace and the actual shift power correlated from block 2976.

Next, the methodology advances to block 2982 to look up or calculate a spark advance to be used for this particular shift based on the calculated power error from block 2980. The methodology then advances to block 2984 to calculate the shift energy which will be used for further adjustments when next the routine is used. This is similar to the adjustments described with respect to blocks 2962 and 2972.

Referring to FIG. 26E, a shift tape for wide open throttle (WOT) launch without stall torque management is shown. When the operator depresses the accelerator pedal for WOT, the throttle angle represented by curve 2986 flares up immediately and levels off at WOT. This causes engine speed $N_e$, represented by curve 2987, and spark advance, represented by curve 2988, to also increase and level off at a predetermined value. Correspondingly, wheel torque, represented by curve 2989, flares to a peak before it declines due to a drop off in torque multiplication in the torque converter 110. Wheel torque is a qualitative measure of engine torque.

Figure 26F:
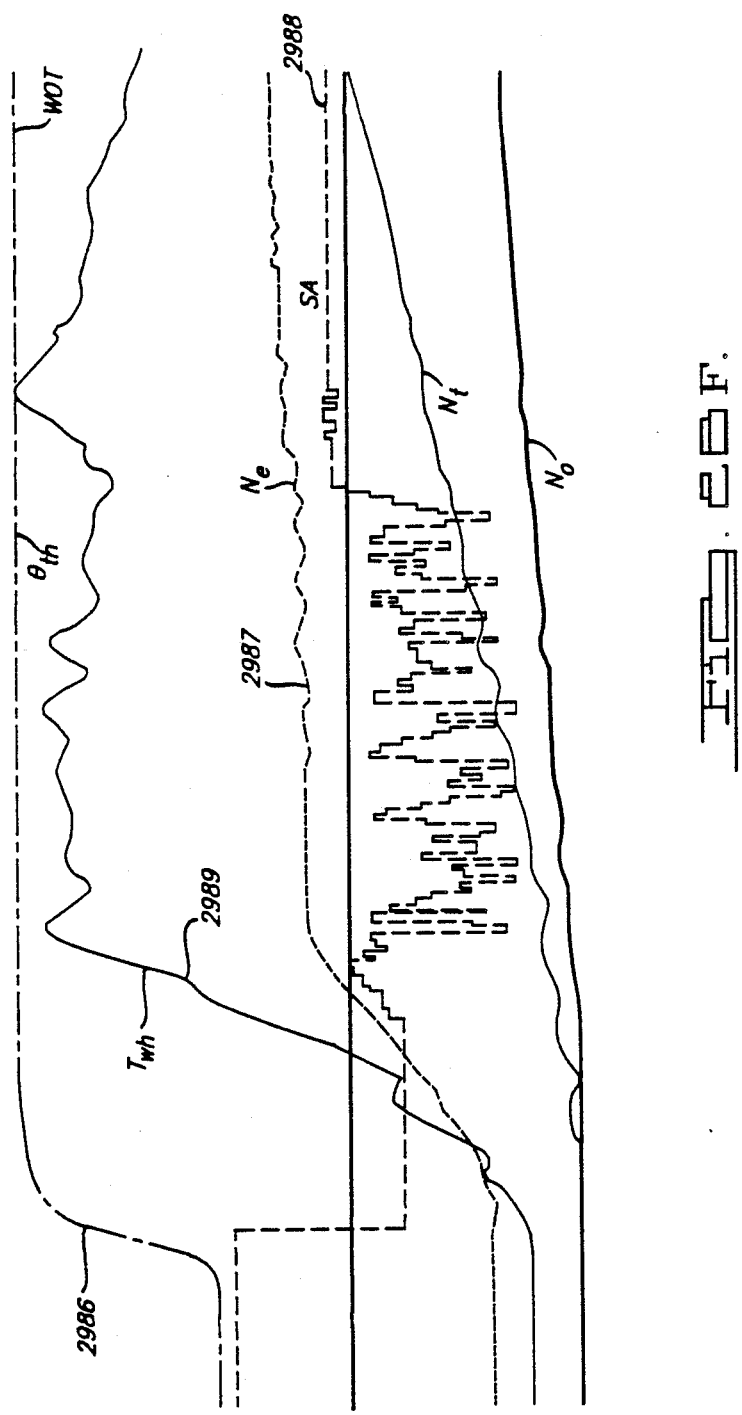

Referring to FIG. 26F, a shift tape for wide open throttle (WOT) launch with stall torque management according to the present invention is shown. The throttle angle curve 2986, rises from rest to WOT as previously described. The $N_e$ curve 2987 also increases until it reaches a theoretical $N_e$ versus $N_o$ limit which is used to maintain a theoretical amount of torque on the turbine 128. The spark advance curve 2988 is continuously adjusted to control $N_e$ along a desired $N_e$ line ($N_e$ vs. $N_o$ limit). This is accomplished by measuring an error of $N_e$ versus the desired $N_e$ line and computing the error. The spark advance is their adjusted in proportion to the error by a predetermined method such as by point slope interpolation. As a result, $N_e$ is managed, effectively managing engine torque. This can be qualitatively seen in the wheel torque curve 2989, which represents engine torque, by the elimination of a peak, leaving a rough but relatively flat wheel torque curve.

Referring to FIG. 26G, a shift tape for a first to second (1-2) gear upshift without engine torque management is shown. Throttle angle is represented by curve 2990. Throttle angle is at WOT by the time to make the shift occur. A shift timing signal represented by curve 2991 denotes the beginning of the shift at point 2992 and the end of the shift at point 2993. Throttle angle is at WOT before the beginning of the shift.

At the beginning of the shift, $N_e$, represented by curve 2944, and $N_t$, represented by curve 2995, rise to a peak and fall to a predetermined value by the end of the shift. The fluid pressure in the apply element (two/four shift clutch 308), represented by curve 2996, starts to increase at the beginning of the shift and levels off to a fairly constant value from approximately half way during the shift to the end of the shift. Shift energy is calculated as the difference between $N_t$ minus $N_j$ multiplied by the net pressure in the oncoming clutch (which is actual pressure minus fill pressure). Similarly, wheel torque, represented by curve 2998 levels off to a fairly constant value from approximately half way during the shift to the end of the shift. Spark advance is represented by curve 2997 and is fairly constant at the beginning of the shift and fails to its normal value by the end of the shift.

Referring to FIG. 26H, the spark advance 2997 is ramped down to the predetermined value at the start of shift at point 2992. The spark advance 2997 is held at the predetermined value until the end of shift at point 2993 where it is ramped up to predetermined normal value. As a result, the fluid pressure 2996 in the apply element (two/four shift clutch 308) does reach the same level as above, but also has a depression or valley 2999 in it until the end of shift. Correspondingly, $N_t$ 2995 falls off more rapidly as the transmission 100 changes gears, i.e. first to second gear. This results from a drop in $N_e$ curve 2994, making for rougher control but less shift energy which is calculated as described above. Thus, a drop in fluid pressure of the oncoming or apply clutch and $N_t$ indicate a lower shift energy.

ELECTRONICALLY CONTROLLED, ADAPTIVE AUTOMATIC TRANSMISSION SYSTEM

Figure 27A:
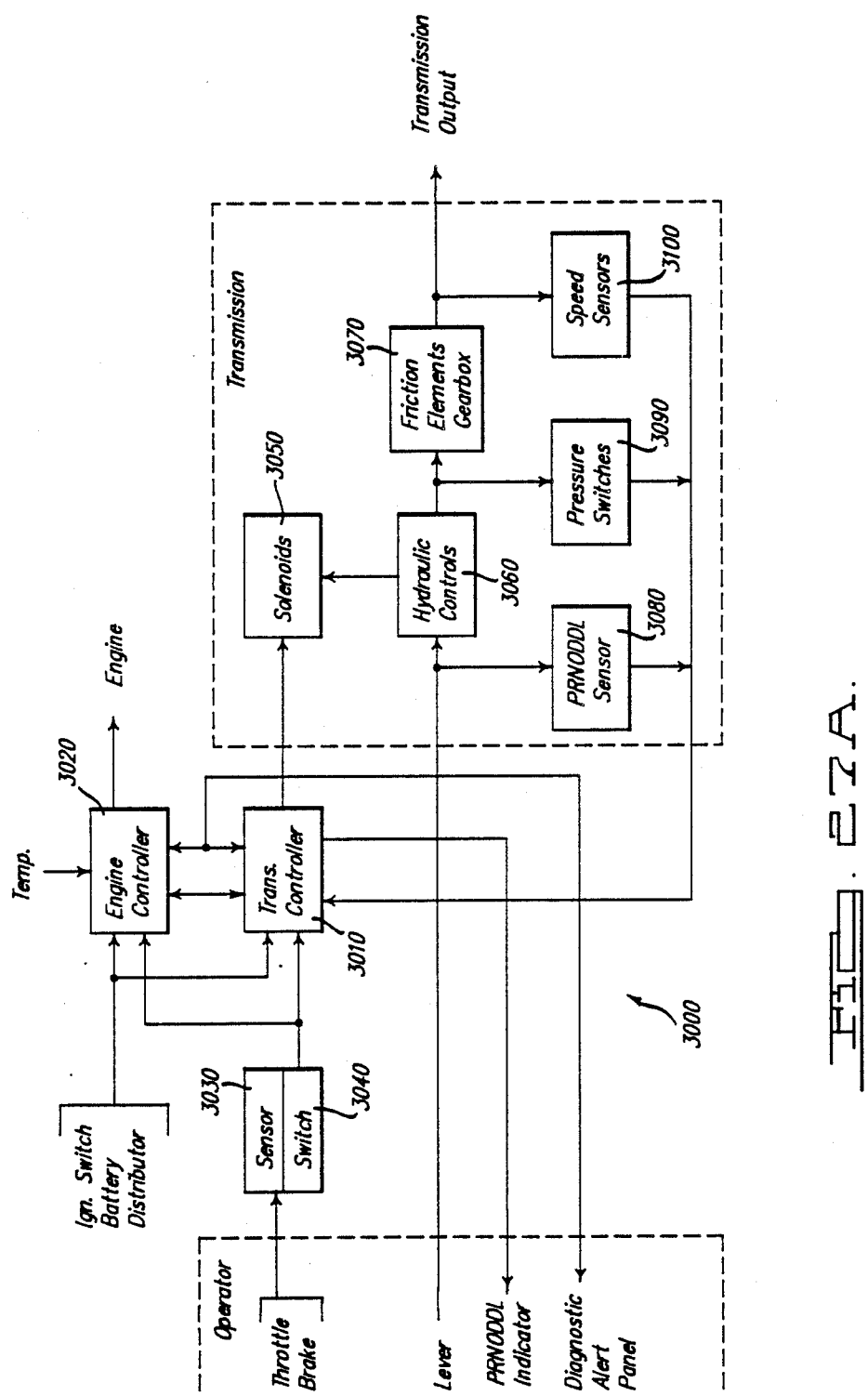
FIG. 27A is a block diagram of an adaptive control system for an automatic transmission according to the present invention.

Referring to FIG. 27A, a block diagram of an adaptive control system 3000 according to the present invention is shown. The adaptive control system 3000 includes a transmission controller 3010 which is capable of both receiving signals from an engine controller 3020 and transmitting signals to this engine controller 3020. While the transmission controller 3010 may be readily adapted to operate without an electronic engine controller, the transmission controller 3010 according to the present embodiment takes advantage of the fact that most automobiles today include a digital or computer based engine controller which receives and processes signals from numerous sensors. For example, FIG. 27A shows that both the transmission controller 3010 and the engine controller 3020 receive an input signal indicative of the temperature of the engine (e.g., the coolant temperature). Other exemplary input signals shared by these controllers include one or more signals from the ignition switch, a battery voltage level signal, and a signal from the distributor or other firing angle control mechanism. With respect to the engine controller 3020, this controller will process such signals and transmit appropriate control or command signals to various components of the engine. Typical computer based engine controllers will also generate and transmit advisory signals to a diagnostic alert panel in the passenger compartment to provide a visual and/or auditory indication of particular engine conditions.

As indicated by the reciprocal signal lines, it should be appreciated that the transmission controller 3010 includes the capability of communicating with existing engine controllers. For example, it may be advisable for the transmission controller 3010 to send signals to the engine controller 3020, such as a signal indicating that the transmission 100 is about to shift gears. As will be appreciated from the description below, the transmission controller 3010 is preferably provided with a serial communications interface to permit serial data transfers to be made between the transmission controller 3010 and the engine controller 3020. Additionally, the transmission controller 3010 may also provide diagnostic alert capabilities, such as transmitting suitable advisory signals to the vehicle operator (e.g., "check transmission").

Another example of some signals which may be shared by the transmission controller 3010 and the engine controller 3020 are those provided by a throttle sensor 3030 and a brake switch sensor 3040. The throttle sensor 3030 may be any suitable sensor which will give an indication of the power demand placed upon the engine by the vehicle operator, such as a transducer which will indicate the present position of the throttle. Similarly, the brake switch 3040 may be any suitable sensor which will give an indication of the application of the vehicle brake by the operator, such as a contact switch actuated by the movement of the brake pedal in the vehicle. As will be appreciated from the description below, the transmission controller 3010 includes suitable interface circuits for receiving signals from the throttle sensor 3030 and the brake switch 3040. Further, examples of information shared between the controllers are signals concerning vehicle type, engine type, manifold absolute pressure (MAP) and load.

One of the primary functions of the transmission controller 3010 is to generate command or control signals for transmission 100 to the solenoid-actuated valves 630, 632, 634, 636 contained in the hydraulic system 600 (FIGS. 5A-L, 8-9) of the transmission 100. In FIG. 27A, these solenoid-actuated valves are lumped into a solenoid block 3050 which is contained within a dashed block labeled "transmission". This Transmission block represents a suitable transmission structure which will operate in conjunction with the transmission controller 3010, such as the transmission 100 described above. Thus, in the transmission 100, the solenoid block 3050 would comprise the solenoid-actuated valves 630, 632, 634 and 636. Similarly, the hydraulic controls block 3060 would comprise other valves contained in the hydraulic system 600, such as the pressure regulator valve 608, the manual valve 604, the T/C control valve 612 and so forth, as described above. Likewise, the friction elements gear box block 3070 would comprise the multi-clutch assembly 300 and the gear assembly 500 as described above. However, it should be appreciated that the adaptive control system 3000 according to the present invention may be used in conjunction with other suitable transmission structures in the appropriate application.

FIG. 27A also illustrates that the Transmission block includes a PRNODDL sensor block 3080 which is responsive to a gear shift lever that is under operator control. The PRNODDL sensor block 3080 may be comprised of one or more suitable sensors which are capable of providing an indication to the transmission controller 3010 of the transmission operating mode selected through the manual actuation of the gear shift lever. In this regard, FIG. 4B shows two contact switch sensors $NS_1$ and $NS_2$ which are mounted to the transmission case 102. The sensors $NS_1$ and $NS_2$ are mounted in proximity to the manual lever 578 in order to permit a spring loaded pin of these sensors to engage and follow the peripheral track of a cap member 578a of the manual lever 578.

NEUTRAL START SWITCH TO SENSE SHIFT LEVER POSITION

Referring briefly now to FIG. 19, a diagrammatic representation of the operation of the sensors $NS_1/RL_1$ and $NS_2/RL_2$ is shown. Specifically, FIG. 19 shows that the sensors $NS_1/RL_1$ and $NS_2/RL_2$ are each provided with a spring loaded contact pin, such as pin 3082, which engages the cap member 578a of the manual lever 578. The cap member 578a is formed to permit metal areas of the manual lever 578 to extend through the cap member 578a, such as metal areas 3084. These metal areas 3084 are used to provide an electrical ground for the sensor. Thus, as shown in the corresponding table for the figure, each of the sensors NS$_1$/RL$_1$ and NS$_2$/RL$_2$ will produce a digital low or "0" signal when their sensor or contact pin is in physical contact with one of the metal areas (e.g., metal 3084). For example, in the park "P" position, both of the "NS" contacts of sensors NS$_1$/RL$_1$ and NS$_2$/RL$_2$ will be grounded, as shown by the corresponding columns of the table under section heading "PRNODDL METHOD".

The cap member 578a also includes non-grounded areas which are formed with trapezoidal shaped grooves, such as groove 3086. These grooves are used in connection with a set of internal contacts within the sensors NS$_1$/RL$_1$ and NS$_2$/RL$_2$ to create the four-bit digital code shown in the table for FIG. 19. These internal contacts 3088 are also illustrated in FIG. 19, which provides a schematic representation of one of the NS/RL sensors. When the contact pin 3082 of either of the sensors NS$_1$/RL$_1$, NS$_2$/RL$_2$ extends into one of the grooves 3086 of cap member 578a, then the internal "RL" contacts 3088 of that sensor will close and cause the sensor to produce a digital high or "1" signal from the electrical terminals of these contacts. As discussed previously, the internal contacts 3088 provide a set of reverse light "RL" contacts which are used in connection with the reverse or back-up lights of the vehicle.

In operation, actuation of the gear shift lever will cause a rotation of the manual lever 578 to the position selected by the vehicle operator. As the manual lever 578 rotates, the sensors NS$_1$/RL$_1$ and NS$_2$/RL$_2$ will produce a four-bit code which will correspond to the rotational position of the manual lever 578. The transmission controller 3010 will then determine the mode of operation selected through the four-bit code produced by the sensors NS$_1$/RL$_1$ and NS$_2$/RL$_2$.

Referring again to FIG. 27A, the transmission controller 3010 receives input signals from the PRNODDL sensor block 3080, as well as produces output signals to a PRNODDL indicator contained in the passenger compartment. This PRNODDL indicator may, for example, be a suitable light source or other appropriate indicator for providing the operator with a visual indication of the operating mode which has been selected.

FIG. 27A also indicates that a pressure switch block 3090 is connected to the hydraulic controls block 3060. In connection with transmission 100, the pressure switch block 3090 would comprise the pressure switches 646, 648 and 650 (FIGS. 5A-L and 10). As described above, each of these pressure switches is adapted to provide a signal indicative of a predetermined pressure level in the corresponding passageways leading to selected friction elements. Specifically, each of these pressure switches provide a digital input signal to the transmission controller 3010 which will indicate whether or not this pressure level has been reached.

FIG. 27A also indicates that the Transmission block includes a speed sensors block 3100 which is connected to the friction elements gear box 3070. In connection with the transmission 100, the speed sensors block 3100 comprises the input or turbine speed sensor 320 and the output speed sensor 546 which are both mounted to the transmission case 102. However, as previously indicated, other suitable speed sensor means may be provided either within or outside of the transmission case 102 in order to provide the desired input or turbine and output speed signals to the transmission controller 3010. The speed sensors block 3100 may also include a suitable engine speed sensor (e.g., hall effect device). However, if the engine controller 3020 is already receiving such a speed signal, then this signal could be shared with the transmission controller 3010 to avoid unnecessary duplication.

ELECTRONIC CONTROLLER FOR AN AUTOMATIC TRANSMISSION

Figure 27B:
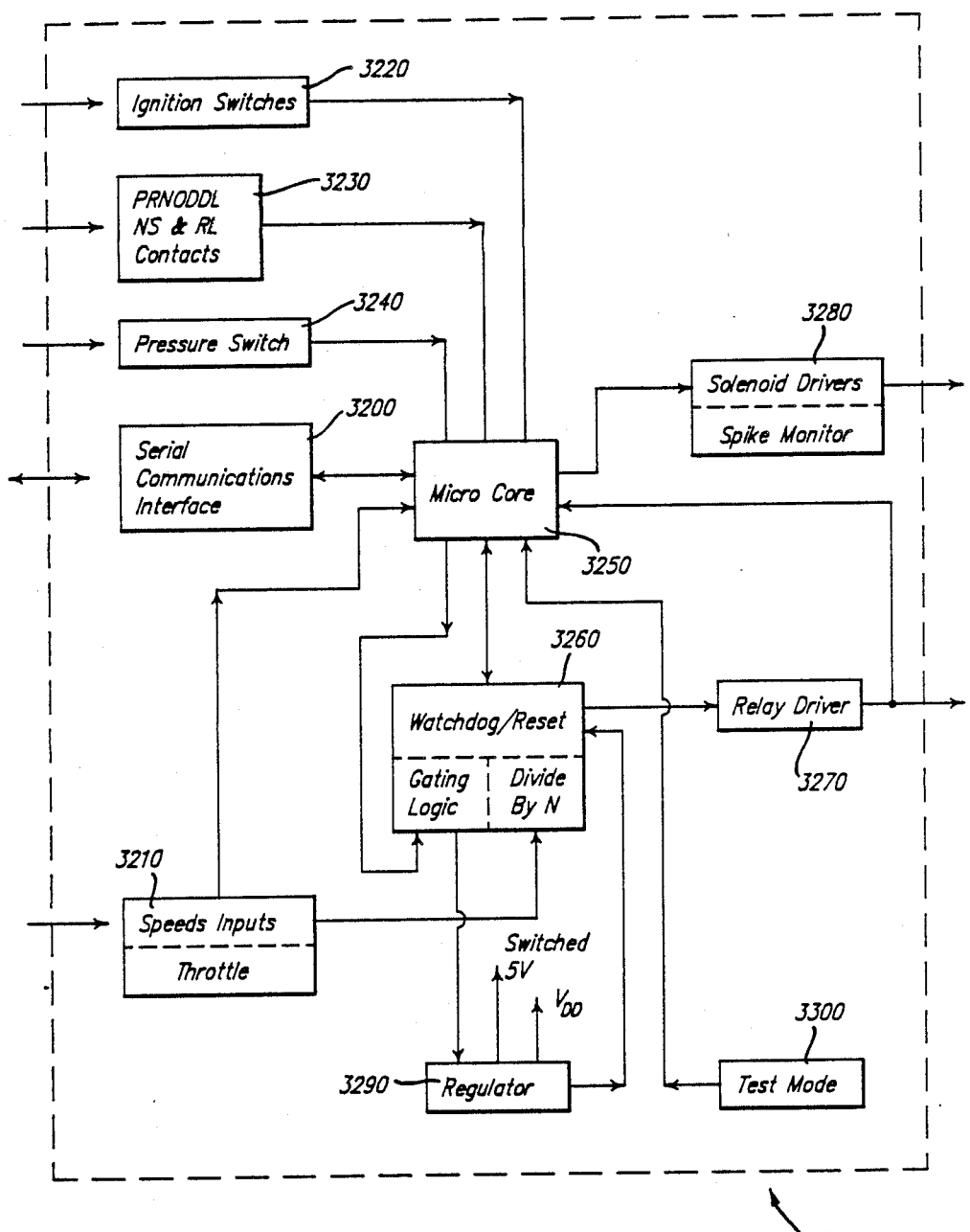
FIG. 27B is a block diagram of the transmission controller for the adaptive control system according to the present invention.

Referring to FIG. 27B, a block diagram of the transmission controller 3010 is shown. The first block is the serial communication interface 3200 which has as its function to provide a serial communications link with the engine controller 3020. This serial communication interface 3200 could also be used to provide a serial communication link with other appropriate microcomputer-based controllers in the vehicle. It should also be understood that a parallel communication could also be used in the appropriate applications.

In the present embodiment, the serial communications interface 3200 utilizes the multiplexing protocol and interface technology of the Chrysler Collision Detection ("C$^2$D") Serial Data Bus. This technology is described in the co-assigned U.S. Pat. No. 4,706,082, entitled "Serial Data Bus For Intermodule Data Communications," which issued on Nov. 10, 1987; and U.S. Pat. No. 4,719,458, entitled "Method Of Data Arbitration And Collision Detection In A Data Bus," which issued on Jan. 12, 1988; and U.S. Pat. No. 4,739,323, entitled "Serial Data Bus For Serial Communication Interface (SCI), Serial Peripheral Interface (SPI) an Buffered SPI Modes of Operation," which issued on Apr. 19, 1988; and U.S. Pat. No. 4,739,324, entitled "Method for Serial Peripheral Interface (SPI) in a Serial Data Bus," which issued on Apr. 19, 1988; and U.S. Pat. No. 4,742,349, entitled "Method for Buffered Serial Peripheral Interface (SPI) in a Serial Data Bus," which will issue on May 3, 1988; and in SAE paper No. 860389, entitled "Chrysler Collison Detection (C$^2$D)—A Revolutionary Vehicle Network," by Frederick O. R. Miesterfield, 1986. These patents and documents are all hereby incorporated by reference.

Another function for the serial communications interface 3200 is to provide a diagnostic interface with the transmission controller 3010 so that service information can be provided to a technician as a troubleshooting or maintenance aid. Still another function of the serial communications interface 3200 is to provide a convenient data or program access route for in-plant testing of the transmission controller 3010 during the manufacturing process.

The transmission controller 3010 also includes several other interface circuits which are used to receive and condition input signals from the various sensors identified above. For example, the transmission controller 3010 includes a block 3210 which contains the interface circuits used to receive signals from the speed sensors 3100 and the throttle sensor 3030. The transmission input speed signal represents the turbine speed $N_t$ of the torque converter 110, while the output speed signal represents the output speed $N_o$ of the vehicle. As described above, both of these signals are generated by variable reluctance pick-ups (e.g., speed sensors 320 and 526). The engine speed is also sensed by a suitable sensor, such as a hall effect pick-up in the distributor of the engine. This technology is described in co-assigned U.S. Pat. No. 4,602,603, entitled "Ignition Distributor-Hall Effect Sensor Switching System and Method," which issued on July 29, 1986 which is hereby incorporated by reference.

The function of block 3210 is to provide input signal conditioning, filtering and conversion of the speed sensor signals to digital logic levels. In this regard, block 3210 also includes an interface circuit for the throttle position sensor 3030. Once this signal is properly conditioned, this information may be shared with the engine controller 3020. The throttle position sensor 3030 will give an indication as to which angular position the throttle blade (means) is in within the throttle body. As with other appropriate input signals, the throttle position sensor signal is conditioned and fed through a unity gain differential amplifier to provide isolation, as will be described below.

The transmission controller 3010 also includes blocks 3220 and 3230 which represents the interface circuits used to receive various input signals related to the engine ignition and PRNODDL condition. Specifically, the ignition related signals include a signal J2, and a signal S2. The signals related to the PRNODDL condition include the "neutral start" signal $NS_2$, and "auxiliary neutral start" signal $NS_2$, a "first reverse light" signal $RL_1$ and a "second reverse light" signal $RL_2$. In accordance with the preferred embodiment, the control methodology is responsive to the condition that these ignition switch voltage signals are in. The reason for this is that it is appropriate to hold the transmission controller 3010 in certain predetermined conditions depending on the position of the ignition switch and/or the neutral contact switch sensor $NS_1$ and/or the auxiliary contact switch sensor $NS_2$.

For example, the signal J2 represents the ignition voltage during the run and crank positions, and this signal will generally be either at a zero voltage level or at the battery voltage level. The signal S2 represents the voltage in the crank position only and is used to provide the necessary voltage for the starter relay coil of the engine. To determine when the transmission 100 is in a crank condition the $NS_1$ or neutral start switch signal is sensed along with the S2 signal to hold the transmission controller 3010 in a reset condition during cranking due to the possibility that the battery voltage may drop below level required for proper controller operation.

Referring specifically to block 3230, the PRNODDL condition switches provide input signals from the contact switch sensor $NS_1$, the auxiliary contact switch sensor $NS_2$, the first reverse light $RL_1$ and the second reverse light $RL_2$. The PRNODDL switch block 3230 controls the switching of the reverse lights which are connected in series. When the signals $RL_1$ and $RL_2$ indicate a reverse condition, electrical current from the ignition switch J2 is fed through a relay coil which interconnects the reverse lights to battery voltage via the relay contacts thus turning on the backup lights on the vehicle. The PRNODDL switch block also acts in combination with the two contact switch sensors $NS_1$ and $NS_2$ to determine the shift lever position, as discussed above.

As shown in FIG. 27B, the transmission controller 3010 includes a pressure switch block 3240 which represents the interface circuit used for receiving and conditioning the pressure level signals from the pressure switches 3090. Each of the pressure switches provide a digital level signal which is either at a zero or battery voltage level depending upon whether or not a predetermined pressure level has been reached. The ressure switches are used in conjunction with the low/reverse, overdrive and two/four shift (kickdown) clutch assemblies, and generally comprise grounding switches located in the manifold assembly 700. The pressure switch interface circuit 3240 provides input signal conditioning, i.e. filtering and buffering for these signals. For example, pull up resistors located in the manifold assembly 700 (See FIG. 8) to provide battery voltage when pressure switch is open are contained in block 3090. The state of each of the pressure switch signals is transmitted to the transmission controller 3010 to provide feedback information for use in both monitoring clutch operation and as an input to the learning logic and methodology described herein.

The heart of the transmission controller 3010 is contained in the micro core block 3250. The micro core 3250 includes an eight-bit microcomputer unit (MCU), a memory chip for storing the application or operating program used by the MCU, and an interface chip for addressing and routing signals on the various lines used in the micro core bus structure. Thus, for example, several of the signals received from the controller's interface circuits are connected to the interface chip, which will then place these signals on the data bus when the chip is properly addressed by the MCU.

The transmission controller 3010 also includes a watchdog/reset block 3260 which provides several circuit functions in conjunction with the micro core 3250. For example, the watchdog/reset circuits 3260 will control the initial start up of the MCU, watch to see if the MCU is properly functioning, cause a reset of the MCU in response to certain regulator voltage conditions, and provide a frequency divider for the speed signals. The watchdog/reset circuits 3260 also provide an output to a relay driver block 3270 which is used to disconnect or turn off electrical power to the solenoid-actuated valves 630, 632, 634 and 636 in the solenoid block 3050 shown in FIG. 27A under predetermined conditions.

One of the principal functions of the micro core 3250 is to generate command or control signals for transmission 100 to the solenoid driver block 3280. The solenoid driver block includes a separate driver circuit for the solenoid-actuated valves 630, 632, 634 and 636 contained in the solenoid block 3050 shown in FIG. 27A. These driver circuits generate the electrical current necessary to operate the solenoid-actuated valves 630, 632, 634 and 636 in response to the control signals generated by the MCU. The solenoid driver block 3280 also includes spike monitor circuits which verify the operation of the solenoid driver circuits by detecting the presence of an inductive spike (FIG. 22E) which occurs when the solenoid coil is de-energized.

The transmission controller 3010 also includes a regulator block 3290 and a test mode block 3300. The regulator block 3290 is used to advise the watchdog/reset circuit 3260 of predetermined conditions relating to the operation of the regulator, such as a low battery voltage condition, a high battery voltage condition, an overload condition, or an over temperature condition in the regulator. It is a dual regulator and includes a 5 V, switched output. The test mode block 3300 is used to permit a test mode program to be downloaded into the RAM memory of the MCU for testing the transmission system.

Figure 28A:
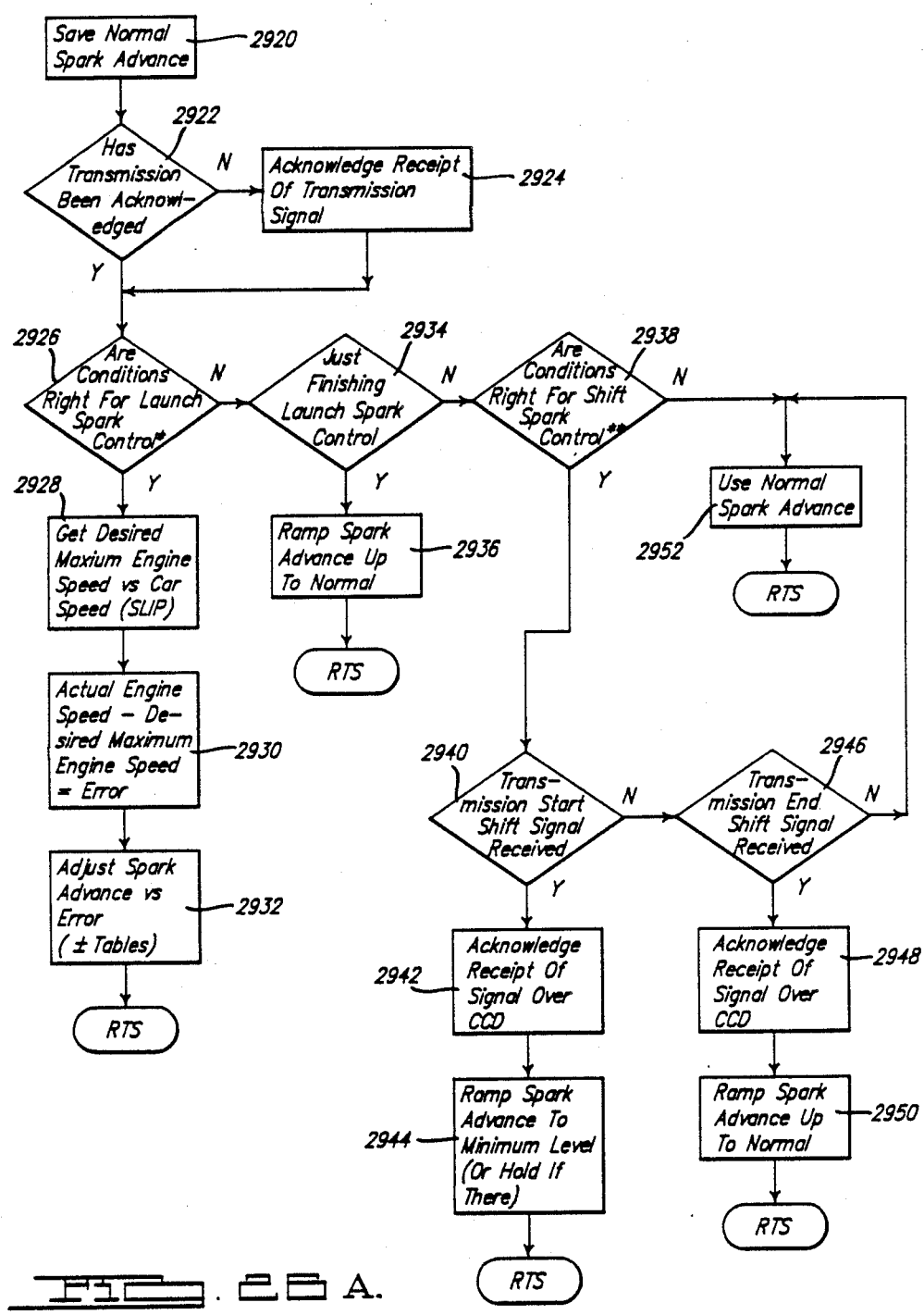
FIGS. 28A-I comprise a schematic diagram of the transmission controller shown in FIG. 27B; specifically.
Figure 28A:
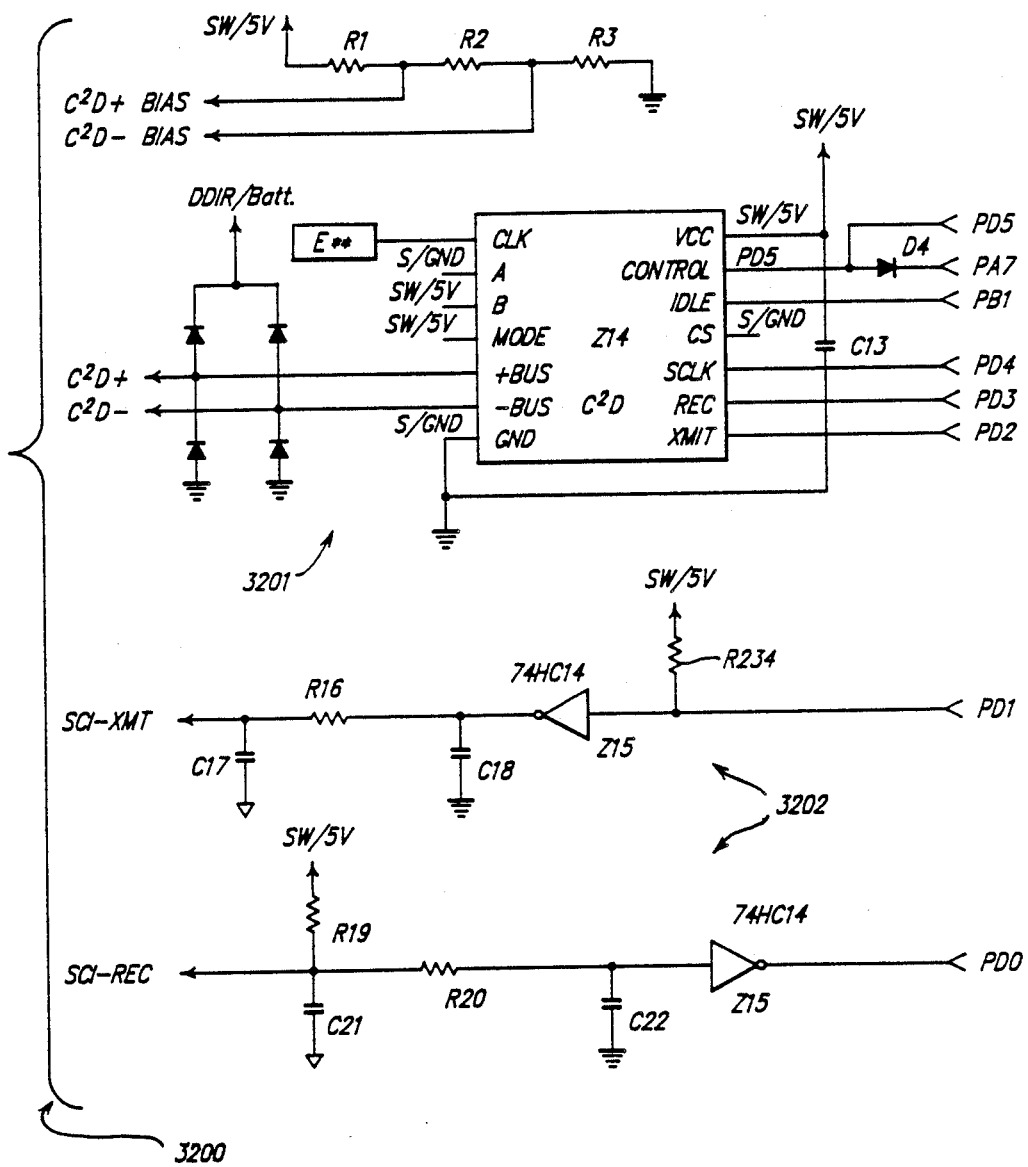
Figure 28B:
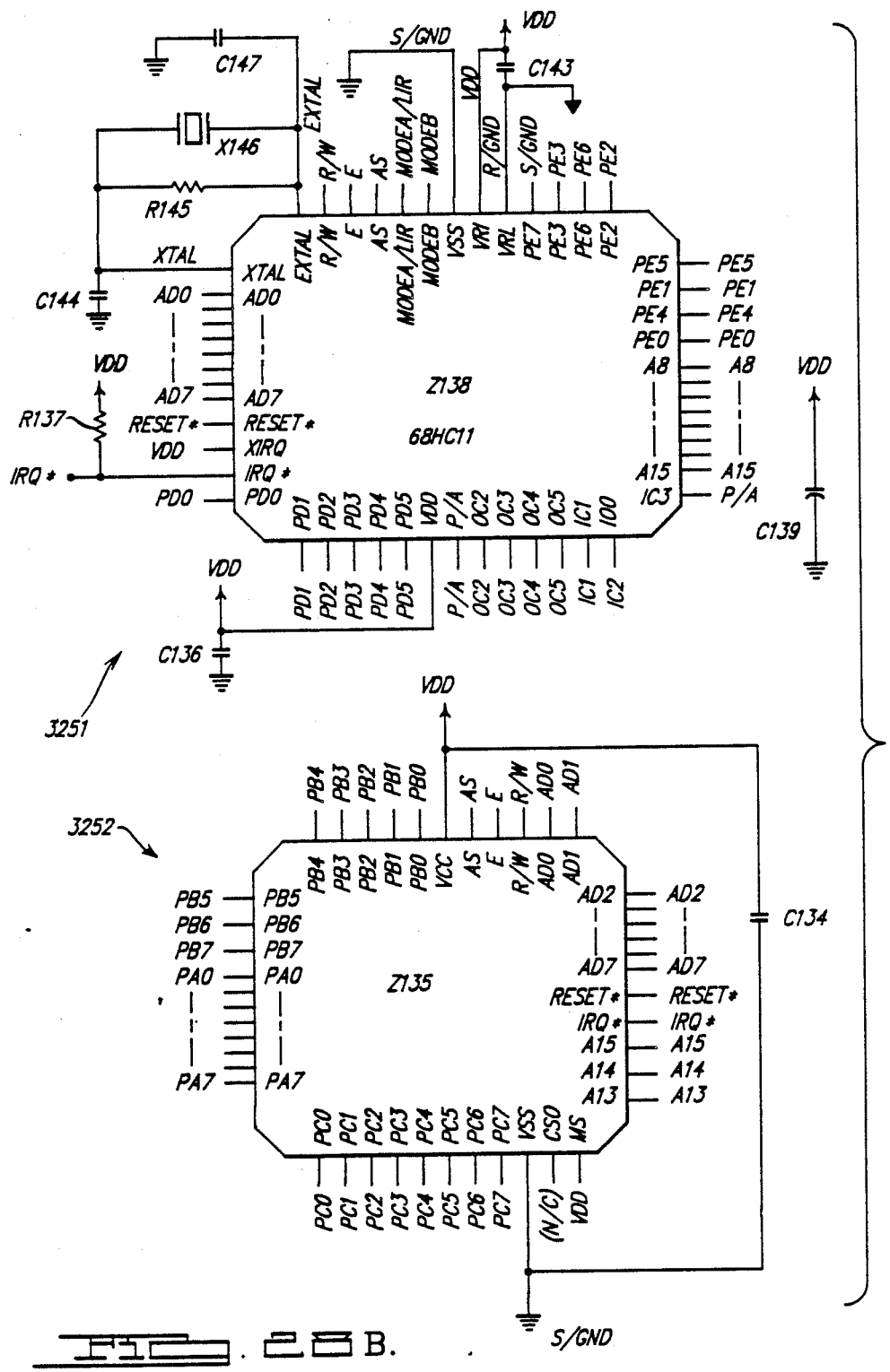
Figure 28C:
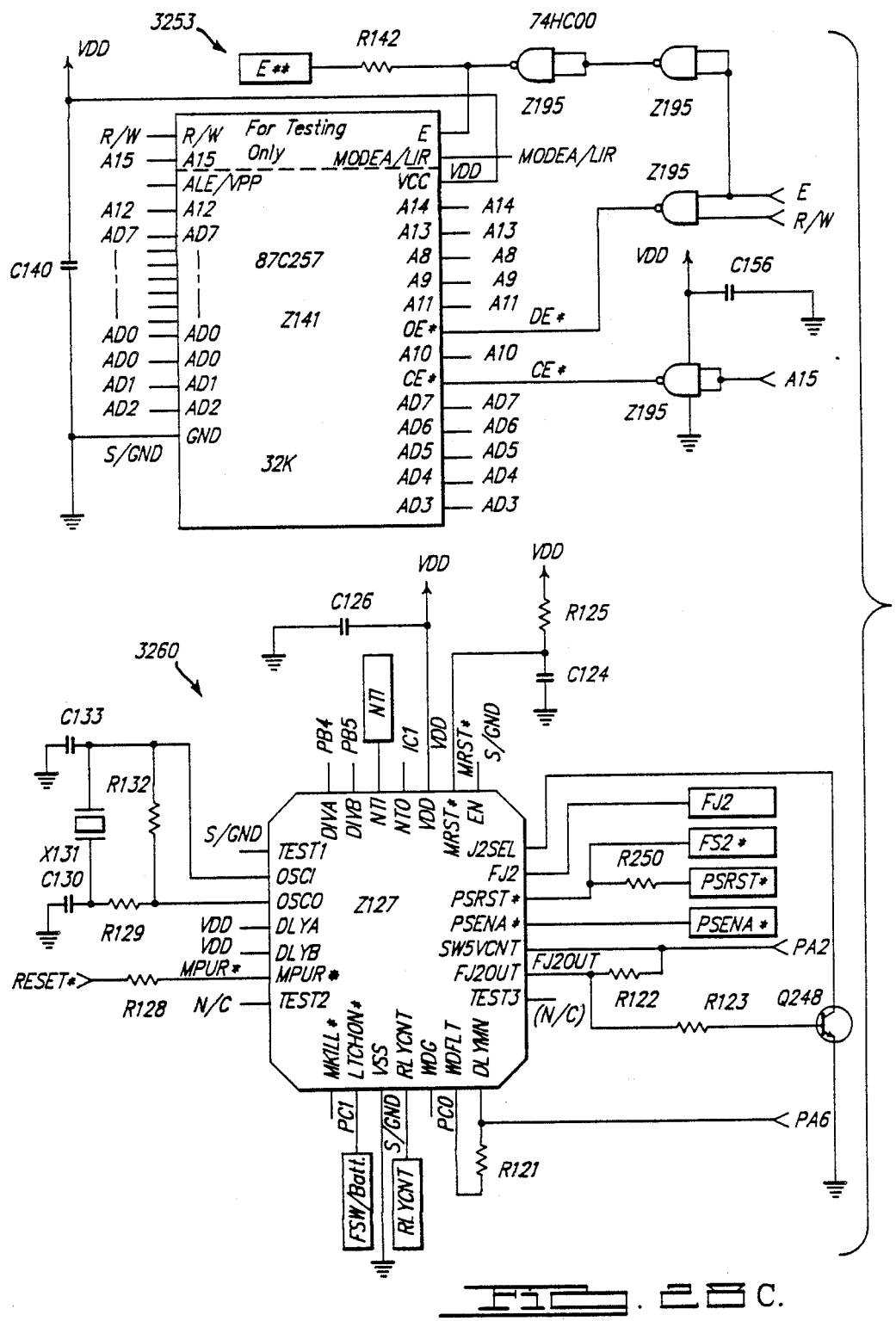

Referring generally to FIGS. 28A–28I, a schematic diagram of the transmission controller 3010 is shown. Each of the FIGS. 28A–28I generally correspond to one of the circuit blocks shown in FIG. 27B. Thus, for example, FIG. 28A illustrates the serial communication interface 3200 which provides a serial communication link between the transmission controller 3010 and the engine controller 3020. Similarly, FIG. 28B illustrates the MCU chip Z138 and the interface chip Z135 which form part of the micro core 3250. The remainder of the micro core 3250 is shown in FIG. 28C which illustrates the EPROM chip Z141 and its associated circuitry. It should also be noted that FIG. 28C illustrates a watchdog/reset chip Z127 and associated circuitry, which together correspond to the watchdog/reset circuit 3260. A discussion of the circuits contained in the watchdog/reset chip Z127 will be presented in connection with FIG. 30. Similarly, a discussion of the circuits contained in the interface chip Z135 will be presented in connection with FIG. 29.

Figure 28D:
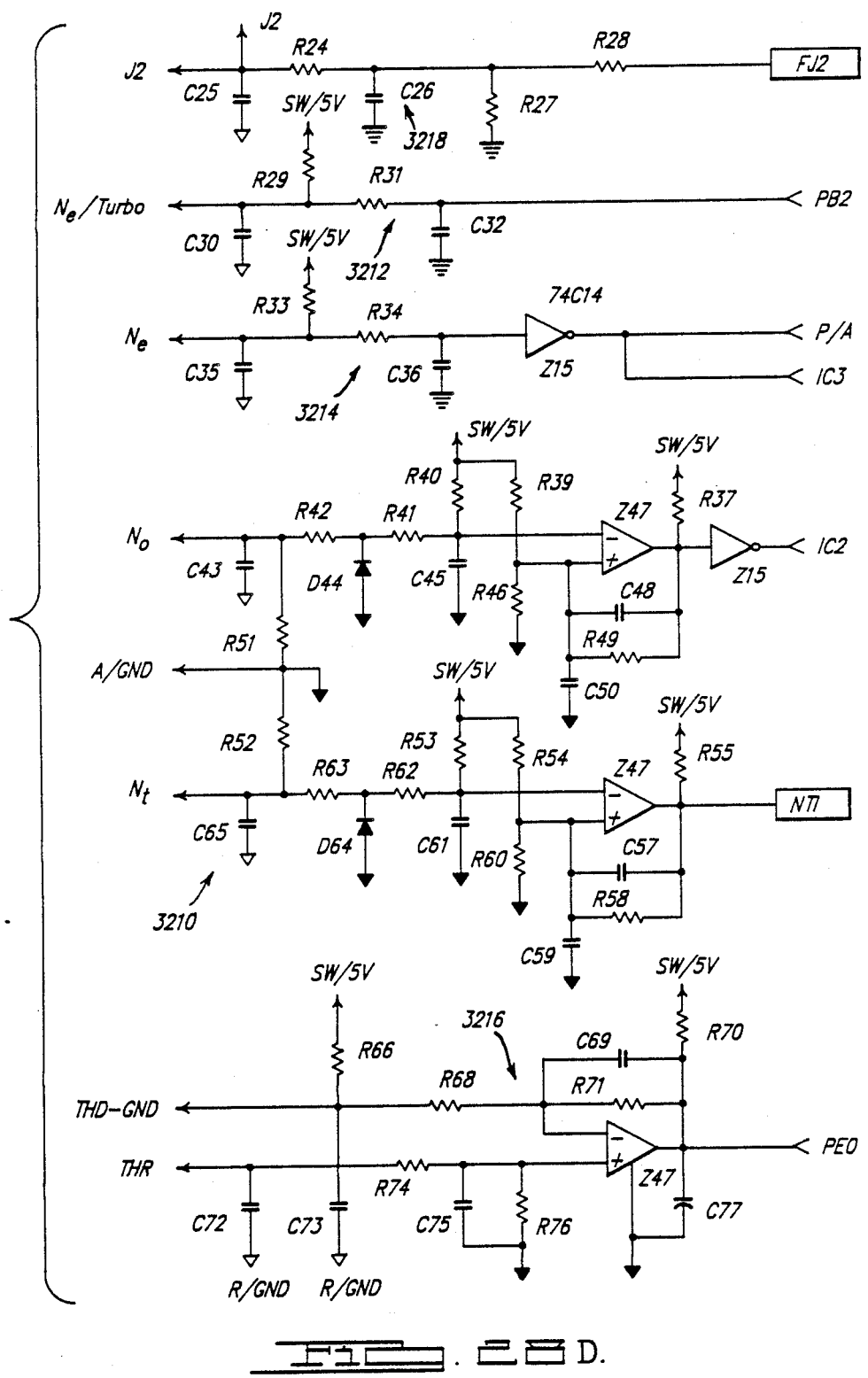
Figure 28E:
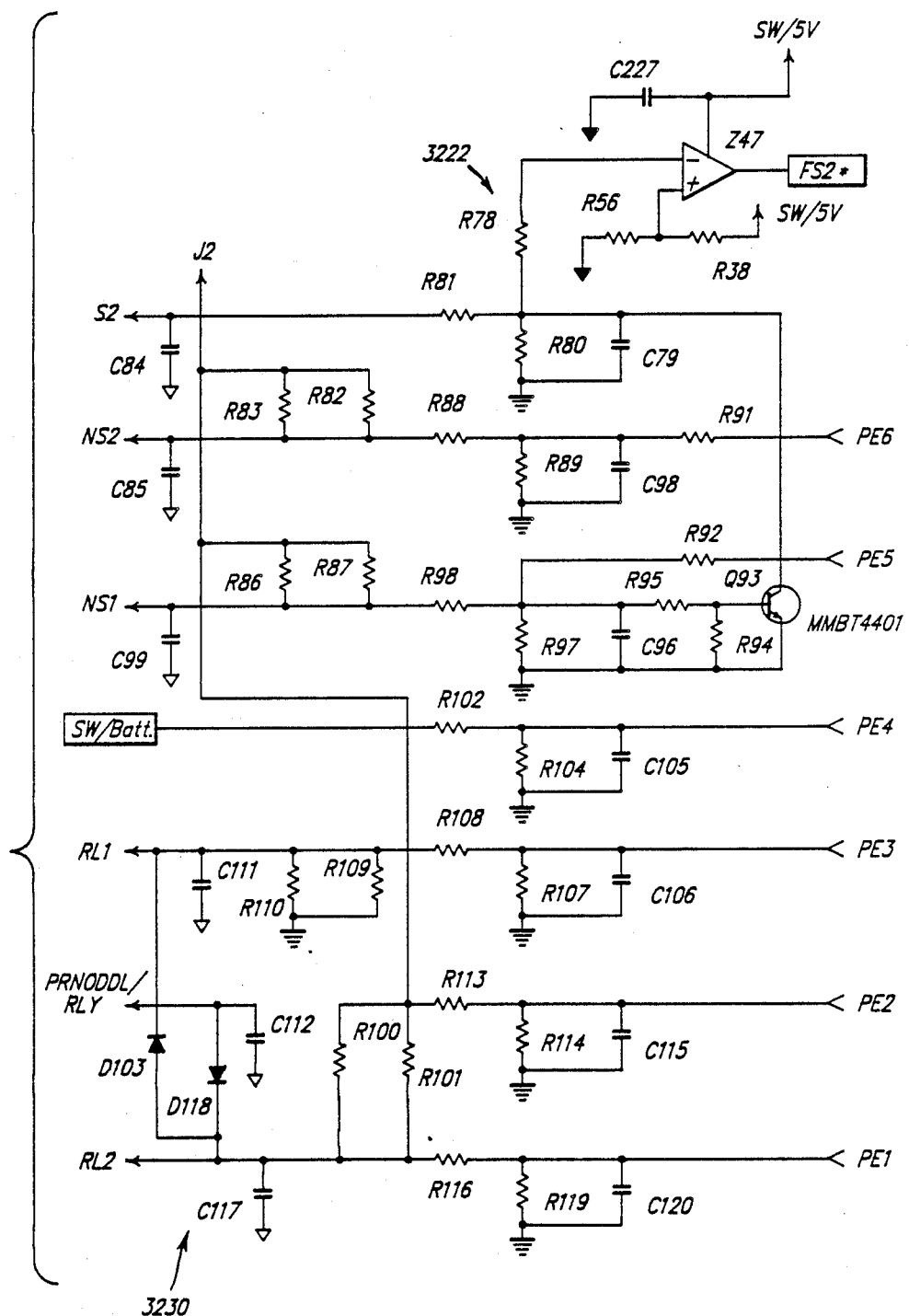
Figure 28F:
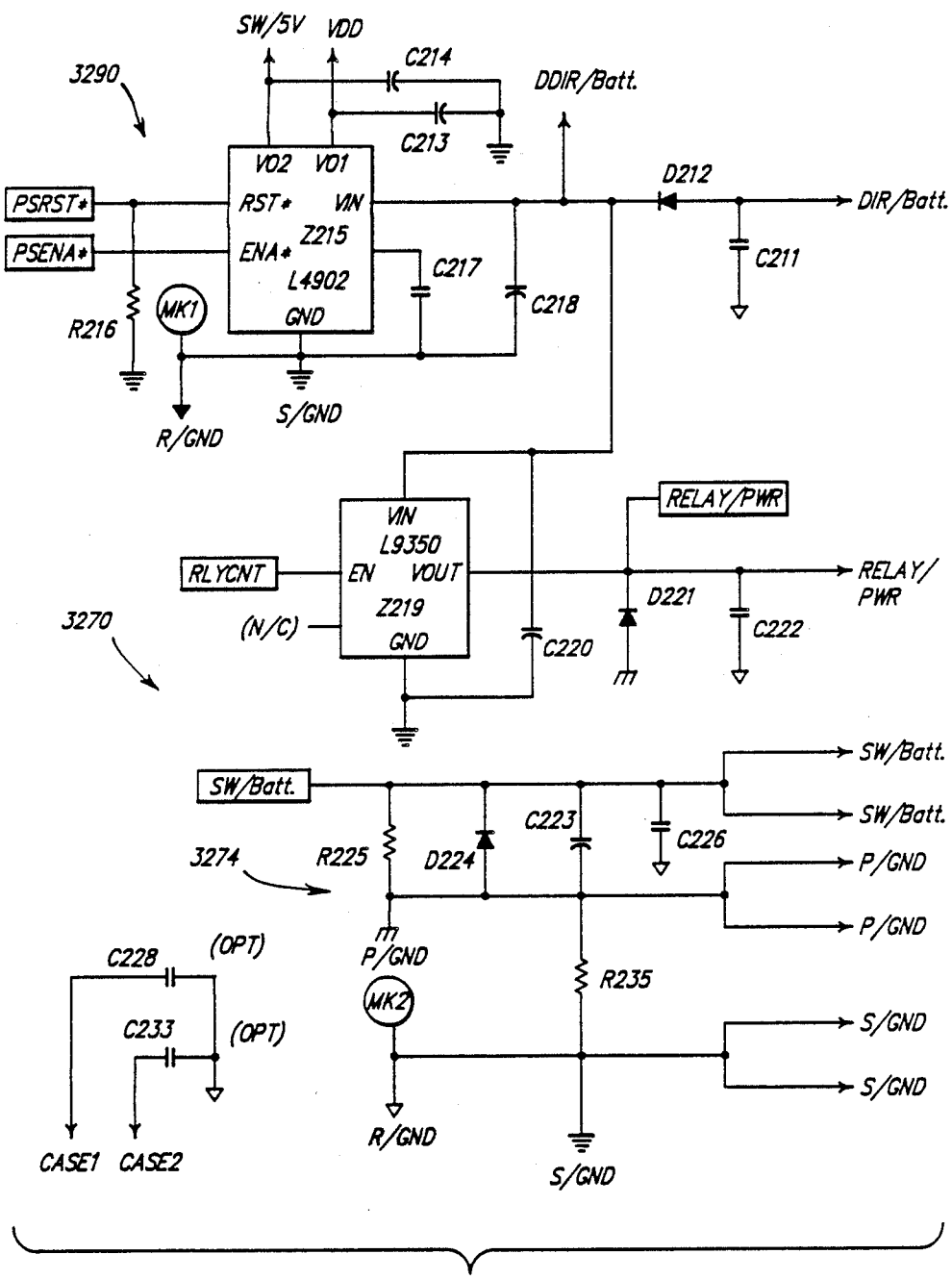
Figure 28G:
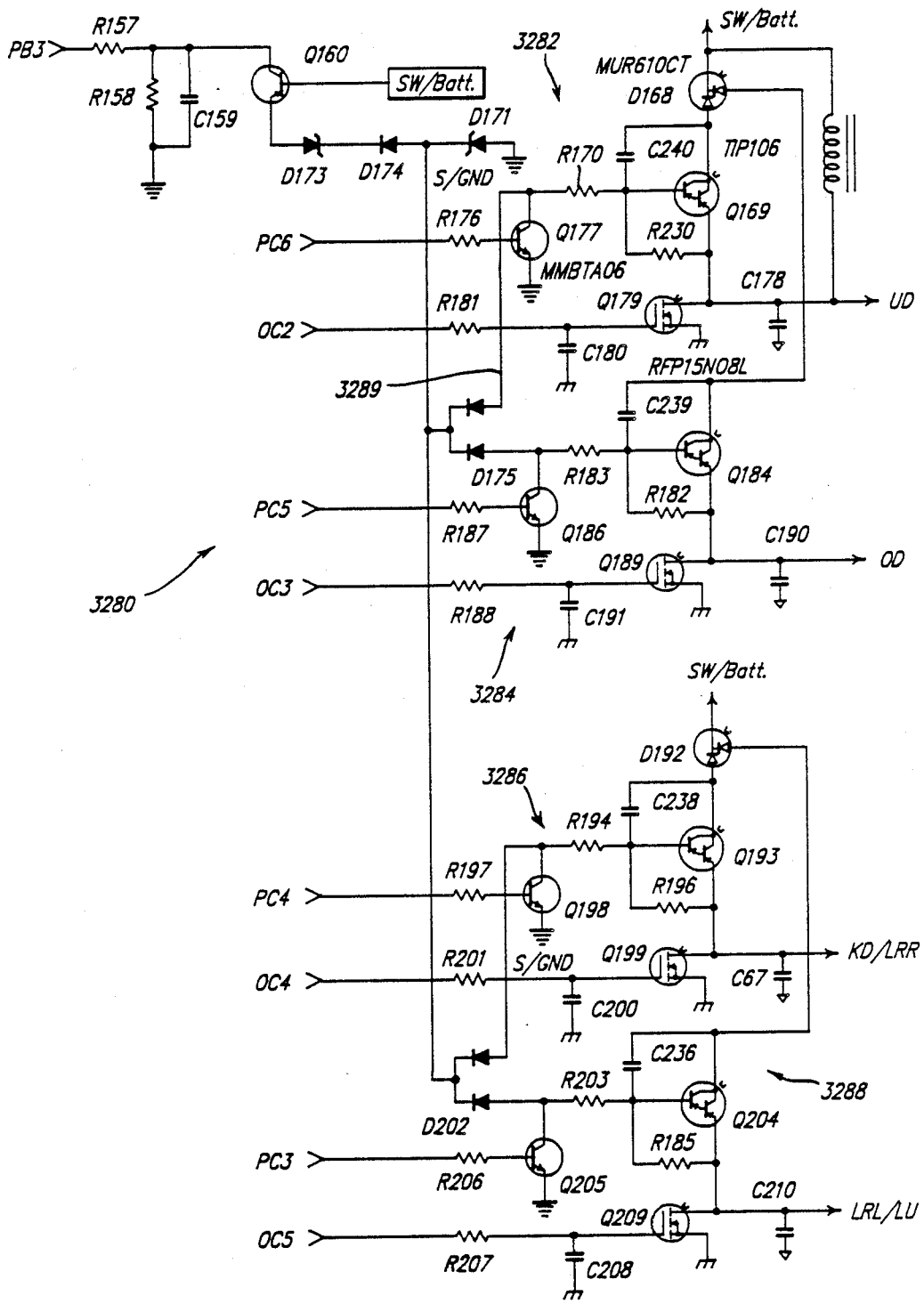
Figure 28H:
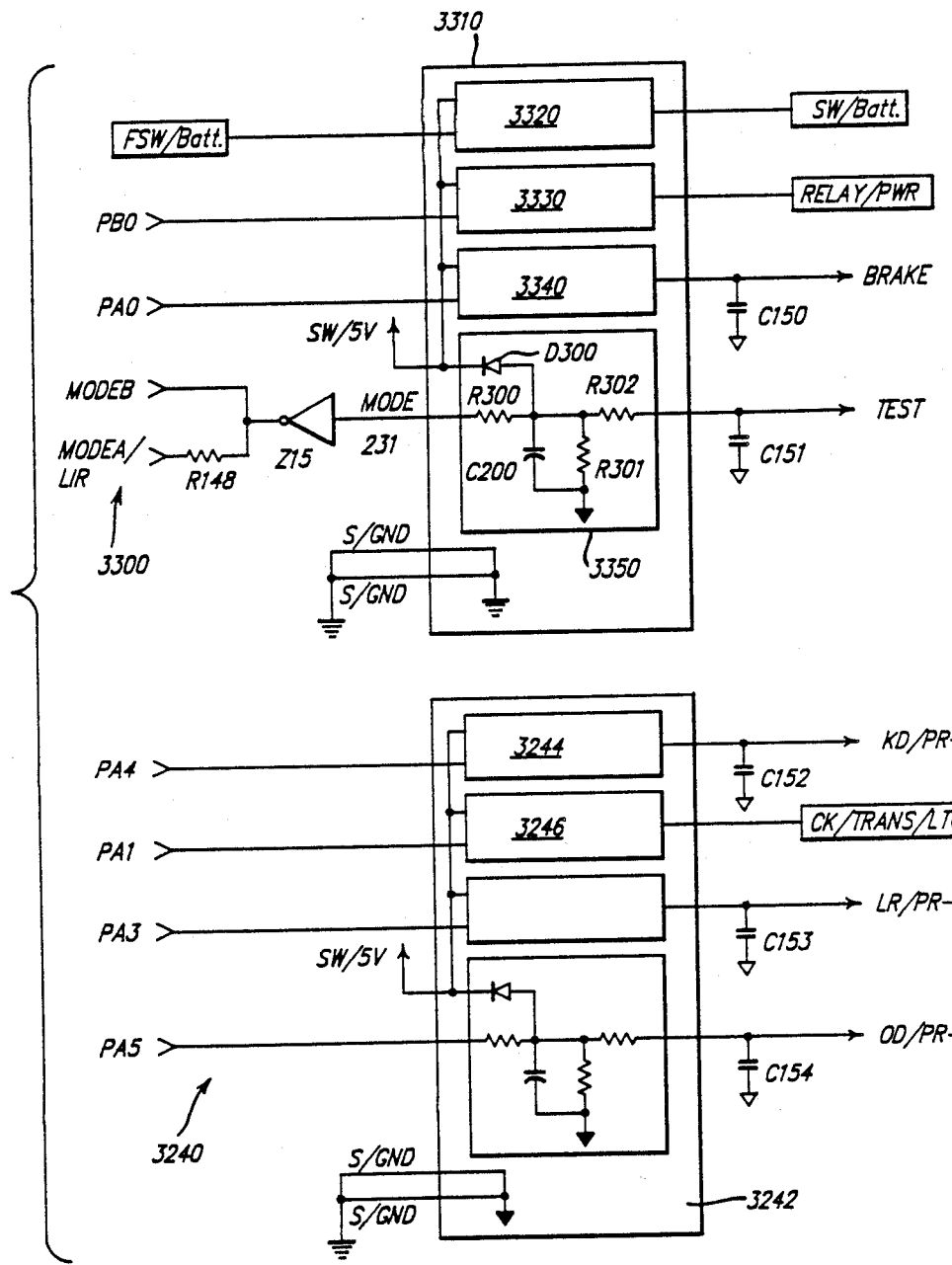
Figure 28I:
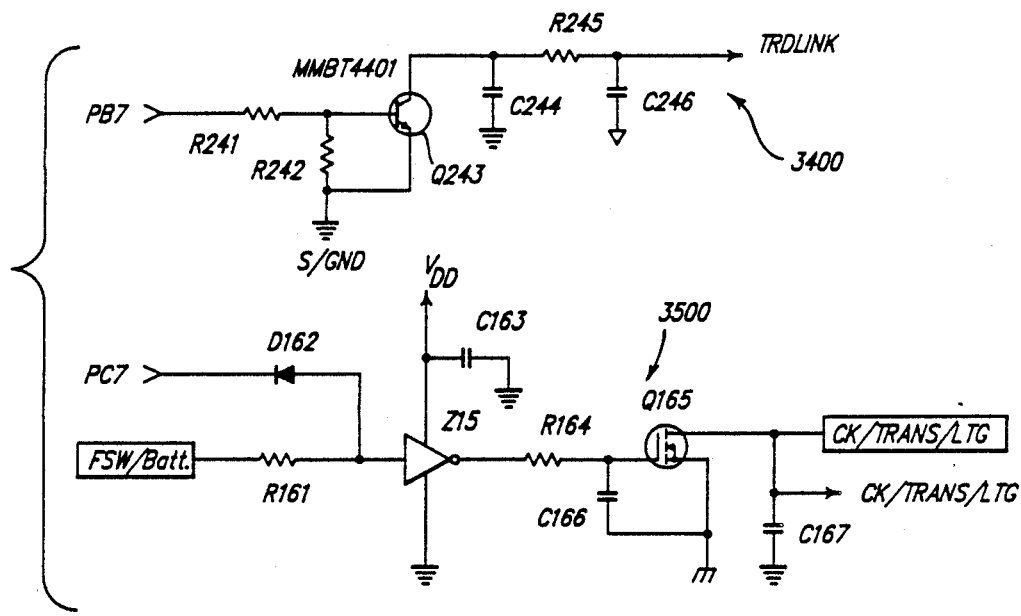

Continuing with an overview of the schematic diagram for the transmission controller 3010, FIG. 28D illustrates the speed and throttle input interface circuits 3210. FIG. 28E illustrates the PRNODDL interface circuits 3230 and part of the ignition switch interface circuits 3220. FIG. 28F illustrates the regulator circuit 3290 and the relay driver circuits 3270. FIG. 28G illustrates the solenoid driver circuits 2880. FIG. 28H illustrates the pressure switch interface circuits 3240. FIG. 28I illustrates an additional serial communication circuit 3400 and a diagnostic communication circuit 3500.

Referring specifically to FIG. 28A, a schematic diagram of the serial communications interface 3200 is shown. This communications interface actually provides for two serial communication channels for the transmission controller 3010. The first serial communication channel 3201 is based upon the Chrysler Collision Detection ($C^2D$) technology identified above. This technology is embodied in the communications chip Z14 which provides the intelligence to know when it has sent a message out onto a serial data bus and whether or not it has won access to the bus. This bus comprises the two conductors labeled "($C^2D$)+" and "$C^2D$)". It should be noted from the above that this serial communications bus comprises a double ended or differential signal transmission link with the engine controller 3020 (or any other appropriate controller in the vehicle which is connected to the bus structure). The communications chip Z14 receives signals transmitted from the microcomputer chip Z138 (shown in FIG. 28B) via its connection to the "PD3" port of the microcomputer. Similarly, signals are transmitted from the communications chip Z14 to the microcomputer chip Z138 via the "PD2" port.

It should be noted that the communications chip Z14 is provided with a clock signal "E**" which is derived from the MCU chip's Z138 system clock, namely the "E" Clock. As shown in FIG. 28C, two NAND gates Z195 are connected in series to double buffer and double invert the E clock signal. Signal transmissions from the MCU chip Z138 are initiated by the MCU chip Z138 which pulls down a "Control" line of communications chip Z14 via a command signal transmitted from the "PD5" port. However, the communications chip Z14 will actually control the transfer of data from the MCU chip Z138 by providing a "SCLK" clock signal to the MCU's "PD4" port, which will clock the data in and out of the MCU chip.

It should also be noted that the communications chip Z14 is turned off when the transmission controller 3010 is in a stop mode, such as after the ignition key is turned off. The communications chip Z14 is turned off through the "SW/5 V" power supply. The SW/5 V voltage level is derived from a dual regulator Z215 contained in the regulator circuit 3290 shown in FIG. 28F. Specifically, the SW/5 V supply is switched on or enabled by the MCU Z138 in response to the ignition switch.

FIG. 28A also illustrates the second serial communications channel which is generally designated by the reference numeral 3202. The serial communications channel 3202 is generally comprised of a transmit line labeled "SCI-XMT" and a receive line labeled "SCI-REC". Each of these transmit and receive lines include an RC filter and a buffering inverter Z15. The transmit line SCI-XMT is connected to the "PD1" port of the microcomputer chip Z138, while the receive line SCI-REC is connected to the "PD0" port of the microcomputer chip. This second serial communications channel may be used for example to download appropriate test programs into the microcomputer chip Z138, such as for end of line testing at the manufacturing facility. In one form of the present invention, the SCI-REC receive line is used in conjunction with the test mode to transmit a signal to the microcomputer chip Z138 which will cause a ROM resident boot load program inside the microcomputer chip to control the receipt and initial execution of the test programs.

Referring to FIGS. 28B–28C, a schematic diagram of the micro core 3250 is shown. The micro core 3250 for the transmission controller 3010 generally comprises the microcomputer 3251 (chip Z138), the interface 3252 (chip Z135), and the memory 3253 (chip Z141). In the present embodiment, the microcomputer chip Z138 is a Motorola eight-bit microcomputer chip (Part No. 68HC11), which includes 256 bytes of RAM memory and 512 bytes of EPROM (erasable electrically programmable read only memory). However, it should be appreciated that other suitable microcomputer chips or microcomputer circuits could be employed in the appropriate application. Similarly, the memory 3253 (chip Z141) may be any suitable memory chip or circuit having sufficient capability to store the computer programs which operate in accordance with the control methodology discussed in detail above, such as an Intel 87C257 memory chip.

Figure 29:
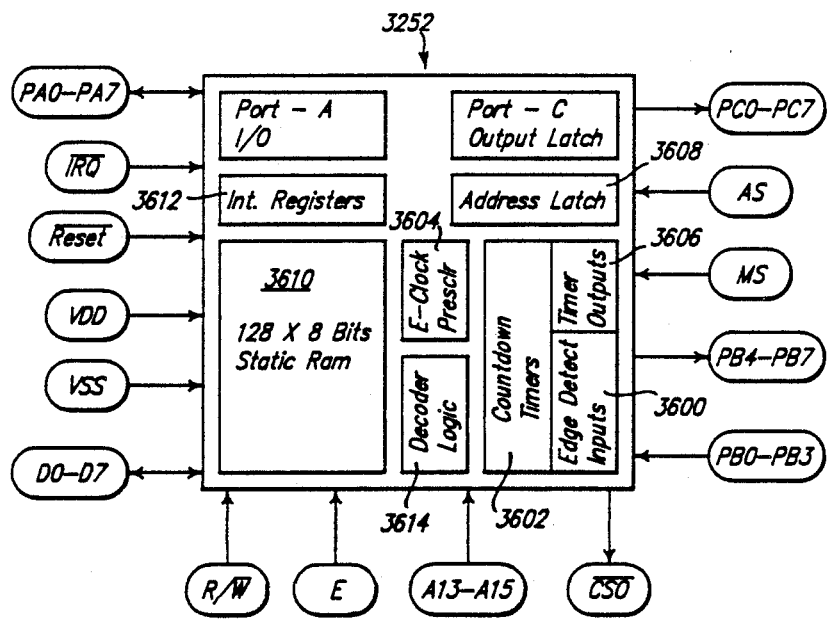
FIG. 29 is a block diagram of the interface chip shown in FIG. 28B.

As will be appreciated from FIG. 29, the interface 3252 (chip Z135) may be any suitable chip or set of chips/circuits which generally provide the circuits illustrated in this Figure. As will be discussed below, the interface 3252 (chip Z135) includes several internal registers for facilitating rapid communications between microcomputer 3251 (chip Z138) and several of the other circuits contained in the transmission controller 3010, such as the pressure switch interface circuit 3240. In the present embodiment, the various circuits illustrated in FIG. 29 have been combined into a single chip configuration, namely interface (chip Z135), to conserve space on the circuit board for the transmission controller 3010.

Each of the pins or ports of the various chips used in the micro core 3250 have been appropriately labeled, so that the various circuit connections between these chips and the other circuits contained in the transmission controller 3010 may be readily discerned from each of the FIGS. 28A–28I. For example, the "Control" and "Idle" lines of the communication chip Z14 in FIG.

28A are also shown to be labeled "PA7" and "PD1" respectively. As will be appreciated from FIG. 28B, both of these signal lines are connected to the interface (chip Z135), as this chip contains both the "PA7" and "PB1" labeled ports.

The microcomputer 3251 (chip Z138) and the interface 3252 (chip Z135) communicate with each other via an address/data bus labeled "AD0–AD7". The address-/data lines in this bus are bidirectional to allow the transfer of both address and data information between the microcomputer 3251 (chip Z138) and the interface 3252 (chip Z135). As illustrated in FIG. 28C, the memory (chip Z141) is also connected to this address/data bus. The memory (chip Z141) is also connected to the microcomputer 3251 (chip Z138) via an address bus which is comprised of address lines "A8–A15". Three of these address lines, namely address lines A13–A15, are also connected to the interface 3252 (chip Z135) for selecting particular register or RAM locations within this chip.

Referring to a portion of FIG. 28D, a schematic diagram of the speed and throttle input circuits 3210 are shown. These circuits are designated as 3212, 3214 and 3218. The speed input signals are labeled "$N_e$/Turbo", "$N_e$", "$N_o$" and "$N_t$". The throttle input signals are labeled "THD-GND" and "THR".

The $N_e$/Turbo and $N_e$ signals are used in an application involving a turbo equipped engine, which provides a dual pick-up in the distributor of the engine. In this situation, both the NE and NE/turbo signals are used to indicate engine speed. However, while these signals provide the same engine speed data, these signals are out of phase with each other. In this regard, it should be noted that in distributors having a single engine speed pick-up, only the $N_e$ signal would be used by the transmission controller 3010. FIG. 28D shows that the input interface circuit for the $N_e$/Turbo signal comprises a low pass filter 3212, which includes resistor R91 and capacitors C90 and C32. The filtered NE/Turbo signal is then directed to the "PB2" port of the interface 3252 (chip Z135). A similar filter network 3214 is also provided for the engine speed signal "$N_e$". However, an inverting amplifier Z15 is also included as a buffer to provide the fast rise and fall times required by the microcomputer 3251 (chip Z138), as well as noise immunity.

The "$N_o$" input signal represents the output speed of the transmission, while the "$N_t$" signal represents the input or turbine speed of the transmission. These signals are first filtered and then transmitted to a zero crossing detector circuit which includes the comparator Z47. Due to the sensitivity of these signals (e.g., minimum amplitude of 500 millivolts peak to peak), each of the comparators Z47 is provided with a positive feedback loop for adding hysteresis capability to these zero crossing detector circuits. For example, resistor R49 and capacitor C48 provide this hysteresis capability for the output speed signal $N_o$. It should also be noted that the filter circuits for these two speed signals use a ground signal labeled "A/GNB". This ground signal represents a clean ground signal which is derived from the microcomputer 3251 (chip Z138) to heighten the sensitivity of these filter circuits. Once the output speed signal $N_o$ is properly conditioned, it is transmitted to the "IC2" port of the microcomputer 3251 (chip Z138). In contrast, the conditioned input transmission speed signal $N_t$ is transmitted to the "NTI" port of the watchdog/reset chip Z127 (shown in FIG. 28C).

The THR and TH-GND signals are used to indicate the throttle position in the vehicle. These signals are processed through a unity gain differential amplifier circuit, which is generally designated by the reference numeral 3216. This differential amplifier circuit is used to sense the ground potential of the throttle position sensor, as well as sense the potentiometer wiper signal of this sensor. The output of the differential amplifier circuit 3216 is directed to the "PE0" port of the microcomputer 3251 (chip Z138). Since the throttle position signal is an analog input signal, it should be appreciated that the microcomputer 3251 (chip Z138) includes an internal analog to digital converter to permit further processing of this signal in accordance with the control methodology discussed above.

Figure 33:
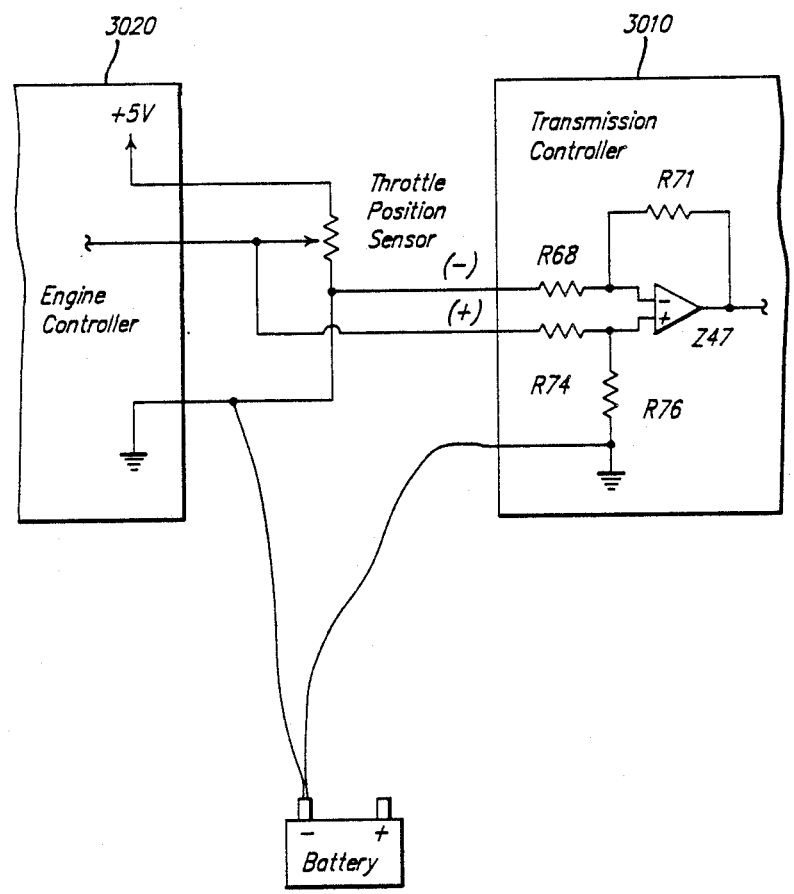
FIG. 33 is a diagrammatic drawing showing how the output of a throttle position sensor can be shared between two electronic controllers having dissimilar ground potentials.

This is further illustrated in conjunction with FIG. 33 where the dissimilar grounds of the engine controller 3020 and transmission controller 3010 are graphically depicted. Attention is invited also to circuit 3216 in FIG. 28D. Dissimilar grounds can generate a variable reference to ground. This is a function of variable resistance and inductance in the vehicle and its electrical system. The variable ground reference could be a significant percentage of the span of the output voltage from the throttle position sensor. Therefore, without the feature of the shared throttle position sensor circuit, two sensors would be needed.

FIG. 28D also shows a portion of the ignition switch interface circuits 3220. Specifically, FIG. 28D shows the interface circuit 3218 for the ignition switch signal "J2". The interface circuit 3218 provides a low pass filter whose output is directed to the "FJ2" port of the watchdog/reset chip Z127.

Turning to FIG. 28E, the last of the ignition switch interface circuits 3220 is shown. Specifically, an interface circuit 3222 for the crank only ignition signals "S2" is shown. The interface circuit 3222 includes a voltage divider (R78 and R80), a low pass filter (R61 and C79), and a comparator Z47. The voltage divider is used to decrease the voltage level of the S2 signal, so that it does not exceed the maximum input voltage of the comparator. The output of the comparator Z47 is connected to the "FS2*" port of the watchdog/reset chip Z127. The S2 ignition signal is used to hold the microcomputer 3251 (chip Z138) in a reset mode during the cranking of the engine. This provision is implemented for purposes of accuracy, since it is possible that the battery voltage in the vehicle could dip down during the cranking of the engine.

CIRCUIT FOR DETERMINING THE CRANK POSITION OF AN IGNITION SWITCH BY SENSING THE VOLTAGE ACROSS THE STARTER RELAY COIL AND HOLDING AN ELECTRONIC DEVICE IN A RESET CONDITION IN RESPONSE THERETO

FIG. 28E also illustrates the PRNODDL interface circuits 3230. Specifically, FIG. 28E shows the circuits used to interface the neutral start signals "NS1" and "NS2", as well as the circuits used to interface the reverse light signals "RL1" and "RL2". Each of these signals are digital signals which will generally be at a zero or battery voltage potential. Accordingly, each of the interface circuits for the signals include a pair of voltage dividing resistors (in addition to a filter) for getting the battery voltage level down to a 5 volt potential. In this regard, it should be noted that each of these input signals are coupled to the ignition switch signal "J2" through suitable pull-up resistors (e.g., R82 and R83) to ensure that these signals will provide battery voltage potential when their corresponding switches are open.

Figure 34:
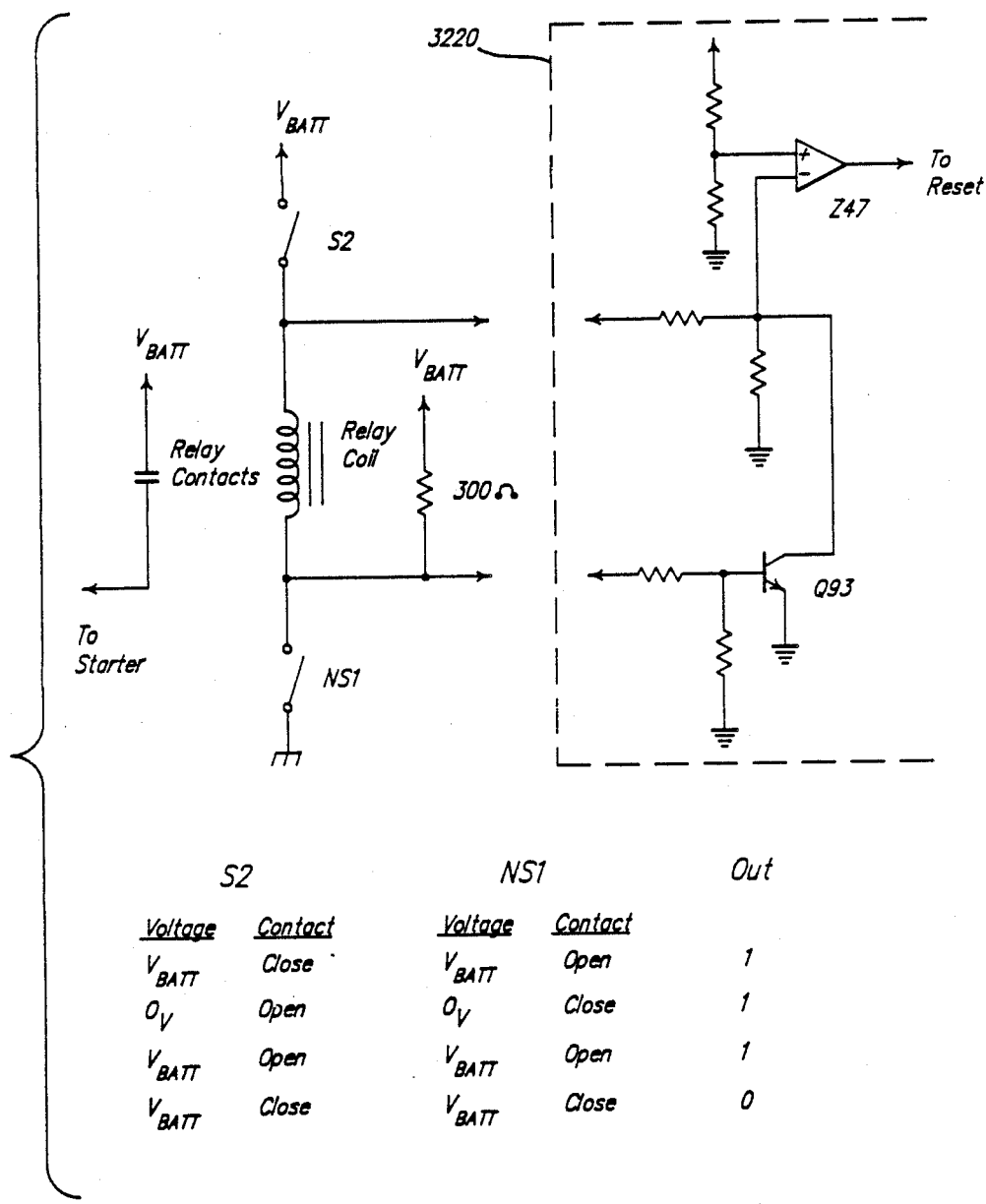
FIG. 34 is a diagrammatic illustration of a circuit for determining the crank position of an ignition switch by sensing the voltage across the starter relay coil and holding an electronic device in a reset condition in response thereto.

While the conditioned NS1 signal is transmitted to the "PE5" port of the microcomputer 3251 (chip Z138), this signal also provides a gating signal to the transistor Q93. The transistor Q93 is used to disable the S2 signal from causing a reset of the microcomputer 3251 (chip Z138). In other words, when the contact switch NS1 is open, the NS1 signal will be HIGH, thereby causing the transistor Q93 to conduct and pull down the input voltage to the comparator Z47. This provision is to ensure that the S2 signal does not cause a reset unless the transmission 100 is either in neutral or in park. This is also graphically depicted in FIG. 34 and its accompanying chart of the states of the contacts, devices and outputs.

Referring to FIG. 28F, a schematic diagram of the regulator circuit 3290 and the relay driver circuit 3270 is shown. Additionally, FIG. 28F shows two capacitors (C228–C233) which are used to tie the grounding potential of the circuit board for the transmission controller 3010 to the aluminum case which surrounds the circuit board. This optional feature may be used to provide additional RF or electromagnetic compatibility for the transmission controller circuitry.

DUAL REGULATOR

The regulator circuit 3290 shown in FIG. 28F generally comprises a dual 5 volt regulator chip Z215 which receives a voltage input signal from the vehicle battery and a command signal from the watchdog/reset chip Z127. This command signal, labeled "PSENA*", is used to enable or switch on and off the "VO2" output of the regulator chip under MCU command when ignition is off. The VO2 output of this chip provides the "SW/5V" supply signal discussed above. This provision of a switchable 5 volt supply is particularly advantageous in a vehicle application, as it permits a substantial portion of the peripheral circuitry (or circuitry with a low priority) connected to the micro core 3250 to be shut down when the vehicle ignition is off thus reducing current draw on the battery. This can also be used under conditions requiring an orderly shutdown for purposes of storing last-sensed data etc. A continuous voltage output can be provided to high priority circuits such as a memory chip or a MCU. It can also be used to keep high priority circuits energized in a "KEY-OFF" situation, if desired, to allow for example the control of gear selection/display while the engine is off.

SHUTDOWN RELAY DRIVER

The shutdown relay driver circuit 3270 includes a self protecting, high side switch chip Z219 which is responsive to a "RLYCNT" control signal from the watchdog/reset chip Z127. Specifically, the relay control signal will cause the battery voltage to be transmitted to the "VOUT" port of the switch chip Z219. This voltage output from the chip Z219 is referred to as the "RELAY/PWR" signal, as it provides the power necessary to operate the shut down relay 3272 shown in FIG. 30. The shut down relay 3272 is used to cut power off to the solenoid driver circuits 3280 to thereby achieve a "LIMP-IN" mode previously described. Specifically, when the shut down relay 3272 is closed, the "SW/BATT" signal shown in FIG. 28F will be transmitted to the solenoid driver circuits 3280. However, before this SW/BATT signal is transmitted to the solenoid driver circuits 3280 it is processed through conditioning circuit 3274. The conditioning circuit 3274 includes a diode "D224" which is used to clamp the back EMF of the solenoid coils when the shut down relay 3272 is open. The conditioning circuit 3274 also includes a pull down resistor R225 to ensure that the line is pulled to ground despite the states of the solenoid driver circuitry. A capacitor C223 is also provided to suppress any line inductive energy spikes that might occur in response to the switching of the transmission solenoids.

THE USE OF DIODES IN AN INPUT CIRCUIT TO TAKE ADVANTAGE OF AN ACTIVE PULL-DOWN NETWORK PROVIDED IN A DUAL REGULATOR

Figure 31:
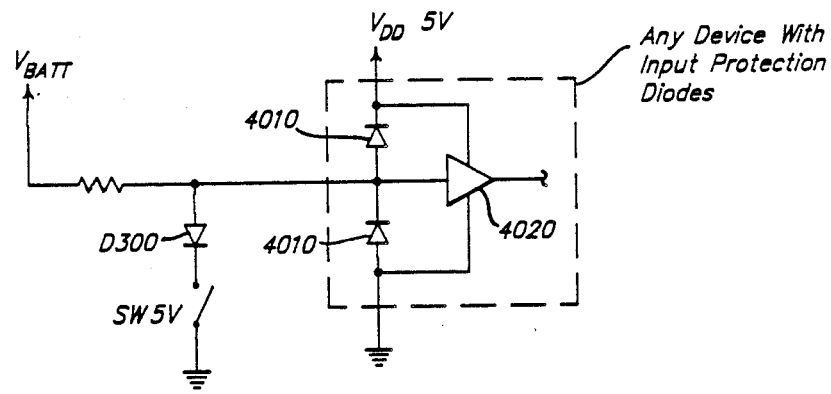
FIG. 31 is an equivalent circuit schematic diagram illustrating how diodes can be used in an input circuit to take advantage of an active pull-down network in a switched voltage section of a dual regulator to provide high voltage protection to a microcomputer with an electrostatic discharge protection circuit.

It should be noted that both the "RELAY/PWR" and "SW/BATT" signals provide input signals to the conditioning circuit block 3310. In the present embodiment, the conditioning circuit block 3310 employs thick film packaging technology to effectively create a single compact chip for the circuits contained in this block. The conditioning circuit block 3310 is comprised of four identical conditioning circuits 3320–3350. Each of these conditioning circuits include an RC filter (R300 and C200) and a pair of voltage dividing resistors (R301 and R302). Since the SW/BATT and RELAY/PWR signals are at the battery voltage potential, the voltage dividing resistors cut this voltage level down to the 5 volt logic level used in the micro core 3250. This is also further illustrated in FIG. 31 which shows this concept in a simpler form.

It is also important to note that each of the conditioning circuits 3320–3350 include a diode "D300" which connects the input signal of each of these circuits to the SW/5V supply line. This is a particularly advantageous feature of the present invention, because the regulator chip Z215 will actively pull the SW/5V signal level down to ground during an over voltage condition (e.g., where the battery voltage exceeds 30 volts). Accordingly, the diode D300 will clamp the battery voltage level input signals to the conditioning circuits 3320–3350 down to ground during such an over voltage condition. This will prevent excessive input signals from being transmitted to the micro core circuits 3250 via ESD protection diodes. In this regard, for example, the RELAY/PWR signal is transmitted to the "PB0" port of the interface circuit Z135 of the micro core 3250 through the conditioning circuit 3330. This feedback provision will enable the microcomputer 3251 (chip Z138) to confirm the status of the relay driver circuit 3270 and is also used while testing the watchdog reset.

OPEN LOOP CONTROL OF AND SPIKE MONITOR FOR SOLENOID COIL DRIVERS

Referring to FIG. 28G, a schematic diagram of the solenoid driver circuits 3280 is shown. The solenoid driver circuits 3280 comprise an individual driver circuit for each of the four solenoid-actuated valves 630, 632, 634 and 636 contained in the transmission namely, driver circuits 3282–3288. Each of these driver circuits is provided with two input signals, one of which is derived from the interface 3252 (chip Z135) and the other of which is derived from the microcomputer 3251 (chip Z138). For example, in the driver circuit 3282, an enablement command signal is transmitted from "PC6" port of the interface 3252 (chip Z135), and a current control signal is transmitted from the "OC2" port of the microcomputer 3251 (chip Z138). The OC2 signal is derived from an internal timer of the microcomputer 3251 (chip Z138). Specifically, the OC2 control signal generated by MCU timer functions provides a series of pulses which have an appropriate duty cycle for causing a pulse width modulation of the current to the solenoid coil, such as the underdrive (UD) coil, in addition a "pull in" pulse is MCU timer generated when the solenoid coil is first turned on.

When the microcomputer 3251 (chip Z138) causes the interface 3252 (chip Z135) to latch its "PC6" port into a HIGH state, the driver circuit 3282 will be enabled through the gating on of transistors Q177 and Q169. The gating on or HIGH pulse of the OC2 signal will permit the current in the UD solenoid coil to charge up through the transistor Q179. Then, when the pulse of the OC2 signal is turned off, current through the UD solenoid coil will circulate in the path created by the diode D168 and transistor Q169. The result will be an efficient slow decay of the current through the UD solenoid coil. At this point, it should be noted that the junction between the Darlington pair transistor Q169 and the MOSFET resistor Q179 will be at a potential above the potential of the SW/BATT supply signal.

Subsequently, when the microcomputer chip Z138 causes the "PC6" port of the interface 3252 (chip Z135) to switch to a LOW state, the transistor Q177 will switch off and cause a rapid decay of current through the UD solenoid coil. When the gate signal is removed from the transistor Q177, it should be noted that the Darlington pair transistor Q169 will also turn off. This rapid decay of current will also cause the voltage on the conductor 3289 to rise above the SW/BATT potential. At some point (e.g., 25 volts), this rising potential will cause the Darlington pair transistor Q169 to turn on again to limit the spike of this rising voltage potential. However, it is important to note that the voltage potential on conductor 3289 is transmitted through the diode "D174" to the zener diode "D173". At a predetermined potential (e.g., 24 volts), the zener diode D173 will breakdown and cause current to flow through the transistor Q168 to the "PB3" port of the interface 3252 (chip Z135).

This spike monitor circuitry is an important aspect of the present invention, as it allows the microcomputer 3251 (chip Z135) to determine whether the solenoid coil is in a shorted or open condition. In other words, the spike monitor circuitry of the solenoid driver circuits 3280 will tell the microcomputer 3251 (chip Z138) that the solenoid coil has indeed turned off. In this regard, it should be noted that the SW/BATT signal continually keeps the transistor Q168 in a conducting condition, so that the current from conductor 3289 will pass directly through its emitter and collector junctions for transmission to the "PB3" port of the interface 3252 (chip Z135).

It should be appreciated that the diode ⊤D173" is connected to each of the driver circuits 3282–3288 through appropriate diodes (e.g., D175 and D202), so that the microcomputer 3251 (chip Z138) will be able to detect the presence of a voltage spike from each of these driver circuits. While each of the driver circuits 3282 are substantially identical, the connections employed in the driver circuit 3282 will be briefly described.

The OC2 port of the microcomputer 3251 (chip Z138) is connected to the gate of the MOSFET transistor Q179 through the resistor R161. The source of the transistor Q179 is connected to ground, while the drain of this transistor is connected to one end of the UD solenoid coil. The other end of the UD solenoid coil is connected to the junction between the SW/BATT potential and the diode pair D168. The common emitter junction of the Darlington pair transistor Q169 is connected across the reverse bias diode in the diode pair D168, while the collector junction of the transistor is connected to the drain of the MOSFET transistor Q179. A capacitor C248 is coupled across the collector and base junctions of the Darlington pair transistor Q169 for stability, while a resistor R298 is connected across the base and emitter junction of this transistor to provide sufficient current for spike monitor operation. The base of the transistor Q169 is also connected to the collector junction of the transistor Q177 through the resistor R178. The base of the transistor Q177 is coupled to the "PC6" port of the interface circuit Z135 through the transistor R176. The emitter junction of the transistor Q177 is connected to ground. The conductor 3289 is connected to the collector junction of the transistor Q177, and is coupled to the diode D174 through one of the diodes labeled "D175".

Figure 35:
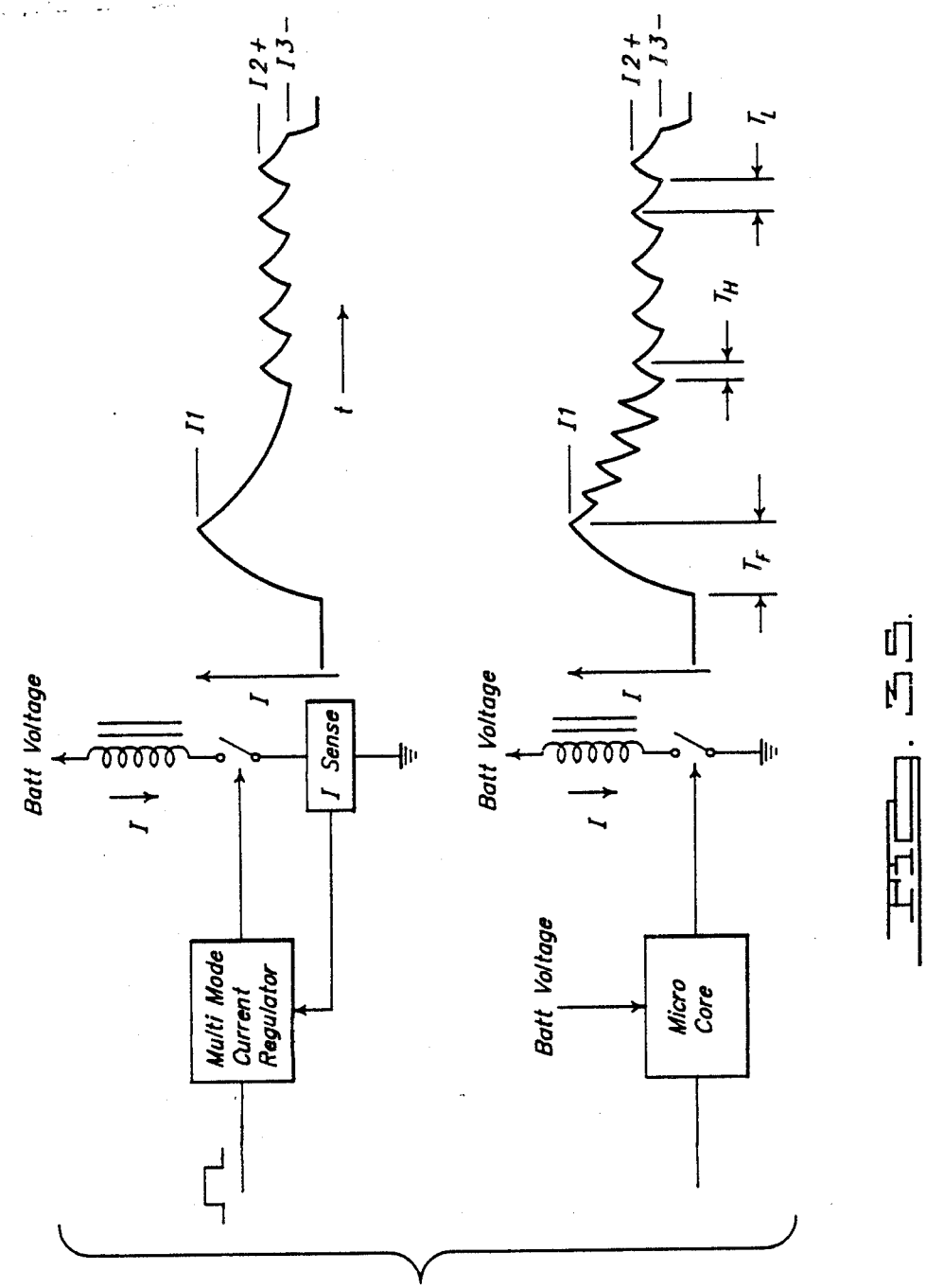
FIG. 35 is an illustration of closed loop and open loop control of solenoid coil drivers showing basic differences between the circuits and basic similarities between the voltage outputs.

FIG. 35 is an illustration of closed loop and open loop control of solenoid coil drivers showing basic differences between the circuits and basic similarities between the voltage outputs. An electronic driver circuit for the open loop control of the energization of a solenoid coil, forming part of an electromagnetic solenoid actuator valve, in response to a control pulse produced by a control circuit and where the predetermined schedules are a function of the inductance and resistance of the coil, the desired peak output voltage from the coil and the desired average holding current through the coil.

The principals of the injector driver circuit are also described in co-assigned U.S. Pat. No. 4,631,628, issued on Dec. 23, 1986, which is expressly hereby incorporated by reference.

Referring to FIG. 28H, a schematic diagram of the pressure switch interface circuits 3240 is shown. The pressure switch interface circuits 3240 are generally embodied in a conditioning circuit block 3242 which is identical to the conditioning circuit block 3310 in the present embodiment. Thus for example, the conditioning circuit block 3242 includes a conditioning circuit 3244 for the "KDPR-SW" pressure switch signal. It should also be noted that the conditioning circuit block 3242 includes a conditioning circuit 3246 which has an input signal labeled "CK/TRANS/LTG". This input signal is generated in the diagnostic alert circuit 3500 shown in FIG. 28I.

Referring to FIG. 28I, the diagnostic alert circuit 3500 is shown to be provided with an input signal labeled "FSW/BATT", which represents the filtered battery voltage level produced at the output of the conditioning circuit 3320 shown in FIG. 28H. As discussed previously, the SW/BATT signal indicates that the battery voltage is being supplied to the solenoid driver circuits 3280. The conditioning circuit 3320 is used to drop this voltage level down to a usable 5 volt logic level which is fed back to the "PC7" port of the interface 3252 (chip Z135) through the diode "D162" of the diagnostic alert circuit 3500.

The FSW/BATT signal is transmitted through an inverting amplifier Z15 which is used to gate the MOSFET transistor Q165. The transistor Q165 produces the CK/TRANS/LTG signal which may be used to alert the operator that power has been cutoff from the transmission solenoid-actuated valves 630, 632, 634 and 636, such as through a light on a diagnostic panel in the passenger compartment. In an application involving the use of the diagnostic alert circuit 3500, the conditioning circuit 3246 shown in FIG. 28H will provide a feedback signal to the "PA1" port of the interface 3252 (chip Z135) to confirm that the diagnostic panel has been provided with the appropriate signal.

FIG. 28I also shows an additional communication circuit 3400 which provides a direct serial transmission link from the transmission controller 3010 to the engine controller 3020. Such a separate transmission channel may be employed when it is desired to send high priority or rapid signals to the engine controller 3020. For example, in some applications it may desirable for the transmission controller 3010 to advise the engine controller 3020 that a gearshift is about to take place. In such a situation, the microcomputer 3251 (chip Z138) would cause an appropriate signal to be placed on the "PB7" port of the interface 3252 (chip Z135) to gate on the transistor Q243. The gating on of the transistor Q243 will generate the "TRDLINK" signal through the filter network comprised of resistor 245 and capacitors 244 and 246.

Referring again to FIG. 28H, the test mode circuit 3300 is shown to include the conditioning circuit 3350. When a testing mode for the transmission controller 3010 is desired, the "test" input signal will be HIGH, thereby causing a LOW "modea/lir" signal to be transmitted to the microcomputer chip Z138. This signal will cause the microcomputer chip Z138 to initiate the test mode sequence discussed above.

Referring to FIG. 29, a block diagram of the interface chip Z135 is shown. The pin designations shown in this figure (e.g., "PC0-PC7") generally correspond to the pin designations shown for the interface 3252 (chip Z135) in FIG. 28B. There is one exception to this correspondence. In FIG. 28B, the pins for Port-A are designated "AD0-AD7"; whereas, in FIG. 29, these pins are designated "D0-D7".

In addition to Port-A, the interface chip Z135 also includes two other ports, namely Port-B (i.e. pins PB0-PB7) and Port-C (i.e. pins PC0-PC7). Pins PB0-PB3 of Port-B are connected to the edge detect input circuits 3600. The edge detect circuits 3600 provide a way to capture the occurrence of an event, such as the turning off of a coil of a solenoid-actuated valve, at a time when the microcomputer 3252 (chip Z138) might otherwise be occupied. Thus, for example, pin PB3 of the interface 3252 (chip Z135) is connected to the spike monitor circuitry of the solenoid driver circuits 3280 in order to transmit a signal indicative of the turning off of a coil of a solenoid-actuated valve to the microcomputer 3251 (chip Z138) through interface 3252 (chip Z135). When such a signal is received, the interface 3252 (chip Z135) can generate an interrupt signal IRQ* which will inform the microcomputer 3251 (chip Z138) that event information has been received for further processing.

The interface 3252 (chip Z138) also includes a plurality of countdown timers 3602, which are responsive to the "E" clock signal of the microcomputer, through the E-clock prescaler circuit 3604. The output from these timers may be transmitted to pins PB4-PB7 through the timer output circuitry 3606, in the event that the timer features of the interface chip are desired to be employed. Otherwise, the pins PB4-PB7 may be used as general purpose output pins.

While Port-C of the interface 3252 (chip Z135) could be used as a low order address port, the mode select signal "MS" is used in the preferred embodiment to configure this port as an output port. In this configuration, the address stroke signal "AS" from the microcomputer chip Z138 is used to command the address latch 3608 to capture low order address information at AD0-AD7 of the interface 3252 (chip Z135).

The interface 3252 (chip Z135) also includes a random access memory circuit 3610, a plurality of internal registers 3612 and a decoder logic circuit 3614. Particular locations in the RAM 3610 and particular internal registers 3612 may be accessed through the decoder logic circuit 3614, which is responsive to the address signal pins "A13-A15" in addition to the latched low order address $A_0$-$A_7$. The internal registers 3612 are used to provide access and control of the various ports and counters for the interface 3252 (chip Z135).

Figure 30:
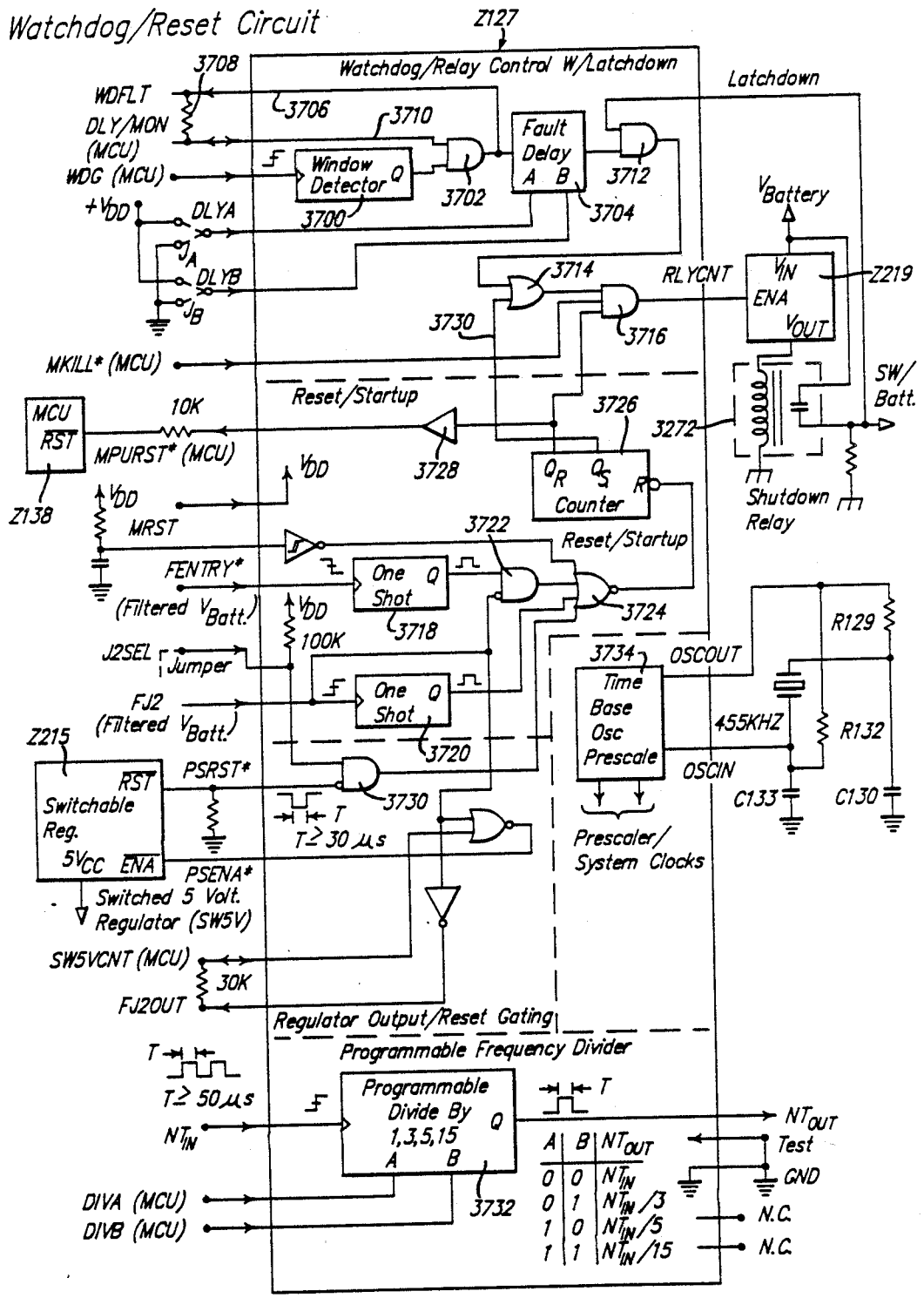
FIG. 30 is a block/schematic diagram of the watchdog/reset chip shown in FIG. 28C.

Referring to FIG. 30, a block/schematic diagram of the watchdog/reset circuit Z127 is shown in association with some of the circuits connected to the watchdog/reset circuit Z127. The first function of the watchdog/reset or "WD" circuit is to monitor the operation of the microcomputer 3251 (chip Z138) by requiring the MCU to periodically transmit a signal to the WD circuit. This signal is designated "WDG" in both FIGS. 28C and 30. If the WD circuit does not receive the WDG signal within a predetermined time window, then the WD circuit will know that the MCU may not be functioning as desired. However, before the WD circuit will react to this situation, it will wait a predetermined amount of delay time to see if proper functioning of the MCU will be quickly restored. If the WDG signal is not received by the end of the delay period, then the WD circuit will transmit a "RLYCNT" signal to the relay driver circuit Z219 which will cause the shutdown relay 3272 to remove electrical power from the solenoid driver circuit 3280.

In this regard, FIG. 30 shows that the WD circuit includes a window detector circuit 3700 which receives the WDG signal. The window detector circuit 3700 includes an up counter which is reset by the WDG signal, and a pair of comparators which determine whether or not the WDG has been received within the predetermined time window (e.g., 14 ms.). If the WDG signal is received too early or too late, or not received at all, then the Q output of the window detector will switch to a LOW digital state. This will in turn drive the output of AND gate 3702 LOW.

The output of the AND gate 3702 is connected to a fault delay circuit 3704 and to a conductor 3706. The fault delay circuit 3704 will give the MCU a predetermined time period (e.g. 64-512 ms.) to transmit the WD signal. This time period may be altered between four different values depending upon the particular voltage or ground connections for the input signals "DLYA" and "DLYB". In the meantime, the conductor 3706 will transmit the "WDFLT" feedback signal, and provide a way of separately testing the operation of the window detector 3700 and the fault delay circuit 3704 within the WD circuit. The conductor 3706 is connected to an input of the AND gate 3702 through the resistor 3708 and conductor 3710. To test the fault delay circuit 3704, the MCU will transmit the "DLY/MON" signal, which will drive the AND gate 3704 LOW in order to simulate the absence of the WD signal from the window detector circuit 3700.

If the WD signal is not received within the time period controlled by the fault delay circuit 3704, then the AND gate 3712 will switch states, and cause the relay driver circuit Z219 to cut off power through the logic connections provided by OR gate 3714 and AND gate 3716. The AND gate 3712 also receives a "Latchdown" signal from the relay driver circuit, which will prevent the AND gate 3712 from switching states again until the reset start-up sequence is initiated, even if the MCU transmits a proper WDG signal in the intervening time period. In other words, once the WD circuit Z127 causes the relay driver circuit Z219 to remove electrical power from the solenoid driver circuit 3280, the reset start-up sequence must be initiated before power will be restored to the solenoid driver circuit.

The WD circuit is also responsive to a master kill signal "MK" from the MCU for removing power from the solenoid driver circuit 3280. In other words, when the MCU determines that power should be removed for whatever reason, then the MK signal will be transmitted to the relay driver circuit through the AND gate 3716.

Another function of the WD circuit Z127 is to control the reset start-up sequence which will occur, for example, when electrical power is first applied to the transmission controller 3010. When power is first applied, this sequence will be initiated by the master reset signal "MRST", which is derived from an RC delay off the VDD power supply.

The reset start-up sequence may also be initiated from a filtered door entry signal "FENTRY". This optional feature could be provided when it is desired, for example, to have the vehicle electrically display the current PRNODDL transmission mode in response to the opening of the vehicle door, prior to the time that the key is inserted into the vehicle ignition. The reset start-up sequence may also be initiated from an actuation of the ignition key, via the ignition signal "FJ2".

The WD circuit includes a pair of one shot multivibrators 3718–3720, which will generate a single or one shot pulse output whenever the FENTRY or FJ2 signals are received. The output from one shot 3718 is combined with the FJ2 signal at the AND gate 3722, while the output of the one shot 3720 is fed directly to the NOR gate 3724. The output from the NOR gate 3724 is connected to the reset input to the counter 3726. Accordingly, it should be appreciated that the NOR gate 3724 serves to combine all those inputs which can cause a reset condition to be generated.

The counter 3726 will generate the reset signal "MPURST", which will be transmitted to the MCU through the buffer 3728. The counter 3726 will also generate a false OK signal on conductor 3730, which is necessary to override or reverse the Latchdown signal. Thus, in the situation where the Latchdown signal has been generated, the momentary false OK signal will allow re-enablement of the relay driver circuit Z219 through OR gate 3714 and AND gate 3716. This re-enablement will, in turn, override the state of the Latchdown signal, and permit electrical power to the solenoid driver circuit 3280 to be applied.

While the above described reset start-up sequence will cause only a momentary MPURST signal to be transmitted to the MCU, the WD circuit also includes a provision for maintaining the presence of this reset signal in response to predetermined regulator conditions. In this regard, it should be appreciated that the continued presence of the reset signal will disable the operation of the MCU, until proper operation of the regulator is restored and the reset signal is removed (i.e. the digital state of this signal is changed).

THE UTILIZATION OF A RESET OUTPUT OF A VOLTAGE REGULATOR AS A SYSTEM LOW-VOLTAGE INHIBIT

As shown in FIG. 30, the regulator circuit Z215 will generate a power supply reset signal "PSRST", which will be transmitted to the NOR gate 3724 through the AND gate 3730. This power supply reset signal will be generated whenever the input voltage to the regulator is too low or too high, or when the regulator is being overloaded.

Figure 32:
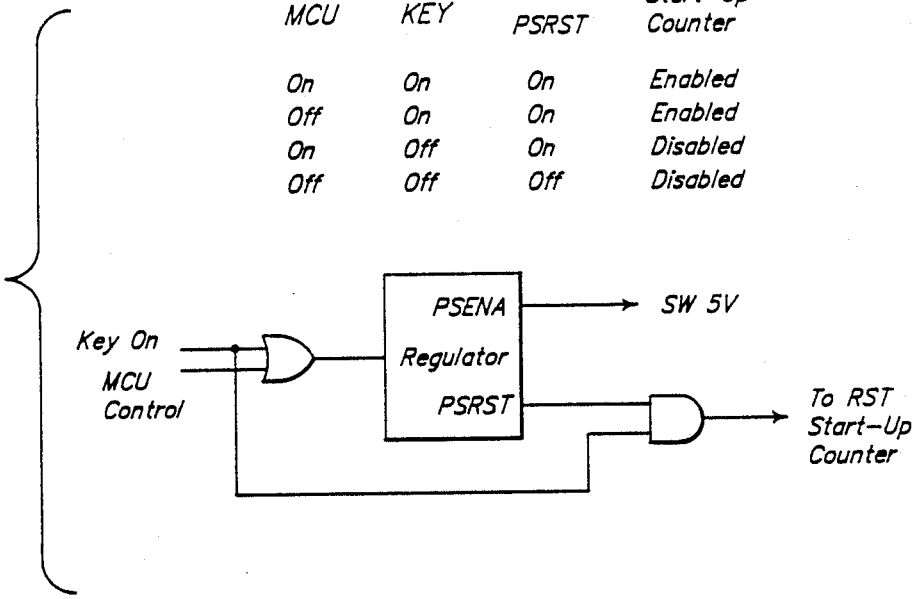
FIG. 32 is an equivalent circuit schematic diagram illustrating how a reset output of a voltage regulator can be used as a system low voltage inhibit.

This feature provides for increased system integrity by holding the MCU 3251 and the transmission controller 3010 in a predetermined RESET state under certain conditions including those shown in conjunction with FIG. 32.

Here a reset output is generated on the powering down of a switch. In other words, the "peripherals" are reset on power-up.

An "additional" RESET mode is provided by the regulator (as shown in FIG. 32) that must be gated out through the watchdog/reset circuit shown in FIG. 30; it also responds to the switching off of the second voltage regulator signal.

Another function of the WD circuit Z127 is to divide the turbine speed signal "$N_t$" down so as to reduce the interrupt burden on the MCU. Accordingly, the WD circuit includes a programmable frequency divider 3732 which receives the turbine speed signal $N_t$. The divided control signals "DIVA" and "DIVB" from the MCU are used to determine one of four different divide ratios to be employed by the divider 3732.

It should also be noted that the WD circuit includes a block 3734 which is labeled "prescaler/system clocks". This block comprises a timer with a prescaler which is used to provide both reset and start-up times, as well as the fault delay and window detector clock signals employed in the WD circuit.

The present invention has been described in an illustrative manner. It is to be understood that the terminology which has been used is intended to be in the nature of words of description rather than of limitation.

Obviously, many modifications and variations are possible in light of the above teachings. Therefore, the subject invention may be practiced otherwise than as specifically described.

What is claimed is:

1. In a vehicle having an engine and a transmission system including an input member, an output member, a torque converter assembly for transmitting torque between the engine and the input member, a gear assembly for changing the ratio of torque between the input member and output member, a plurality of friction elements for shifting the gear assembly, input sensors providing input signals indicative of predetermined conditions, a controller having memory for processing and storing the input signals and predetermined values and providing output signals, a method of adaptively scheduling a shift of the gear assembly, said method comprising the steps of:
   checking the speed of the engine;
   determining whether engine speed ($N_e$) is less than a predetermined speed stored in memory;
   if engine speed is not less than the predetermined speed, allowing the shift to occur; and if engine speed is less than the predetermined speed, inhibiting the shift of the gear assembly for a time period until $N_e$ is equal to the predetermined speed to prevent the speed of the turbine from increasing above the speed of the engine which results in backlash of the drivetrain.

2. In a transmission system associated with an engine, the transmission system including an input member, an output member, a gear assembly for changing the ratio of torque between the input member and output member, input sensors providing input signals indicative of predetermined conditions, a controller having memory for processing and storing the input signals and providing output signals to shift the gear assembly, a method of adaptively scheduling a shift of the gear assembly, said method comprising the steps of:

checking a predetermined condition;

determining whether a value of the predetermined condition is less than a predetermined value stored in memory;

if the value of the predetermined condition is not less than the predetermined value, allowing a shift of the gear assembly to occur;

if the value of the predetermined condition is less than the predetermined value, inhibiting the shift of the gear assembly until the value of the predetermined condition is equal to the predetermined value to prevent backlash of the transmission system; and wherein said step of checking a predetermined condition is further defined as checking the speed of the engine.

3. A method as set forth in claim 2 wherein the step of inhibiting the shift is further defined as delaying the shift for a time period until the speed of the engine is equal to the predetermined value and then allowing the shift of the gear assembly to occur.

4. In a transmission system associated with an engine, the transmission system including an input member, an output member, a gear assembly for changing the ratio of torque between the input member and output member, input sensors providing input signals indicative of predetermined conditions, a controller having memory for processing and storing the input signals and providing output signals to shift the gear assembly, a method of adaptively scheduling a shift of the gear assembly, said method comprising the steps of:

checking the speed of the engine;

determining whether the speed of the engine is less than a predetermined speed stored in memory;

if the speed of the engine is not less than the predetermined speed, allowing the shift to occur; and if the speed of the engine is less than the predetermined speed, delaying the shift of the gear assembly for a time period until the speed of the engine is equal to the predetermined speed to prevent a backlash of the transmission system.

* * * * *